(12) United States Patent
Park et al.

(10) Patent No.: US 11,782,329 B2
(45) Date of Patent: Oct. 10, 2023

(54) CAMERA MODULE, DUAL CAMERA MODULE, OPTICAL DEVICE, AND METHOD FOR MANUFACTURING DUAL CAMERA MODULE

(71) Applicant: LG INNOTEK CO., LTD., Seoul (KR)

(72) Inventors: Sang Ok Park, Seoul (KR); Tae Young Kim, Seoul (KR); Hyun Ah Oh, Seoul (KR); Youn Baek Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/050,291

(22) Filed: Oct. 27, 2022

(65) Prior Publication Data
US 2023/0070041 A1 Mar. 9, 2023

Related U.S. Application Data

(63) Continuation of application No. 17/195,035, filed on Mar. 8, 2021, now Pat. No. 11,513,424, which is a (Continued)

(30) Foreign Application Priority Data

Nov. 1, 2016 (KR) .................... 10-2016-0144381
Jan. 9, 2017 (KR) .................... 10-2017-0002960
(Continued)

(51) Int. Cl.
*G03B 17/12* (2021.01)
*H01F 7/16* (2006.01)
(Continued)

(52) U.S. Cl.
CPC ............. *G03B 17/12* (2013.01); *G03B 17/02* (2013.01); *G03B 19/22* (2013.01); *H01F 7/08* (2013.01);
(Continued)

(58) Field of Classification Search
CPC ........ G03B 17/12; G03B 17/02; G03B 19/22; H01F 7/08; H01F 7/16; H04N 23/00;
(Continued)

(56) References Cited

U.S. PATENT DOCUMENTS 9,609,234 B1 3/2017 Checka
9,838,599 B1 12/2017 Tam et al.
(Continued)

FOREIGN PATENT DOCUMENTS

CN 101271192 A 9/2008
CN 102281392 A 12/2011
(Continued)

OTHER PUBLICATIONS

International Search Report in International Application No. PCT/KR2017/012285, filed Nov. 1, 2017.
(Continued)

*Primary Examiner* — Christopher K Peterson
(74) *Attorney, Agent, or Firm* — Saliwanchik, Lloyd & Eisenschenk

(57) ABSTRACT

The present embodiment relates to a dual camera module comprising: a rigid first substrate having a first image sensor arranged thereon; a rigid second substrate spaced apart from the first substrate and having a second image sensor arranged thereon; a third substrate connected to the first substrate and the second substrate; and a flexible connection unit for connecting the first substrate to the second substrate, wherein the first substrate includes a first side surface, the second substrate includes a second side surface facing the first side surface, and the connection unit connects the first side surface of the first substrate to the second side surface of the second substrate.

19 Claims, 56 Drawing Sheets

Related U.S. Application Data continuation of application No. 16/345,461, filed as application No. PCT/KR2017/012285 on Nov. 1, 2017, now Pat. No. 10,969,659.

(30) Foreign Application Priority Data

Jan. 11, 2017 (KR) ........................ 10-2017-0004206
Feb. 10, 2017 (KR) ........................ 10-2017-0018832

(51) Int. Cl.
| | |
|---|---|
| G03B 17/02 | (2021.01) |
| G03B 19/22 | (2021.01) |
| H01F 7/08 | (2006.01) |
| H04N 23/00 | (2023.01) |
| H04N 23/50 | (2023.01) |
| H04N 23/51 | (2023.01) |
| H04N 23/60 | (2023.01) |
| H04N 23/90 | (2023.01) |
| H04N 25/00 | (2023.01) |

(52) U.S. Cl.
CPC .............. *H01F 7/16* (2013.01); *H04N 23/00* (2023.01); *H04N 23/50* (2023.01); *H04N 23/51* (2023.01); *H04N 23/60* (2023.01); *H04N 23/90* (2023.01); *H04N 25/00* (2023.01)

(58) Field of Classification Search
CPC ........ H04N 23/50; H04N 23/51; H04N 23/60; H04N 23/90; H04N 25/00
See application file for complete search history.

(56) References Cited

U.S. PATENT DOCUMENTS

| | | | |
|---|---|---|---|
| 2004/0021792 A1 | 2/2004 | Yasui | |
| 2005/0046740 A1 | 3/2005 | Davis | |
| 2008/0203420 A1* | 8/2008 | Higaki | H01L 33/486 257/E23.005 |
| 2009/0017867 A1 | 1/2009 | Koh | |
| 2010/0165120 A1* | 7/2010 | Chang | H04N 23/50 348/207.99 |
| 2010/0326703 A1 | 12/2010 | Gilad et al. | |
| 2013/0070148 A1* | 3/2013 | Kim | H04N 23/57 348/357 |
| 2014/0035081 A1* | 2/2014 | Jan | H01L 27/14618 257/E31.127 |
| 2014/0092298 A1* | 4/2014 | Kim | G03B 17/02 348/374 |
| 2014/0212127 A1 | 7/2014 | Chen | |
| 2015/0049167 A1 | 2/2015 | Suzuki et al. | |
| 2015/0130974 A1 | 5/2015 | Chuang et al. | |
| 2015/0316745 A1 | 11/2015 | Chen et al. | |
| 2016/0018720 A1 | 1/2016 | Bachar et al. | |
| 2016/0178923 A1 | 6/2016 | Hayashi | |
| 2016/0255260 A1 | 9/2016 | Huang et al. | |
| 2017/0146766 A1 | 5/2017 | Hsu | |
| 2017/0146771 A1 | 5/2017 | Ho et al. | |
| 2020/0200994 A1 | 6/2020 | Park | |

FOREIGN PATENT DOCUMENTS

| | | |
|---|---|---|
| CN | 103973943 A | 8/2014 |
| CN | 104333687 A | 2/2015 |
| CN | 104640405 A | 5/2015 |
| CN | 104869293 A | 8/2015 |
| CN | 104932174 A | 9/2015 |
| CN | 105319664 A | 2/2016 |
| CN | 205407979 U | 7/2016 |
| CN | 205545551 U | 8/2016 |
| CN | 205545576 U | 8/2016 |
| CN | 105933581 A | 9/2016 |
| CN | 205566466 U | 9/2016 |
| CN | 105988181 A | 10/2016 |
| CN | 205647691 U | 10/2016 |
| CN | 107407849 A | 11/2017 |
| EP | 2 955 557 A1 | 12/2015 |
| EP | 3 035 109 A1 | 6/2016 |
| JP | 2007-150988 A | 6/2007 |
| JP | 2014-157309 A | 8/2014 |
| KR | 10-0649770 B1 | 11/2006 |
| KR | 10-2009-0055889 A | 6/2009 |
| KR | 10-2012-0021083 A | 3/2012 |
| KR | 10-2014-0133002 A | 11/2014 |
| KR | 10-1459753 B1 | 11/2014 |
| KR | 10-2015-0142197 A | 12/2015 |
| WO | 2016/117222 A1 | 7/2016 |

OTHER PUBLICATIONS

Supplementary Partial European Search Report dated Nov. 12, 2019 in European Application No. 17867458.6.
Supplementary European Search Report dated Apr. 28, 2020 in European Application No. 17867458.6.
Office Action dated Aug. 24, 2020 in Chinese Application No. 201780067478.8.
Office Action dated Mar. 20, 2020 in U.S. Appl. No. 16/345,461.
Office Action dated Sep. 25, 2020 in U.S. Appl. No. 16/345,461.
Notice of Allowance dated Dec. 9, 2020 in U.S. Appl. No. 16/345,461.
Office Action dated Oct. 11, 2021 in Chinese Application No. 201780067478.8.
European Search Report dated Jun. 20, 2022 in European Application No. 22155414.0.
Office Action dated Apr. 13, 2022 in U.S. Appl. No. 17/195,035.
Notice of Allowance dated Jul. 27, 2022 in U.S. Appl. No. 17/195,035.
Office Action dated Aug. 9, 2023 in Korean Application No. 10-2017-0004206.
Office Action dated May 24, 2023 in Chinese Application No. 202210451416.X.

* cited by examiner

CAMERA MODULE, DUAL CAMERA
MODULE, OPTICAL DEVICE, AND
METHOD FOR MANUFACTURING DUAL
CAMERA MODULE

CROSS-REFERENCE TO RELATED APPLICATIONS

This application is a continuation of U.S. application Ser. No. 17/195,035, filed Mar. 8, 2021; which is a continuation of U.S. application Ser. No. 16/345,461, filed Apr. 26, 2019, now U.S. Pat. No. 10,969,659, issued Apr. 6, 2021; which is the U.S. national stage application of International Patent Application No. PCT/KR2017/012285, filed Nov. 1, 2017; which claims the benefit under 35 U.S.C. § 119 of Korean Application Nos. 10-2016-0144381, filed Nov. 1, 2016; 10-2017-0002960, filed Jan. 9, 2017; 10-2017-0004206, filed Jan. 11, 2017; and 10-2017-0018832, filed Feb. 10, 2017; all of which are hereby incorporated by reference in their entirety.

TECHNICAL FIELD

The teachings in accordance with exemplary and non-limiting embodiments of this invention relate generally to a camera module, a dual camera module, an optical device and a method for manufacturing a dual camera module.

BACKGROUND ART

This section provides background information related to the present invention, which is not necessarily prior art.

Concomitant with generalization of wide use of various mobile terminals, and commercialization of wireless interact services, demands by consumers related to mobile terminals are also diversified to allow various types of peripheral devices to be mounted on the mobile terminals. Among the representative items thereof, there is mentioned a camera module capturing a subject in a picture or a video. The camera module include an AF (Auto Focus) camera module having a function of performing an AF function automatically adjusting a focus in response to a distance to a subject, and an OIS (Optical image stabilization) camera module having a function correcting handshake of a user when a subject is captured.

The conventional dual camera module suffers from disadvantages in that there is no way to adjust two image sensors subsequent to alignment thereof after the two image sensors are mounted on a PCB (Printed Circuit Board) and the alignment between the two image sensors becomes twisted due to heat or shock.

Moreover, when two lens driving devices are proximately arranged for obtainment of good performance of dual camera, a magnetic force of a magnet on any one lens driving device of two lens driving devices problematically affects the other lens driving device.

Still another problem is that a distance between an upper end of an image sensor and a lower end of lens may be shortened in a camera module depending on design, and in this case, a wire applying a power to the image sensors and the PCB may problematically interfere with a sensor base.

The current trend is that, concomitant with requirement of high performance of lens in a camera module, each diameter of the lens and a lens barrel becomes increased. However, unlike the increased diameter of lens and the lens barrel, an adhesive area between a lens driving device and a sensor base becomes relatively decreased to disadvantageously generate the disengagement of lens driving device during drop test or tumble test.

DETAILED DESCRIPTION OF THE INVENTION

Technical Subject

A first exemplary embodiment of the present invention is to provide a dual camera module configured to adjust and align two image sensors after mounting two image sensors by adding a flexible material between the two image sensors albeit a single PCB. In addition, the present invention is to provide an optical device including a dual camera module. The present invention also provides a method for manufacturing a dual camera module.

A second exemplary embodiment of the present invention is to provide a dual camera module configured to minimize the phenomenon of mutually affecting an influence on two magnets of two parallel-arranged lens driving devices. Particularly, the present invention is to provide a dual camera module configured to minimize a phenomenon of a bobbin disposed with any one sensing magnet being disengaged or tilted from a regular position by another magnet in two parallel OIS modules each having an AF feedback function. The present invention also provides an optical device including a dual camera module.

A third exemplary embodiment of the present invention is to provide a camera module configured to have a structure of inhibiting a wire electrically conducting an image sensor and a PCB from being interfered with a sensor base. The present invention also provides an optical device including the camera module.

A fourth exemplary embodiment of the present invention is to provide a camera module configured to have a structure in which adhesive strength of an adhesive adhering a lens driving device to a sensor base is reinforced. The present invention also provides an optical device including the camera module.

Technical Solution

A dual camera module according to a first exemplary embodiment may comprise: a first rigid substrate having a first image sensor arranged thereon; a second rigid substrate spaced apart from the first substrate and having a second image sensor arranged thereon; a third substrate connected to the first substrate and the second substrate; and a flexible connection unit for connecting the first substrate to the second substrate, wherein the first substrate includes a first side surface, the second substrate includes a second side surface facing the first side surface, and the connection unit connects the first side surface of the first substrate to the second side surface of the second substrate.

The third substrate may include a body part, a first connection part extended from the body part and connected to the first substrate, and a second connection part extended from the body part and connected to the second substrate, wherein the first connection part may be spaced apart from the second connection part.

The first substrate may include a third side surface adjacent to the first side surface, the second substrate may include a fourth side surface adjacent to the side surface, the first connection part may be connected to the third side surface and the second connection part may be connected to the fourth side surface.

The first connection part may be connected to the third side surface leaned toward a corner near to the second substrate in two corners of the third side surface, and the second connection part may be connected to the fourth side surface leaned to a corner near to the first substrate in two side corners of the fourth side surface.

The third substrate may be a flexible PCB (Flexible Printed Circuit Board, and the body part may be disposed with a connector connected to an outside.

The connection unit may include a first moving part and a second moving part spaced apart from the first moving part, wherein an area where the first moving part meets the second moving part and an area where the second moving part meets the first side surface may be symmetrical about a center of the first side surface.

The first and second moving parts may become smaller in at least a portion of a cross-sectional area of a cross-section parallel with the first side surface to allow being spaced apart from the first substrate and the second substrate.

The connection unit may have an insulation property and may not be formed with a conductive line.

The dual camera module may further comprise a stiffener disposed at a lower surface of first substrate and at a lower surface of second substrate, and the first substrate and the second substrate may be coupled to the stiffener by epoxy for AA (Active Alignment).

The connection unit may be integrally formed with the first substrate and the second substrate.

A length of the connection unit to a width direction may be more than 50% of a length of the first side surface of first substrate to a long side direction, and a width direction of the connection unit and a long side direction of the first side surface may be parallel.

A dual camera module according to a first exemplary embodiment may comprise:
 a first rigid substrate having a first image sensor arranged thereon; a second rigid substrate spaced apart from the first substrate and having a second image sensor arranged thereon; a third substrate connected to the first substrate and the second substrate; and a connecting part disposed at the third substrate and electrically connected to an outside element, wherein the first substrate may include a first side surface, the second substrate may include a second side surface facing the first side surface, and wherein the first substrate may include a third side surface adjacent to the first side surface, and the second substrate may include a fourth side surface adjacent to the second side surface, and wherein the third substrate may be connected to the first substrate at the third side surface, the third substrate may be connected to the second substrate at the fourth side surface and a discrete distance between the third side surface and the connecting part may correspond to a discrete distance between the connecting part and the fourth side surface.

An optical device according to a first exemplary embodiment may comprise:
 a main body;
 a dual camera module disposed on the main body; and
 a display part disposed at one surface of main body to output an image captured by the dual camera module, wherein the dual camera module may comprise:
 a first rigid substrate having a first image sensor arranged thereon; a second rigid substrate spaced apart from the first substrate and having a second image sensor arranged thereon; a third substrate connected to the first substrate and the second substrate; and a flexible connection unit for connecting the first substrate to the second substrate, wherein the first substrate includes a first side surface, the second substrate includes a second side surface facing the first side surface, and the connection unit connects the first side surface of the first substrate to the second side surface of the second substrate.

A method for manufacturing a dual camera module according to a first exemplary embodiment may comprise:
 mounting a first image sensor on a first substrate and mounting a second image sensor on a second substrate spaced apart from the first substrate and connected to the first substrate by a connection unit;
 coupling a first lens driving device coupled by a first lens module to the first substrate;
 coupling a second lens driving device coupled by a second lens module to the second substrate;
 coupling the first substrate to a stiffener; and
 coupling the second substrate to the stiffener.

The step of coupling the first lens driving device to the first substrate may include:
 curing (hardening) a first epoxy by aligning the first lens module with the first image sensor while the first substrate and the first lens driving device are provisionally adhered by the first epoxy, and
 the step of coupling the second lens driving device to the second substrate may include:
 curing (hardening) a second epoxy by aligning the second lens module with the second image sensor while the second substrate and the second lens driving device are provisionally adhered by the first epoxy, and
 the step of coupling the second substrate to the stiffener may include:
 curing (hardening) a third epoxy by aligning the first image sensor with the second image sensor while the second substrate and the stiffener are provisionally adhered by the third epoxy.

An OIS and OIS dual camera module according to a second exemplary embodiment may provide a VCM (Voice Coil Motor) so configured as to reduce a portion of a driving magnet from a dual camera module and to maintain two modules at a minimum distance, a camera module and a mobile phone.

The second exemplary embodiment may include a structure in which sensing magnets may be symmetrically arranged, and a driving magnet between products is maintained at a maximum distance.

The second exemplary embodiment may include a structure in which two camera modules have a same actuator structure.

The second exemplary embodiment may be so configured as to allow an OIS Hall IC to be overlapped with a portion or all of a magnet. Furthermore, the second exemplary embodiment may be so configured as to allow an OIS Hall IC to be overlapped with a portion or all of a magnet at the time of driving.

In the second exemplary embodiment, an AF Hall IC in a CLAF (closed loop Auto Focus) may be disposed at a symmetrical direction, and an OIS Hall IC may be disposed on a straight line part.

A dual camera module according to a second exemplary embodiment may comprise:
 a first lens driving device including a first housing, a first bobbin disposed at an inside of the first housing; a first magnet disposed on the first housing, a first coil disposed at the first bobbin and facing the first magnet, a first base disposed underneath the first housing, a first substrate including a first circuit member having a second coil so disposed as to face the first magnet between the first housing and the first base, a first sensing magnet disposed at the first bobbin, and a first Hall sensor disposed at the first housing to detect the first sensing magnet; and a second lens driving device including a second housing, a second bobbin disposed at an inside of the second housing; a second magnet disposed on the second housing, a third coil disposed at the second bobbin and facing the second magnet, a second base disposed underneath the second housing, a second substrate including a second circuit member having a fourth coil so disposed as to face the second magnet between the second housing and the second base, a second sensing magnet disposed at the second bobbin, and a second Hall sensor disposed at the second housing to detect the second sensing magnet, wherein the first lens driving device may be spaced apart from the second lens driving device and surfaces mutually facing each other may be parallel arranged, the first Hall sensor may be disposed at a corner portion most spaced apart from the second sensing magnet among a plurality of corner portions of the first housing, and the second Hall sensor may be disposed at a corner portion most spaced apart from the first Hall sensor among a plurality of corner portions of the second housing.

The first lens driving device may further comprise a first compensation magnet disposed at the first bobbin and symmetrically formed with the first sensing magnet about a first optical axis, and the second lens driving device may further comprise a second compensation magnet disposed at the second bobbin and symmetrically formed with the second sensing magnet about a second optical axis.

The first housing may include a first side surface, a third side surface facing the first side surface, and second and fourth side surfaces facing each other between the first and third side surfaces, the second housing may include a fifth side surface facing the first side surface, a seventh side surface facing the fifth side surface, and sixth and eighth side surfaces facing each other between the fifth and seventh side surfaces, and the first Hall sensor may be disposed at a corner portion between the second and third side surfaces, and the second Hall sensor may be disposed at a corner portion between the sixth and seventh side surfaces.

The first magnet may include first to fourth side magnets each disposed at the first to fourth side surfaces of the first housing, and the second magnet may include fifth to eighth side magnets each disposed at the fifth to eighth side surfaces of the second housing, and each of the first to eighth side magnets may take a flat plate shape.

The first to fourth side magnets may be symmetrical with the fifth to eighth side magnets about a first virtual line which is an imaginary straight line, and the first virtual line may be disposed on an imaginary plane surface including the first and second optical axes and may be parallel with the first and second optical axes.

The first to fourth side magnets may be mutually symmetrical about a first optical axis, and the fifth to eighth side magnets may be mutually symmetrical about a second optical axis.

The first magnet may not be overlapped with the fifth magnet to a direction perpendicular to a first optical axis.

The first housing may include first to fourth corner parts disposed among the first to fourth side surfaces, the first side magnet may be disposed to be closer to the first corner part than the fourth corner part, the second side magnet may be disposed to be closer to the first corner part than the second corner part, the third side magnet may be disposed to be closer to the third corner part than the second corner part, the fourth side magnet may be disposed to be closer to the third corner part than the fourth corner part, the second housing may include fifth to eighth corner parts disposed among the fifth to eighth side surfaces, the fifth side magnet may be disposed to be closer to the fifth corner part than the eighth corner part, the sixth side magnet may be disposed to be closer to the fifth corner part than the sixth corner part, the seventh side magnet may be disposed to be closer to the seventh corner part than the sixth corner part, and the eighth side magnet may be disposed to be closer to the seventh corner part than the eighth corner part.

The first sensing magnet may be disposed at a side surface of the first bobbin facing a corner part between the second and third side surfaces of the first housing, and the second sensing magnet may be disposed at a side surface of the second bobbin facing a corner part between the sixth and seventh side surfaces of the second housing.

The first side surface may be disposed to be parallel with the fifth side surface, and the first side surface may be overlapped with the fifth side surface to a direction perpendicular to a first optical axis.

The first lens driving device may further comprise a first cover member accommodated into an inside of the first housing, and the second lens driving device may further comprise a second cover member accommodated into an inside of the second housing, wherein the first cover member may be spaced apart from the second cover member by 1 mm to 5 mm.

At least one of the first and second Hall sensors may include a temperature detecting function.

The first lens driving device may further comprise a first upper elastic member disposed at an upper side of the first bobbin and coupled to the first bobbin and the first housing, a first lower elastic member disposed at a lower side of the first bobbin and coupled to the first bobbin and the first housing, and a first support member coupled to the first upper elastic member and the first substrate, and the second lens driving device may further comprise a second upper elastic member disposed at an upper side of the second bobbin and coupled to the second bobbin and the second housing, a second lower elastic member disposed at a lower side of the second bobbin and coupled to the second bobbin and the second housing, and a second support member coupled to the second upper elastic member and the second substrate.

A dual camera module according to a second exemplary embodiment may further comprise:

a PCB;
a first image sensor disposed on the PCB;
a second image sensor disposed on the PCB and spaced apart from the first image sensor;
a first lens disposed at a position opposite to that of the first image sensor and coupled to the first bobbin; and
a second lens disposed at a position opposite to that of the second image sensor and coupled to the second bobbin.

An optical device according to a second exemplary embodiment may comprise:

a main body;
a dual camera module disposed on the main body to capture an image of a subject; and
a display part to output an image captured by the dual camera module, wherein the dual camera module may comprise:
a first lens driving device including a first housing, a first bobbin disposed at an inside of the first housing, a first magnet disposed at the first housing, a first coil disposed at the first bobbin and facing the first magnet, a first base disposed underneath the first housing, a first substrate including a first circuit member having a second coil disposed to face the first magnet between the first housing and the first base, a first sensing magnet disposed on the first bobbin, and a first Hall sensor disposed at the first housing to detect the first sensing magnet; and a second lens driving device including a second housing, a second bobbin disposed at an inside of the second housing, a second magnet disposed at the second housing, a third coil disposed at the second bobbin to face the second magnet, a second base disposed underneath the second housing, a second substrate including a second circuit member having a fourth coil disposed to face the second magnet between the second housing and the second base, a second sensing magnet disposed on the second bobbin, and a second Hall sensor disposed at the second housing to detect the second sensing magnet, wherein the first lens driving device may be spaced apart from the second lens driving device and surfaces mutually facing each other may be disposed to be parallel, and the first Hall sensor may be disposed at a corner portion most spaced apart from the second sensing magnet in a plurality of corner portions of the first housing, and the second Hall sensor may be disposed at a corner portion most spaced apart from the first Hall sensor in a plurality of corner portions of the second housing.

An FBL (Flange Back Length) may be used when a short lens is applied in order to increase a lens design performance in a camera module according to a third exemplary embodiment. At this time, the FBL is a distance from a lower end of lens barrel to a top surface of image sensor. Furthermore, an FBL (Flange Back Length) may be used when a cavity PCB (Cavity Printed Circuit Board) is applied for slim camera module according to the present exemplary embodiment.

A step (staircase) shape may be formed at an inside of sensor base according to the third exemplary embodiment. A lens FBL in the third exemplary embodiment may be short as 0.80 mm~0.89 mm, or may be 1.00 mm~1.09 mm when applied with a cavity PCB.

A camera module according to a third exemplary embodiment may comprise:

a PCB;

an image sensor disposed at a top surface of the PCB;

a wire connected to a top surface of the image sensor and to a top surface of the PCB;

a body part having a through hole disposed at an upper side of the image sensor;

a sensor base including a support part extended from a periphery of the body part to a lower side to be disposed on a top surface of the PCB, wherein a lower surface of the body part may include a first surface formed at an inside of the support part, a second surface formed at an inside of the first surface and a third surface formed at an inside of the second surface, and wherein the second surface may be disposed at a side lower than the first surface, the third surface may be disposed at a side lower than the second surface, an upper end of the wire may be overlapped with the second surface to an optical axis direction of the image sensor and may be disposed at an outside of the third surface.

A boundary connecting the third surface to the second surface may be overlapped with the image sensor to an optical axis direction.

The boundary may include an incline forming an obtuse angle or an acute angle with the third surface or the second surface.

A circuit element may be interposed between the first surface and a top surface of the PCB.

The camera module may further comprise a filter disposed at a position corresponding to that of the through hole, wherein the filter may be disposed on a reception surface formed by allowing a portion of the sensor base to be recessed.

An inner surface of the sensor base forming the through hole may form an obtuse angle with the third surface, and may be formed as an incline forming an acute angle with the reception surface.

The PCB may include a cavity surface formed by allowing a portion of a top surface of the PCB to be recessed, and the image sensor may be disposed on the cavity surface, and the wire may be connected to a top surface of the image sensor and to a top surface of the PCB.

A distance between a top surface of image sensor and the third surface may be 0.14~0.16 mm, and a distance between the third surface and the second surface may be 0.02~0.03 mm.

A distance between the third surface and the reception surface may be 0.19~0.21 mm, and a distance between the reception surface and a top surface of sensor base may be 0.23~0.29 mm, and a distance between a top surface of sensor base and a lower end of lens barrel may be 0.15~0.20 mm.

A distance between the third surface and the second surface may be by 10~15% the distance between the third surface and the reception surface.

The camera module may further comprise a lens driving device disposed at an upper side of the sensor base and a lens module coupled to the lens driving device, wherein the lens driving device may be actively aligned to a top surface of the sensor base.

The lens module may include a lens barrel and at least one lens accommodated into the lens barrel, wherein a distance between a lower end of the lens barrel and a top surface of the image sensor, which is an FBL (Flange Back Length), may be 0.75~0.88.

A distance from the third surface to a top surface of sensor base may be 1.20~1.67 times the thickness of the image sensor.

The lens driving device may comprise: a housing; a bobbin disposed at an inside of the housing and coupled to the lens; a coil disposed at an outside of the bobbin; a magnet disposed at the housing to face the coil; and an elastic member coupled to the bobbin and the housing.

An optical device according to a third exemplary embodiment may comprise:

a main body, a camera module disposed at the main body to capture an image of a subject, a camera module disposed on the main body to capture an image of a subject, and a display part disposed at the main body to output the image captured by the camera module, wherein the camera module comprises:

a PCB;

an image sensor disposed at a top surface of the PCB;

a wire connected to a top surface of the image sensor and to a top surface of the PCB;

a body part having a through hole disposed at an upper side of the image sensor;

a sensor base including a support part extended from an outside of the body part to be disposed at a top surface of the PCB, wherein a lower surface of body part may include a first surface formed at an inside of the support part, a second surface formed at an inside of the first surface and a third surface formed at an inside of the second surface, and wherein the second surface may be disposed at a side lower than the first surface, and the third surface may be disposed at a side lower than the second surface, and wherein an upper end of the wire may be overlapped with the second surface to an optical axis direction of the image sensor and may be disposed at an outside of the third surface.

A camera module according to a fourth exemplary embodiment may comprise:

a PCB;

an image sensor disposed on the PCB;

a sensor base disposed at a top surface of the PCB;

a lens driving device coupled to the sensor base; and an adhesive interposed between the sensor base and the lens driving device, wherein the adhesive may be disposed at a lower surface of the lens driving device and a top surface of the sensor base, and wherein the sensor base may be formed by allowing a top surface of sensor base to be recessed, and may include a recessed groove accommodating at least a portion of the adhesive.

The sensor base may include a through hole formed at a position corresponding to that of the image sensor and a filter reception part formed by allowing a portion corresponding to a circumference of the through hole in the top surface of the sensor base to be recessed, and disposed with a filter, wherein the recess groove may be spaced apart from the filter reception part.

The recessed groove may include a first groove and a second groove formed between the filter reception part and an external side surface of the sensor base, and mutually spaced apart, wherein the first groove may be disposed to be parallel with the second groove at an opposite side of the second groove based on the fitter reception part, and a distance between the first groove and the external side surface of the sensor base may correspond to a distance between the first groove and the filter reception part.

The first groove and the second groove may be spaced apart from the external side surface of the sensor base, and each of the first groove and the second groove may be straightly extended along a virtual straight line, and an extended length of the first groove and the second groove may be longer than a length to a direction corresponding to the filter reception part.

The lens driving device may comprise:

a housing;

a bobbin disposed at an inside of the housing;

a coil disposed on the bobbin;

a first magnet disposed at the housing to face the coil;

an elastic member coupled to the bobbin and the housing;

a second magnet disposed at the bobbin; and a sensor disposed on the substrate to detect the second magnet, wherein the substrate may be disposed at a side surface of the housing.

An optical device according to a fourth exemplary embodiment may comprise a main body, a camera module disposed at the main body to capture an image of a subject, and a display part disposed at the main body to output the image captured by the camera module, wherein the camera module may comprise:

a PCB;

an image sensor disposed at the PCB;

a sensor base disposed at a top surface of the PCB;

a lens driving device coupled to the sensor base; and an adhesive interposed between the sensor base and the lens driving device, and wherein the adhesive may be disposed at a lower surface of the lens driving device and a top surface of the sensor base, and the sensor base may be formed by allowing a top surface of the sensor base to be recessed, and include a groove accommodating at least a portion of the adhesive.

Advantageous Effects

A process defect rate may be reduced through a first exemplary embodiment of the present invention by allowing an alignment to be enabled after an image sensor is mounted. An alignment quality of image sensors can be improved over the conventional method. An alignment change of image sensors relative to impact and temperature can be improved. To be more specific, although a PCB flatness change to impact and temperature is conventionally ensued to alignment change of image sensors, the alignment of image sensors can be adjusted even if there is a PCB flatness change according to the present exemplary embodiment.

A magnetic influence mutually affected by magnets of two camera modules in a dual camera module can be minimized through a second exemplary embodiment of the present invention. Through this advantageous effect, a discrete distance between two camera modules can be minimized.

A distance between a filter disposed on a sensor base and a lens driving device disposed on a top surface of sensor base may be secured through a third exemplary embodiment of the present invention. Through this advantageous effect, an AA (Active Alignment) space for lens focusing can be secured. Furthermore, shock reliability can be secured by improvement in filter breakage. A flare phenomenon can be minimized through the third exemplary embodiment. To be more specific, a phenomenon in which a light bounced off from a gold wire and a passive element is re-incident on a lens side can be minimized. A cost reduction can be expected by non-application of black mask disposed on a filter in order to inhibit the conventional flare phenomenon.

A phenomenon in which a lens driving device is disengaged from a sensor base during drop test and tumble test can be inhibited through a fourth exemplary embodiment of the present invention.

BEST MODE

Figure 1:
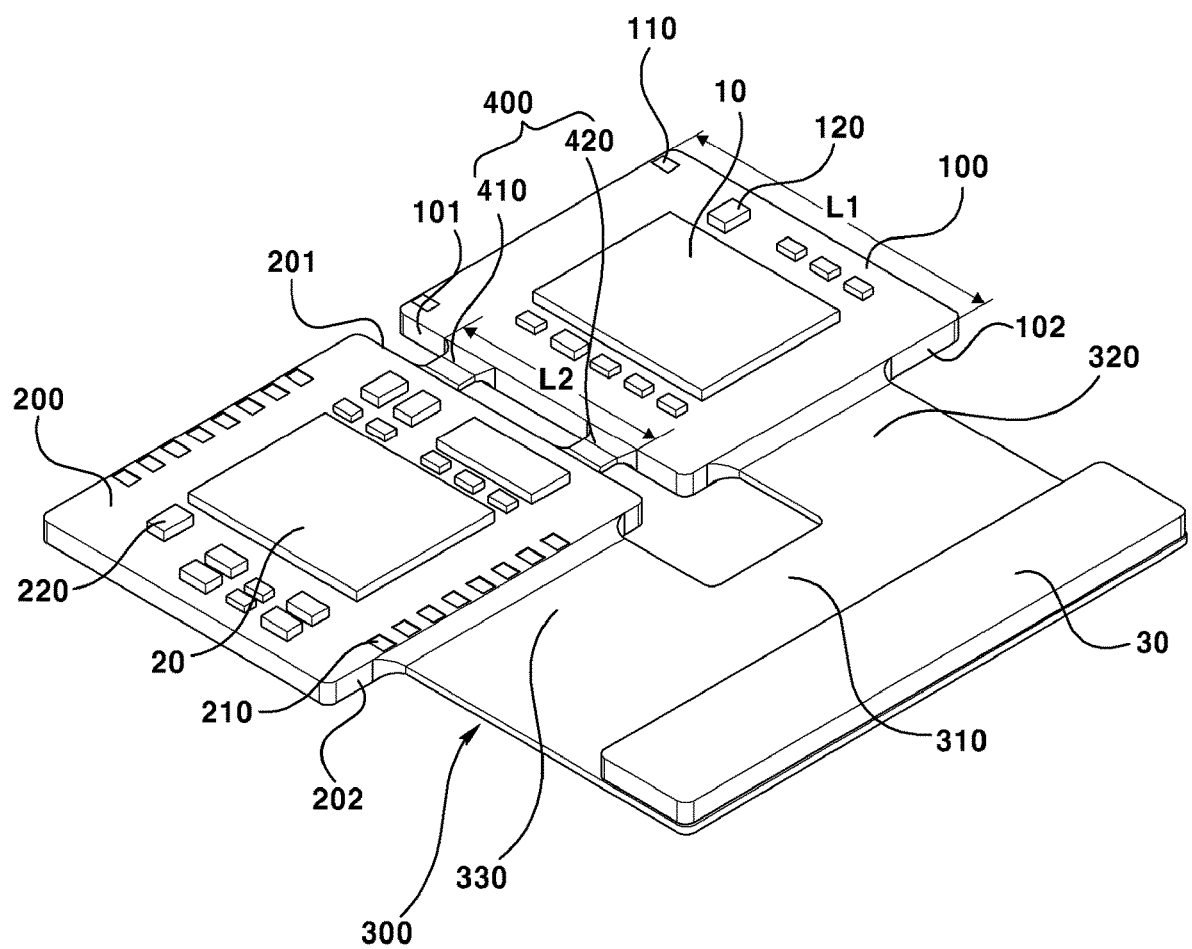
FIG. 1 is a perspective view illustrating a PCB of a dual camera module and related configurations thereof according to a first exemplary embodiment of the present invention.

Some exemplary embodiments of present invention will be described in detail with reference to the accompanying drawings. In describing a reference numeral for each element, a same reference numeral will be designated, if possible, for the same element, albeit being differently indicated on other drawings. Furthermore, a detailed explanation of some elements will be omitted while being explained in the exemplary embodiments of the present invention if obstructed in the understanding of the exemplary embodiment of present invention.

In describing elements in the exemplary embodiments of the present invention, the terms, first, second, A, B (a), (b), etc., may be used. These terms may be used only to distinguish one element from another element, and the nature, order or sequence is not restricted by these terms. When an element is referred to as being "accessed to", "coupled to," or "connected to," another element, it should be appreciated that the element may be directly accessed, connected or coupled to the other element, or intervening elements may be present therebetween.

The hereinafter-used term of "optical axis direction" may be defined as an optical axis direction of a lens module of a camera module. Meantime, the "optical axis direction" may be interchangeably used with a vertical direction, a z axis direction and other directions.

The term of 'auto focus function' used hereinafter may be defined as a function of adjusting a focus of a subject by moving a lens module to an optical axis direction according to a distance to the subject in order to obtain a clear image of the subject in an image sensor. Meantime, the "auto focus" may be interchangeably used with an "AF (Auto Focus)".

The term of 'handshake correction function' used hereinafter may be defined as a function of moving or tilting a lens module to a direction perpendicular to an optical axis in order to offset a vibration (movement) generated by an external force on an image sensor. Meantime, the 'handshake correction function' may be interchangeably used with the 'OIS (Optical Image Stabilization)'.

The present exemplary embodiment may include a first exemplary embodiment, a second exemplary embodiment, a third exemplary embodiment and a fourth exemplary embodiment. The technical features in the first exemplary embodiment, the second exemplary embodiment, the third exemplary embodiment and the fourth exemplary embodiment may be interchangeably, mutually and inferably applied. For example, a configuration of any one exemplary embodiment in the first exemplary embodiment, the second exemplary embodiment, the third exemplary embodiment and the fourth exemplary embodiment may be applied by being substituted, added or deleted by another exemplary embodiment within a scope not affecting or damaging a technical idea.

First Exemplary Embodiment

Now, configuration of optical device according to a first exemplary embodiment will be described.

An optical device may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and the optical device may comprise any device capable of capturing an image or a photograph.

The optical device may comprise a main body (not shown), a dual camera module and a display part (not shown). However, any one or more of the elements in the main body, the dual camera module and the display part may be omitted or changed from the optical device.

The main body may form an external shape of an optical device. The main body may comprise a cubic shape, for example. However, the present invention is not limited thereto. As a modification, the main body may be partially rounded. The main body may accommodate a dual camera module. One surface of a main body may be disposed with a display part.

The dual camera module may be disposed on the main body. The dual camera module may be disposed at one surface of main body. At least one portion of the dual camera module may be accommodated into the main body. The dual camera module may photograph an image of a subject.

The display part may be disposed on the main body. The display part may be disposed at one surface of main body. That is, the display part may be disposed on a same surface as that of dual camera module. Alternatively, the display part may be disposed at the other surface of main body. The display part may be disposed on a surface disposed at an opposite surface of a surface disposed with the dual camera module. The display part may output an image photographed by the dual camera module.

Hereinafter, configuration of an optical device according to a first exemplary embodiment of the present invention will be described.

The optical device may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and may comprise any device capable of capturing an image or a photograph.

The optical device may comprise a main body (not shown), a dual camera module and a display part (not shown). However, any one or more of the main body, the dual camera module and the display part may be omitted or changed.

The main body may form an external shape of an optical device. The main body may comprise a cubic shape, for example. However, the present invention is not limited thereto. As a modification, the main body may be at least partially rounded. The main body may accommodate the dual camera module. One surface of a main body may be disposed with a display part.

The dual camera module may be disposed on the main body. The dual camera module may be disposed at one surface of main body. At least one portion of the dual camera module may be accommodated into the main body. The dual camera module may capture an image of a subject.

The display part may be disposed on the main body. The display part may be disposed at one surface of main body. That is, the display part may be disposed on a same surface as that of dual camera module. Alternatively, the display part may be disposed at the other surface of main body. The display part may be disposed on a surface disposed at an opposite surface of a surface disposed with the dual camera module. The display part may output an image captured by the dual camera module.

Hereinafter, configuration of a dual camera module according to a first exemplary embodiment of the present invention will be described with reference to the accompanying drawings.

Figure 12:
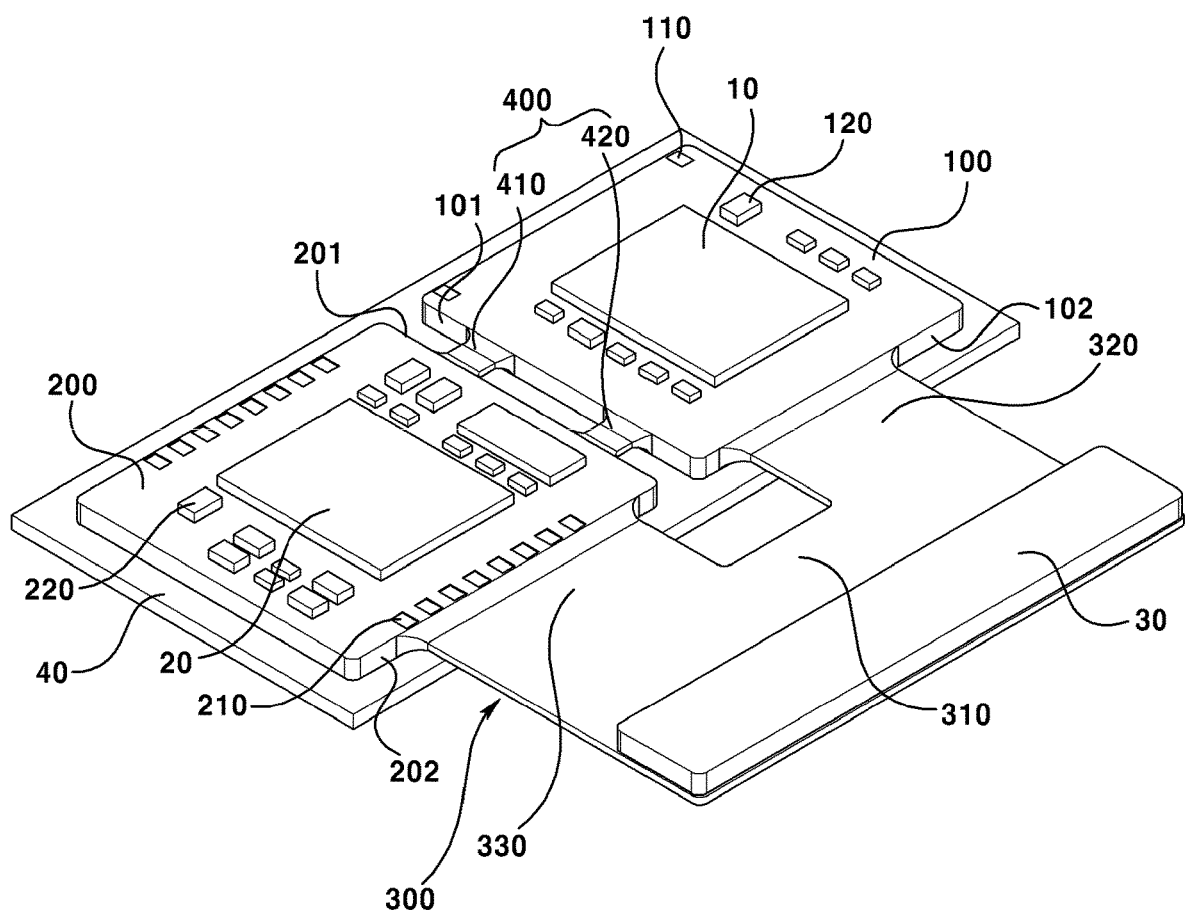
FIG. 12 is a perspective view illustrating a state where a stiffener is coupled to a first substrate and to a second substrate in FIG. 1.

FIG. 1 is a perspective view illustrating a PCB of a dual camera module and related configurations thereof according to a first exemplary embodiment of the present invention and FIG. 12 is a perspective view illustrating a state where a stiffener is coupled to a first substrate and to a second substrate in FIG. 1.

The dual camera module according to a first exemplary embodiment may comprise a first image sensor (10), a first substrate (100), a second image sensor (20), a second substrate (200), a third substrate (300) and a connection unit (400). However, any one of the first substrate (100), the second substrate (200), the third substrate (300) and the connection unit (400) may be omitted or changed from the first exemplary embodiment of the present invention.

The first image sensor (10) may be disposed at the first substrate (100). The first image sensor (10) may be disposed at a top surface of first substrate (100). As a modification, the first image sensor (10) may be disposed at a lower surface of first substrate (100) to allow a valid picture area to be exposed to an upper side through a through hole. The first image sensor (10) may be electrically connected to the first substrate (100). The first image sensor (10) may be coupled to the first substrate (100) using an SMT (Surface Mounting Technology. The first image sensor (10) may be coupled to the first substrate (100) using a flip chip technology. The first image sensor (10) may be so arranged as to match to a first lens module in terms of optical axis. That is, an optical axis of the first image sensor (10) and an optical axis of first lens module may be aligned. Through this configuration, the first image sensor (10) can obtain a light having passed the first lens module. The first image sensor (10) can convert a light irradiated on a valid picture area to an electric signal. The first image sensor (10) may be any one of a CCD (charge coupled device), a MOS (metal oxide semi-conductor), a CPD and a CID. However, the types of first image sensor (10) are not limited thereto, and the first image sensor (10) may comprise any configuration capable of converting an incident light to an electric signal.

The first substrate (100) may be disposed at a top surface with a first lens driving device (1000). The first substrate (100) may be disposed at a lower surface of the first lens driving device (1000). The first substrate (100) may be coupled to the first lens driving device (1000). The first substrate (100) may be disposed with the first image sensor (10). The first substrate (100) may be electrically connected to the first image sensor (10). For example, a holder member may be interposed between the first substrate (100) and the first lens driving device (1000). At this time, the holder member may accommodate at an inside the first image sensor (10). In another example, the first substrate (100) may be directly disposed with the first lens driving device (1000). At this time, the first lens driving device (1000) may accommodate at an inside the first image sensor (10). Through this structure, a light having passed the first lens module coupled to the first lens driving device can be irradiated on the first image sensor disposed on the first substrate (100). The first substrate (100) can supply a power (current) to the first lens driving device (1000).

The first substrate (100) may have rigidity. The first substrate (100) may be an RPCB (Rigid Printed Circuit Board). The first substrate (100) may be disposed with a first image sensor (10). The first substrate (100) may be disposed at a top surface with a first image sensor (10). The first substrate (100) may be formed with a 4-edged plate shape. At this time, each of the four edges of the first substrate (100) may be roundly formed. An area of a top surface of the first substrate (100) may be smaller than an area of a top surface of the second substrate (200).

A top surface of first substrate (100) may be formed with a terminal (110). The terminal (110) may be electrically connected to the first lens driving device (1000) disposed at a top surface of first substrate (100). The terminal (110) may be coupled to a first lower support member (1620). The terminal (110) and a lower end of a terminal part (1624) of the first lower support member (1620) may be coupled by soldering. A current may be supplied to a first coil (1220) from the first substrate (100) through the terminal (110).

The first substrate (100) may be disposed at a top surface with a passive element (120). The passive element (120) may be disposed at an outside of the first image sensor (10). The passive element (120) may be spaced apart from the first image sensor (10). The passive element (120) may be used to remove noise generated from the first image sensor (10).

The first substrate (100) may comprise a first side surface (101). The first substrate (100) may comprise a first side surface (101) facing a second side surface (201) of the second substrate (200). The first substrate (100) may comprise a third side surface (102). The first substrate (100) may comprise a third side surface (102) adjacently disposed with the first side surface (101). The first side surface (101) and the third side surface (102) may be adjacent. The first side surface (101) of the first substrate (100) may face the second side surface (201) of second substrate (200). The third side surface (102) of the first substrate (100) may face to a same direction as that of a fourth side surface (202) of the second substrate (200).

The second image sensor (20) may be disposed on the second substrate (200). The second image sensor (20) may be disposed at a top surface of second substrate (200). As a modification, the second image sensor (20) may be coupled to a lower surface of second substrate in order to allow a valid picture area to be exposed to an upper side through a through hole. The second image sensor (20) may be electrically connected to the second substrate (200). The second image sensor (20) may be coupled to the second substrate (200) using an SMT (Surface Mounting Technology). The second image sensor (20) may be coupled to the second substrate (200) using a flip chip technology. The second image sensor (20) may be so arranged as to match to the second lens module in terms of optical axis. That is, an optical axis of second image sensor (20) and an optical axis of second lens module may be aligned. Through this configuration, the second image sensor (20) can obtain a light having passed the second lens module. The second image sensor (20) can convert a light irradiated on a valid picture area to an electric signal. The second image sensor (20) may be any one of a CCD (charge coupled device), a MOS (metal oxide semi-conductor), a CPD and a CID. However, the types of the second image sensor (20) are not limited thereto, and any configuration capable of converting an incident light to an electric signal may be comprised.

The second substrate (200) may be disposed at a top surface with a second lens driving device (2000). The second substrate (200) may be disposed at a lower surface of the second lens driving device (2000). The second substrate (200) may be coupled to the second lens driving device (2000). The second substrate (200) may be disposed with a second image sensor (20). The second substrate (200) may be electrically connected to the second image sensor (20). For example, a holder member may be interposed between the second substrate (200) and the second lens driving device (2000). At this time, the holder member may accommodate at an inside the second image sensor (20). In another example, the second substrate (200) may be directly disposed with the second lens driving device (2000). At this time, the second lens driving device (2000) may accommodate at an inside the second image sensor (20). Through this structure, a light having passed the second lens module coupled to the second lens driving device (2000) can be irradiated on the second image sensor (20) disposed on the second substrate (200). The second substrate (200) can supply a power (current) to the second lens driving device (2000).

The second substrate (200) may have rigidity. The second substrate (200) may be an RPCB (Rigid Printed Circuit Board). The second substrate (200) may be disposed with a second image sensor (20). The second substrate (200) may be disposed at a top surface with a second image sensor (20). The second substrate (200) may be formed with a 4-edged (angled) plate shape. At this time, each of the four edges of the second substrate (200) may be roundly formed. An area of a top surface of the second substrate (200) may be greater than an area of a top surface of the first substrate (100).

A top surface of second substrate (200) may be formed with a terminal (210). The terminal (210) may be electrically connected to the second lens driving device (2000) disposed at a top surface of second substrate (200). The terminal (210) may be coupled to a terminal part (2412) of a substrate (2410). The terminal (210) and a lower end of a terminal part (2412) of the substrate (2410) may be coupled by soldering. A current may be supplied to a second coil (2220) from the second substrate (200) through the terminal (210).

The second substrate (200) may be disposed at a top surface with a passive element (220). The passive element (220) may be disposed at an outside of the second image sensor (20). The passive element (220) may be spaced apart from the second image sensor (20). The passive element (220) may be used to remove noise generated from the second image sensor (20).

The second substrate (200) may comprise a second side surface (201). The second substrate (200) may comprise a second side surface (201) facing a first side surface (101) of the first substrate (100). The second substrate (200) may comprise a fourth side surface (202). The second substrate (200) may comprise a fourth side surface (202) adjacently disposed with the second side surface (201). The second side surface (201) and the fourth side surface (202) may be adjacent. The second side surface (201) of the second substrate (200) may face the first side surface (101) of the first substrate (100). The fourth side surface (202) of the second substrate (200) may face to a same direction as that of a third side surface (102) of the first substrate (100).

A connector (30) may be disposed on a body part (310) of third substrate (300). The connector (30) may be disposed on the third substrate (300). The connector (30) may be electrically connected to an external element forming an optical device. The connector (30) may be an example of a connecting part. The connecting part may be electrically connected to an external element forming an optical device.

The third substrate (300) may be connected to the first substrate (100). The third substrate (300) may be connected to the second substrate (200). The third substrate (300) may be connected to the first substrate (100) and the second substrate (200). The third substrate (300) can electrically connect the first substrate (100) and the second substrate (200) to an outside element. The third substrate (300) may be disposed with a connector (30). The third substrate (300) may be electrically connected to an outside element through the connector (30). The third substrate (300) may have flexibility. The third substrate (300) may be an FPCB (Flexible Printed Circuit Board). At least one portion of thickness of the third substrate (300) may be thinner than thickness of the first substrate (100) and the second substrate (200).

The third substrate (300) may be integrally formed with the first substrate (100) and the second substrate (200). That is, the first substrate (100), the second substrate (200) and the third substrate (300) may be formed with an RFPCB (Rigid Flexible Printed Circuit Board).

The third substrate (300) may comprise a body part (310), a first connection part (320) and a second connection part (330). However, the body part (310), the first connection part (320) and the second connection part (330) may be omitted or changed from the third substrate (300).

The body part (310) may be coupled to an outside element of dual camera. The body part (310) may be disposed with a connector (30) connected to an outside. The body part (310) may be integrally formed with the first connection part (320) and the second connection part (330).

The first connection part (320) may be extended from the body part (310). The first connection part (320) may be integrally formed with the body part (310). The first connection part (320) may be connected to the first substrate (100). The first connection part (320) may be spaced apart from the second connection part (330). A space may be formed between the first connection part (320) and the second connection part (330). That is, the third substrate (300) may comprise a groove recessed to a body part (310) side by the body part (310), the first connection part (320) and the second connection part (330). The first connection part (320) may be connected to the third side surface (102) of the first substrate (100). The first connection part (320) may be connected to the third side surface (102) by being leaned to a corner near to the second substrate (200) on both corners of the third side surface (102).

The second connection part (330) may be extended from the body part (310). The second connection part (330) may be integrally formed with the body part (310). The second connection part (330) may be connected to the second substrate (200). The second connection part (330) may be spaced apart from the first connection part (320). The second connection part (330) may be connected to the fourth side surface (202) of second substrate (200). The second connection part (330) may be connected to the fourth side surface (202) by being leaned to a corner near to the first substrate on both corners of the fourth side surface (202).

The connection unit (400) according to the first exemplary embodiment may be so connected as to allow the first substrate (100) and the second substrate (200) to be moved within a mutually limited scope. In this case, there is an advantageous effect of aligning the first image sensor (10) and the second image sensor (20), even in a state where the first image sensor (10) is mounted on the first substrate (100) and the second image sensor (20) is mounted on the second substrate (200), when compared with a case where the connection unit (400) is omitted, and the first substrate (100) and the second substrate (200) are connected by an RPCB. Meantime, the connection unit (400) may restrict the first substrate (100) and the second substrate (200) from mutually moving to a horizontal direction while allowing each of the first substrate (100) and the second substrate (200) to tilt within a predetermined scope.

Recently, researches are being briskly waged on a dual camera module where an AF camera module and an OIS camera module are disposed in parallel. Meanwhile, an image sensor is individually used to each camera module in the said dual camera module, where the flatness of greatly affects the alignment between the said two image sensors. However, even if there is a change in the flatness of PCB, the first image sensor (10) and the second image sensor (20) can be aligned according to the present exemplary embodiment.

The connection unit (400) may be extended from the first substrate (100). The connection unit (400) may be extended from the first side surface (101) of first substrate (100). The connection unit (400) may be extended from the second substrate (200). The connection unit (400) may be extended from the second side surface (201) of second substrate (200). The connection unit (400) may connect the first substrate (100) and the second substrate (200). The connection unit (400) may connect the first side surface (101) of first substrate (100) and the second side surface (201) of second substrate (200). At this time, the first side surface (101) of first substrate (100) and the second side surface (201) of second substrate may be faced each other. The connection unit (400) may be integrally formed with the first substrate (100) and the second substrate (200). The connection unit (400) may have insulation property. The connection unit (400) may not be formed with a conductive line.

The connection unit (400) may comprise a first moving part (410) and a second moving part (420). However, any one or more of the first moving part (410) and the second moving part (420) may be omitted or changed from the connection unit (400). Furthermore, the first moving part (410) and the second moving part (420) may not be spaced apart and instead may be integrally formed.

The first moving part (410) may be spaced apart from the second moving part (420). A cross-sectional area of the first moving part (410) may grow smaller on at least a portion thereof as being distanced from the first substrate (100). At this time, the cross-sectional area may be in parallel with the first side surface (101). That is, each cross-sectional area of the cross-section parallel with the first side surface (101) may grow smaller on at least a portion thereof as being spaced apart from the first and second moving parts (410, 420). The first moving part (410) may grow smaller on at least a portion thereof as being distanced from the second substrate (200). The first moving part (410) may have a same thickness as that of the first substrate (100) at an area meeting the first substrate (100). The first moving part (410) may have a thinner thickness than that of the first substrate (100) at an area spaced apart from the first substrate (100). A width of the first moving part (410) may be narrower at an area spaced apart from the first substrate (100) than that of an area joined by the first substrate (100). The first moving part (410) may have a same thickness at an area joined by the second substrate (200) as that of the second substrate (200). The first moving part (410) may be thinner in thickness at an area spaced apart from the second substrate (200) than the second substrate (200). The width of first moving part (410) may be narrower at an area spaced apart from the second substrate (200) than that of an area joined by the second substrate (200).

The second moving part (420) may be spaced apart from the first moving part (410). A cross-sectional area of the second moving part (420) may grow smaller on at least a portion thereof as being distanced from the first substrate (100). The second part (420) may grow smaller on at least a portion of cross-sectional area as being distanced from the second substrate (200). The second moving part (420) may have a same thickness as that of the first substrate (100) at an area meeting the first substrate (100). The second moving part (420) may have a thinner thickness than that of the first substrate (100) at an area spaced apart from the first substrate (100). A width of the second moving part (420) may be narrower at an area spaced apart from the first substrate (100) than that of an area joined by the first substrate (100). The second moving part (420) may have a same thickness at an area joined by the first substrate (100) as an area spaced apart from the first substrate (100). The second moving part (420) may be thinner in thickness at an area spaced apart from the second substrate (200) than the first substrate (100). The width of the second moving part (420) may be narrower at an area spaced apart from the second substrate (200) than that of an area joined by the second substrate (200).

An area where the first moving part (410) meets the first side surface (101) and an area where the second moving part (420) meets the first side surface may be symmetrical about the first side surface (101). In this case, the horizontal movement of the first moving part (410) and the second moving part (420) may be more restricted compared with a case of the first moving part (410) and the second moving part (420) being leaned to a coiner of one side of the first side surface (101). In other words, when any one of the first moving part (410) and the second moving part (420) is omitted, or both the first moving part (410) and the second moving part (420) are disposed to be leaned to a corner of one side of the first side surface (101), the shape itself of the first moving part (100) and the second moving (200) being disposed in parallel may be dispersed. In the present exemplary embodiment, the first moving part (410) and the second moving part (420) can couple the first substrate (100) and the second substrate (200) in balance, whereby the shape of the first substrate (100) and the second substrate (200) being arranged in parallel can be always maintained, and if necessary, any one of the first substrate (100) and the second substrate (200) may be tilted to realize the alignment of the first image sensor (10) and the second image sensor (20).

As illustrated in FIG. 1, a width (L2) of connection unit (400) may be wider by at least 50% than a width (L1) of the first substrate (100). A length (L2) of connection unit (400) to a width direction may be longer by at least 50% than a length (L1) of the first side surface of first substrate (100) to a long side direction. A width (L2) of connection unit (400) may be a distance to a distal end of the other side of the second moving part (420) from a distal end of one side of the first moving part (410). At this time, one side of first moving part (410) is a direction distancing from the second moving part (420), and the other side of the second moving part (420) may be a direction distancing from the first moving part (410). Alternatively, the connection unit (400) may take a shape where a space between the first moving part (410) and the second moving part (420) is omitted and the first moving part (410) and the second moving part (420) are integrally formed. At this time, a width of connection unit (400) may be a distance from a distal end of one side of connection unit (400) to a distal end of the other side of the connection unit (400).

The dual camera module according to the first exemplary embodiment may further comprise a stiffener (40).

The stiffener (40) may be disposed at a lower surface of first substrate (100) and at a lower surface of second substrate (200). The stiffener (40) may be disposed with the first substrate (100) and the second substrate (200). A top surface of stiffener (40) may be disposed with the first substrate (100) and the second substrate (200). The stiffener (40) may be coupled to a lower surface of first substrate (100) and to a lower surface of second substrate (200). The stiffener (40) may be formed with a flat shape. The stiffener (40) may comprise a flat plate shape. The stiffener (40) may be a substrate. The stiffener (40) may have rigidity. An epoxy (not shown) for AA (Active Alignment) may be interposed between the stiffener (40) and the first substrate (100) and between the stiffener (40) and the second substrate (200). That is, the first substrate (100) and the second substrate (200) may be coupled to the stiffener (40) by the epoxy for active alignment. For example, the first substrate (100) is first coupled to the stiffener (40), and epoxy may be hardened after a coupled state of second substrate (200) is adjusted in order to align the first image sensor (10) and the second image sensor (20) while the second substrate (200) is preliminarily coupled by the epoxy. Conversely, the second substrate (200) is first coupled to the stiffener (40), and epoxy may be hardened after a coupled state of first substrate (100) is adjusted in order to align the first image sensor (10) and the second image sensor (20) while the first substrate (100) is preliminarily coupled by the epoxy. The stiffener (40) may be integrally formed and a top surface of stiffener (40) may be coupled by the first substrate (100) and the second substrate (200) while an optical axis of first image sensor (10) and an optical axis of the second image sensor (20) are aligned.

The dual camera module according to the first exemplary embodiment may comprise a first camera module and a second camera module.

Figure 2:
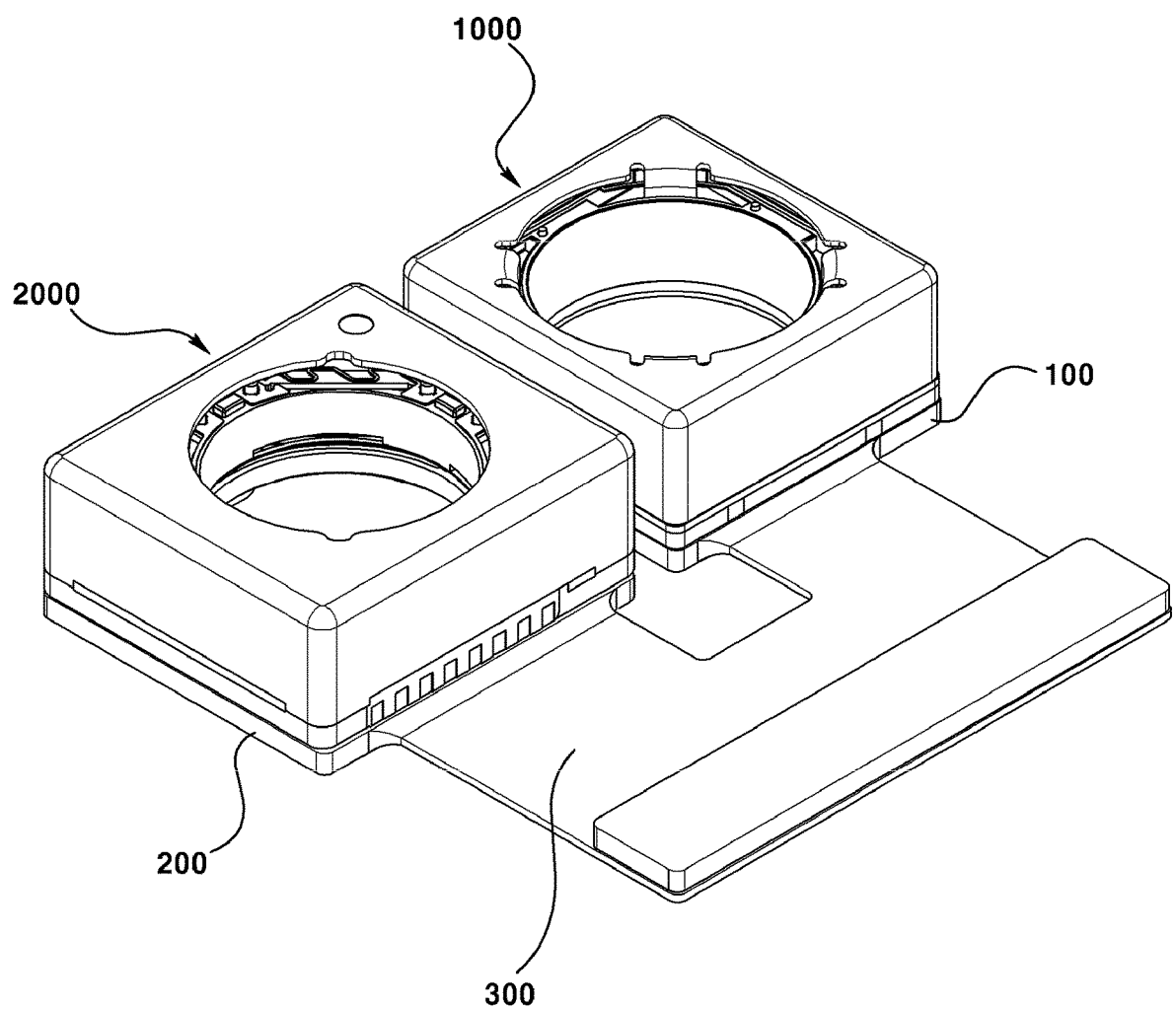
FIG. 2 is a perspective view illustrating a dual camera module according to a first exemplary embodiment.
Figure 3:
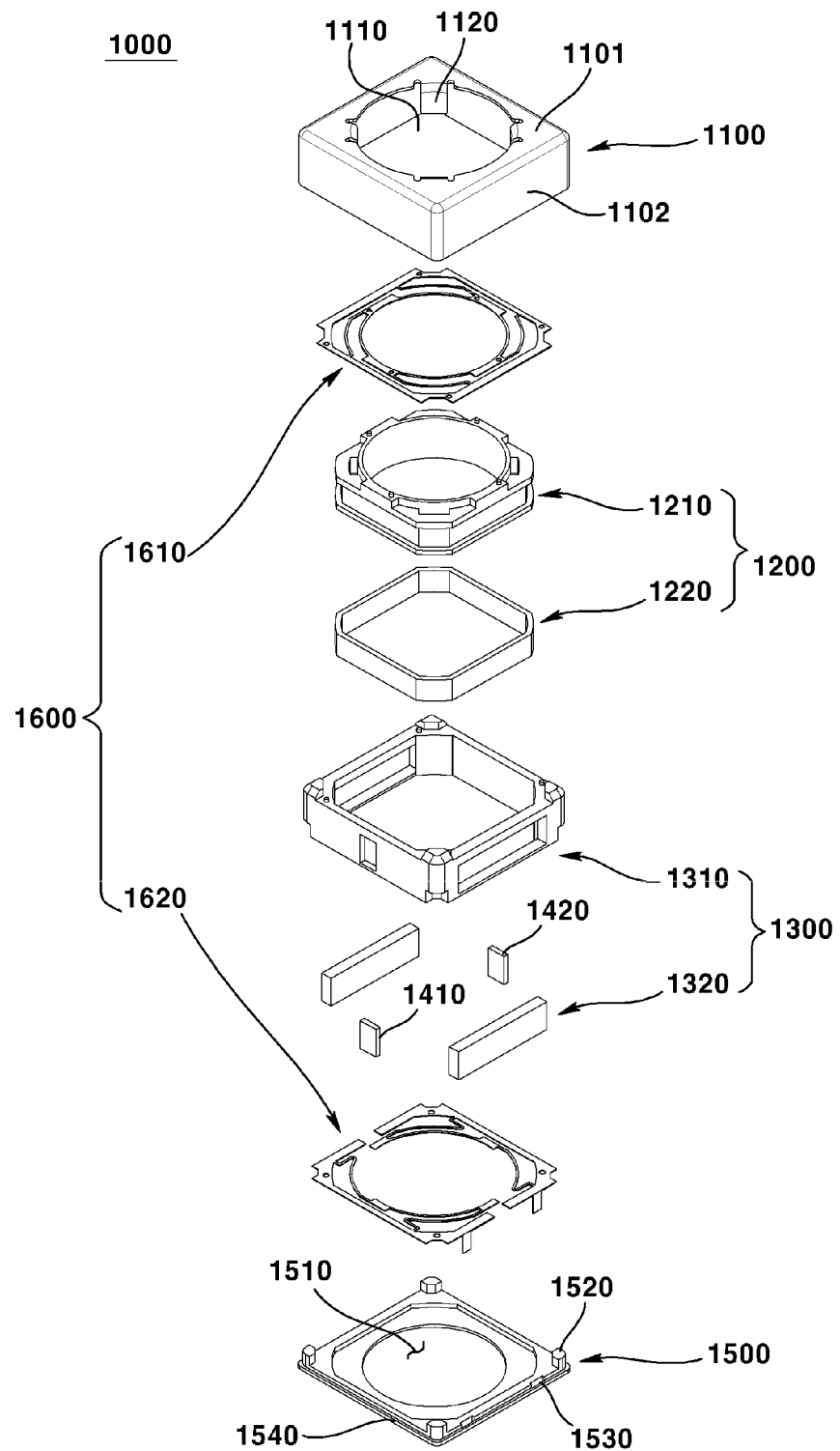
FIG. 3 is an exploded perspective view of a first camera module according to a first exemplary embodiment.
Figure 4:
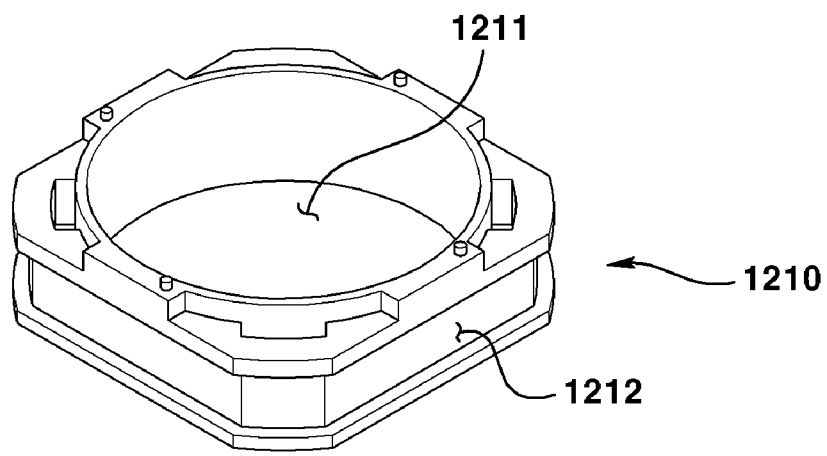
FIG. 4 is an exploded perspective view of a mover of a first camera module according to a first exemplary embodiment.
Figure 4:
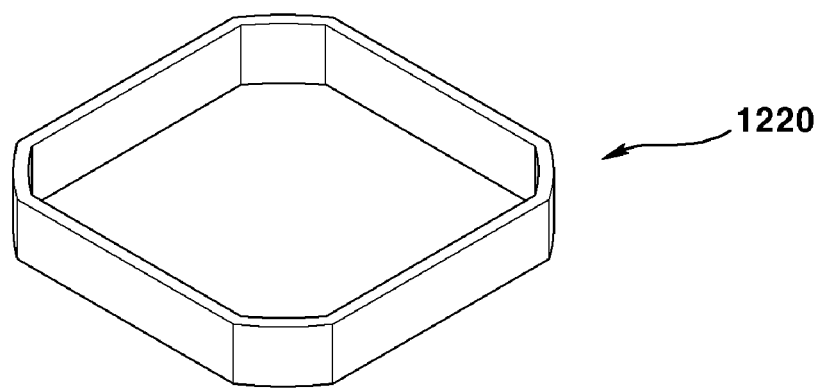
Figure 5:
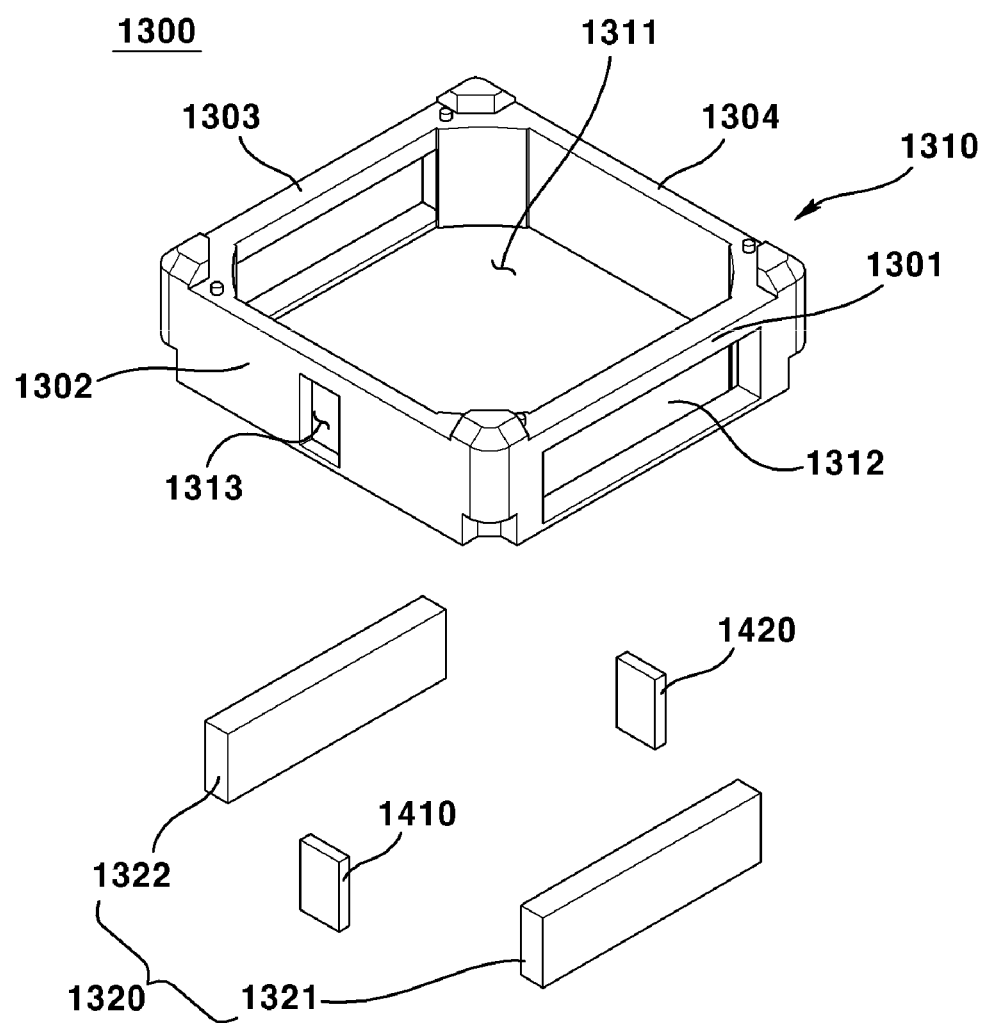
FIG. 5 is an exploded perspective view of a stator of a first camera module according to a first exemplary embodiment.
Figure 6:
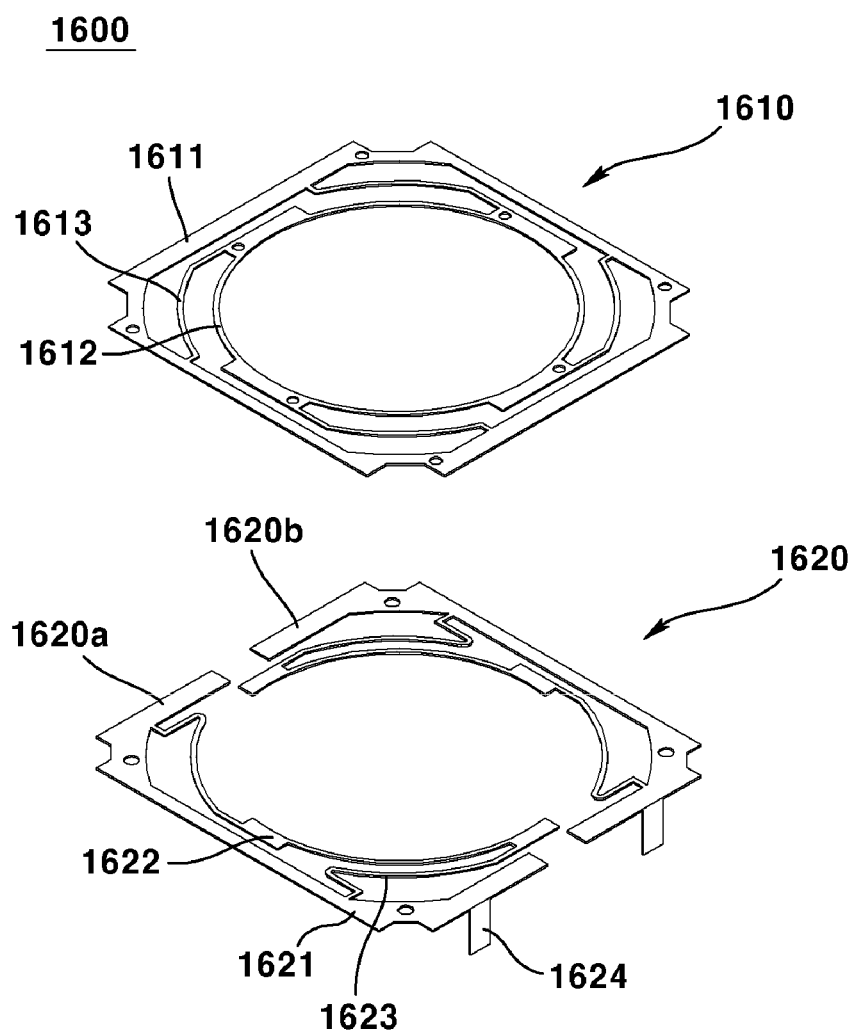
FIG. 6 is an exploded perspective view of an AF support member of a first camera module according to a first exemplary embodiment.
Figure 7:
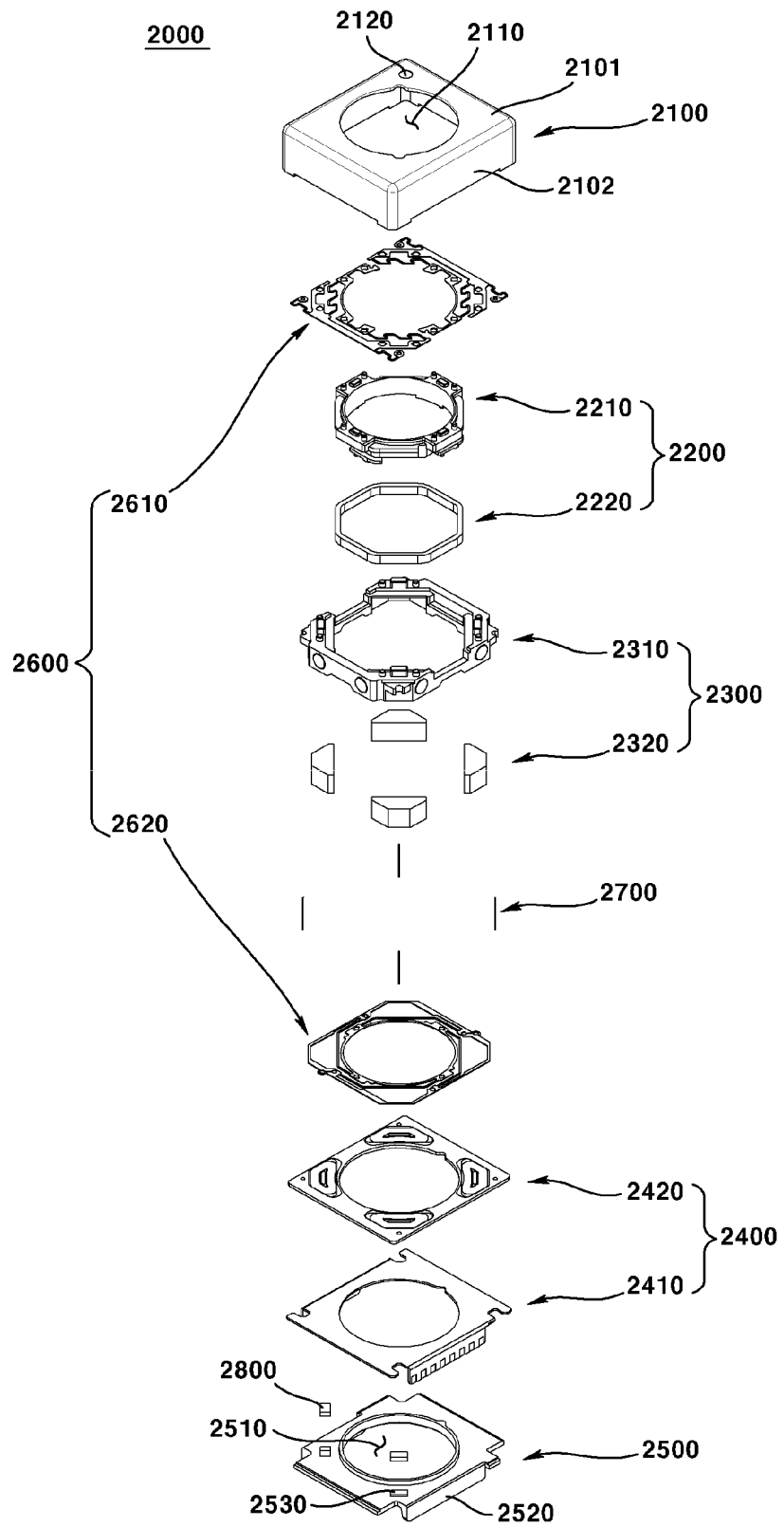
FIG. 7 is an exploded perspective view of a second camera module according to a first exemplary embodiment.
Figure 8:
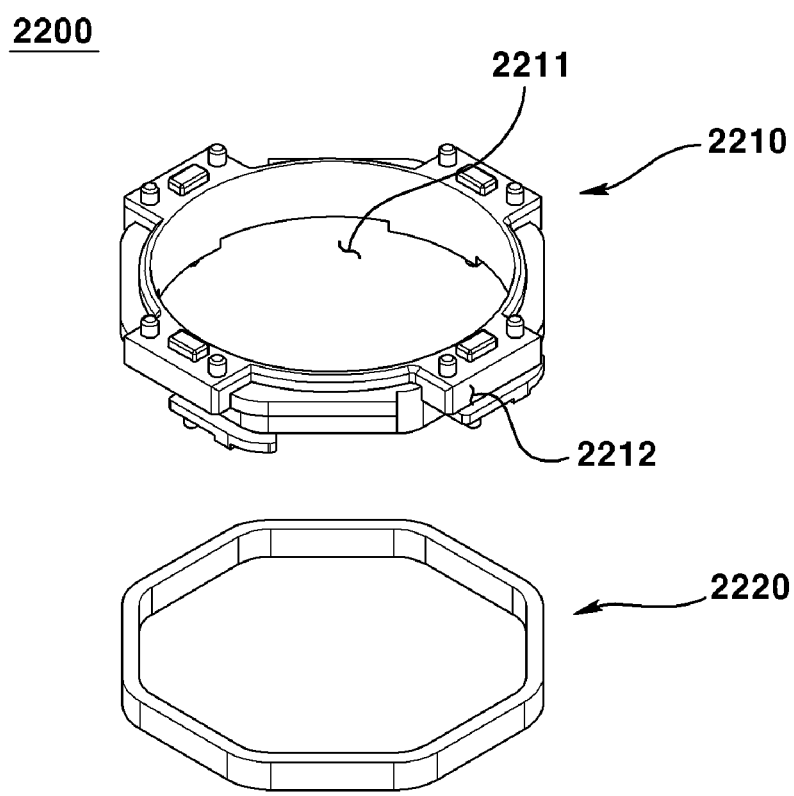
FIG. 8 is an exploded perspective view of an AF mover of a second camera module according to a first exemplary embodiment.
Figure 9:
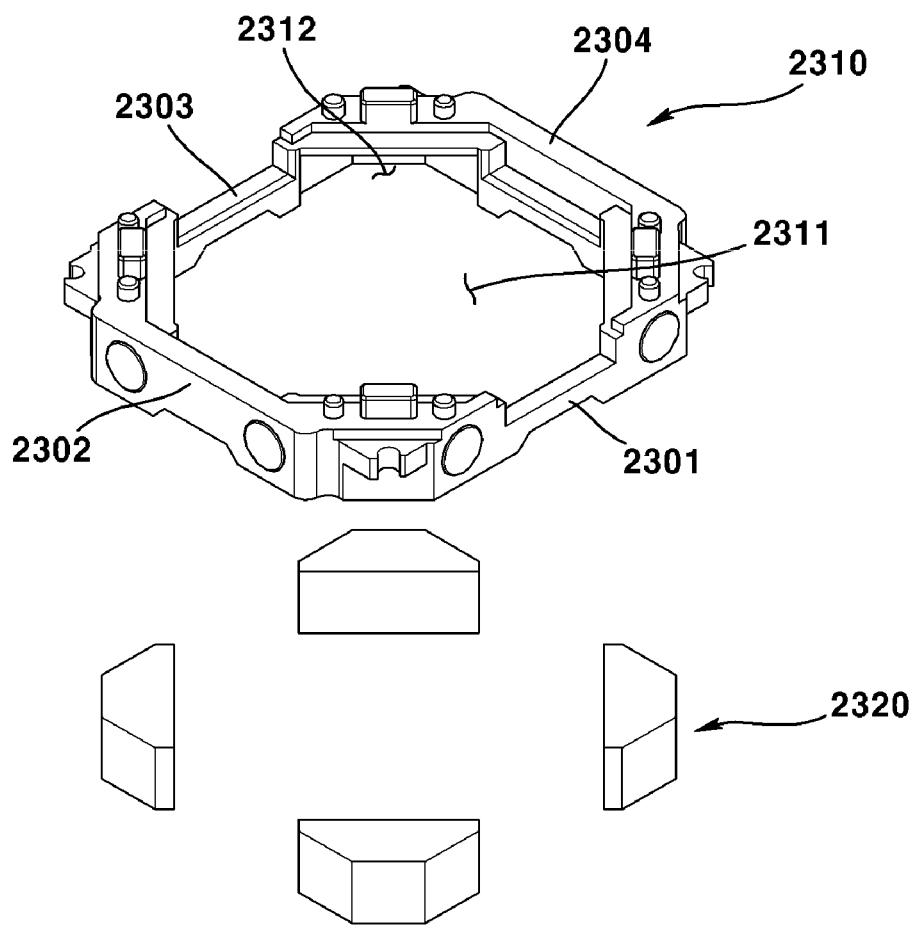
FIG. 9 is an exploded perspective view of an OIS mover of a second camera module according to a first exemplary embodiment.
Figure 10:
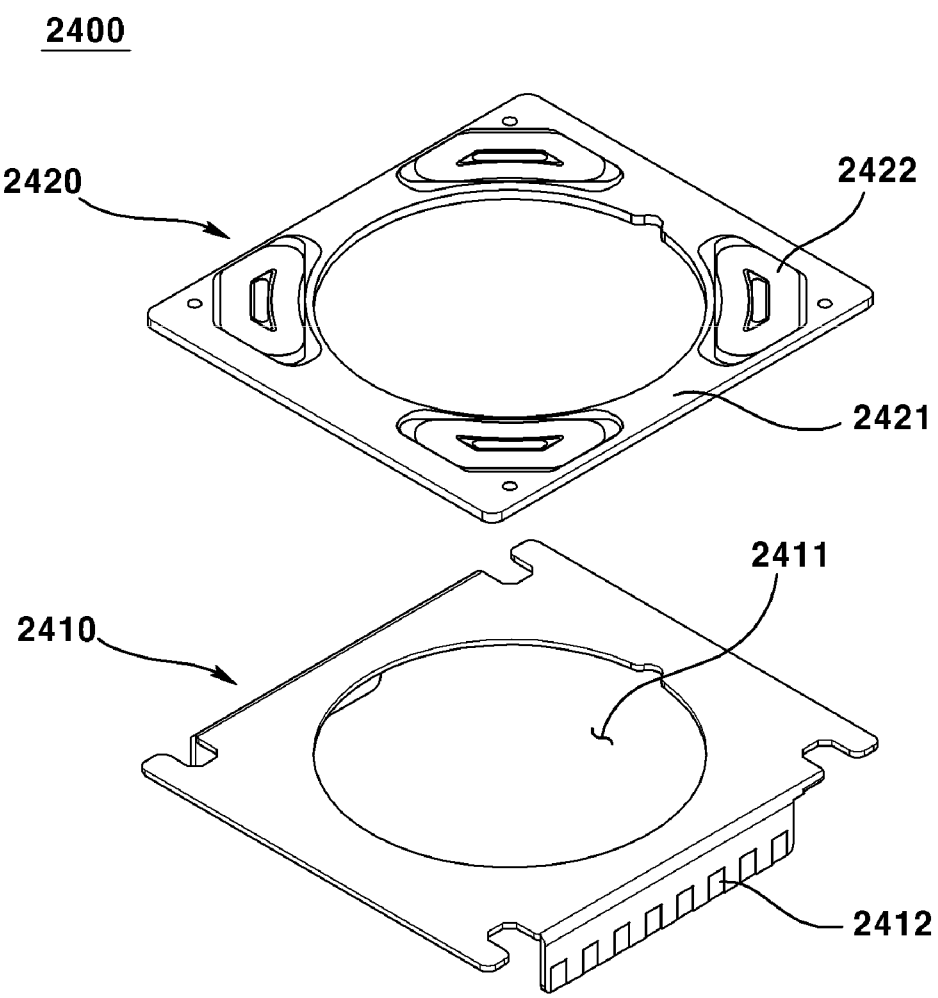
FIG. 10 is an exploded perspective view of a stator of a second camera module according to a first exemplary embodiment.
Figure 11:
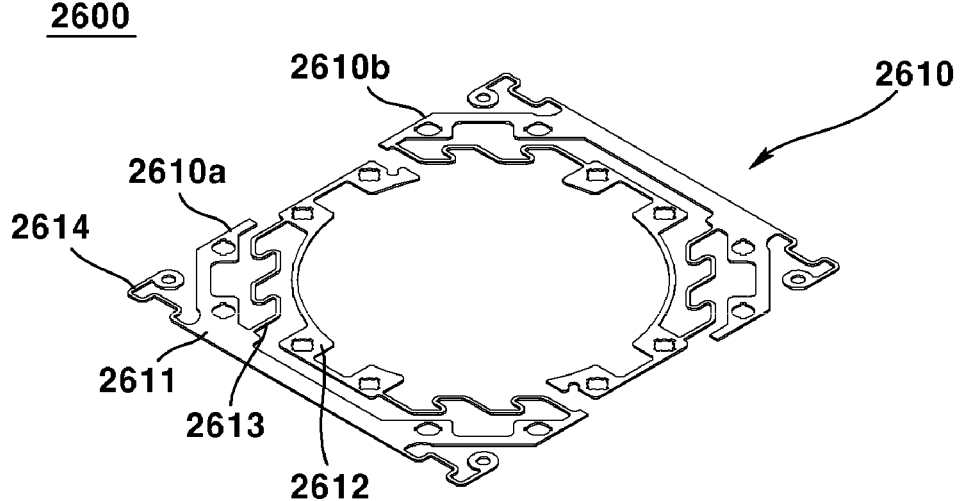
FIG. 11 is an exploded perspective view of an AF support member of a second camera module according to a first exemplary embodiment.
Figure 11:
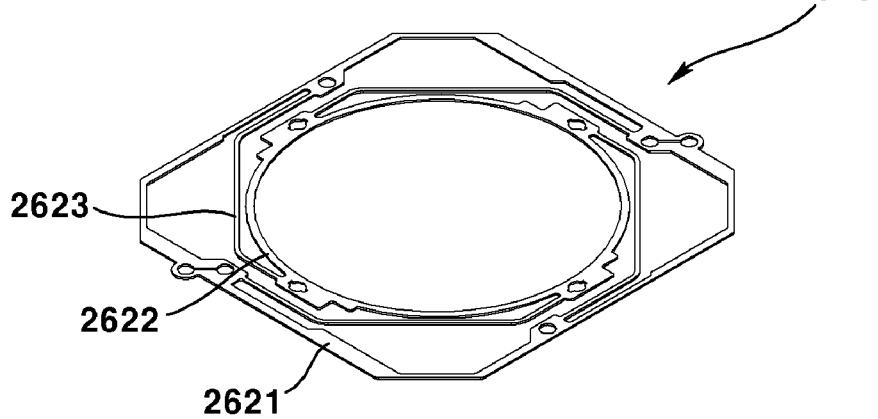

FIG. 2 is a perspective view illustrating a dual camera module according to a first exemplary embodiment, FIG. 3 is an exploded perspective view of a first camera module according to a first exemplary embodiment, FIG. 4 is an exploded perspective view of a mover of a first camera module according to a first exemplary embodiment, FIG. 5 is an exploded perspective view of a stator of a first camera module according to a first exemplary embodiment, FIG. 6 is an exploded perspective view of an AF support member of a first camera module according to a first exemplary embodiment, FIG. 7 is an exploded perspective view of a second camera module according to a first exemplary embodiment, FIG. 8 is an exploded perspective view of an AF mover of a second camera module according to a first exemplary embodiment, FIG. 9 is an exploded perspective view of an OIS mover of a second camera module according to a first exemplary embodiment, FIG. 10 is an exploded perspective view of a stator of a second camera module according to a first exemplary embodiment, and FIG. 11 is an exploded perspective view of an AF support member of a second camera module according to a first exemplary embodiment.

The first camera module may be an AF driving camera module. At this time, the first camera module may be called an "AF camera module". Alternatively, the first camera module may be formed with an OIS driving camera module.

The first camera module may comprise a first lens driving device (1000), a first lens module (not shown), a first infrared filter (not shown), a first image sensor (10), a first substrate (100) and a controller (not shown). However, any one or more of the first lens driving device (1000), the first lens module, the first infrared filter, the first image sensor (10), the first substrate (100) and the controller may be omitted or changed from the first camera module. Here, the first image sensor (10) and the second image sensor (20) are same as explained before.

The first lens module may comprise a lens and a lens barrel. The first lens module may comprise one or more lenses (not shown) and a lens barrel accommodating one or more lenses. However, one element of first lens module is not limited to the lens barrel, and any holder structure capable of supporting one or more lenses will suffice for a lens barrel. The first lens module may move along with the first lens driving device (1000) by being coupled to the first lens driving device (1000). The first lens module may be coupled to an inside of the first lens driving device (1000). The first lens module may be screw-coupled to the first lens driving device (1000). The first lens module may be coupled to the first lens driving device (1000) using an adhesive (not shown). Meantime, a light having passed the first lens module may be irradiated on the first image sensor (10).

A terminal part (1624) of the first lens driving device (1000) may be coupled to a terminal (110) of first substrate (100). The terminal part (1624) of the first lens driving device (1000) may be coupled to the terminal (110) of first substrate (100) via soldering. The terminal (110) of first substrate (100) may be disposed at an opposite side of a third side surface (102) on a top surface of first substrate (100). A terminal part (2412) of second lens driving device (2000) may be coupled to a terminal (210) of second substrate (200). The terminal part (2412) of second lens driving device (2000) may be coupled to the terminal (210) of second substrate (200) via soldering. The terminal (210) of second substrate (200) may be disposed at a fourth side surface (202) side on a top surface of second substrate (200). Moreover, the terminal (210) of second substrate (200) may be disposed at an opposite side of the fourth side surface (202) on a top surface of second substrate (200).

The first lens driving device (1000) may be coupled to the first substrate (00) mounted with the first image sensor (10) using an epoxy. The first lens driving device (1000) may be aligned with the first image sensor (10) using the epoxy. The first lens driving device (1000) may be directly accommodated to a top surface of first substrate (100). Alternatively, a separate holder member may be interposed between the first lens driving device (1000) and the first substrate (100). The second lens driving device (2000) may be coupled to the second substrate (200) mounted with the second image sensor (20) using an epoxy. The second lens driving device (2000) may be aligned with the second image sensor (20) using the epoxy. The second lens driving device (2000) may be directly accommodated to a top surface of second substrate (200). Alternatively, a separate holder member may be interposed between the second lens driving device (2000) and the second substrate (200).

The first infrared filter may inhibit a light of infrared region from being incident on the first image sensor (10). The first infrared filter may be interposed between the first lens module and the first image sensor (10). The first infrared filter may be disposed at a holder member (not shown) separately disposed from a first base (1500). However, the first infrared filter may be mounted on an opening (1510) formed at a center of the first base (1500). The first infrared filter may be formed with a film material or glass material. The infrared filter may be formed by coating an infrared cut-off coating material on a flat optical filter such as protective cover glass and cover glass. The first infrared may be an infrared cut-off filter or an infrared absorption filter.

The first controller may be mounted on the first substrate (100). The first controller may be disposed at an outside of the first lens driving device (1000). However, the first controller may be also disposed at an inside of the first lens driving device (1000). The first controller may control the direction, intensity and amplitude of a current supplied to each element forming the first lens driving device (1000). The first controller may perform any one or more of the AF function and the OIS function of first camera module by controlling the first lens driving device (1000). That is, the first controller may move or tilt the first lens module to an optical axis direction or to a direction perpendicular to the optical axis direction by controlling the first lens driving device (1000). Furthermore, the first controller may perform the feedback control of the AF function and OIS function. To be more specific, the first controller may provide a more accurate AF function by controlling a power or a current applied to a first coil (1220) through reception of position of first bobbin (1210) detected by a Hall sensor (not shown).

The first lens driving device (1000) may comprise a first cover member (1100), a mover (1200), a stator (1300), a third magnet unit (1410), a fourth magnet unit (1420), a first base (1500) and an AF support member (1600). However, any one or more of the first cover member (1100), the mover (1200), the stator (1300), the third magnet unit (1410), the fourth magnet unit (1420), the first base (1500) and the AF support member (1600) may be omitted or changed from the first lens driving device (1000). Particularly, the fourth magnet unit (1420) may be omitted from a first modification. Moreover, the third magnet unit (1410) and the fourth magnet unit (1420) may be omitted from a second modification.

The first lens driving device (1000) may be an AF module. At this time, the second lens driving device (2000) may be an OIS module. Here, the OIS module may also perform an AF function. However, the first lens driving device (1000) may be an OIS module. The second lens driving device (2000) may be an AF module. That is, any one of the first lens driving device (1000) and the second lens driving device (2000) may be an AF module and the other may be an OIS module. Alternatively, both the first lens driving device (1000) and the second lens driving device (2000) may be an AF module. Alternatively, both the first lens driving device (1000) and the second lens driving device (2000) may be an OIS module.

The first cover member (1100) may be integrally formed with a first housing (1310). Alternatively, the first cover member (1100) may be omitted and the first housing (1310) may function as the first cover member (1100). That is, the first cover member (1100) may be a first housing (1310).

The first cover member (1100) may form an external shape of the first lens driving device (1000). The first cover member (1100) may take a bottom-opened cubic shape. However, the present invention is not limited thereto. The first cover member (1100) may be a non-magnetic substance. If the first cover member (1100) is formed with a magnetic substance, the magnetic force of first cover member (110) may affect the second magnetic unit (2320) of the second lens driving device (2000). The first cover member (1100) may be formed with a metal material. To be more specific, the first cover member (1100) may be formed with a metal plate. In this case, the first cover member (1100) may shield an EMI (Electro Magnetic Interference). Because of this characteristic of the first cover member (1100), the first cover member (1100) may be called an "EMI shield can". The first cover member (1100) can shield radio waves generated from outside of the first lens driving device from being introduced into the first cover member (1100). Furthermore, the first cover member (1100) may shield radio waves generated from inside of the first cover member (1100) from being discharged to outside of the first cover member (1100). However, the material of first cover member (1100) is not limited thereto.

The first cover member (1100) may comprise an upper plate (1101) and a side plate (1102). The first cover member (1100) may comprise an upper plate (1101) and a side plate (1102) extended downwardly from an outside of the upper plate (1101). A lower end of the side plate (1102) of first cover member (1100) may be mounted on a first base (1500). The lower end of the side plate (1102) of first cover member (1100) may be coupled to a step (staircase, 1540) of the first base (1500). The first cover member (1100) may be mounted on the first base (1500) by being tightly coupled at an inner surface, in part or in whole, to a side surface of the first base (1500). An inner space formed by the first cover member (1100) and the first base (1500) may be disposed with a mover (1200), a stator (1300) and an AF support member (1600). Through this structure, the first cover member (1100) can protect inner elements from an outside shock and simultaneously inhibit an outside foreign object from being inwardly introduced. However, the present invention is not limited thereto, and a lower end of the side plate (1102) of the first cover member (1100) may be directly coupled to a first substrate (100) disposed at a lower side of the first base (1500). Some portions of a plurality of side plates may face a second cover member (2100).

The first cover member (1100) may comprise an opening (1110) and an extension part (1120). However, the extension part (1120) may be omitted or changed from the first cover member (1100).

The opening (1110) may be formed on an upper plate (1101). The opening (1110) may expose the first lens module. The opening (1110) may be formed to correspond in shape to the first lens module. The size of opening (1110) may be formed to be greater than a diameter of the first lens module in order to allow the first lens module to be assembled through the opening (1110). Meantime, a light having introduced through the opening (1110) may pass through the first lens module. At this time, the light having passed the first lens module may be obtained as an image by a first image sensor.

The extension part (1120) may be extended by being downwardly bent from an inside of the upper plate (1101). The extension part (1120) may be called an "inner yoke". At least a portion of the extension part (1120) may be inserted into a groove formed on a first bobbin (1210). Through this structure, the first bobbin (1210) may be inhibited from being rotated in the process of the first lens module being screw-connected to the first bobbin (1210). In addition, the extension part (1120) can inhibit the first bobbin (1210) from rotating relative to the first cover member (1100).

The mover (1200) may be coupled to the first lens module. The mover (1200) may accommodate the first lens module therein. An inside of the mover (1200) may be coupled by an outside of the first lens module. The mover (1200) may integrally move along with the first lens module through an interaction with the stator (1300).

The mover (1200) may comprise a first bobbin (1210) and a first coil (1220). However, any one or more of the first bobbin (1210) and the first coil (1220) may be omitted or changed from the mover (1200).

The first bobbin (1210) may be disposed at an inside of a first housing (1310). The first bobbin (1210) may be accommodated into a through hole (1311) of the first housing (1310). The first bobbin (1210) may be coupled with the first lens module. To be more specific, an inside of the first bobbin (1210) may be coupled by an outside of the first lens module. The first bobbin (1210) may be coupled by the first coil (1220). A lower surface of first bobbin (1210) may be coupled by a first lower support member (1620). A top surface of first bobbin (1210) may be coupled by a first upper support member (1610). The first bobbin (1210) may move to an optical axis direction relative to the first housing (1310).

The first bobbin (1210) may comprise a through hole (1211) and a coil reception part (1212). However, any one or more of the through hole (1211) and the coil reception part (1212) may be omitted or changed from the first bobbin (1210).

The through hole (1211) may be formed at an inside of the first bobbin (1210). The through hole (1211) may be formed with an upper/bottom opened shape. The through hole (1211) may be coupled by the first lens module. An inside of the through hole (1211) may be formed with a screw thread with a shape corresponding to that formed on an outside of the first lens module. That is, the through hole (1211) may be screw-connected to the first lens module. An adhesive may be interposed between the first lens module and the first bobbin (1210). At this time, the adhesive may be an epoxy hardened by UV (ultraviolet), heat or laser beam. That is, the first lens module and the first bobbin (1210) may be adhered by UV-hardened epoxy and/or thermally hardened epoxy.

The coil reception port (1212) may accommodate at least a portion of the first coil (1220). The coil reception part (1212) may be integrally formed with an outside of the first bobbin (1210). Furthermore, the coil reception part (1212) may be continuously formed along an outside of the first bobbin (1210) or may be spaced apart from the first bobbin (1210) at a predetermined gap. For example, the coil reception part (1212) may be formed by allowing a portion of an outside of the first bobbin (1210) to be correspondingly recessed to a shape of the first coil (1220). At this time, the first coil (1220) may be directly wound on a first driving part coupling part (1212). In a modification, the coil reception part (1212) may take an upper/bottom-opened shape. At this time, the first coil (1220) may be inserted into the coil reception part (1212) in a pre-wound state through an opened area.

The first coil (1220) may be disposed at the first bobbin (1210). The first coil (1220) may be disposed at an outside of the first bobbin (1210). The first coil (1220) may be directly wound on an outside of first bobbin (1210). The first coil (1220) may electrically interact with a first magnet unit (1320). The first coil (1220) may face the first magnet unit (1320), in this case, when a current is supplied to the first coil (1220) to form a magnetic field about the first coil (1220), the first coil (1220) may move relative to the first magnet unit (1320) through an electromagnetic interaction between the first coil (1220) and the first magnet unit (1320). The first coil (1220) may move for AF driving. In this case, the first coil (1220) may be called an "AF coil".

The first coil (1220) may comprise a pair of lead cables (not shown) for power supply. The pair of lead cables on the first coil (1220) may be electrically connected to a first lower support member (1620). Each of the lead cables of the first coil (1220) may be electrically connected to first and second support units (1620*a*, 1620*b*). In this case, the first coil (1220) may be supplied with a power through the first lower support member (1620) electrically connected through a terminal part (1624) to the first substrate (100).

The stator (1300) may accommodate the mover (1200) thereinside. The stator (1300) can move the mover (1200) through an electromagnetic interaction as a fixed member. The stator (1300) may comprise a first housing (1310) and a first magnet unit (1320). However, any one or more of the first housing (1310) and the first magnet unit (1320) may be omitted or changed from the stator (1300).

The first housing (1310) may be disposed at an outside of the first bobbin (1210). The first housing (1310) may be spaced apart from the first bobbin (1210). At least one portion of the first housing (1310) may take a shape corresponding to that of an inside of the first cover member (1100). Particularly, an outside of the first housing (1310) may take a shape corresponding to that of an inside of the side plate (1102) of the first cover member (1100). The first housing (1310) may take a cubic shape comprising four side surfaces, for example. However, the shape of the first housing (1310) may take any shape as long as the shape can allow being disposed inside of the first cover member (1100). The first housing (1310) may be formed with an insulation material. The first housing (1310) may be formed with an injection in consideration of productivity. The first housing (1310) may be fixed on the first base (1500). As a modification, the first housing (1310) may be omitted and the first magnet unit (1320) may be fixed on the first cover member (1100). A top surface of first housing (1310) may be coupled by a first upper support member (1610). A lower surface of first housing (1310) may be coupled by the first lower support member (1620).

The first housing (1310) may comprise first to fourth side surfaces (1301, 1302, 1303, 1304). The first housing (1310) may comprise continuously arranged first to fourth side surfaces (1301, 1302, 1303, 1304). The first housing (1310) may comprise a first side surface (1301) disposed with a first magnet (1321), a second side surface (1302) disposed with a third magnet unit (1410), and a third side surface (1303) disposed with a second magnet (1322). The first housing (1310) may comprise a fourth side surface (1304) disposed with a fourth magnet unit (1420). The second side surface (1302) may face an eighth side surface (2304).

The first housing (1310) may comprise a through hole (1311), a magnet reception part (1312) and a third magnet unit reception part (1313). The first housing (1310) may further comprise a fourth magnet unit reception part (not shown). However, any one or more of the through hole (1311), the magnet reception part (1312), the third magnet unit reception part (1313) and the fourth magnet reception part may be omitted or changed from the first housing (1310).

The through hole (1311) may be formed at an inside of the first housing (1310). The through hole (1311) may take an upper/bottom opened shape on the first housing (1310). The through hole (1311) may be accommodated by the first bobbin (1210). The through hole (1311) may be movably disposed with the first bobbin (1210). The through hole (1311) may take a shape corresponding to that of the first bobbin (1210).

The magnet reception part (1312) may be formed at a side surface of the first housing (1310). The magnet reception part (1312) may be formed as a hole penetrating the first housing (1310). Alternatively, the magnet reception part (1312) may be formed as a groove that is formed by allowing a portion of the first housing (1310) to be recessed. The magnet reception part (1312) may accommodate at least a portion of the first magnet unit (1320). An adhesive (not shown) may be interposed between the magnet reception part (1312) and the first magnet unit (1320). That is, the magnet reception part (1312) and the first magnet unit (1320) may be coupled by an adhesive. The magnet reception part (1312) may be disposed at an inside of the first housing (1310). The magnet reception part (1312) may be formed by allowing a portion of an inside of the first housing (1310) to be outwardly recessed. In this case, an electromagnetic interaction with the first coil (1220) disposed at an inside of the first magnet unit (1320) may be advantageously realized.

The third magnet unit reception part (1313) may be formed at a second side surface (1302) of first housing (1310). The third magnet unit reception part (1313) may be formed at an outside of the first housing (1310). The third magnet unit reception part (1313) may be formed at an outside of the first housing (1310) by being inwardly recessed. Alternatively, the third magnet unit reception part (1313) may be formed as a hole passing through the first housing (1310). The third magnet unit reception part (1313) may accommodate the third magnet unit (1410). The third magnet unit reception part (1313) may accommodate at least a portion of the third magnet unit (1410). The third magnet unit reception part (1313) may take a shape corresponding to that of the third magnet unit (1410).

The fourth magnet unit reception part may be formed at a fourth side surface (1304) of first housing (1310). The fourth magnet unit reception part may be formed at an outside of the first housing (1310). The fourth magnet unit reception part may be formed at an outside of first housing (1310) by being inwardly recessed. Alternatively, the fourth magnet unit reception part may be formed as a hole passing through the first housing (1310). The fourth magnet unit reception part may accommodate the fourth magnet unit (1420). The fourth magnet unit reception part may accommodate at least a portion of the fourth magnet unit (1420). The fourth magnet unit reception part may take a shape corresponding to that of the fourth magnet unit (1420). The fourth magnet unit reception part may be symmetrical with the third magnet unit reception part (1313) about an optical axis of the first camera module.

The first magnet unit (1320) may be disposed on the first housing (1310). The first magnet unit (1320) may be accommodated into the magnet reception part (1312) of first housing (1310). The first magnet unit (1320) may electrically interact with the first coil (1220). The first magnet unit (1320) may face the first coil (1220). The first magnet unit (1320) may move the first bobbin (1210) fixed with the first coil (1220). The first magnet unit (1320) may move the first coil (1220) for AF driving. In this case, the first magnet unit (1320) may be called an "AF driving magnet".

The first magnet unit (1320) may comprise first and second magnets (1321, 1322). The first magnet unit (1320) may comprise mutually spaced-apart first and second magnets (1321, 1322). The first magnet unit (1320) may comprise mutually facing first and second magnets (1321, 1322). The first magnet unit (1320) may comprise first and second magnets (1321, 1322) each facing at a side surface of the first housing (1310). The first magnet unit (1320) may comprise a first magnet (1321) disposed at the first side surface (1301) and a second magnet (1322) disposed at the third side surface (1303).

The first and second magnets (1321, 1322) may be symmetrical about an optical axis of first camera module. Each of the first and second magnets (1321, 1322) may have a size and a shape symmetrical about an optical axis of the first camera module. Each of the first and second magnets (1321, 1322) may be disposed on a corresponding position about an optical axis of first camera module. Each of the first and second magnets (1321, 1322) may be mutually parallel disposed. Each of the first and second magnets (1321, 1322) may be so disposed as to allow same polarity to face an inside. Each of the first and second magnets (1321, 1322) may be so disposed as to allow an N pole to face inside. Each of the first and second magnets (1321, 1322) may take a flat plate shape. In this case, each of the first and second magnets (1321, 1322) may be called a "flat plate magnet".

The third magnet unit (1410) may be disposed at a side surface of first housing (1310) facing a second housing (2310). The third magnet unit (1410) may be disposed at a second side surface (1302) of first housing (1310). The third magnet unit (1410) may be interposed between the first magnet (1321) and the second magnet (1322). The third magnet unit (1410) may be smaller than the first magnet (1321). The third magnet unit (1410) may have a width narrower than the first magnet (1321). The third magnet unit (1410) may have a thickness thinner than the first magnet (1321). The third magnet unit (1410) may be lower in height than the first magnet (1321). Alternatively, the third magnet unit (1410) may be of same height as the first magnet (1321). The third magnet unit (1410) may be smaller than the second magnet (1322). The third magnet unit (1410) may be disposed on a virtual line connecting an optical axis of first camera module and an optical axis of second camera module. The third magnet unit (1410) may be so arranged as to allow same polarity of first and second magnets (1321, 1322) to face inside. The third magnet unit (1410) may be so disposed as to allow an N pole to face inside. Alternatively, the third magnet unit (1410) may be so arranged as to allow an S pole to face inside.

In the first exemplary embodiment, the third magnet unit (1410) is arranged on the AF camera module formed with a flat plate magnet to thereby minimize the magnetic force affected on a corner magnet of the OIS camera module by a magnet of AF camera module. When the third magnet unit (1410) is removed under a condition where a current is not corrected in the present exemplary embodiment, an optical axis of the second camera module may be moved more than 5 μm.

The fourth magnet unit (1420) may be disposed on the first housing (1310). The fourth magnet unit (1420) may be disposed on a fourth side surface (1304) of the first housing (1310). The fourth magnet unit (1420) may be symmetrically disposed with the third magnet unit (1410) about an optical axis of first camera module. The fourth magnet unit (1420) may be disposed at a position corresponding to that of the third magnet unit (1410) about an optical axis of the first camera module. The fourth magnet unit (1420) may be formed with a size and shape corresponding to those of the third magnet unit (1410) about an optical axis of the first camera module. The fourth magnet unit (1420) may be interposed between the first magnet (1321) and the second magnet (1322). The fourth magnet unit (1420) may be smaller than the first magnet (1321). The fourth magnet unit (1420) may have a width narrower than the first magnet (1321). The fourth magnet unit (1420) may have a thickness thinner than the first magnet (1321). The fourth magnet unit (1420) may be lower in height than the first magnet (1321). Alternatively, the fourth magnet unit (1420) may have the same height as that of the first magnet (1321). The fourth magnet unit (1420) may be smaller than the second magnet (1322). The fourth magnet unit (1420) may be disposed on a virtual line connecting an optical axis of first camera module and an optical axis of second camera module. The fourth magnet unit (1420) may be so disposed as to allow same polarity of the first and second magnets (1321, 1322) to face an inside. The fourth magnet unit (1420) may be so disposed as to allow the same polarity as the third magnet unit (1410) to face an inside. The fourth magnet unit (1420) may be so disposed as to allow an N pole to face inside. Alternatively, the fourth magnet unit (1420) may be so disposed as to allow an S pole to face inside.

In the first exemplary embodiment, the fourth magnet unit (1420) corresponding to the third magnet unit (1410) may be arranged to offset an influence of the third magnet unit (1410) affected on the AF driving of the first camera module. Alternatively, the fourth magnet unit (1420) may allow the third magnet unit (1410) to apply a symmetrical influence on an influence affected by the AF driving of the first camera module.

The first base (1500) may be disposed at a lower side of first housing (1310). The first base (1500) may be disposed at a top surface of first substrate (100). The first base (1500) may be coupled by a first infrared filter.

The first base (1500) may comprise an opening (1510), a support part (1520), a terminal reception groove (1530) and a step (staircase) part (1540). However, any one or more of the opening (1510), the support part (1520), the terminal reception groove (1530) and the step (staircase) part (1540) may be omitted or changed from the first base (1500).

The opening (1510) may be formed at a center of the first base (1500). The opening (1510) may be formed by vertically passing through the first base (1500). The opening (1510) may be overlapped with the first lens module to an optical axis direction. The opening (1510) may pass through a light having passed the first lens module.

The support part (1520) may be upwardly protruded from a top surface of the first base (1500). The support part (1520) may be formed at each of the four corners. The support part (1520) may be press-fitted to the first housing (1310). Through this shape, the support part (1520) may fix the first housing (1310) to an inside.

The terminal reception groove (1530) may be formed at a side surface of first base (1500). The terminal reception groove (1530) may be formed by allowing a portion of a side surface of an outside of first base (1500) to be inwardly recessed. The terminal reception groove (1530) may accommodate at least one portion of terminal part (1624) of the first lower support member (1620). The terminal reception groove (1530) may be formed with a width corresponding to that of the terminal part (1624).

The step part (1540) may be formed at a lower end of an outside of the first base (1500). The step part (1540) may be formed by being outwardly protruded from an outside of the first base (1500). The step part (1540) may support a lower end of the side plate (1102) of first cover member (1100).

The AF support member (1600) may be coupled to the first bobbin (1210) and to the first housing (1310). The AF support member (1600) may elastically support the first bobbin (1210). The AF support member (1600) may support the first bobbin (1210) so as to be moved relative to the first housing (1310). The AF support member (1600) may have elasticity on at least a portion thereof.

The AF support member (1600) may comprise a first upper support member (1610) and a first lower support member (1620). However, any one or more of the first upper support member (1610) and the first lower support member (1620) may be omitted or changed from the AF support member (1600).

The first upper support member (1610) may be coupled to a top surface of first bobbin (1210) and to a top surface of first housing (1310). The first upper support member (1610) may be integrally formed.

The first upper support member 610) may comprise an external part (1611), an internal part (1612) and a connection part (1613). However, any one or more of the external part (1611), the internal part (1612) and the connection part (1613) may be omitted or changed from the first upper support member (1610).

The external part (1611) may be coupled to the first housing (1310). The external part (1611) may be coupled to a top surface of first housing (1310).

The internal part (1612) may be coupled to the first bobbin (1210). The internal part (1612) may be coupled to a top surface of first bobbin (1210).

The connection part (1613) may connect the external part (1611) and the internal part (1612). The connection part (1613) may elastically connect the external part (1611) and the internal part (1612). The connection part (1613) may have elasticity.

The first lower support member (1620) may be coupled to a lower surface of first bobbin (1210) and to a lower surface of first housing (1310). The first upper support member (1610) may be electrically connected to the first coil (1220). The first lower support member (1620) may comprise first and second support units (1620a, 1620b). Each of the first and second support units (1620a, 1620b) may be coupled to a pair of lead cables of the first coil (1220).

The first lower support member (1620) may comprise an external part (1621), an internal part (1622), a connection part (1623) and a terminal part (1624). However, any one or more of the external part (1621), the internal part (1622), the connection part (1623) and the terminal part (1624) may be omitted or changed from the first lower support member (1620).

The external part (1621) may be coupled to the first housing (1310). The external part (1621) may be coupled to a lower surface of first housing (1310). The internal part (1622) may be coupled to the first bobbin (1210). The internal part (1622) may be coupled to a lower surface of first bobbin (1210). The connection part (1623) may connect the external part (1621) and the internal part (1622). The connection part (1623) may elastically connect the external part (1621) and the internal part (1622). The connection part (1623) may have elasticity.

The terminal part (1624) may be extended from the external part (1621). The terminal part (1624) may be formed by being bent from the external part (1621). The terminal part (1624) may be extended by being bent downwardly from the external part (1621). Alternatively, as a modification, the terminal part (1624) may be disposed as a member separate from the external part (1621). The separately disposed terminal part (1624) and the external part (1621) may be coupled by a conductive member. The terminal part (1624) may be coupled to the first substrate (100). The terminal part (1624) may be coupled to the first substrate (100) via soldering. The terminal part (1624) may be accommodated into a terminal reception groove (1530) of first base (1500).

The second camera module may comprise a second lens driving device (2000), a second lens module (not shown), a second infrared filter (not shown), a second image sensor (10), a second substrate (200) and a second controller (not shown). However, any one or more of the second lens driving device (2000), the second lens module, the second infrared filter, the second image sensor (10), the second substrate (200) and the second controller may be omitted or changed from the second camera module. Here, the second image sensor (20) and the second substrate (200) are same as explained before.

The second lens module may comprise a lens and a lens barrel. The second lens module may comprise one or more lenses (not shown) and a lens barrel accommodating one or more lenses. However, one element of the second lens module is not limited to the lens barrel, and any holder structure capable of supporting one or more lenses will suffice for a lens barrel. The second lens module may move along with the second lens driving device (2000) by being coupled to the second lens driving device (2000). The second lens module may be coupled to an inside of the second lens driving device (2000). The second lens module may be screw-coupled to the second lens driving device (2000). The second lens module may be coupled to the second lens driving device (2000) using an adhesive (not shown). Meantime, a light having passed the second lens module may be irradiated on the second image sensor (20).

The second lens module may be so arranged as to be aligned with an optical axis of the first lens module The second infrared filter may inhibit a light of infrared region from being incident on the second image sensor (20). The second infrared filter may be interposed between the second lens module and the second image sensor (20). The second infrared filter may be disposed at a holder member (not shown) separately disposed from a second base (2500). However, the second infrared filter may be mounted on an opening (2510) formed at a center of the second base (2500). The second infrared filter may be formed with a film material or glass material. The second infrared filter may be formed by coating an infrared cut-off coating material on a flat optical filter such as protective cover glass and cover glass. The second infrared may be an infrared cut-off filter or an infrared absorption filter.

The second controller may be mounted on the second substrate (200). The second controller may be disposed at an outside of the second lens driving device (2000). However, the second controller may be also disposed at an inside of the second lens driving device (2000). The second controller may control the direction, intensity and amplitude of a current supplied to each element forming the second lens driving device (2000). The second controller may perform any one or more of the AF function and the OIS function of second camera module by controlling the second lens driving device (2000). That is, the second controller may move or tilt the second lens module to an optical axis direction or to a direction perpendicular to the optical axis direction by controlling the second lens driving device (2000). Furthermore, the second controller may perform the feedback control of the AF function and OIS function. To be more specific, the second controller may provide a more accurate AF function by controlling a power or a current applied to a second coil (2220) and/or third coil (2422) through reception of position of second bobbin (2210) and/or second housing (2310) detected by a Hall sensor (2800) and additional sensor (not shown).

The second lens driving device (2000) may comprise a second cover member (2100), an AF mover (2200), an OIS mover (2300), a stator (2400), a second base (2500), an AF support member (2600), an OIS support member (2700), and a Hall sensor (2800). However, any one or more of the second cover member (2100), the AF mover (2200), the OIS mover (2300), the stator (2400), the second base (2500), the AF support member (2600), the OIS support member (2700), and the Hall sensor (2800) may be omitted or changed from the second lens driving device (2000).

The second cover member (2100) may accommodate the second housing (2310). The second cover member (2100) may be spaced apart from the first cover member (1100). At this time, a discrete distance between the second cover member (2100) and the first cover member (1100) may be within 4 mm. Alternatively, a discrete distance between the second cover member (2100) and the first cover member (1100) may be within 3 mm. Alternatively, a discrete distance between the second cover member (2100) and the first cover member (1100) may be within 2 mm. Alternatively, a discrete distance between the second cover member (2100) and the first cover member (1100) may be within 1 mm.

The second cover member (2100) may form an external shape of the second lens driving device (2000). The second cover member (1100) may take a bottom-opened cubic shape. However, the present invention is not limited thereto. The second cover member (2100) may be a non-magnetic substance. If the second cover member (2100) is formed with a magnetic substance, the magnetic force of second cover member (2100) may affect the second magnetic unit (2320). The second cover member (2100) may be formed with a metal material. To be more specific, the second cover member (2100) may be formed with a metal plate. In this case, the second cover member (2100) may shield an EMI (Electro Magnetic Interference). Because of this characteristic of the second cover member (2100), the second cover member (2100) may be called an "EMI shield can". The second cover member (2100) can shield radio waves generated from outside of the second lens driving device from being introduced into the second cover member (2100). Furthermore, the second cover member (2100) may shield radio waves generated from inside of the second cover member (2100) from being discharged to outside of the second cover member (2100). However, the material of the second cover member (2100) is not limited thereto.

The second cover member (2100) may comprise an upper plate (2101) and a side plate (2102). The second cover member (2100) may comprise an upper plate (2101) and a side plate (2102) extended downwardly from an outside of the upper plate (2101). A lower end of the side plate (2102) of the second cover member (2100) may be mounted on a second base (2500). The second cover member (2100) may be mounted on the second base (2500) by being tightly coupled at an inner surface, in part or in whole, to a side surface of the second base (2500). An inner space formed by the second cover member (2100) and the second base (2500) may be disposed with the AF mover (2200), the OIS mover (2300), the stator (2400), the AF support member (2600) and the OIS support member (2700).

Through this structure, the second cover member (2100) can protect inner elements from an outside shock and simultaneously inhibit an outside foreign object from being inwardly introduced. However, the present invention is not limited thereto, and a lower end of the side plate (2102) of the second cover member (2100) may be directly coupled to a second substrate (200) disposed at a lower side of the second base (1500). Some portions of a plurality of side plates (2102) may face a first cover member (1100).

A distance (See L2 of FIG. 11) to a lengthwise direction of the side plate (2102) of second cover member (2100) may not exceed 1.5 times the length (See L1 of FIG. 11) to a lengthwise direction of the side plate (2102) of first cover member (1100).

The second cover member (2100) may comprise an opening (2110) and a marking part (2120). However, the marking part (2120) may be omitted or changed from the second cover member (2100).

The opening (110) may be formed on an upper plate (2101). The opening (2110) may expose the second lens module. The opening (2110) may be formed to correspond in shape to the second lens module. The size of opening (2110) may be formed to be greater than a diameter of the second lens module in order to allow the second lens module to be assembled through the opening (2110). Meantime, a light having introduced through the opening (2110) may pass through the second lens module. At this time, the light having passed the second lens module may be obtained as an image by a second image sensor.

The marking part (2120) may be formed at an upper plate (2102) of second cover member (2100). The marking part (2120) may be so formed as to allow an operator to know directivity of the second cover member (2100) at a glance. In the OIS lens driving device, the directivity is important at the time of soldering on a PCB, the marking part (2120) may be formed as to allow an operator to easily know the directivity of the OIS lens driving device. The marking part (2120) may be formed at a corner portion of one side of the upper plate (2120).

The AF mover (2200) may be coupled to the second lens module. The AF mover (2200) may accommodate the second lens module therein. An inside of the AF mover (2200) may be coupled by an outside of the second lens module. The AF mover (2200) may integrally move along with the second lens module through an interaction with an OIS mover (2300) and/or the stator (2400).

The AF mover (2200) may comprise a second bobbin (2210) and a second coil (2220). However, any one or more of the second bobbin (2210) and the second coil (2220) may be omitted or changed from the AF mover (2200).

The second bobbin (21210) may be disposed at an inside of a second housing (2310). The second bobbin (2210) may be accommodated into a through hole (2311) of the second housing (2310). The second bobbin (2210) may be coupled with the second lens module. To be more specific, an inside of the second bobbin (2210) may be coupled by an outside of the second lens module. The second bobbin (2210) may be coupled by the second coil (2220). A lower surface of the second bobbin (2210) may be coupled by a second lower support member (2620). A top surface of second bobbin (2210) may be coupled by a second upper support member (2610). The second bobbin (2210) may move to an optical axis direction relative to the second housing (2310).

The second bobbin (2210) may comprise a through hole (2211) and a coil reception part (2212). However, any one or more of the through hole (22.11) and the coil reception part (2212) may be omitted or changed from the second bobbin (2210).

The through hole (2211) may be formed at an inside of the second bobbin (2210). The through hole (2211) may be formed with an upper/bottom opened shape. The through hole (2211) may be coupled by the second lens module. An inside of the through hole (2211) may be formed with a screw thread with a shape corresponding to that formed on an outside of the second lens module. That is, the through hole (2211) may be screw-connected to the second lens module. An adhesive may be interposed between the second lens module and the second bobbin (2210). At this time, the adhesive may be an epoxy hardened by UV (ultraviolet), heat or laser beam. That is, the second lens module and the second bobbin (2210) may be adhered by UV-hardened epoxy and/or thermally hardened epoxy.

The coil reception port (2212) may accommodate at least a portion of the second coil (2220). The coil reception part (2212) may be integrally formed with an outside of the second bobbin (2210). Furthermore, the coil reception part (2212) may be continuously formed along an outside of the second bobbin (2210) or may be spaced apart from the second bobbin (2210) at a predetermined gap. For example, the coil reception part (2212) may be formed by allowing a portion of an outside of the second bobbin (2210) to be correspondingly recessed to a shape of the second coil (2220). At this time, the second coil (2220) may be directly wound on the coil reception part (2212). In a modification, the coil reception part (2212) may take an upper-opened or bottom-opened shape. At this time, the second coil (2220) may be inserted into the coil reception part (2212) in a pre-wound state through an opened area.

The second coil (2220) may be disposed at the second bobbin (2210). The second coil (2220) may be disposed at an outside of the second bobbin (2210). The second coil (2220) may be directly wound on an outside of second bobbin (2210). The second coil (2220) may electrically interact with a second magnet unit (2320). The second coil (2220) may face the second magnet unit (2320). In this case, when a current is supplied to the second coil (2220) to form a magnetic field about the second coil (2220), the second coil (2220) may move relative to the second magnet unit (2320) through an electromagnetic interaction between the second coil (2220) and the second magnet unit (2320). The second coil (2220) may move for the AF driving. In this case, the second coil (2220) may be called an "AF coil".

The second coil (2220) may comprise a pair of lead cables (not shown) for power supply. The pair of lead cables on the second coil (2220) may be electrically connected to a second upper support member (2610). Each of the lead cables of the second coil (2220) may be electrically connected to third and fourth support units (2620a, 2620b). In this case, the second coil (2220) may be supplied with a power through the second upper support member (2610) electrically connected through a substrate (2410), a substrate part (2421) and an OIS support member (2700) to the second substrate (200).

The OIS mover (2300) may move for OIS function. The OIS mover (2300) may be disposed at an outside of the AF mover (2200) to face the AF mover (2200). The OIS mover (2300) may move the AF mover (2200) or may move along with the AF mover (2200). The OIS mover (2300) may be movably supported by a stator (2400) and/or a second base (2500) disposed thereunder. The OIS mover (2300) may be disposed at an inner space of the second cover member (2100).

The OIS mover (2300) may comprise a second housing (2310) and a second magnet unit (2320). However, any one or more of the second housing (2310) and a second magnet unit (2320) may be omitted or changed from the OIS mover (2300).

The second housing (2310) may be spaced apart from the first housing (1310) of the first camera module (1000). The second housing (2310) may be disposed at an outside of the second bobbin (2210). The second housing (2310) may be spaced apart from the second bobbin (2210). At least one portion of the second housing (2310) may take a shape corresponding to that of an inside of the second cover member (2100). Particularly, an outside of the second housing (2310) may take a shape corresponding to that of an inside of the side plate (2102) of the second cover member (2100). The second housing (2310) may take a cubic shape comprising four side surfaces, for example. However, the shape of the second housing (2310) may take any shape as long as the shape can allow being disposed inside of the second cover member (2100). The second housing (2310) may be formed with an insulation material. The second housing (2310) may be formed with an injection in consideration of productivity. The second housing (2310) is a moving part for OIS driving and may be spaced apart from the second cover member (2100). A top surface of second housing (2310) may be coupled by a second upper support member (2610). A lower surface of second housing (2310) may be coupled by the second lower support member (2620).

The second housing (2310) may comprise fifth to eighth side surfaces (2301, 2302, 2303, 2304). The second housing (2310) may comprise continuously arranged fourth to eighth side surfaces (2301, 2302, 2303, 2304). The eighth side surface (2304) may face the second side surface (1302).

The second housing (2310) may comprise a through hole (2311) and a magnet reception part (2312). However, any one or more of the through hole (2311), and the magnet reception part (2312) may be omitted or changed from the first housing (2310).

The through hole (2311) may be formed at an inside of the second housing (2310). The through hole (2311) may take an upper/bottom opened shape on the second housing (2310). The through hole (2311) may be accommodated by the second bobbin (2210). The through hole (2311) may be movably disposed with the second bobbin (2210). The through hole (2311) may take a shape corresponding to that of the second bobbin (2210).

The magnet reception part (2312) may be formed at a side surface of the second housing (2310). The magnet reception part (2312) may accommodate at least a portion of the second magnet unit (2320). An adhesive (not shown) may be interposed between the magnet reception part (2312) and the second magnet unit (2320). That is, the magnet reception part (2312) and the second magnet unit (2320) may be coupled by an adhesive. The magnet reception part (2312) may be disposed at an inside of the second housing (2310). The magnet reception part (2312) may be formed by allowing a portion of an inside of the second housing (2310) to be outwardly recessed. In this case, an electromagnetic interaction with the second coil (2220) disposed at an inside of the second magnet unit (2320) may be advantageously realized. The magnet reception part (2312) may take a bottom-opened shape. In this case, an electromagnetic interaction with the third coil (2422) disposed at a lower side of the second magnet unit (2320) may be advantageously realized.

The second magnet unit (2320) may be disposed at the second housing (2310). The second magnet unit (2320) may be accommodated into the magnet reception part (2312) of the second housing (2310). The second magnet unit (2320) may electrically interact with the second coil (2220). The second magnet unit (2320) may face the second coil (2220). The second magnet unit (2320) may move the second bobbin (2210) fixed by the second coil (2220). The second magnet unit (2320) may move the second coil (2220) for the AF driving. In this case, the second magnet unit (2320) may be called an "AF driving magnet". Furthermore, the second magnet unit (2320) may be moved for OIS driving. In this case, the second magnet unit (2320) may be called an "OIS driving magnet". Thus, the second magnet unit (2320) may be called an "AF/OIS common driving magnet".

The second magnet unit (2320) may comprise four corner magnets. The four corner magnets may be so disposed as to allow an N pole to face an inside. Alternatively, the four corner magnets may be so disposed as to allow an S pole to face an inside. The four corner magnets may take a large cylindrical shape where an inside surface is greater than an outside.

The stator (2400) may be disposed at a lower side of the AF mover (2200). The stator (2400) may be disposed at a lower side of the OIS mover (2300). The stator (2400) may move the OIS mover (2300). At this time, the AF mover (2200) may also move along with the OIS mover (2300). That is, the stator (2400) may move the AF mover (2200) and the OIS mover (2300). The stator (2400) may comprise a substrate (2410) and a third coil part (2420). However, any one or more of the substrate (2410) and the third coil part (2420) may be omitted or changed from the mover (2400).

The substrate (2410) may be an FPCB (Flexible Printed Circuit Board). The substrate (2410) may be disposed at a top surface of second base (2500). The substrate (2410) may be interposed between the second base (2500) and the third coil part (2420). The substrate (2410) may be electrically connected to the third coil (2422). The substrate (2410) may be electrically connected to the second coil (2220). The substrate (2410) may be electrically connected to the second coil (2220) through the OIS support member (2700) and the second upper support member (2610).

The substrate (2410) may comprise a through hole (2411) and a terminal part (2412). However, any one or more of the through hole (2411) and the terminal part (2412) may be omitted or changed from the substrate (2410). The through hole (2411) may be disposed at a center of the sub substrate (2410). The through hole (2411) may be so formed as to vertically pass through the sub substrate (2410). The through hole (2411) may be overlapped with the second lens module to an optical axis direction. The through hole (2411) may pass through a light having passed the second lens module.

The terminal part (2412) may be formed by allowing a portion of the substrate (2410) to be bent. The terminal part (2412) may be formed by allowing portion of the substrate (2410) to be downwardly bent. At least a portion of the terminal part (2412) may be exposed to an outside. A lower end of the terminal part (2412) may be coupled with the second substrate (200). The terminal part (2412) may be soldered to the second substrate (200). The substrate (2410) may be electrically connected to the second substrate (200) through the terminal part (2412).

The third coil part (2420) may be disposed at a top surface of substrate (2410). The third coil part (2420) may be disposed on the second base (2500). The third coil part (2420) may face the second magnet unit (2320). The third coil part (2420) may electrically interact with the second magnet unit (2320). The third coil part (2420) may move the second magnet unit (2320) for OIS driving. The third coil part (2420) may comprise a substrate part (2421) and a third coil (2422). However, any one or more of the substrate part (2421) and a third coil (2422) may be omitted or changed from the third coil part (2420).

The substrate part (2421) may be an FPCB. The substrate part (2421) may be formed with a third coil (2422) in a FPC (Fine Pattern Coil). The substrate part (2421) may be disposed at a top surface of substrate (2410). The substrate part (2421) may be electrically connected to the substrate (2410). The substrate part (2421) may be electrically connected to the third coil (2422).

The third coil (2422) may be formed on a substrate part (2421) in a FPC (Fine Pattern Coil). The third coil (2422) may be disposed on the base (2500). The third coil (2422) may electrically interact with the second magnet unit (2320). The third coil (2422) may face the second magnet unit (2320). In this case, when a current is supplied to the third coil (2422) to form a magnetic field about the third coil (2422), the second magnet unit (2320) may move relative to the third coil (2422) in response to an electromagnetic interaction between the third coil (2422) and the second magnet unit (2320). The third coil (2422) can move the second magnet unit (2320) for OIS driving. In this case, the third coil (2422) may be called an "OIS coil".

The second base (2500) may be disposed at a lower side of second housing (2310). The second base (2500) may movably support the second housing (2310). The second base (2500) may be disposed at a top surface of second substrate (200). The second base (2500) may be coupled by a second infrared filter.

The second base (2500) may comprise an opening (2510), a terminal reception part (2520), and a sensor reception part (2530). However, any one or more of the opening (1510), the terminal reception part (2520), and the sensor reception part (2530) may be omitted or changed from the second base (2500).

The opening (2510) may be formed at a center of the second base (2500). The opening (2510) may be formed by vertically passing through the second base (2500). The opening (2510) may be overlapped with the second lens module to an optical axis direction. The opening (2510) may pass through a light having passed the second lens module.

The terminal reception part (2520) may be formed at a side surface of the second base (2500). The terminal reception part (2520) may be so formed as to allow a portion of an external side surface of the second base (2500) to be inwardly recessed. The terminal reception part (2520) may accommodate at least a portion of the terminal part (2412) of the substrate part (2410). The terminal reception part (2520) may be formed with a width corresponding to that of the terminal part (2412).

The sensor reception part (2530) may be formed at a top surface of the second base (2500). The sensor reception part (2530) may be so formed as to allow a portion of a top surface of the second base (2500) to be inwardly recessed. The sensor reception part (2530) may be formed with a groove. The sensor reception part (2530) may accommodate at least a portion of a Hall sensor (2800). The sensor reception part (2530) may be formed to correspond in shape to the Hall sensor. The sensor reception part (2530) may be formed in the same number as that of the Hall sensor. The sensor reception part (2530) may be formed in two pieces.

The AF support member (2600) may be coupled to the second bobbin (2210) and to the second housing (2310). The AF support member (2600) may elastically support the second bobbin (2210). The AF support member (2600) may movably support the second bobbin (1210) relative to the second housing (2310). The AF support member (2600) may have elasticity on at least a portion thereof.

The AF support member (2600) may comprise a second upper support member (2610) and a second lower support member (2620). However, any one or more of the second upper support member (2610) and the second lower support member (2620) may be omitted or changed from the AF support member (2600).

The second upper support member (2610) may be coupled to a top surface of second bobbin (2210) and to a top surface of second housing (2310). The second upper support member (2610) may be electrically connected to the second coil (2220). The second upper support member (2610) may comprise third and fourth support units (2610a, 2610b). Each of the third and fourth support units (2610a, 2610b) may be coupled to a pair of lead cables of second coil (2220).

The second upper support member (2610) may comprise an external part (2611), an internal part (2612), a connection part (2613) and a coupling part (2614). However, any one or more of the external part (2611), the internal part (2612), the connection part (2613) and the coupling part (2614) may be omitted or changed from the second upper support member (2610).

The external part (2611) may be coupled to the second housing (2310). The external part (2611) may be coupled to a top surface of second housing (2310).

The internal part (2612) may be coupled to the second bobbin (2210). The internal part (2612) may be coupled to a top surface of second bobbin (2210).

The connection part (2613) may connect the external part (2611) and the internal part (2612). The connection part (2613) may elastically connect the external part (2611) and the internal part (2612). The connection part (2613) may have elasticity.

The coupling part (2614) may be extended from the external part (2611). The coupling part (2614) may be outwardly extended from the external part (2611). The coupling part (2614) may be disposed at four corner portions of the second housing (2310). The coupling part (2614) may be coupled to an OIS support member (2700).

The second lower support member (2620) may be coupled to a lower surface of second bobbin (2210) and to a lower surface of second housing (2310). The second upper support member (2610) may be integrally formed. The second lower support member (2620) may comprise an external part (2621), an internal part (2622), and a connection part (2623). However, any one or more of the external part (2621), the internal part (2622), and the connection part (2623) may be omitted or changed from the second lower support member (2620).

The external part (2621) may be coupled to the second housing (2310). The external part (2621) may be coupled to a lower surface of the second housing (2310). The internal part (2622) may be coupled to the second bobbin (2210). The internal part (2622) may be coupled to a lower surface of second bobbin (2210). The connection part (2623) may connect the external part (2621) and the internal part (2622). The connection part (2623) may elastically connect the external part (2621) and the internal part (2622). The connection part (2623) may have elasticity.

The OIS support member (2700) may movably support the second housing (2310). The OIS support member (2700) may movably support the OIS mover (2300) relative to the stator (2400). A lower end of the OTS support member (2700) may be coupled to a third coil part (2420). An upper end of the OIS support member (2700) may be coupled to the second upper support member (2610). The OIS support member (2700) may comprise a plurality of wires. Alternatively, the OIS support member (2700) may comprise a plurality of leaf springs. The OIS support member (2700) may have elasticity on at least a portion thereof. The OIS support member (2700) may be formed with a conductive member. The second coil part (2420) and the second upper support member (2610) may be electrically conducted by the OIS support member (2700). The OIS support member (2700) may be formed in four pieces to allow respectively being disposed on four corner portions of the second housing (2310).

The OIS support member (2700) and the second housing (2310) may be disposed with a damper (not shown). The OIS support member (2700) and the AF support member (2600) may be disposed with a damper. The damper can inhibit a resonance phenomenon that may be generated in the course of AF/OIS feedback driving. Alternatively, in a modification, instead of a damper, a cushioning part (not shown) may be formed by changing in shape a portion of the OIS support member (2700) and/or the AF support member (2600). The cushioning part may be formed by being bent or by being curved.

The Hall sensor (2800) may be used for OIS feedback function. The Hall sensor (2800) may be a Hall IC. The Hall sensor (2800) can detect a magnetic force of second magnet unit (2320). The Hall sensor (2800) may detect the movement of second housing (2310). The Hall sensor (2800) may detect the second magnet unit (2320) fixed on the second housing (2310). The Hall sensor (2800) may be electrically connected to the substrate (2410). The Hall sensor (2800) may be accommodated into the sensor reception part (2530)

of second base (2500). The Hall sensor (2800) may be disposed in two pieces to detect the movement of second housing (2310) in x axis and y axis components by being mutually disposed at 90° relative to the optical axis.

Hereinafter, a manufacturing method of dual camera module according to the first exemplary embodiment will be described.

The manufacturing method of dual camera module may comprise:

mounting the first image sensor (10) on the first substrate (100) and mounting the second image sensor (20) on the second substrate (20) spaced apart from the first substrate (100) and connected by the first substrate (100) and the connection unit (400);

coupling the first lens driving device (1000) coupled by the first lens module to the first substrate (100);

coupling the second lens driving device (2000) coupled by the second lens module to the second substrate (200);

coupling the first substrate (100) to the stiffener (40); and coupling the second substrate (200) to the stiffener (40).

The step of coupling the first lens driving device (1000) to the first substrate (100) may comprise a step of aligning the first lens module and the first image sensor (10) to harden a first epoxy (not shown) while the first substrate (100) and the first lens driving device (1000) are preliminarily adhered by the first epoxy.

The step of coupling the second lens driving device (2000) to the second substrate (200) may comprise a step of aligning the second lens module and the second image sensor (20) to harden a second epoxy (not shown) while the second substrate (200) and the second lens driving device (2000) are preliminarily adhered by the second epoxy.

The step of coupling the second substrate (200) to the stiffener (40) may comprise a step of aligning the first image sensor (10) and the second image sensor (20) to harden a third epoxy (not shown) while the second substrate (200) and the stiffener (40) are preliminarily adhered by the third epoxy.

Here, the step of coupling the first lens driving device (1000) to the first substrate (100) and the step of coupling the second lens driving device (2000) to the second substrate (200) may allow any one step to be realized before the other step or may allow both steps to be realized at the same time.

Furthermore, although explanation is given that the first substrate (100) is first coupled to the stiffener (40), and the second substrate (200) is later coupled to the stiffener (40), the second substrate (200) may be first coupled to the stiffener (40) and the first substrate (100) is later coupled to the stiffener (40). Moreover, the stiffener (40) is not limited to a flat plate shaped steel, and may comprise a wall of main body for optical device.

As explained in the first exemplary embodiment, a total of three times of active alignments may be performed to allow an alignment between the first camera module and the second camera module to be completed. Because a connection unit flexibly connects the first substrate (100) and the second substrate (200) in these processes, a mutual alignment can be performed even through each of the first substrate (100) and the second substrate (200) is coupled to the first lens driving device (1000) and the second lens driving device (2000). On the other hand, the connection unit (400) limits the mutual movement of the first substrate (100) and the second substrate (200), a remaining substrate may be inhibited from being deviated from a normal position, while any one substrate of the first substrate (100) and the second substrate (200) is first fixed to the stiffener (40).

Hereinafter, configuration of dual camera module according to a modification will be described with reference to the accompanying drawings.

Figure 13:
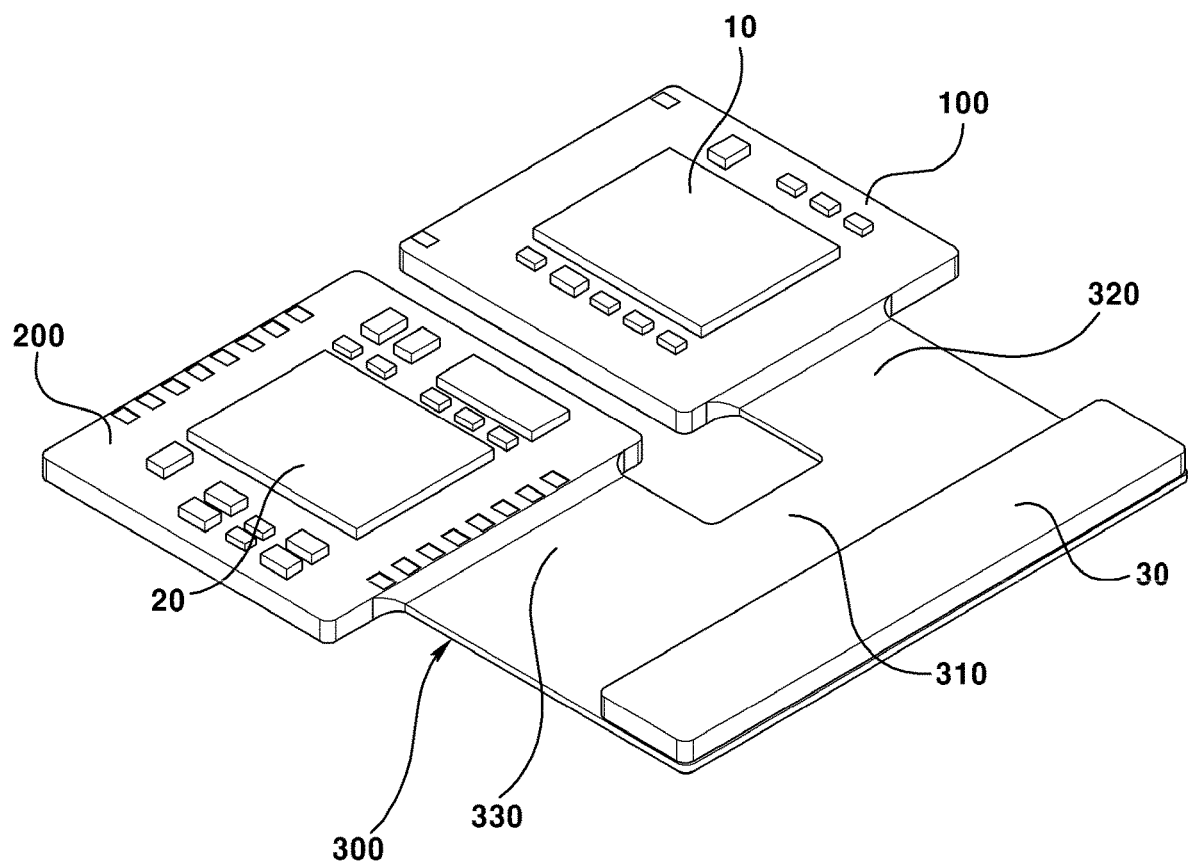
FIG. 13 is a perspective view illustrating a PCB of a dual camera module according to a modification and a related configuration thereof.

FIG. 13 is a perspective view illustrating a PCB of a dual camera module according to a modification and a related configuration thereof.

The dual camera module according to the modification may comprise a first image sensor (10), a first substrate (100), a second image sensor (20), a second substrate (200) and a third substrate (300). That is, the dual camera module according to the modification may take a configuration where the connection unit (400) is omitted compared with the dual camera module according to the exemplary embodiment. Meantime, any configuration corresponding to the present exemplary embodiment in the configuration of the modification may be inferably applied from the explanation of the present exemplary embodiment.

The modification also has an advantageous effect of alignment after mounting the first and second image sensors (10, 20) as in the present exemplary embodiment. However, in comparison with the exemplary embodiment, because the first substrate (100) and the second substrate (200) are connected only by the third substrate, there is a disadvantage in that it is difficult to maintain the parallel alignment of the first substrate (100) and the second substrate (200) in the steps of transferring the first and second substrates (100, 200) and of coupling the first and second substrates (100, 200) to the stiffener (40).

Hereinafter, configuration of dual camera module according to another modification with reference to accompanying drawing will be described.

Figure 14:
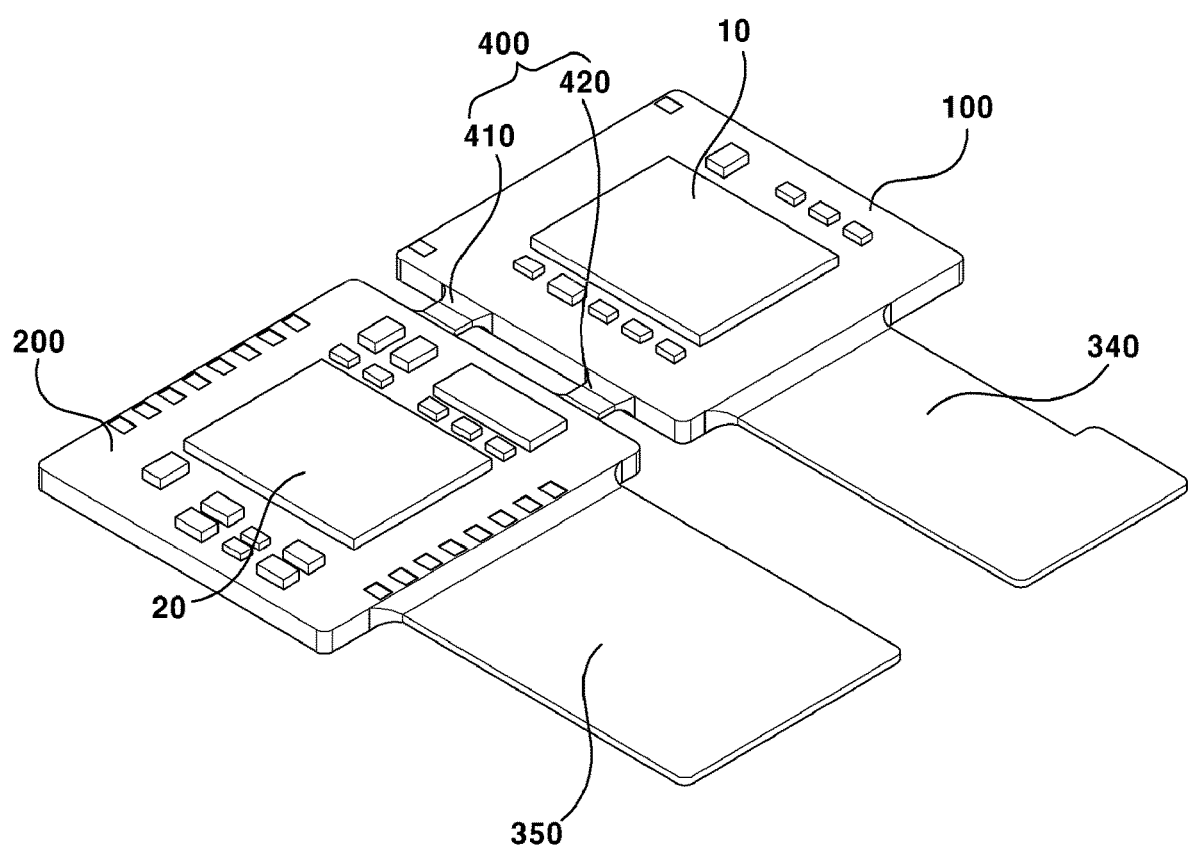
FIG. 14 is a perspective view illustrating a PCB of a dual camera module according to another modification and a related configuration thereof.

FIG. 14 is a perspective view illustrating a PCB of a dual camera module according to another modification and a related configuration thereof.

The dual camera module according to another modification may comprise a first image sensor (10), a first substrate (100), a second image sensor (20), a second substrate (200), a third substrate (300) and a connection unit (400). However, the dual camera module according to another modification may be different from the dual camera module according to the present exemplary embodiment in that there is a difference in the shape of third substrate (300). Meantime, any configuration corresponding to the present exemplary embodiment in the configuration of another modification may be inferably applied from the explanation of the present exemplary embodiment.

The third substrate (300) may comprise a first connection part (340) and a second connection part (350). That is, the third substrate (300) according to another modification may take a shape where the body part (310) is omitted compared with the third substrate (300) in the present exemplary embodiment. Moreover, the connector (30) may be omitted. The first connection part (340) of third substrate (300) according to another modification may correspond to the first connection part (320) according to the present exemplary embodiment, and the second connection part (350) of third substrate (300) according to another modification may correspond to the second connection part (330) of the third substrate (300) according to the present exemplary embodiment.

The first connection part (340) may be electrically connected to an outside element using a connector connecting part bonding using an ACF. The first connection part (340) may be connected to the first substrate (100). The first connection part (340) may be spaced apart from the second connection part (330). A space may be disposed between the first connection part (340) and the second connection part (350). The first connection part (340) may be connected to a third side surface (102) of first substrate (100). The first connection part (340) may be connected to a third side surface (102) by being leaned to a corner of a side near to the second substrate (200) in both corners of the third side surface (102).

The first connection part (350) may be electrically connected to an outside element via a connector connection part bonding using an ACF. The second connection part (350) may be connected to the second substrate (200). The second connection part (350) may be spaced apart from the first connection part (340). The second connection part (350) may be connected to a fourth side surface (202) of second substrate (200). The second connection part (350) may be connected to a fourth side surface (202) by being leaned to a corner of a side near to the first substrate (100) in both corners of the fourth side surface (202).

Second Exemplary Embodiment

Hereinafter used "OIS feedback function" is defined as a function to feedback-control the OIS function in real time. Meantime, the "OIS feedback" may be interchangeably used with an "OIS Feedback". Hereinafter used "first AF feedback sensor (3710)" may be called a "first Hall sensor", and a "second AF feedback sensor (4710)" may be called a "second Hall sensor".

Hereinafter, an optical device according to a second exemplary embodiment may be inferably applied with the optical device according to the first exemplary embodiment.

Hereinafter, configuration of dual camera module according to a second exemplary embodiment will be described with accompanying drawings.

Figure 15:
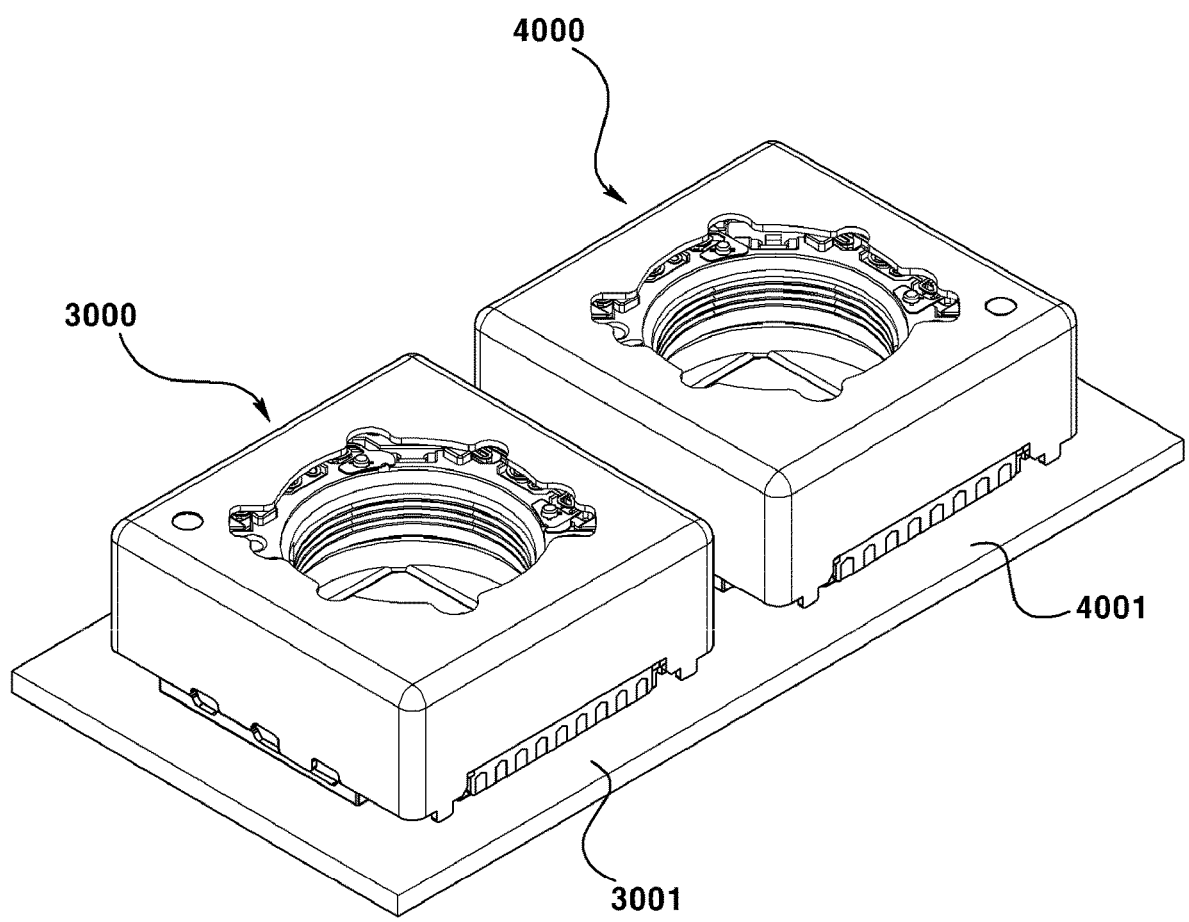
FIG. 15 is a perspective view illustrating a dual camera module according to a second exemplary embodiment.

FIG. 15 is a perspective view illustrating a dual camera module according to a second exemplary embodiment.

The dual camera module according to the second exemplary embodiment may comprise a first camera module and a second camera module. The dual camera module according to the second exemplary embodiment may comprise a dual lens driving device. The dual lens driving device may comprise a first lens driving device (3000) and a second lens driving device (4000).

The first camera module may be an OIS camera module having an AF feedback function. The first camera module may be a camera module having an AF function, an AF feedback function, an OIS function and an OIS feedback function altogether.

The first camera module may comprise a first lens driving device (3000), a first lens module (not shown), a first infrared filter (not shown), a first PCB (3001), a first image sensor (not shown) and a first controller (not shown). However, any one or more of the first lens driving device (3000), the first lens module, the first infrared filter, the first PCB (3001), the first image sensor and the first controller may be omitted or changed from the first camera module.

The first lens module may comprise a lens and a lens barrel. The first lens module may comprise one or more lenses and a lens barrel accommodating one or more lenses. However, one element of first lens module is not limited to the lens barrel, and any holder structure capable of supporting one or more lenses may suffice for a lens barrel. The first lens module may move along with the first lens driving device (3000) by being coupled to the first lens driving device (3000). The first lens module may be coupled to an inside of the first lens driving device (3000). The first lens module may be screw-connected to the first lens driving device (3000). The first lens module may be coupled to the first lens driving device (3000) by an adhesive (not shown). Meantime, a light having passed the first lens module may be irradiated on a first image sensor.

The first infrared filter may inhibit a light of infrared region from being incident on a first image sensor. The first infrared filter may be interposed between the first lens module and the first image sensor. The first infrared filter may be disposed at a holder member (not shown) separately disposed from a first base (3430). However, the first infrared filter may be mounted on a through hole (3431) formed at a center of the first base (3430). The first infrared filter may be formed with a film material or glass material. The first infrared filter may be formed by coating an infrared cut-off coating material on a flat optical filter such as protective cover glass and cover glass. The first infrared filter may be an infrared cut-off filter or an infrared absorption filter.

The first PCB (3001) may support the first lens driving device (3000). The first PCB (3001) may be mounted with a first image sensor. For example, an upper inner side of the first PCB (3001) may be disposed with the first image sensor and an upper outside of the first PCB (3001) may be disposed with a holder member. Alternatively, an upper inner side of the first PCB (3001) may be disposed with the first image sensor and an upper outside of the first PCB (3001) may be disposed with the first lens driving device (3000). Through this structure, a light having passed the first lens module accommodated into the first lens driving device (3000) may be irradiated on the first image sensor mounted on the first PCB (3001). The first PCB (3001) may supply a power to the first lens driving device (3000). Meantime, the first PCB (3001) may be disposed with a first controller in order to control the first lens driving device (3000). The PCB (3001) may be integrally formed with a second PCB (4001). The first PCB (3001) and/or second PCB (4001) may be integrally formed. The first PCB (3001) and/or second PCB (4001) may be respectively a substrate of an optical device. Each of the first PCB (3001) and/or second PCB (4001) may comprise a terminal for being electrically connected to an outside.

The first image sensor may be mounted on the first PCB (3001). The first image sensor may be matched in optical axis with the first lens module. Through this structure, the first image sensor may obtain a light having passed the first lens module. The first image sensor may output the irradiated light as an image. The first image sensor may be a CCD (charge coupled device), a MOS (metal oxide semi-conductor), a CPD and a CID. However, the types of first image sensor are not limited thereto.

The first controller may be mounted on the first PCB (3001). The first controller may be disposed at an outside of the first lens driving device (3000). However, the first controller may be also disposed at an inside of the first lens driving device (3000). The first controller may control the direction, intensity and amplitude of a current supplied to each element forming the first lens driving device (3000). The first controller may perform an AF function of first camera module by controlling the first lens driving device (3000). That is, the first controller may move the first lens module to an optical axis direction by controlling the first lens driving device (3000). Furthermore, the first controller may perform the feedback control of the AF function. To be more specific, the first controller may provide a more accurate AF function by controlling a power or a current applied to a first coil (3220) through reception of position of first bobbin (3210) detected by a first AF feedback sensor (3710).

Moreover, the first controller may perform an GIS function of the first camera module by controlling the first lens driving device (3000). That is, the first controller may move or tilt the first lens module to a direction perpendicular to an optical axis by controlling the first lens driving device (3000). Moreover, the first controller may perform a feedback control of OIS function. To be more specific, the first controller may provide a more accurate OIS function by controlling a power or a current applied to a second coil (3422) through reception of position of first housing (3310) detected by a first OIS feedback sensor (3800).

Hereinafter, configuration of first lens driving device will be described with reference to the accompanying drawings.

Figure 16:
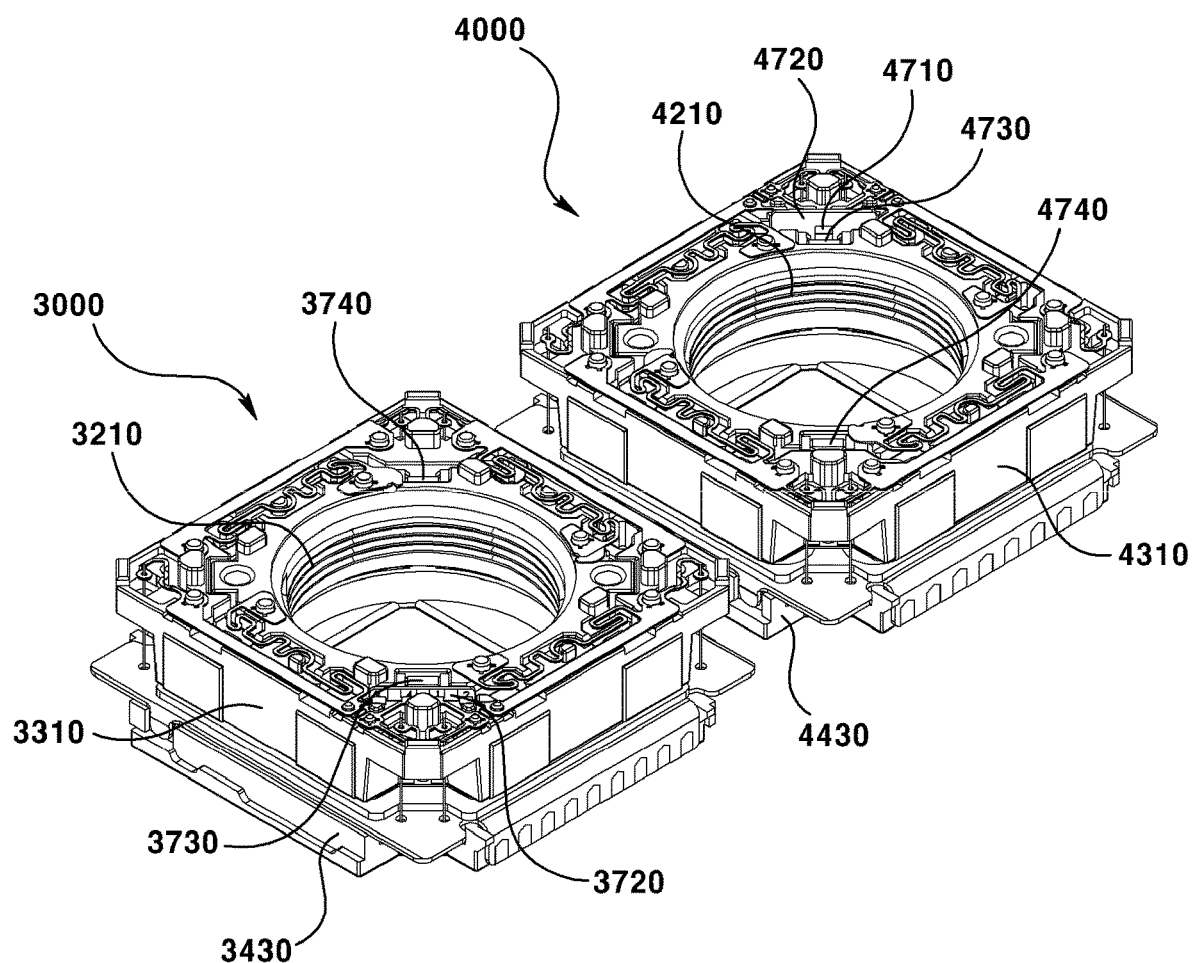
FIG. 16 is a perspective view of a dual camera module omitted of some elements according to a second exemplary embodiment.
Figure 17:
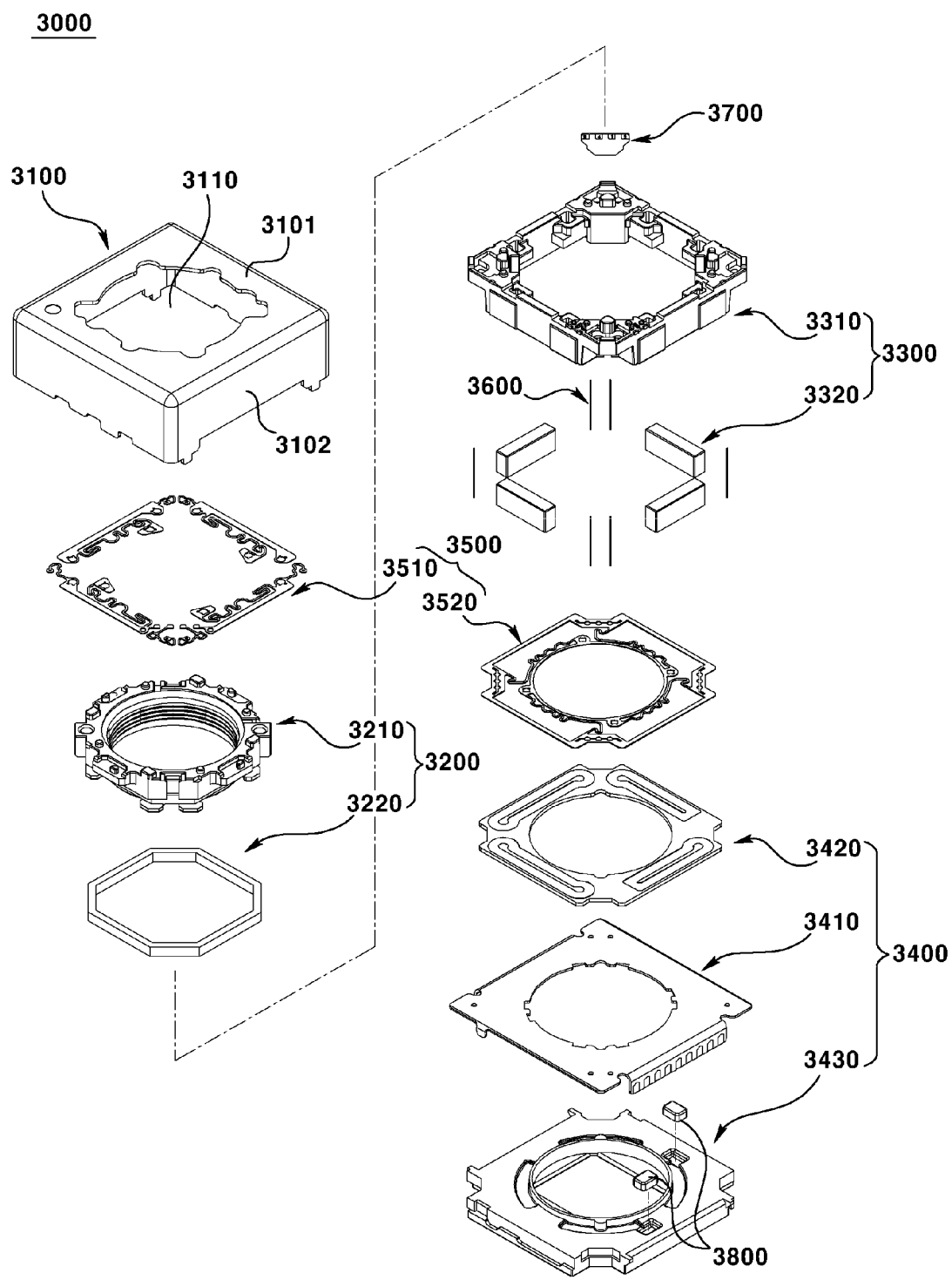
FIG. 17 is an exploded perspective view illustrating a first lens driving device according to a second exemplary embodiment.
Figure 18:
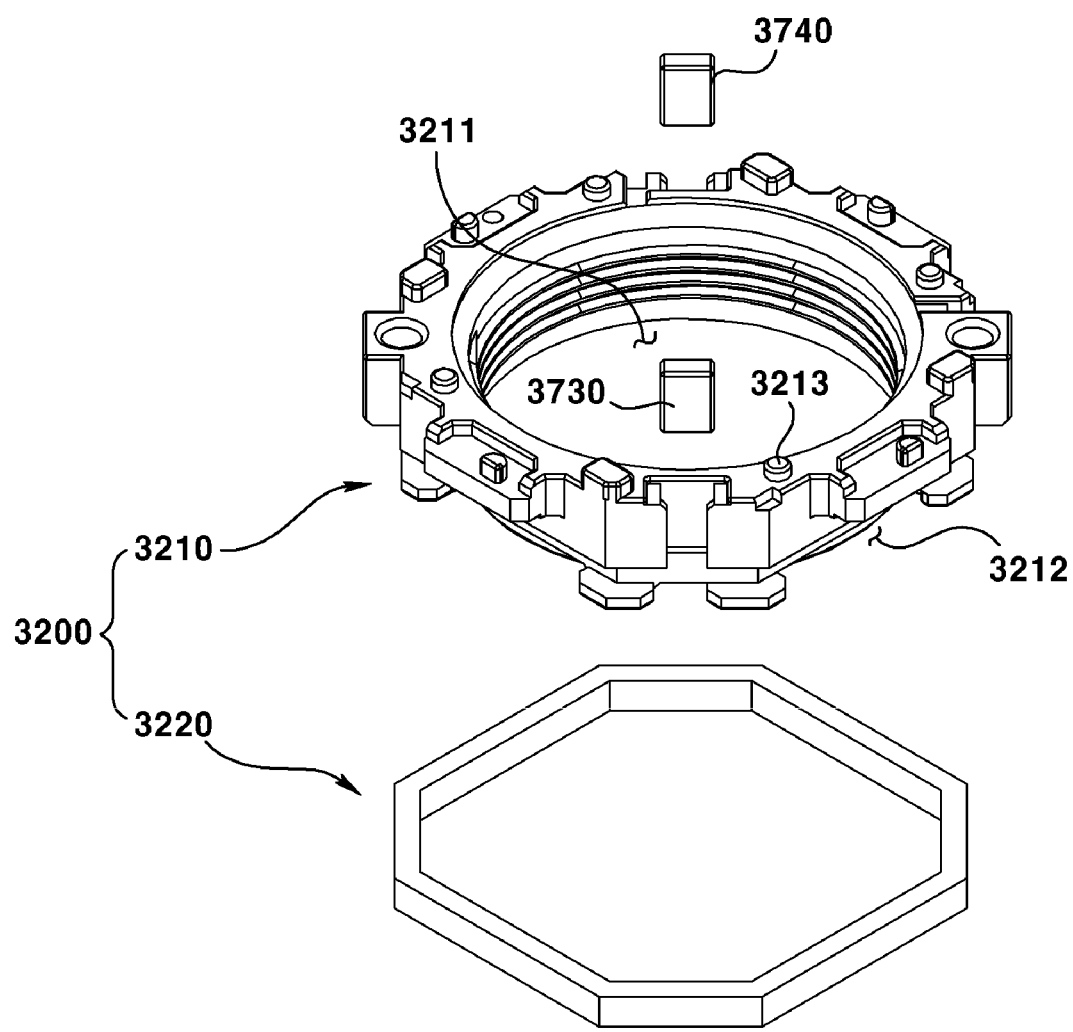
FIG. 18 is an exploded perspective view illustrating a first AF mover and related configuration according to a second exemplary embodiment.
Figure 19:
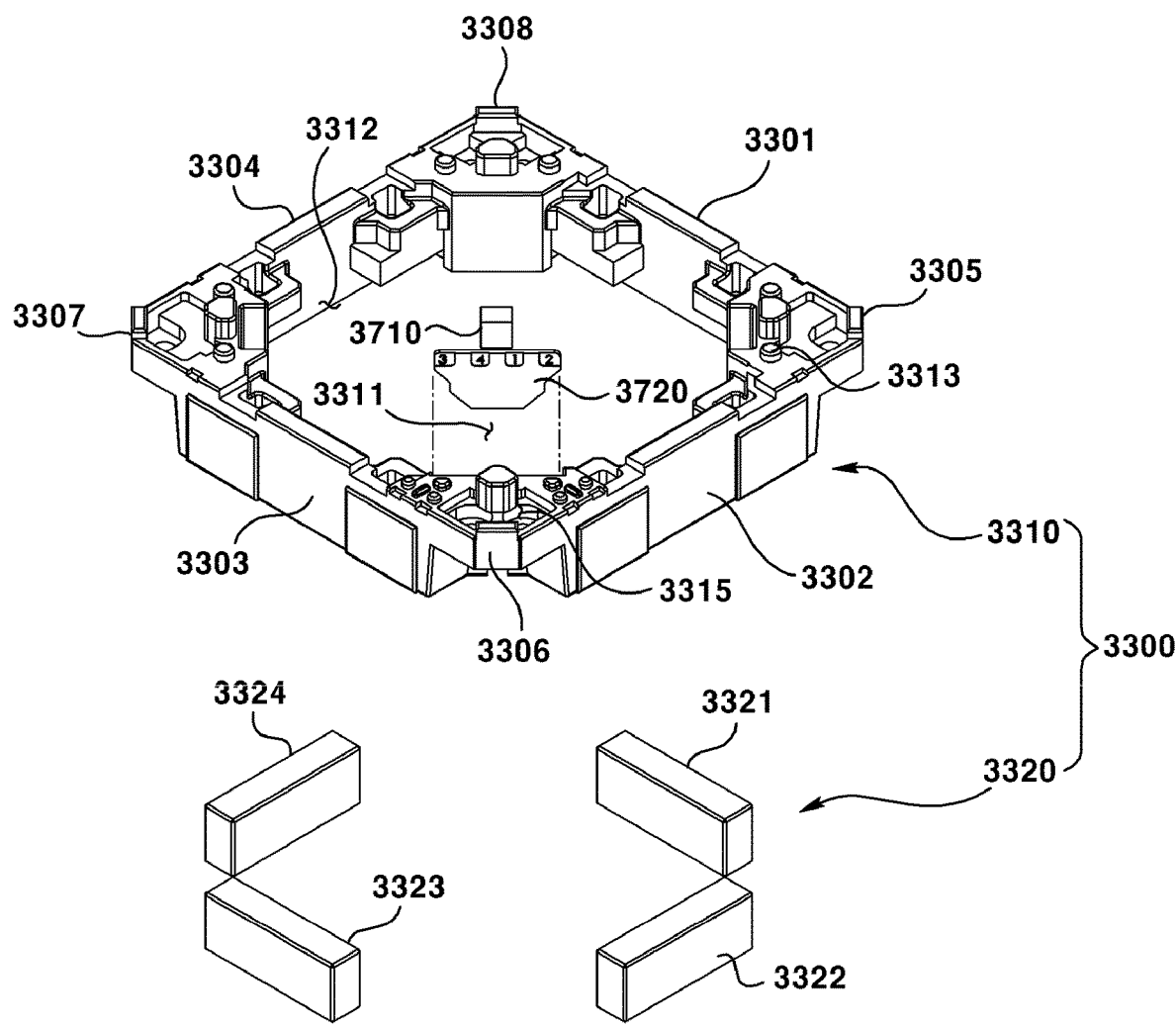
FIG. 19 is an exploded perspective view of a first OIS mover and related configuration thereof according to a second exemplary embodiment.
Figure 20:
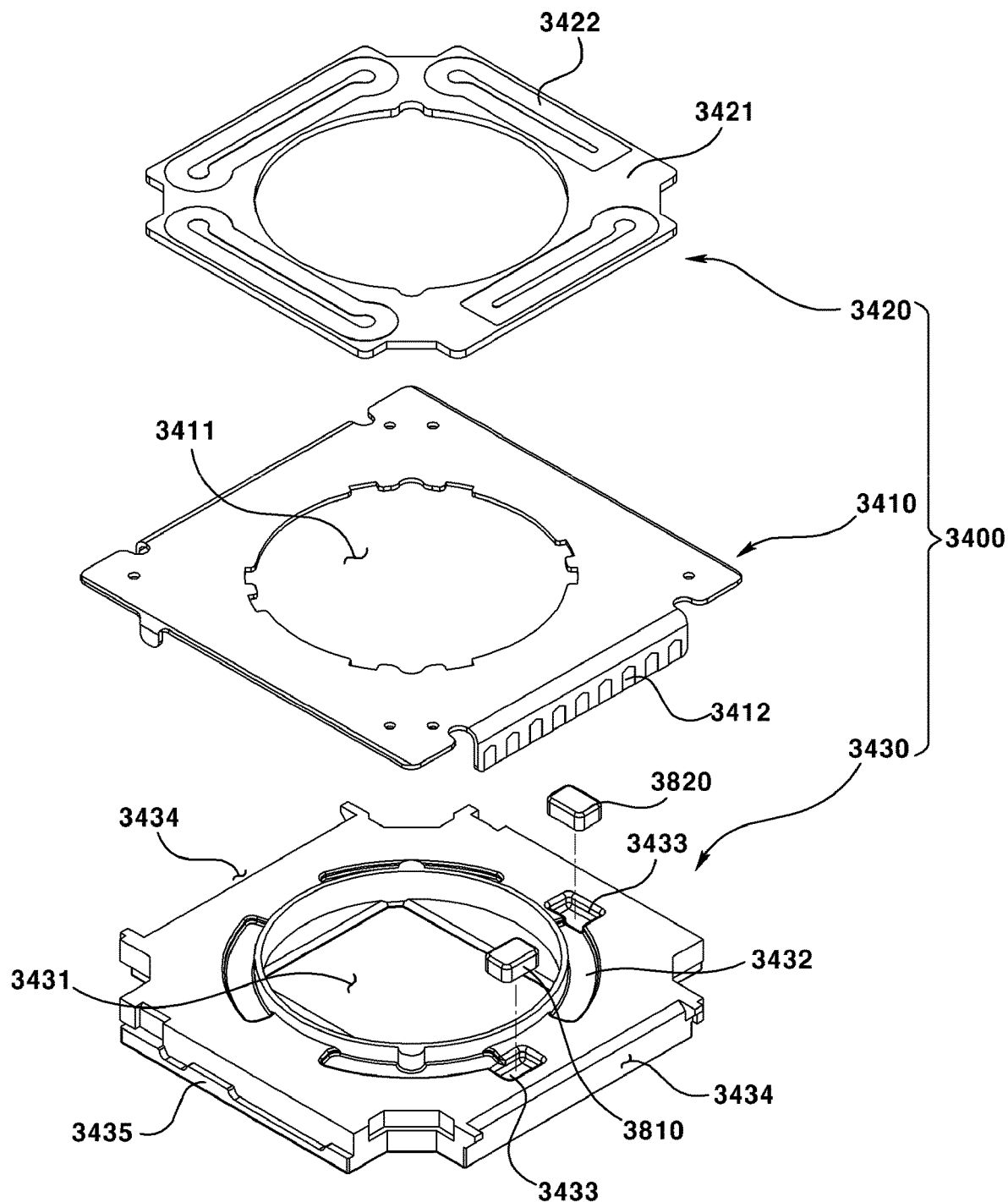
FIG. 20 is an exploded perspective view of a first stator and related configuration thereof according to a second exemplary embodiment.
Figure 21:
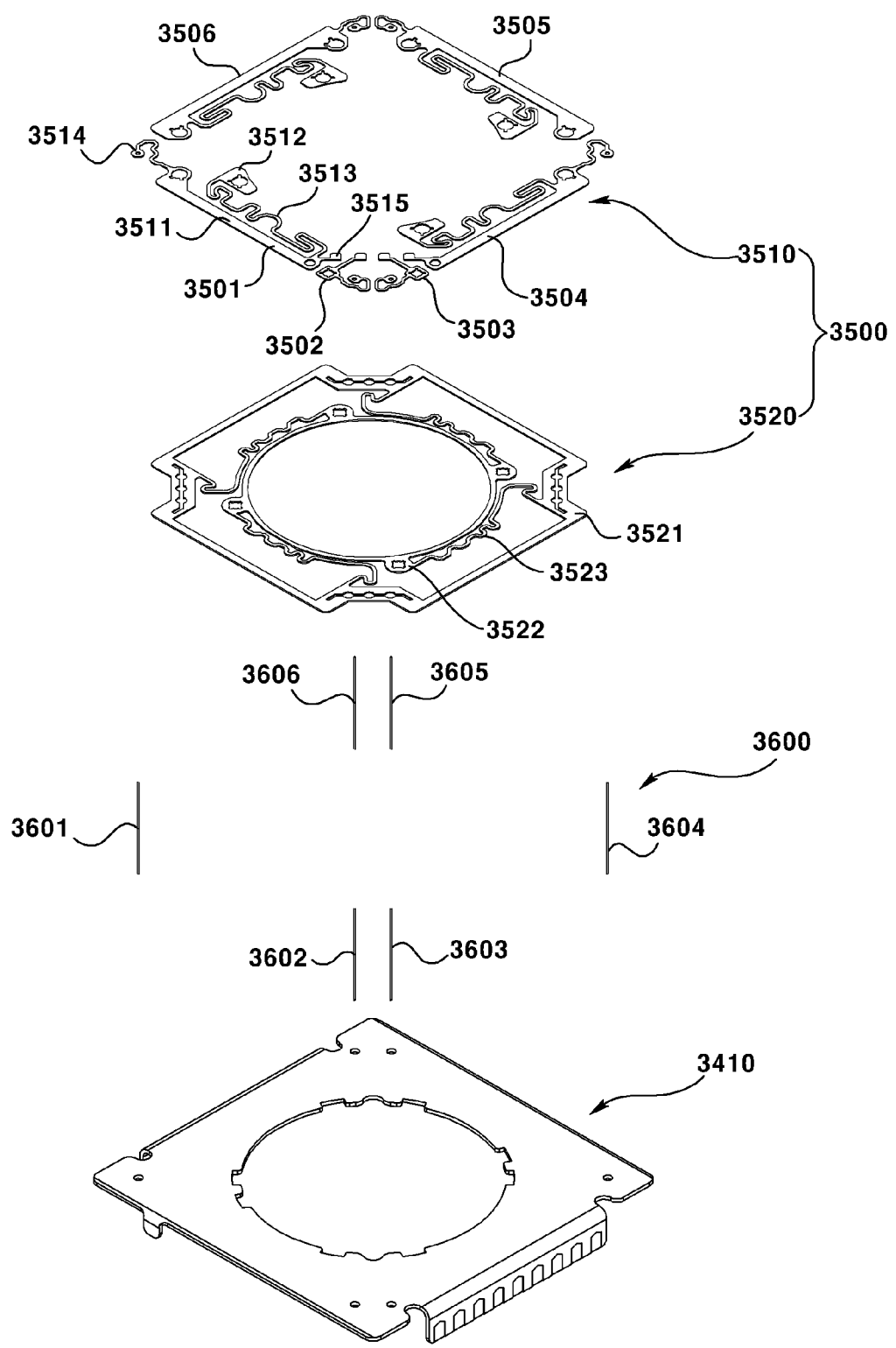
FIG. 21 is an exploded perspective view illustrating a first elastic member, a first support member and related configuration thereof according to a second exemplary embodiment.
Figure 22:
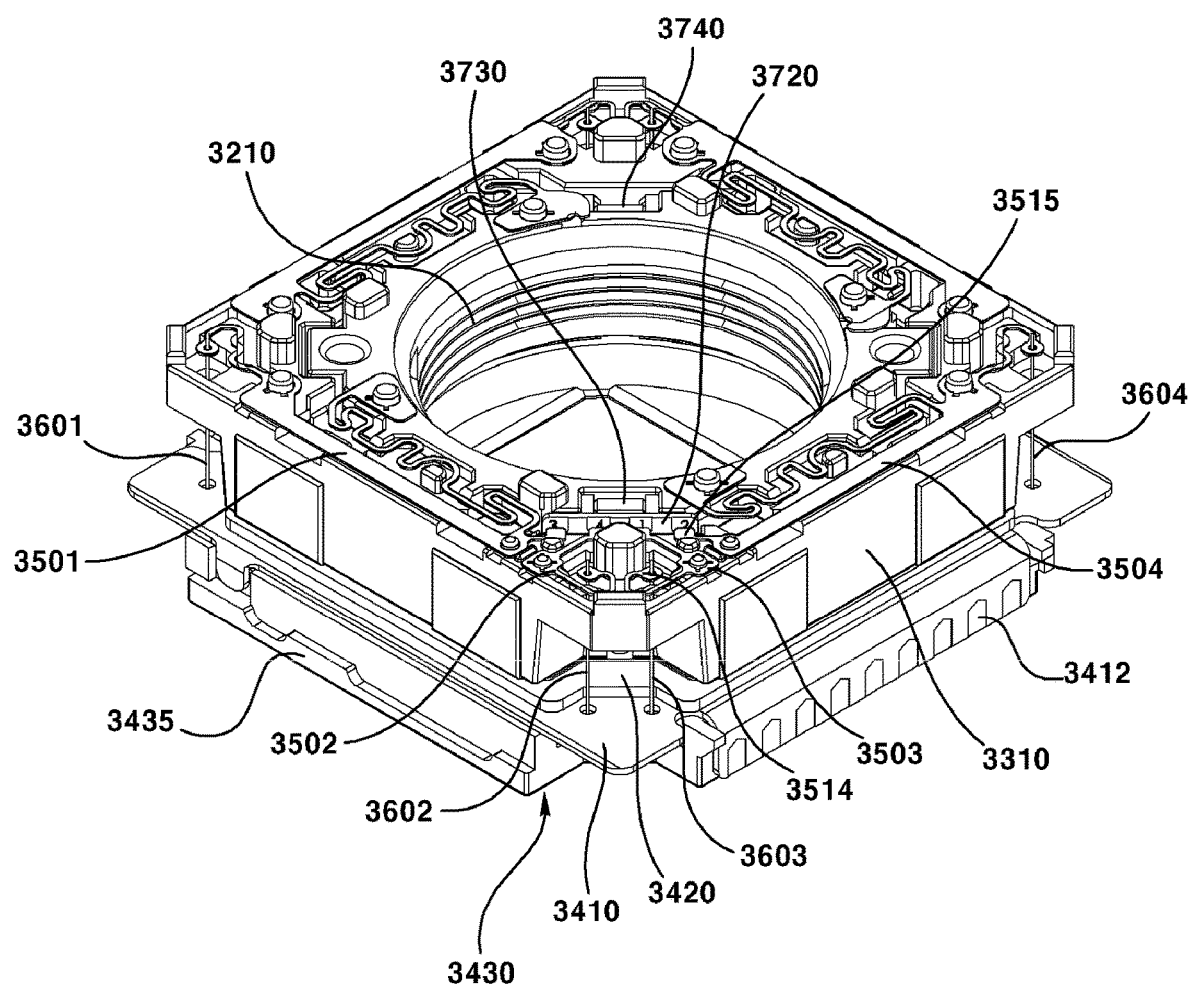
FIG. 22 is a perspective view illustrating a first lens driving device omitted of some elements according to a second exemplary embodiment.

FIG. 16 is a perspective view of a dual camera module omitted of some elements according to a second exemplary embodiment, FIG. 17 is an exploded perspective view illustrating a first lens driving device according to a second exemplary embodiment, FIG. 18 is an exploded perspective view illustrating a first AF mover and related configuration according to a second exemplary embodiment, FIG. 19 is an exploded perspective view of a first OIS mover and related configuration thereof according to a second exemplary embodiment, FIG. 20 is an exploded perspective view of a first stator and related configuration thereof according to a second exemplary embodiment, FIG. 21 is an exploded perspective view illustrating a first elastic member, a first support member and related configuration thereof according to a second exemplary embodiment, and FIG. 22 is a perspective view illustrating a first lens driving device omitted of some elements according to a second exemplary embodiment.

The first lens driving device (3000) may be spaced apart from the second lens driving device (4000). The first lens driving device (3000) may be disposed to be parallel with the second lens driving device (4000). The first lens driving device (3000) may be disposed to be side by side with the second lens driving device (4000). A surface of the first lens driving device (3000) facing the second lens driving device (4000) may be disposed to be mutually parallel with a surface of the second lens driving device (4000). A first side surface (3301) of the first lens driving device (3000) may be parallel with a fifth side surface (4301) of the second lens driving device (4000). The first side surface (3301) of the first lens driving device (3000) may be overlapped with fifth side surface (4301) of the second lens driving device (4000) to a direction perpendicular to a first optical axis. A first cover member (3100) of the first lens driving device (3000) may be spaced apart from a second cover member (4100) of the second lens driving device (4000) by 1 mm~5 mm. That is, a discrete distance (See L of FIG. 29) between the first cover member (3100) and the second cover member (4100) may be 1 mm~5 mm. Alternatively, a discrete distance (L) between the first cover member (3100) and the second cover member (4100) may be 1 mm~3 mm. Alternatively, a discrete distance (L) between the first cover member (3100) and the second cover member (4100) may be 1 mm.

The first lens driving device (3000) may comprise a first cover member (3100), a first AF mover (3200), a first OIS mover (3300), a first stator (3400), a first elastic member (31500), a first support member (3600), a first AF feedback sensor unit (3700) and a first OIS feedback sensor (3800). However, any one or more of the first cover member (3100), the first AF mover (3200), the first OIS mover (3300), the first stator (3400), the first elastic member (31500), the first support member (3600), the first AF feedback sensor unit (3700) and the first OIS feedback sensor (3800) may be omitted or changed from the first lens driving device (3000). In a modification, the first AF feedback sensor (3700) may be omitted.

The first cover member (3100) may be accommodated into an inside of the first housing (3310). The first cover member (3100) may form an external shape of the first lens driving device (3000). The first cover member (3100) may take a bottom-opened cubic shape. However, the present invention is not limited thereto. The first cover member (3100) may be of a non-magnetic substance. The first cover member (3100) may be formed with a metal material. To be more specific, the first cover member (3100) may be formed with a metal plate. In this case, the first cover member (3100) may shield an EMI (Electro Magnetic Interference). Because of this characteristic of the first cover member (3100), the first cover member (3100) may be called an "EMI shield can". The first cover member (3100) can shield radio waves generated from outside of the first lens driving device (3000) from being introduced into the first cover member (3100). Furthermore, the first cover member (3100) may shield radio waves generated from inside of the first cover member (3100) from being discharged to outside of the first cover member (3100). However, the material of first cover member (3100) is not limited thereto.

The first cover member (3100) may comprise an upper plate (3101) and a side plate (3102). The first cover member (3100) may comprise an upper plate (3101) and a side plate (3102) extended downwardly from an outside of the upper plate (3101). A lower end of the side plate (3102) of first cover member (3100) may be mounted on a first base (3430). The lower end of the side plate (3102) of first cover member (3100) may be coupled to a step (staircase, 3435) of the first base (3430). The first cover member (3100) may be mounted on the first base (3430) by being tightly coupled at an inner surface, in part or in whole, to a side surface of the first base (3430). An inner space formed by the first cover member (3100) and the first base (3430) may be disposed with a first AF mover (3200) and a first OIS mover (3300). Through this structure, the first cover member (3100) can protect inner elements from an outside shock and simultaneously inhibit an outside foreign object from being inwardly introduced. However, the present invention is not limited thereto, and a lower end of the side plate (3102) of the first cover member (3100) may be directly coupled to a first substrate (3001) disposed at a lower side of the first base (3430). Some portions of a plurality of side plates (3102) may face a second cover member (3100).

The first cover member (3100) may comprise an opening (3110). The opening (3110) may be formed on the upper plate (3101). The opening (3110) may expose the first lens module. The opening (3110) may be formed to correspond in shape to the first lens module. The size of opening (3110) may be formed to be greater than a diameter of first lens module to allow the first lens module to be assembled through the opening (3110). Meantime, a light having passed through the opening (3110) may pass the first lens module. At this time, the light having passed through the first lens module may be obtained as an image by the first image sensor.

The first AF mover (3200) may be coupled to the first lens module. The first AF mover (3200) may accommodate the first lens module at an inside thereof. An inner periphery surface of the first AF mover (3200) may be coupled by an outer periphery surface of the first lens module. The first AF mover (3200) may integrally move with the first lens module through an interaction with the first OIS mover (3300). The first AF mover (3200) may move integrally with the first lens module through an interaction with the first stator (3400).

The first AF mover (3200) may be coupled with the first lens module (where, the first lens module may be explained as an element of the lens driving device) which is an element of first camera module. The first AF mover (3200) may accommodate the first lens module thereinside. An inner periphery surface of the first AF mover (3200) may be coupled by an outer periphery surface of the first lens module. The first AF mover (3200) may move through an interaction with the first OIS mover (3300) and/or the first stator (3400). At this time, the first AF mover (3200) may integrally move with the first lens module. Meantime, the first AF mover (3200) may move for AF function. However, the given said description does not limit to a member that moves the first AF mover (3200) only for the AF function. The first AF mover (3200) may also move for OIS function.

The first AF mover (3200) may comprise a first bobbin (3210) and a first coil (3220). However, any one or more of the first bobbin (3210) and the first coil (3220) may be omitted or changed from the first AF mover (3200).

The first bobbin (3210) may be disposed at an inside of the first housing (3310). The first bobbin (3210) may be disposed at a through hole (3311) of the first housing (3310). The first bobbin (3210) may move to an optical axis direction about the first housing (3310). The first bobbin (3210) may be so disposed at the through hole (3311) of the first housing (3310) as to allow moving along an optical axis. The first bobbin (3210) may be coupled with the first lens module. An inner periphery surface of the first bobbin (3210) may be coupled by an outer periphery surface of the first lens module. The first bobbin (3210) may be coupled by a first coil (3220). An outer periphery surface of the first bobbin (3210) may be coupled by the first coil (3220). A top surface of the first bobbin (3210) may be coupled with the first upper elastic member (3510). A lower surface of first bobbin (3210) may be coupled with the first lower elastic member (3520).

The first bobbin (3210) may comprise a through hole (3211), a driving part coupling part (3212), an upper coupling part (3213) and a lower coupling part (not shown). However, any one or more of the through hole (3211), the driving part coupling part (3212), the upper coupling part (3213) and the lower coupling may be omitted or changed from the first bobbin (3210).

The through hole (3211) may be formed at an inside of the first bobbin (3210). The through hole (3211) may be formed with an upper/bottom opened shape. The through hole (3211) may be coupled by the first lens module. An inner periphery surface of the through hole (3211) may be formed with a screw thread with a shape corresponding to that formed on an outer periphery surface of the first lens module. That is, the through hole (3211) may be screw-connected by the first lens module. An adhesive may be interposed between the first lens module and the first bobbin (3210). At this time, the adhesive may be an epoxy hardened by UV (ultraviolet), heat or laser beam. That is, the second lens module and the second bobbin (2210) may be adhered by UV-hardened epoxy and/or thermally hardened epoxy.

The driving part coupling part (3212) may be coupled by the first coil (3220). The driving part coupling part (3212) may be formed at an outer periphery surface of the first bobbin (3210). The driving part coupling part (3212) may be formed with a groove by allowing a portion of an outer periphery surface of first bobbin (3210) to be inwardly recessed. At this time, the driving part coupling part (3212) may be accommodated by at least a portion of the first coil (3220). The driving part coupling part (3212) may be integrally formed with an outer periphery surface of first bobbin (3210). For example, the driving part coupling part (3212) may be continuously formed along an outer periphery surface of first bobbin (3210). At this time, the driving part coupling part (3212) may be wound with the first coil (3220). In another example, the driving part coupling part (3212) may be formed in a plural number and formed to be mutually spaced apart. At this time, the first coil (3220) may be also formed in a plural number to be respectively coupled to the driving part coupling part (3212). In still another example, the driving part coupling part (3212) may be formed in an upper/bottom opened shape. At this time, the first coil (3220) may be coupled by being inserted into the driving part coupling part (3212) in a pre-wound state through an opened portion.

The upper coupling part (3213) may be coupled to the first upper elastic member (3510). The upper coupling part (3213) may be coupled with an internal part (3512) of the first upper elastic member (3510). The upper coupling part (3213) may be formed by being upwardly protruded from a top surface of first bobbin (3210). For example, a protrusion of the upper coupling part (3213) may be coupled by being inserted into a groove or a hole of the internal part (3512) of the first upper elastic member (3510). At this time, the protrusion of the upper coupling part (3213) may be fused in a state of being inserted into a hole of the internal part (3512) to allow the first upper elastic member (3510) to be fixed between the fused protrusion and the top surface of first bobbin (3210).

The lower coupling part may be coupled with the first lower elastic member (3520). The lower coupling part may be coupled with an internal part (3522) of the first lower elastic member (3520). The lower coupling part may be formed by being downwardly protruded from a lower surface of first bobbin (3210). For example, a protrusion of the lower coupling part may be coupled by being inserted into a groove or a hole of an inside of the first lower elastic member (3520). At this time, the protrude of the lower coupling part may be fused in a state of being inserted into a hole of the internal part (3522) to allow the first lower elastic member (3510) to be fixed between the fused protrusion and the lower surface of first bobbin (3210).

The first coil (3220) may be disposed at the first bobbin (3210). The first coil (3220) may be disposed at an outer periphery surface of first bobbin (3210). The first coil (3220) may be directly wound on the first bobbin (3210). The first coil (3220) may face the first magnet (3320). In this case, when a current is supplied to the first coil (3220) to form a magnetic field about the first coil (3220), the first coil (3220) may move relative to the first magnet (3320) through an electromagnetic interaction between the first coil (3220) and the first magnet (3320). The first coil (3220) may electromagnetically interact with the first magnet (3320). The first coil (3220) may move the first bobbin (3210) relative to the first housing (3310) to an optical axis direction through an electromagnetic interaction with the first magnet (3320). At this time, the first coil (3220) may be called an "AF coil". For example, the first coil (3220) may be an integrally-formed one coil. In another example, the first coil (3220) may comprise a plurality of coils, each mutually space apart. The first coil (3220) may comprise mutually-spaced apart four coils. At this time, the four coils may be disposed at an outer periphery surface of the first bobbin (3210) to allow two adjacently-formed coils to form a 90° therebetween.

The first coil (3220) may comprise a pair of lead cables for power supply. At this time, the pair of lead cables on the first coils (3220) may be electrically connected to fifth and sixth elastic units (3505, 3506) which are divisible elements of first upper elastic member (3510). That is, the first coil (3220) may receive a power through the first upper elastic member (3510). To be more specific, the first coil (3220) may receive a power sequentially through the first PCB (3001), the first substrate (3410), the first support member (3600) and the first upper elastic member (3510). Alternatively, the first coil (3220) may receive a power through the first lower elastic member (3520).

The first OIS mover (3300) may accommodate, at an inside, at least a portion of the first AF mover (3200). The first OIS mover (3300) may move the first AF mover (3200) or move along with the first AF mover (3200). The first OIS mover (3300) may move through an interaction with the first stator (3400). The first OIS mover (3300) may be moved for OIS function. The first OIS mover (3300) may integrally move with the first AF mover (3200) for OIS function.

The first OIS mover (3300) may comprise a first housing (3310) and a first magnet (3320). However, any one or more of the first housing (3310) and the first magnet (3320) may be omitted or changed from the first OIS mover (3300).

The first housing (3310) may be disposed at an outside of first bobbin (3210). The first housing (3310) may accommodate, at an inside, at least a portion of the first bobbin (3210). For example, the first housing (3310) may take a cubic shape. The first housing (3310) may comprise four side surfaces, and four corner portions disposed among the four side surfaces. The first housing (3310) may be disposed with a first magnet (3320). For example, the each of the four side surfaces of first housing (3310) may be respectively disposed with a first magnet (3320). For another example, each of the four corner portions of first housing (3310) may be disposed with a first magnet (3320). At least a portion of an outer periphery surface of first housing (3310) may be formed in a shape corresponding to that of an inner periphery surface of first cover member (3100). Particularly, an outer periphery surface of first housing (3310) may be formed in a shape corresponding to that of an inner periphery surface of a side plate (3102) of first cover member (3100). The first housing (3310) may be formed with an insulation material. The first housing (3310) may be formed with a material different from that of the first cover member (3100). The first housing (3310) may be formed in an injection in consideration of productivity. An outer side surface of the first housing (3310) may be spaced apart from an inner side surface of the side plate (3102) of first cover member (3100). The first housing (3310) may move for OIS driving in a space between the first housing (3310) and the first cover member (3100). A top surface of first housing (3310) may be coupled by the first upper elastic member (3510). A lower surface of first housing (3310) may be coupled by the first lower elastic member (3520).

The first housing (3310) may comprise first to fourth side surfaces (3301, 3302, 3303, 3304). The first housing (3310) may comprise continuously disposed first to fourth side surfaces (3301, 3302, 3303, 3304). The first housing (3310) may comprise first side surface (3301) disposed with a first side surface magnet (3321), a second side surface (3302) disposed with a second side surface magnet (3322), a third side surface (3303) disposed with a third side surface magnet (3323) and a fourth side surface (3304) disposed with a fourth side surface magnet (3324). The first side surface (3301) of first housing (3310) at the first lens driving device (3000) may face a fifth side surface (4301) of second housing (4310) at the second lens driving device (4000). The first housing (3310) may comprise a first side surface (3301), a third side surface (3303) disposed opposite to the first side surface (3301), and second and fourth side surfaces (3302, 3304) disposed mutually opposite between the first and third side surfaces (3301, 3303).

The first housing (3310) may comprise first to fourth corner portions (3305, 3306, 3307, 3308). The first housing (3310) may comprise first to fourth corner portions (3305, 3306, 3307, 3308) disposed among the first to fourth side surfaces (3301, 3302, 3303, 3304). The first corner portion (3305) may be disposed between the first side surface (3301) and the second side surfaces (3302). The second corner portion (3306) may be disposed between the second side surface (3302) and the third side surface (3303). The third corner portion (3307) may be disposed between the third side surface (3303) and the fourth side surface (3304). The fourth corner portion (3308) may be disposed between the fourth side surface (1304) and the first side surface (3301).

The first housing (3310) may comprise a through hole (3311), a driving part coupling part (3312), an upper coupling part (3313), a lower coupling part (not shown) and a sensor coupling part (3315). However, any one or more of the through hole (3311), the driving part coupling part (3312), the upper coupling part (3313), the lower coupling part and the sensor coupling part (3315) may be omitted or changed from the first housing (3310).

The through hole (3311) may be formed at the first housing (3310). The through hole (3311) may be formed at an inside of the first housing (3310). The through hole (3311) may be so formed as to vertically penetrate the first housing (3310). The through hole (3311) may be disposed with a first bobbin (3210). The through hole (3311) may be movably disposed with the first bobbin (3210). At least a portion of the through hole (3311) may be formed in a shape corresponding to that of the first bobbin (3210). An inner periphery surface of first housing (3310) forming the through hole (3311) may be spaced apart from an outer periphery surface of the first bobbin (3210). However, the inner periphery surface of first housing (3310) forming the through hole (3311) may be formed at an inner periphery surface of first housing (3310) with a stopper that mechanically restricts movement of the first bobbin (3210) to an optical axis direction by being inwardly protruded.

The driving part coupling part (3312) may be coupled by the first magnet (3320). The driving part coupling part (3312) may be formed at the first housing (3310). The driving part coupling part (3312) may be formed at an inner periphery surface of first housing (3310). In this case, it is advantageous for the first magnet (3320) disposed on the driving part coupling part (3312) to electromagnetically interact with the first coil (3220) disposed at an inside of the first magnet (3320). The driving part coupling part (3312) may take a bottom-opened shape. In this case, it is advantageous for the first magnet (3320) disposed on the driving part coupling part (3312) to electromagnetically interact with the second coil (3422) disposed at a lower side of the first magnet (3320). The driving part coupling part (3312) may be formed as a groove formed by allowing an inner periphery surface of the first housing (3310) to be outwardly recessed. At this time, the driving part coupling part (3312) may be disposed in a plural number. Meantime, each of the plurality of driving part coupling parts (3312) may be accommodated by the first magnet (3320). For example, the driving part coupling part (3312) may be disposed by being divided in four pieces. Each of the four driving part coupling parts (3312) may be disposed with the first magnet (3320). For example, the driving part coupling part (3312) may be formed at a side surface of first housing (3310). In another example, the driving part coupling part (3312) may be formed at a corner portion of the first housing (3310).

The upper coupling part (3313) may be coupled with the first upper elastic member (3510). The upper coupling part (3313) may be coupled with an external part (3511) of the first upper elastic member (3510). The upper coupling part (3313) may be formed by being upwardly protruded from a top surface of first housing (3310). For example, the protrude of the upper coupling part (3313) may be coupled by being inserted into a groove or a hole of an external part (3511) of first upper elastic member (3510). At this time, the protrude of the upper coupling part (3313) may be fused in a state of being inserted into a hole of the external part (3511) to fix the first upper elastic member (3510) between the fused protrude and the top surface of the first housing (3310).

The lower coupling part may be coupled with the first lower elastic member (3520). The lower coupling part may be coupled to an external part (1521) of first lower elastic member (3520). The lower coupling part may be formed by being downwardly protruded from a lower surface of first housing (3310). For example, the protruder of the lower coupling part may be coupled by being inserted into a groove or a hole of the external part (3521) of the first lower elastic member (3520). The protruder of the lower coupling part may be fused in a state of being inserted into a hole of the external part (3521) to fix the first lower elastic member (3520) between the fused protruder and the lower surface of the first housing (3310).

The sensor coupling part (3315) may be disposed with at least a portion of a first AF feedback sensor unit (3700). The sensor coupling part (3315) may be disposed with a first AF feedback sensor (3710). The sensor coupling part (3315) may be formed on the first housing (3310). The sensor coupling part (3315) may be formed as a groove formed by allowing a portion of top surface of first housing (3310) to be downwardly recessed. At this time, the sensor coupling part (3315) may be accommodated by at least a portion of the first AF feedback sensor (3710). Furthermore, the at least one portion of the sensor coupling part (3315) may be formed to correspond in shape to the first AF feedback sensor (3710).

The first magnet (3320) may be disposed at the first housing (3310). The first magnet (3320) may be disposed at an outside of first coil (3220). The first magnet (3320) may face the first coil (3220). The first magnet (3320) may electromagnetically interact with the first coil (3220). The first magnet (3320) may be disposed at an upper side of second coil (3422). The first magnet (3320) may face the second coil (3422). The first magnet (3320) may electromagnetically interact with the second coil (3422). The first magnet (3320) may be co-used for AF function and OIS function. However, the first magnet (3320) may comprise a plurality of magnets that may be used separately for the AF function and the OIS function. For example, the first magnet (3320) may be disposed at a side surface of first housing (3310). At this time, the first magnet (3320) may be a flat-plated magnet. The first magnet (3320) may take a flat-plate shape. In a modification, the first magnet (3320) may be disposed at a corner portion of the first housing (3310). At this time, the first magnet (3320) may be a corner magnet. The first magnet (3320) may take a broad cubic shape where an inner side surface is broader than an outer side surface.

The first magnet (3320) may comprise first to fourth side surface magnets (3321, 3322, 3323, 3324). The first magnet (3320) may comprise first to fourth side surface magnets (3321, 3322, 3323, 3324), each mutually spaced apart from the other. The first magnet (3320) may comprise first to fourth side surface magnets (3321, 3322, 3323, 3324) each disposed at first to fourth side surfaces (3301, 3302, 3303, 3304) of first housing (3310). The first magnet (3320) may comprise a first side surface magnet (3321) disposed at the first side surface (3301) of first housing (3310). The first magnet (3320) may comprise a second side surface magnet (3322) disposed at a second side surface (3302) of first housing (3310). The first magnet (3320) may comprise a third side surface magnet (3323) disposed at a third side surface (3303) of first housing (3310). The first magnet (3320) may comprise a fourth side surface magnet (3324) disposed at a fourth side surface (3304) of first housing (3310).

The first side surface magnet (3321) may be disposed at a first side surface (3301) of first housing (3310). The first side surface magnet (3321) may be disposed closer to a first corner portion (3305) than a fourth corner portion (3308). The second side surface magnet (3322) may be disposed at a second side surface (3302) of first housing (3310). The second side surface magnet (3322) may be disposed closer to the first corner portion (3305) than a second corner portion (3306). The third side surface magnet (3323) may be disposed at a third side surface (3303) of first housing (3310). The third side surface magnet (3323) may be disposed closer to a third corner portion (3307) than the second corner portion (3306). The fourth side surface magnet (3324) may be disposed at a fourth side surface (3304) of first housing (3310). The fourth side surface magnet (3324) may be disposed closer to a third corner portion (3307) than a fourth corner portion (3308).

The first to fourth side surface magnets (3321, 3322, 3323, 3324) may be mutually symmetrical about a first optical axis. The first side surface magnet (3321) may be symmetrical with the third side surface magnet (3323) about the first optical axis. The first side surface magnet (3321) may be disposed at a position symmetrical with the third side surface magnet (3323) about a first optical axis. The first side surface magnet (3321) may be formed with a size and a shape symmetrical with those of the third side surface magnet (3323) about the first optical axis. The second side surface magnet (3322) may be symmetrical with the fourth side surface magnet (3324) about the first optical axis. The second side surface magnet (3322) may be disposed at a position symmetrical with the fourth side surface magnet (3324) about the first optical axis. The second side surface magnet (3322) may be formed with a size and a shape symmetrical with those of the fourth side surface magnet (3324) about the first optical axis.

Each of the first to fourth side surface magnets (3321, 3322, 3323, 3324) may have a flat-plated shape. In this case, the first to fourth side surface magnets (3321, 3322, 3323, 3324) may be called "flat-plated magnets". The first to fourth side surface magnets (3321, 3322, 3323, 3324) may be so disposed as to allow each N pole to face an inside. Alternatively, the first to fourth side surface magnets (3321, 3322, 3323, 3324) may be so disposed as to allow each S pole to face inside.

The first to fourth side surface magnets (3321, 3322, 3323, 3324) may be symmetrical with fifth to eighth side surface magnets (4321, 4322, 4323, 4324) about a first virtual line which is an imaginary straight line. The first virtual line may be disposed on a plane surface comprising first and second optical axes, and may be parallel with the first and second optical axes. Furthermore, the first virtual line may be spaced apart from the first and second optical axes at an equal distance.

The first side surface magnet (3321) may not be overlapped with the fifth side surface magnet (4321) to a direction perpendicular to the first optical axis. Alternatively, the first side surface magnet (3321) may be overlapped within a 30% area of an opposite surface with the fifth side surface magnet (4321) to a direction perpendicular to the first optical axis. Alternatively, the first side surface magnet (4321) may be overlapped within a 50% area of an opposite surface with the fifth side surface magnet (4321) to a direction perpendicular to the first optical axis.

The first magnet (3320) may be formed with a shape corresponding to that of the second magnet (4320). The first magnet (3320) may be formed with a width same as that of the second magnet (4320). The first magnet (3320) may have a same height as that of the second magnet (4320). The first magnet (3320) may have a same thickness as that of the second magnet (4320). A position disposed by the first magnet (3320) in the first lens driving device (3000) may correspond to that disposed by the second magnet (4320) in the second lens driving device (4000). The first coil (3220) may have eight side surfaces, and the first magnet (3320) may be so disposed as to face any one side surface of eight side surfaces at the first coil (3220). A length of the first magnet (3320) may be shorter than a length of an opposite surface of the first coil (3220). The first coil (3220) may have eight side surfaces, and the first sensing magnet (3730) may be so disposed as to allow facing any one side surface of the eight side surfaces in the first coil (3220). The first coil (3220) may have eight side surfaces, and the first compensation magnet (3740) may be so disposed as to allow facing any one side surface of the eight side surfaces in the first coil (3220).

The first stator (3400) may be disposed at a lower side of first housing (3310). The first stator (3400) may be disposed at a lower side of the first OIS mover (3300). The first stator (3400) may face the first OIS mover (3300). The first stator (3400) may movably support the first OIS mover (3300). The first stator (3400) may move the first OIS mover (3300). At this time, the first AF mover (3200) may move along with the first OIS mover (3300).

The first stator (3400) may comprise a first substrate (3410), a first circuit member (3420) and a first base (3430). However, any one or more of the first substrate (3410), the first circuit member (3420) and the first base (3430) may be omitted or changed from the first stator (3400).

The first substrate (3410) may supply a power to the second coil (3422). The substrate (3410) may be coupled with the first circuit member (3420). The first substrate (3410) may be coupled with a first PCB (3001) disposed at a lower side of the first base (3430). The first substrate (3410) may be disposed at a lower surface of the first circuit member (3420). The first substrate (3410) may be disposed at a top surface of first base (3430). The first substrate (3410) may be interposed between the first circuit member (3420) and the first base (3430). The first substrate (3410) may be coupled by a first support member (3600). The first substrate (3410) may be formed with a hole passed through by the first support member (3600). A lower surface of first substrate (3410) and a lower end of the first support member (3600) may be coupled by soldering.

The first substrate (3410) may comprise a flexible PCB (FPCB, Flexible Printed Circuit Board). The first substrate (3410) may be partially bent. The first substrate (3410) may supply a current to the first coil (3220). The first substrate (3410) may supply a current to the first coil (3220) through the first support member (1600) and the first upper elastic member (3510). The first substrate (3410) may supply a current to a substrate (3720) of the first AF feedback sensor unit (3700) through the first support member (1600) and the first upper elastic member (3510). The current supplied to the substrate (3720) may be used for driving the first AF feedback sensor (3710).

The first substrate (3410) may comprise an opening (3411) and a terminal part (3412). However, any one or more of the opening (3411) and the terminal part (3412) may be omitted or changed from the first substrate (3410).

The opening (3411) may be formed on the first substrate (3410). The opening (3411) may be formed at a center of the first substrate (3410). The opening (3411) may be formed by passing through the first substrate (3410). The opening (3411) may pass a light having passed through the first lens module. The opening (3411) may be formed in a round shape. However, the shape of the opening (3411) is not limited thereto.

The terminal part (3412) may be formed on the first substrate (3410). The terminal part (3412) may be formed by a portion of the first substrate (3410) being downwardly bent. At least a portion of the terminal part (3412) may be exposed to an outside. The terminal part (3412) may be coupled to the first PCB (3001) disposed at a lower side of the first base (3430) by way of soldering. A lower end of the terminal part (3412) may directly contact the first PCB (3001). The terminal part (3412) may be disposed at a terminal coupling part (3434) of the first base (3430).

The first circuit member (3420) may be disposed at the first base (3430). The first circuit member (3420) may be disposed at the first substrate (3410). The first circuit member (3420) may be disposed at a top surface of first substrate (3410). The first circuit member (3420) may be disposed at a lower side of the first magnet (3320). The first circuit member (3420) may be interposed between the first magnet (3320) and the first base (3430). The first circuit member (3420) may be coupled by the first support member (1600). The first circuit member (3420) may movably support the first OIS mover (3300).

The first circuit member (3420) may comprise a substrate part (3421) and a second coil (3422). However, any one or more of the substrate part (3421) and the second coil (3422) may be omitted or changed from the first circuit member (3420).

The substrate part (3421) may be a circuit substrate. The substrate part (3421) may be an FPCB. The substrate part (3421) may be integrally formed with the second coil (3422). The substrate part (3421) may be coupled by the first support member (3600). The substrate part (3421) may be formed with a hole through which the first support member (3600) can pass by. A lower surface of substrate part (3421) and a lower end of the first support member (3600) may be coupled by soldering. The substrate part (3421) may be formed with an opening. The substrate part (3421) may be formed with an opening through which the substrate part (3421) passes by. The opening of the substrate part (3421) may be so formed as to correspond to the opening (3411) of the first substrate (3410).

The second coil (3422) may face the first magnet (3320). In this case, when a current is supplied to the second coil (3422) to form a magnetic field about the second coil (3422), the first magnet (3320) may move to the second coil through an electromagnetic interaction between the second coil (3422) and the first magnet (3320). The second coil (3422) may electromagnetically interact with the first magnet (3320). The second coil (3422) may move the first housing (3310) and the first bobbin (3210) relative to the first base through the electromagnetic interaction with the first magnet (3320) to a direction perpendicular to an optical axis. The second coil (3422) may comprise at least one coil. The second coil (3422) may be an FP coil (Fine Pattern coil) integrally formed at the substrate part (3421). The second coil (3422) may comprise a plurality of coils each mutually spaced apart from the other coil. The second coil (3422) may comprise four coils each mutually spaced apart from the other coil. At this time, the four coils may be disposed at the substrate part (3421) to allow the adjacent two coils to mutually form a 90°. Meantime, each of the four coils may be separately controlled. The second coil (3422) may receive a power sequentially through the first PCB (3001), the first substrate (3410) and the substrate part (3421).

The first base (3430) may be disposed at a lower surface of first substrate (3410). A top surface of first base (3430) may be disposed with the first substrate (3410). The first base (3430) may be disposed with the first circuit member (3420). The first base (3430) may be coupled with the first cover member (3100). The first base (3430) may be disposed at a top surface of first PCB (3001). However, a separate holder member may be interposed between the first base (3430) and the first PCB (3001). The first base (3430) may perform the function of a sensor holder protecting the first image sensor mounted on the first PCB (3001).

The first base (3430) may comprise a through hole (3431), a foreign object collection part (3432), a sensor coupling part (3433), a terminal coupling part (3434) and a step (staircase) part (3435). However, any one or more of the through hole (3431), the foreign object collection part (3432), the sensor coupling part (3433), the terminal coupling part (3434) and the step part (3435) may be omitted or changed from the first base (3430).

The through hole (3431) may be disposed on the first base (3430). The through hole (3431) may be so formed as to vertically penetrate the first base (3430). The through hole (3431) may be disposed with an infrared filter. However, the infrared filter may be coupled to a separate holder member disposed at a lower surface of first base (3430). A light having passed the first lens module through the through hole (3431) may be incident on the image sensor. That is, the light having passed through the first lens nodule may be incident on the image sensor through the opening of the first circuit member (3420), an opening (3411) of first substrate (3410) and the through hole (3431) of the first base (3430). The through hole (3431) may be so formed as to have a round shape. However, the shape of the through hole (3431) is not limited thereto.

The foreign object collection part (3432) may collect foreign objects introduced into the first lens driving device (3000). The foreign object collection part (3432) may comprise a groove formed by allowing a top surface of the first base (3430) to be downwardly recessed, and an adhesive part disposed on the groove. The adhesive part may comprise an adhesive material. The foreign objects introduced into the first lens driving device (3000) may be adhered by the adhesive part.

The sensor coupling part (3433) may be disposed at the first OIS feedback sensor (3800). The sensor coupling part (3433) may accommodate at least a portion of the first OIS feedback sensor (3800). The sensor coupling part (3433) may be formed by a groove formed by allowing a top surface of the first base (3430) to be downwardly recessed. The sensor coupling part (3433) may be spaced apart from the foreign object collection part (3432). The sensor coupling part (3433) may be formed by a plurality of grooves. For example, the sensor coupling part (3433) may be formed with two grooves. At this time, each of the two grooves may be disposed with a first OIS feedback sensor (3800).

The terminal coupling part (3434) may be disposed with the terminal part (3412) of the first substrate (3410). The terminal coupling part (3434) may be formed with a groove by allowing a portion of one side surface of first base (3430) to be inwardly recessed. At this time, the terminal coupling part (3434) may be accommodated by at least a portion of the terminal part (3412) of first substrate (3410). A width of the terminal coupling part (3434) may be so formed as to correspond to that of the terminal part (3412) of first substrate (3410). A length of the terminal coupling part (3434) may be so formed as to correspond to that of the terminal part (3412) of first substrate (3410).

The step part (3435) may be formed at a side surface of first base (3430). The step part (3435) may be so formed as to surround an outer periphery surface of first base (3430). The step part (3435) may be formed by allowing a top surface of a side surface of the first base (3430) to be recessed. Alternatively, the step part (3435) may be formed by allowing a lower surface of side surface of first base (3430) to be protruded. The step part (3435) may be disposed with a lower end of the side plate (3102) of the first cover member (3100).

The first elastic member (3500) may be coupled to the first bobbin (3210) and to the first housing (3310). The first elastic member (3500) may elastically support the first bobbin (3210). The first elastic member (3500) may have elasticity on at least a portion thereof. The first elastic member (3500) may movably support the first bobbin (3210). The first elastic member (3500) may movably support the first bobbin (3210) relative to the first housing (3310) to an optical axis. That is, the first elastic member (3500) may support in such a manner that the first bobbin (3210) performs the AF driving. At this time, the first elastic member (3500) may be called an "AF elastic member".

The first elastic member (3500) may comprise a first upper elastic member (3510) and a first lower elastic member (3520). However, any one or more of the first upper elastic member (3510) and the first lower elastic member (3520) may be omitted or changed from the first elastic member (3500).

The first upper elastic member (3510) may be disposed at an upper side of the first bobbin (3210), and may be coupled to the first bobbin (3210) and to the first housing (3310). The first upper elastic member (3510) may be coupled to the first bobbin (3210) and to the first housing (3310). The first upper elastic member (3510) may be coupled to a top surface of first bobbin (3210) and to a top surface of first housing (3310). The first upper elastic member (3510) may elastically support the first bobbin (3210). The first upper elastic member (3510) may have elasticity on at least a portion thereof. The first upper elastic member (3510) may movably support the first bobbin (3210). The first upper elastic member (3510) may movably support the first bobbin (3210) relative to the first housing (3310) to an optical axis direction. The first upper elastic member (3510) may be formed with a leaf spring.

The first upper elastic member (3510) may be formed with a plurality of divisive elements. The first upper elastic member (3510) may comprise six (6) elastic units (3501, 3502, 3503, 3504, 3505, 3506), each spaced apart from the other units. However, any one or more of six (6) elastic units (3501, 3502, 3503, 3504, 3505, 3506) may be omitted or changed from the first upper elastic member (3510).

The first to sixth elastic units (3501, 3502, 3503, 3504, 3505, 3506) may be mutually spaced apart, through which, the first to sixth elastic units (3501, 3502, 3503, 3504, 3505, 3506) may be used as a conductive lines inside the first lens driving device (3000). The first to sixth elastic units (3501, 3502, 3503, 3504, 3505, 3506) may be electrically connected to the first substrate (3410) through the first support member (3600). The first to fourth elastic units (3501, 3502, 3503, 3504) may be coupled to the substrate (3720) of the first AF feedback sensor unit (3700), through which the first to fourth elastic units (3501, 3502, 3503, 3504) may be electrically connected to the first AF feedback sensor (3710). At this time, the fifth and sixth elastic units (3505, 3506) may be electrically connected to the first coil (3220). That is, the first to sixth elastic units (3501, 3502, 3503, 3504, 3505, 3506) may be used for supplying a power to the AF feedback sensor (3710) disposed at the first housing (3310) and to the first coil (3220) disposed at the first bobbin (3210).

The first upper elastic member (3510) may comprise an external part (3511), an internal part (3512), a connection part (3513), a coupling part (3514) and a terminal part (3515). However, any one or more of the external part (3511), the internal part (3512), the connection part (3513), the coupling part (3514) and the terminal part (3515) may be omitted or changed from the first upper elastic member (3510).

The external part (3511) may be coupled to the first housing (3310). The external part (3511) may be coupled to a top surface of the first housing (3310). The external part (3511) may be coupled to an upper coupling part (3313) of the first housing (3310). The external part (3511) may comprise a hole or a groove coupled to the upper coupling part (3313) of the first housing (3310).

The internal part (3512) may be coupled to the first bobbin (3210). The internal part (3512) may be coupled to a top surface of the first bobbin (3210). The internal part (3512) may be coupled to the upper coupling part (3213) of the first bobbin (3210). The internal part (3512) may comprise a hole or a groove coupled to the upper coupling part (3213) of the first bobbin (3210).

The connection part (3513) may connect the external part (3511) and the internal part (3512). The connection part (3513) may elastically connect the external part (3511) and the internal part (3512). The connection part (3513) may have elasticity. At this time, the connection part (3513) may be called an "elastic part". The connection part (3513) may be formed by being bent more than twice.

The coupling part (3514) may be coupled to a first support member (3600). The coupling part (3514) may be coupled to the first support member (3600) by way of soldering. For example, the coupling part (3514) may comprise a hole passed through by the first support member (3600). In another example, the coupling part (3514) may comprise a groove coupled by the first support member (3600). The coupling part (3514) may be extended from the external part (3511). The coupling part (3514) may be extended from the external part (3511) to an outside. The coupling part (3514) may comprise a bent part formed by being bent.

The terminal part (3515) may be extended from the external part (3511). The terminal part (3515) may be electrically connected to the substrate (3720) of the first AF feedback sensor unit (3700). The terminal part (3515) may be coupled to a terminal of the substrate (3720) of the first AF feedback sensor unit (3700) by way of soldering. The terminal part (3515) may comprise a total of four pieces.

The first lower elastic member (3520) may be disposed at a lower side of first bobbin (3210) and may be coupled to the first bobbin (3210) and the first housing (3310). The first lower elastic member (3520) may be coupled to the first bobbin (3210) and the first housing (3310). The first lower elastic member (3520) may be coupled to a lower surface of first bobbin (3210) and to a lower surface of first housing (3310). The first lower elastic member (3520) may elastically support the first bobbin (3210). The first lower elastic member (3520) may have elasticity on at least a portion thereof. The first lower elastic member (3520) may movably support the first bobbin (3210). The first lower elastic member (3520) may movably support the first bobbin (3210) relative to the first housing (3310) to an optical axis direction. The first lower elastic member (3520) may be formed with a leaf spring. For example, the first lower elastic member (3520) may be integrally formed.

The first lower elastic member (3520) may comprise an external part (3521), an internal part (3522) and a connection part (3523). However, any one or more of the external part (3521), the internal part (3522) and the connection part (3523) may be omitted or changed from the first lower elastic member (3520).

The external part (3521) may be coupled to the first housing (3310). The external part (3521) may be coupled to a lower surface of the first housing (3310). The external part (3521) may be coupled to a lower coupling part of the first housing (3310). The external part (3521) may comprise a hole or a groove coupled to the lower coupling part of the first housing (3310).

The internal part (3522) may be coupled to the first bobbin (3210). The internal part (3522) may be coupled to a top surface of the first bobbin (3210). The internal part (3522) may be coupled to a lower coupling part of the first bobbin (3210). The internal part (3522) may comprise a hole or a groove coupled to the lower coupling part of the first bobbin (3210).

The connection part (3523) may connect the external part (3521) and the internal part (3522). The connection part (3523) may elastically connect the external part (3521) and the internal part (3522). The connection part (3523) may have elasticity. At this time, the connection part (3523) may be called an "elastic part". The connection part (3523) may be formed by being bent more than twice.

The first support member (3600) may movably support the first housing (3310). The first support member (3600) may elastically support the first housing (3310). The first support member (3600) may have elasticity on at least a portion thereof. At this time, the first support member (3600) may be called an "elastic member". For example, the first support member (3600) may movably support the first housing (3310) relative to the first stator (3400) to a direction perpendicular to the optical axis. At this time, the first bobbin (3210) may integrally move with the first housing (3310). For another example, the first support member (3600) may tiltably support the first housing (3310) relative to the first stator (3400). That is, the first support member (3600) may support the first housing (3310) and the first bobbin (3210) in such a manner that the first housing (3310) and the first bobbin (3210) can perform the OIS driving. At this time, the first support member (3600) may be called an "OIS support member". For example, the first support member (3600) may be formed with a wire. For another example, the first support member (3600) may be formed with a leaf spring.

The first support member (3600) may be coupled to the first upper elastic member (3510) and the first stator (3400). A lower end of the first support member (3600) may be coupled to the first substrate (3410). The first support member (3600) may pass through the first substrate (3410). Through this structure, the lower end of the first support member (3600) may be coupled to a lower surface of the first substrate (3410) by way of soldering. An upper end of the first support member (3600) may be coupled to a coupling part (1514) of the first upper elastic member (3510). An upper end of the first support member (3600) may pass through the coupling part (3514) of the first upper elastic member (3510). Through this structure, an upper end of the first support member (3600) may be coupled to a top surface of the coupling part (3514) of the first upper elastic member (3510) by way of soldering. In a modification, the lower end of the first support member (3600) may be coupled to the substrate part (3421) of first circuit member (3420). The lower end of first support member (3600) may be coupled to the first base (3430). The upper end of the first support member (3600) may be coupled to the first housing (3310). However, the structure of the first support member (3600) is not limited thereto, and may comprise any structure capable of movably supporting the first OIS mover (3300) relative to the first stator (3400).

The first support member (3600) may be formed with a plurality of divisive elements. The first support member (3600) may be formed with six (6) support parts (3601, 3602, 3603, 3604, 3605, 3606) each mutually spaced apart. The first support member (3600) may comprise first to sixth support parts (3601, 3602, 3603, 3604, 3605, 3606) each mutually spaced apart. However, any one or more of the first to sixth support parts (3601, 3602, 3603, 3604, 3605, 3606) may be omitted or changed from the first support member (3600). Particularly, the first support member (3600) may be formed with first to sixth support parts (3601, 3602, 3603, 3604, 3605, 3606) in order to pair with first to sixth elastic units support (3501, 3502, 3503, 3504, 3505, 3506) of the first upper elastic member (3510). However, as a modification, the first support member (3600) may be formed with eight support parts in consideration of symmetry.

The first to sixth support parts (3601, 3602, 3603, 3604, 3605, 3606) may be mutually spaced apart, through which the first to sixth support parts (3601, 3602, 3603, 3604, 3605, 3606) may be used as conductive lines within the first lens driving device (3000). The first to sixth support parts (3601, 3602, 3603, 3604, 3605, 3606) may be couple to the first substrate (3410). The first to sixth support parts (3601, 3602, 3603, 3604, 3605, 3606) may be coupled to the first upper elastic member (3510). That is, the first to sixth support parts (3601, 3602, 3603, 3604, 3605, 3606) may electrically connect the first substrate (3410) and the first upper elastic member (3510). The first support part (3601) may be coupled to the first elastic unit (3501), the second support part (3602) may be coupled to the second elastic unit (3502), the third support part (3603) may be coupled to the third elastic unit (3503), the fourth support part (3604) may be coupled to the fourth elastic unit ((3504), the fifth support part (3605) may be coupled to the fifth elastic unit (3505), and the sixth support part (3606) may be coupled to the sixth elastic unit (3506). Each of the first to sixth support parts (3601, 3602, 3603, 3604, 3605, 3606) may be a wire.

A damper (not shown) may be disposed on the first support member (3600). The damper may be disposed on the first support member (3600) and the first housing (3310). The damper may be disposed on the first elastic member (3500). The damper may be disposed on the first elastic member (3500) and/or the first support member (3600) to inhibit the resonance phenomenon generated from the first elastic member (3500) and/or the first support member (3600). A shock absorption part (not shown) may be provided to any one or more of the first elastic member (3500) and the first support member (3600). The shock absorption part may be formed by allowing a shape of a portion of the first elastic member (3500) and/or the first support member (3600) to be changed.

The first AF feedback sensor unit (3700) may be provided for AF feedback. The first AF feedback sensor unit (3700) may detect the movement of the first bobbin (3210) to an optical axis direction. The first AF feedback sensor unit (3700) may detect the movement the first bobbin (3210) to an optical axis direction for supply to the controller in real time.

The first AF feedback sensor unit (3700) may comprise a first AF feedback sensor (3710), a substrate (3720) and a first sensing magnet (3730). However, any one or more of the first AF feedback sensor (3710), the substrate (3720) and the first sensing magnet (3730) may be omitted or changed from the first AF feedback sensor unit (3700). Furthermore, the first AF feedback sensor unit (3700) may further comprise a first compensation magnet (3740). However, the first compensation magnet (3740) is an element having nothing to do with the position sensing of the first bobbin (3210), and therefore, may be explained as a separate element from the first AF feedback sensor unit (3700).

The first AF feedback sensor (3710) may be disposed on the first housing (3310). The first AF feedback sensor (3710) may be arranged on the first housing (3310). The first AF feedback sensor (3710) may be disposed at a corner portion of the first housing (3310). The first AF feedback sensor (3710) may be disposed on a corner portion most spaced apart from a second sensing magnet (4730) among a plurality of corner portions of the first housing (3310). The first AF feedback sensor (3710) may be disposed on a corner portion most spaced apart from a second AF feedback sensor (4710) among a plurality of corner portions of the first housing (3310). Through this structure, the first AF feedback sensor (3710) and the second AF feedback sensor (4710) may be maximally spaced apart within a limited space. The first AF feedback sensor (3710) may be disposed on a second corner portion (3306) of the first housing (3310). The first AF feedback sensor (3710) may be interposed between second and third side surfaces (3302, 3303). The first AF feedback sensor (3710) may be disposed on a virtual straight line connecting a second corner portion (3306) and a fourth corner portion (3308). That is, all the first AF feedback sensor (3710), the first sensing magnet (3730), and the first compensation magnet (3740) may be disposed on the virtual straight line connecting the second corner portion (3306) and the fourth corner portion (3308) of first housing (3310).

The first AF feedback sensor (3710) may be disposed on the substrate (3720). The first AF feedback sensor (3710) may be coupled to the substrate (3720). The first AF feedback sensor (3710) may be electrically connected to the substrate (3720). The first AF feedback sensor (3710) may be mounted on the substrate (3720). The first AF feedback sensor (3710) may be coupled to the substrate (3720) using the SMT (Surface Mounter Technology). The first AF feedback sensor (3710) may be mounted on a sensor mounting part of substrate (3720). The first AF feedback sensor (3710) may detect the first sensing magnet (3730). The first AF feedback sensor (3710) may comprise a Hall IC detecting a magnetic field of a magnet. The first AF feedback sensor (3710) may comprise a Hall-integrated driver. The first AF feedback sensor (3710) may comprise a temperature detection function.

The first AF feedback sensor (3710) is fixed to the first housing (3310) and the first sensing magnet (3730) is fixed to the first bobbin (3210). When the first sensing magnet (3730) moves along with the first bobbin (3210), the magnetic flux density detected by the Hall IC inside the first AF feedback sensor (3710) may be changed in response to a relative position of the first AF feedback sensor (3710) and the first sensing magnet (3730). The first AF feedback sensor (3710) may detect a position of the first lens module using an output voltage of Hall IC in proportion to a magnetic flux density that changes in response to the relative position of the first AF feedback sensor (3710) and the first sensing magnet (3730).

The substrate (3720) may be disposed on the first housing (3310). The substrate (3720) may be coupled to the first AF feedback sensor (3710). The substrate (3720) may be electrically connected to the first AF feedback sensor (3710). The substrate (3720) may be coupled to the first upper elastic member (3510). The substrate (3720) may be electrically connected to first to fourth elastic units (3501, 3502, 3503, 3504) of first upper elastic member (3510). The substrate (3720) may comprise four (4) terminals coupled to the first to fourth elastic units (3501, 3502, 3503, 3504) of first upper elastic member (3510). The substrate (3720) and the first upper elastic member (3510) may be coupled by way of soldering. A top surface of the substrate (3720) may be coupled to the first to fourth elastic units (3501, 3502, 3503, 3504) of first upper elastic member (3510), and a lower surface of the substrate (3720) may be coupled to the first AF feedback sensor (3710).

The first sensing magnet (3730) may be disposed at a side surface facing the second corner portion (3306) between the second and third side surfaces (3302, 3303) of first housing (3310). The first sensing magnet (3730) may be disposed on the first bobbin (3210). The first sensing magnet (3730) may be arranged on the first bobbin (3210). The first sensing magnet (3730) may be detected by the first AF feedback sensor (3710). The first sensing magnet (3730) may be disposed at a corner of the first bobbin (3210). The first sensing magnet (3730) may be so disposed as to face the second corner portion (3306) of first housing (3310). The first sensing magnet (3730) may be disposed on a virtual straight line connecting the second corner portion (3306) and the fourth corner portion (3308). The first sensing magnet (3730) may be symmetrical with the first compensation magnet (3740) about the first bobbin (3210). The first sensing magnet (3730) may have a magnetism corresponding to that of the first compensation magnet (3740). The first sensing magnet (3730) may be disposed at one side of the first bobbin (3210). The first sensing magnet (3730) may be overlapped with the first coil (3220) to a direction perpendicular to the first optical axis.

The first sensing magnet (3730) may be disposed at an inside of the first coil (3220). The first coil (3220) may comprise eight (8) side surfaces, and the first sensing magnet (3730) may be disposed at an inside of the first coil (3220) to allow facing any one side surface of the eight side surfaces of the first coil (3220). The first sensing magnet (3730) may be disposed at an outside of first coil (3220). The first sensing magnet (3730) may be interposed between the first coil (3220) and the first AF feedback sensor (3710). In this case, a detection value detected by the first AF feedback sensor (3710) may be great because a distance between the first sensing magnet (3730) and the first AF feedback sensor (3710) come nearer over a case where the first sensing magnet (3730) is disposed at an inside of the first coil (3220). The first sensing magnet (3730) may be magnetized to four (4) poles and may be disposed in consideration of a relative position with the first AF feedback sensor (3710) to allow using only a section where a Hall output is positive. The first sensing magnet (3730) may be so disposed to allow an S pole to be formed at an upper inside, an N pole to be formed at an upper outside, an N pole to be formed at a lower inside and an S pole to be formed at a lower outside.

The first compensation magnet (3740) may be so disposed as to implement a magnetic balance with the first sensing magnet (3730). The first compensation magnet (3740) may be disposed on the first bobbin (3210). The first compensation magnet (3740) may be arranged on the first bobbin (3210). The first compensation magnet (3740) may be symmetrical with the first sensing magnet (3730) about the first optical axis. The first compensation magnet (3740) may be symmetrical with the first sensing magnet (3730) about the first bobbin (3210). The first compensation magnet (3740) may have a magnetism corresponding to that of the first sensing magnet (3730). The first compensation magnet (3740) may be disposed at the other side of the first bobbin (3210) corresponding to an opposite side of one side of the first bobbin (3210) disposed with the first sensing magnet (3730). The first compensation magnet (3740) may be disposed on a virtual straight line connecting the second corner portion (3306) and the fourth corner portion (3308). The first compensation magnet (3740) may be so disposed as to be symmetrical with the first sensing magnet (3730) about the first optical axis. Through this structure, an electromagnetic balance between the first sensing magnet (3730) and the first compensation magnet (3740) may be realized. As a result, an influence affecting on the electromagnetic interaction between the first sensing magnet (3730) by the first coil (3220) may be minimized.

The first compensation magnet (3740) may be disposed at an inside of the first coil (3220). The first coil (3220) may comprise eight (8) side surfaces, and the first compensation magnet (3740) may be disposed at an inside of the first coil (3220) to allow facing any one side surface of the eight side surfaces of the first coil (3220). The first compensation magnet (3740) may be disposed at an outside of the first coil (3220).

The first OIS feedback sensor (3800) may be provided for OIS feedback. The first OIS feedback sensor (3800) may detect the movement of first housing (3310). The first OIS feedback sensor (3800) may detect the movement or tilt to a direction perpendicular to an optical axis of first housing (3310) and/or the first bobbin (3210). The first OIS feedback sensor (3800) may detect the first magnet (3320). The first OIS feedback sensor (3800) may detect the first magnet (3320) disposed on the first housing (3310). The first OIS feedback sensor (3800) may detect the position of the first housing (3310). The first OIS feedback sensor (3800) may detect the amount of movement to a direction perpendicular to an optical axis of the first housing (3310). At this time, the amount of movement to a direction perpendicular to an optical axis of first housing (3310) may correspond to that of the first bobbin (3210) and to that of the lens module coupled to the first bobbin (3210). The first OIS feedback sensor (3800) may be disposed on the first stator (3400). The first OIS feedback sensor (3800) may be disposed at a lower surface of first substrate (3410). The first OIS feedback sensor (3800) may be electrically connected to the first substrate (3410). The first OIS feedback sensor (3800) may be disposed on the first base (3430). The first OIS feedback sensor (3800) may be accommodated into a sensor coupling part (3433) formed at a top surface of first base (3430). The first OIS feedback sensor (3800) may be a Hall sensor. The first OIS feedback sensor (3800) may be a Hall IC (Hall integrated circuit). The first OIS feedback sensor (3800) may detect a magnetic force of first magnet (3320). That is, when the first housing moves, the first OIS feedback sensor (3800) may detect the displacement volume of the first housing (3310) by detecting a change in the magnetic force that changes in response to the movement of the first magnet (3320). The first OIS feedback sensor (3800) may be provided in a plural number. The first OIS feedback sensor (3800) may comprise a first axis sensor (3810) and a second axis sensor (3820). At this time, the first axis sensor (3810) may detect the movement of the first housing (3310) to an x axis (z axis is optical axis) direction and the second axis sensor (3820) may detect the movement of first housing (3310) to a y axis direction.

The second camera module may be an OIS camera module having an AF feedback function. The second camera module may be a camera module having all functions of AF function, AF feedback function, OIS function and OIS feedback function.

The second camera module may comprise a second lens driving device (4000), a second lens module (not shown), a second infrared filter (not shown), a second PCB (4001), a second image sensor (not shown) and a second controller (not shown). However, any one or more of the second lens driving device (4000), the second lens module, the second infrared filter, the second PCB (4001), the second image sensor and the second controller may be omitted or changed from the second camera module.

The second lens module may comprise a lens and a lens barrel. The second lens module may comprise one or more lenses (not shown) and a lens barrel accommodating one or more lenses. However, one element of the second lens module is not limited to the lens barrel, and any holder structure capable of supporting one or more lenses will suffice for a lens barrel. The second lens module may move along with the second lens driving device (4000) by being coupled to the second lens driving device (4000). The second lens module may be coupled to an inside of the second lens driving device (4000). The second lens module may be screw-coupled to the second lens driving device (4000). The second lens module may be coupled to the second lens driving device (4000) using an adhesive (not shown). Meantime, a light having passed the second lens module may be irradiated on the second image sensor.

The second infrared filter may inhibit a light of infrared region from being incident on the second image sensor. The second infrared filter may be interposed between the second lens module and the second image sensor. The second infrared filter may be disposed at a holder member (not shown) separately disposed from a second base (4430). However, the second infrared filter may be mounted on a through hole (4431) formed at a center of the second base (4430). The second infrared filter may be formed with a film material or glass material. The second infrared filter may be formed by coating an infrared cut-off coating material on a flat optical filter such as protective cover glass and cover glass. The second infrared may be an infrared cut-off filter or an infrared absorption filter.

The second PCB (4001) may support the second lens driving device (4000). The second PCB (4001) may be mounted with a second image sensor. For example, an inner top surface of the second PCB (4001) may be disposed with the second image sensor and an upper outside of the second PCB (4001) may be disposed with a holder member. Alternatively, an upper outside surface of the second PCB (4001) may be disposed with the second lens driving device (4000) and an upper inside of the second PCB (4001) may be disposed with a second image sensor. Through this structure, a light having passed the second lens module accommodated at an inside of the second lens driving device (4000) may be irradiated on the second image sensor mounted on the second PCB (4001). The second PCB (4001) may supply a power to the second lens driving device (4000). Meantime, the second PCB (4001) may be disposed with a second controller for controlling the second lens driving device (4000). The second PCB (4001) may be integrally formed with the first PCB (3001). The second PCB (4001) and/or the first PCB (3001) may be a substrate of an optical device. Each of the first and second PCBs (3001, 4001) may comprise a terminal for being electrically connected to an outside.

The second image sensor may be mounted on the second PCB (4001). An optical axis of the second image sensor and an optical axis of the second lens module may be matched in positions thereof, through which the second image sensor may obtain a light having passed the second lens module. The second image sensor may output the irradiated light as an image. The second image sensor may be a CCD (charge coupled device), a MOS (metal oxide semi-conductor), a CPD and a CID. However, the types of the second image sensor are not limited thereto.

The second controller may be mounted on the second PCB (4001). The second controller may be disposed at an outside of the second lens driving device (4000). However, the second controller may be also disposed at an inside of the second lens driving device (4000). The second controller may control the direction, intensity and amplitude of a current supplied to each element forming the second lens driving device (4000). The second controller may perform an AF function and the second camera module by controlling the second lens driving device (4000). That is, the second controller may move the second lens module to an optical axis direction by controlling the second lens driving device (4000). Furthermore, the second controller may perform the feedback control of the AF function. To be more specific, the second controller may provide a more accurate AF function by controlling a power or a current applied to a third coil (2220) through reception of position of second bobbin (4210) detected by a second AF feedback sensor (4710). Furthermore, the second controller may perform the OIS function of the second camera module by controlling the second driving lens module (4000). That is, the second controller may move or tilt the second lens module to a direction perpendicular to the optical axis by controlling the second lens driving device (4000). Furthermore, the second controller may perform feedback control of the OIS function. To be more specific, the second controller may provide a more accurate OIS function by controlling a power or a current applied to a fourth coil (4422) through reception of position of second housing (4310) detected by a second OIS feedback sensor (4800).

Hereinafter, configuration of second lens driving device will be described with reference to the accompanying drawings.

Figure 23:
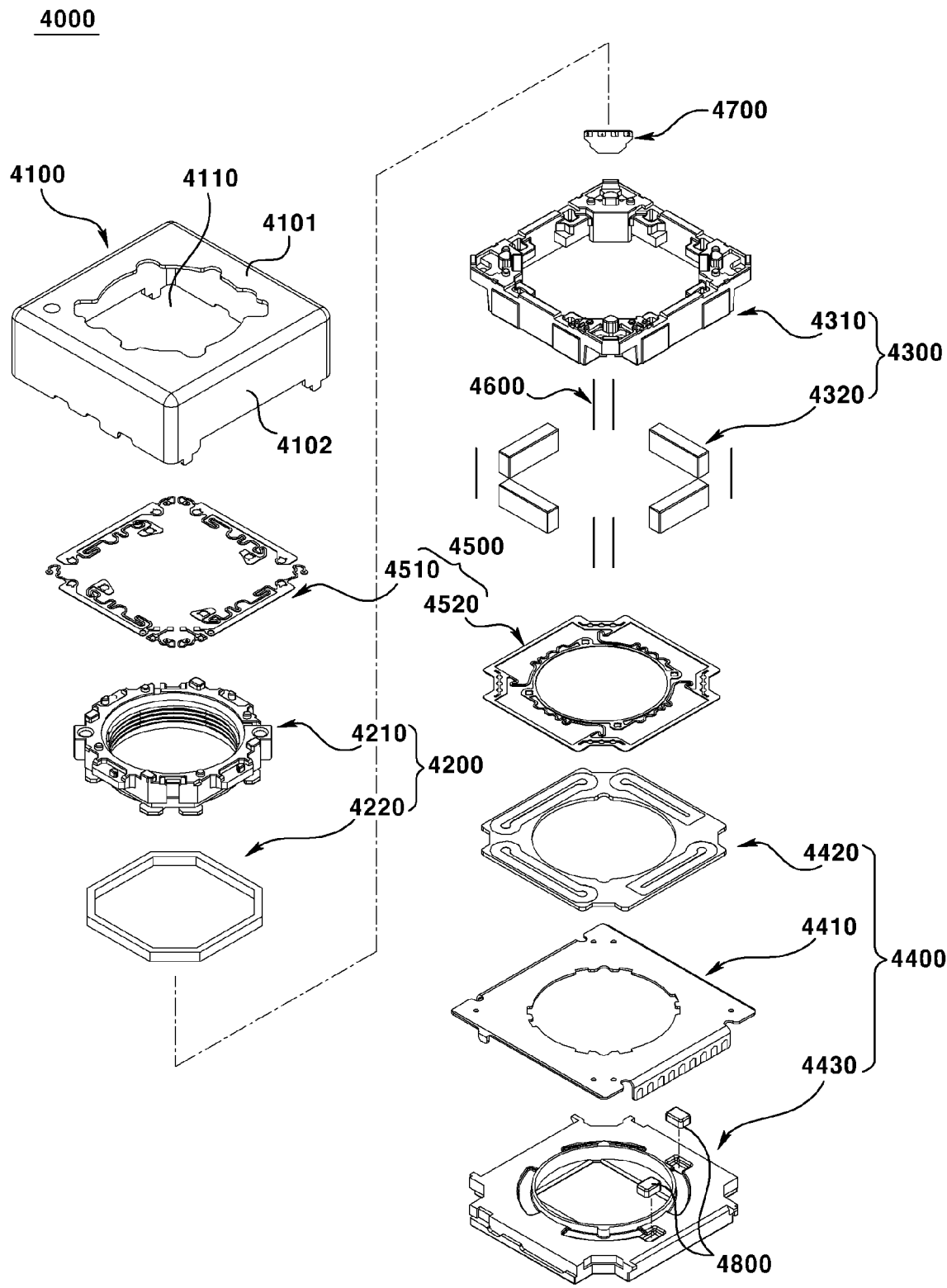
FIG. 23 is an exploded perspective view illustrating a second lens driving device according to a second exemplary embodiment.
Figure 24:
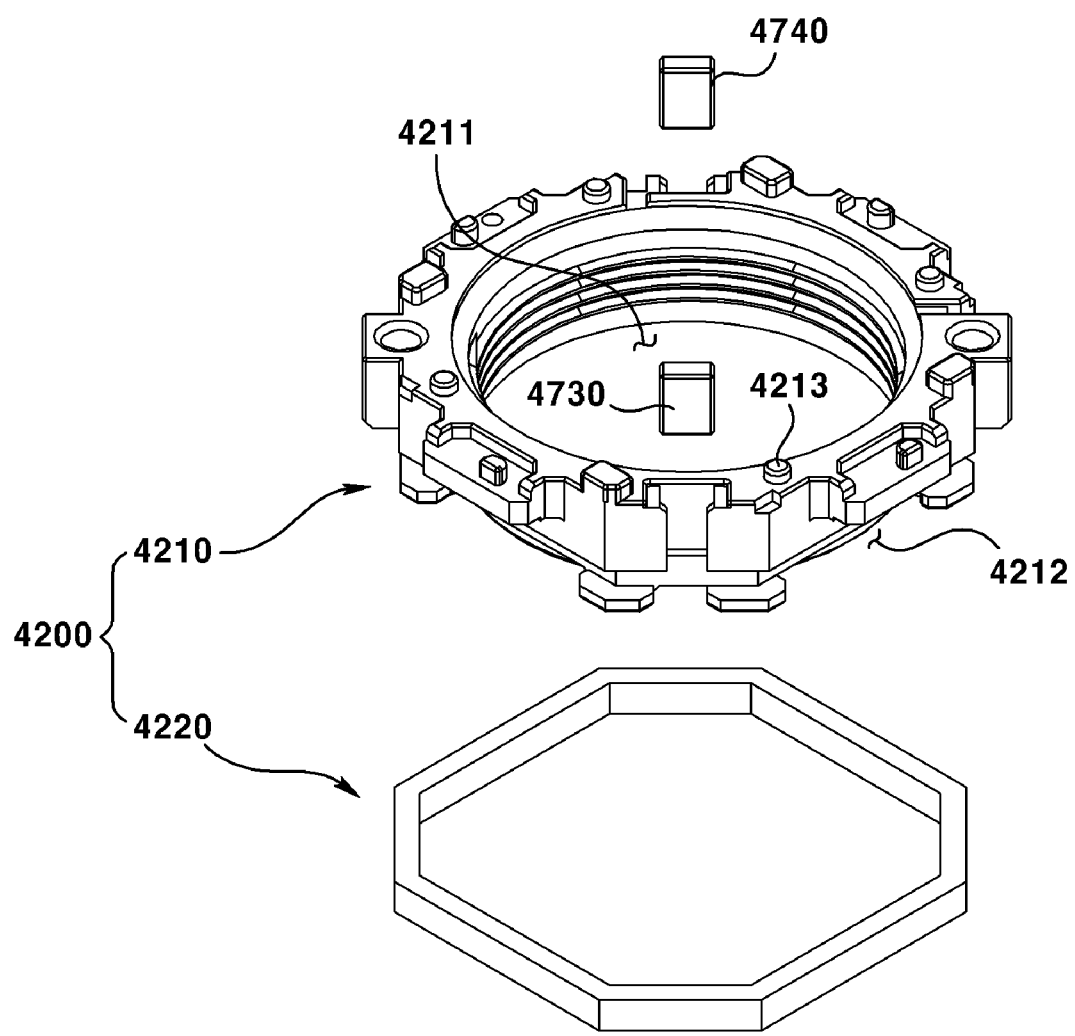
FIG. 24 is an exploded perspective view illustrating a second AF mover and related configuration according to a second exemplary embodiment.
Figure 25:
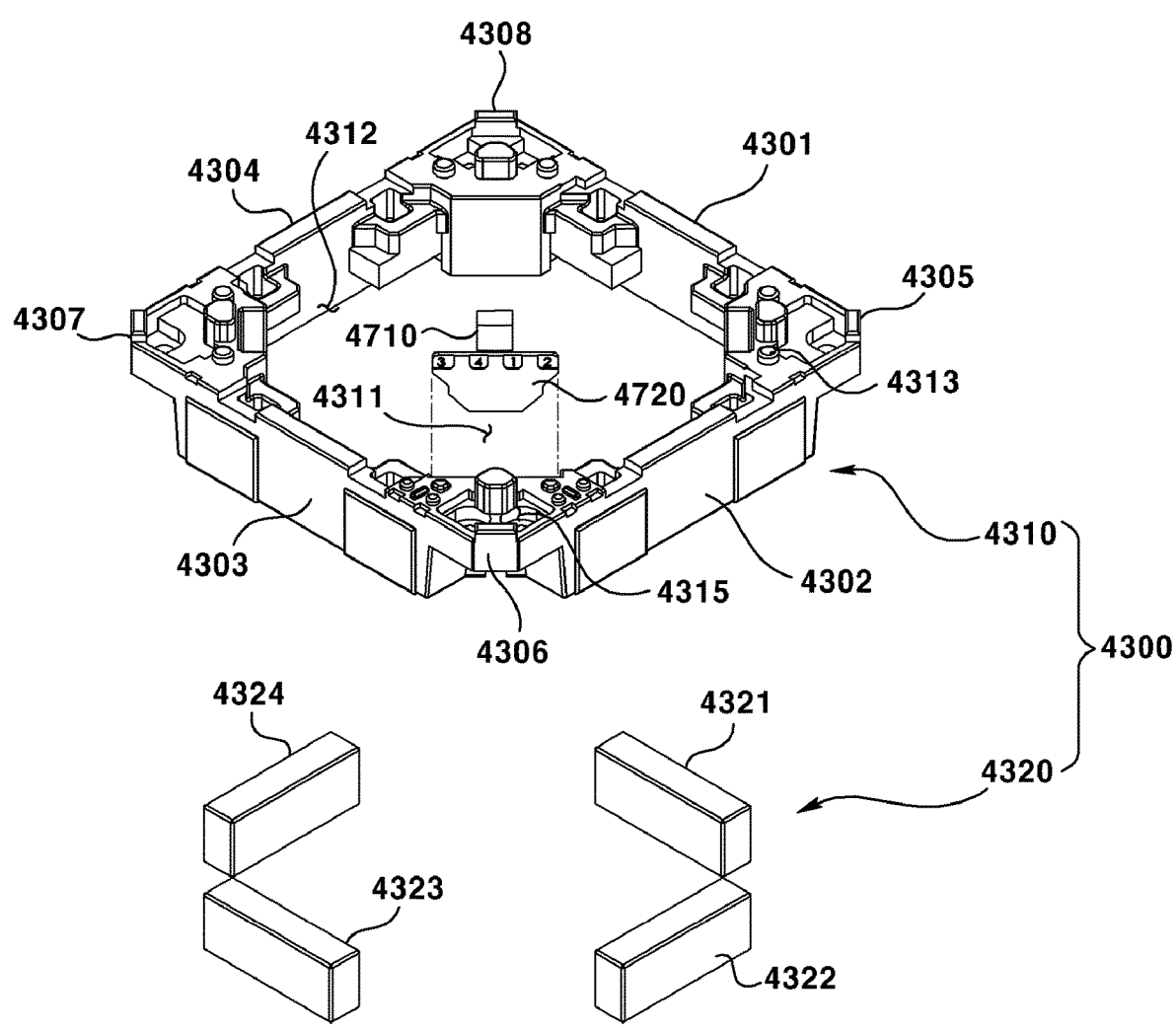
FIG. 25 is an exploded perspective view illustrating a second OIS mover and related configuration according to a second exemplary embodiment.
Figure 26:
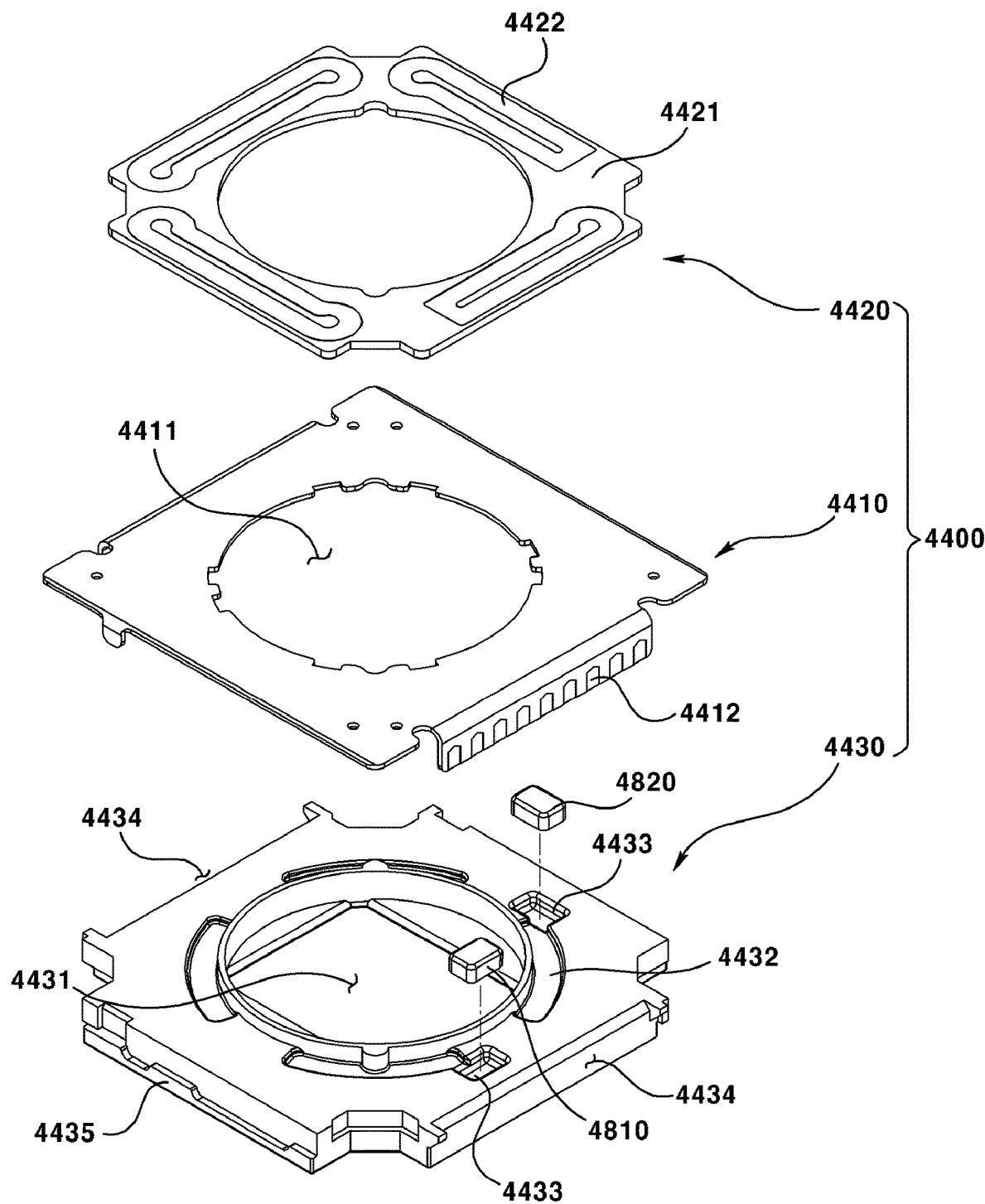
FIG. 26 is an exploded perspective view illustrating a second stator and related configuration according to a second exemplary embodiment.
Figure 27:
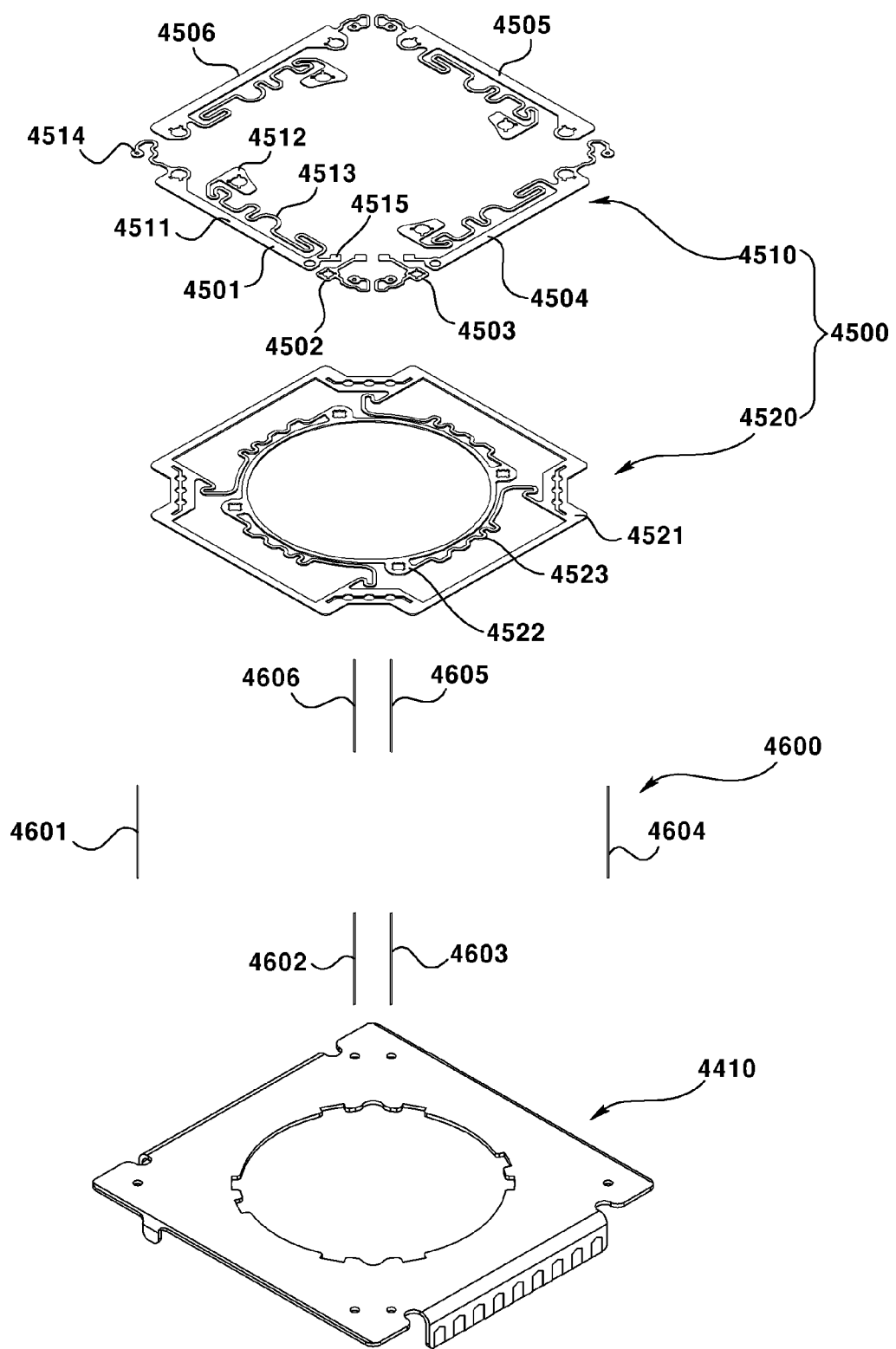
FIG. 27 is an exploded perspective view illustrating a second elastic member, a second support member and related configuration thereof according to a second exemplary embodiment.
Figure 28:
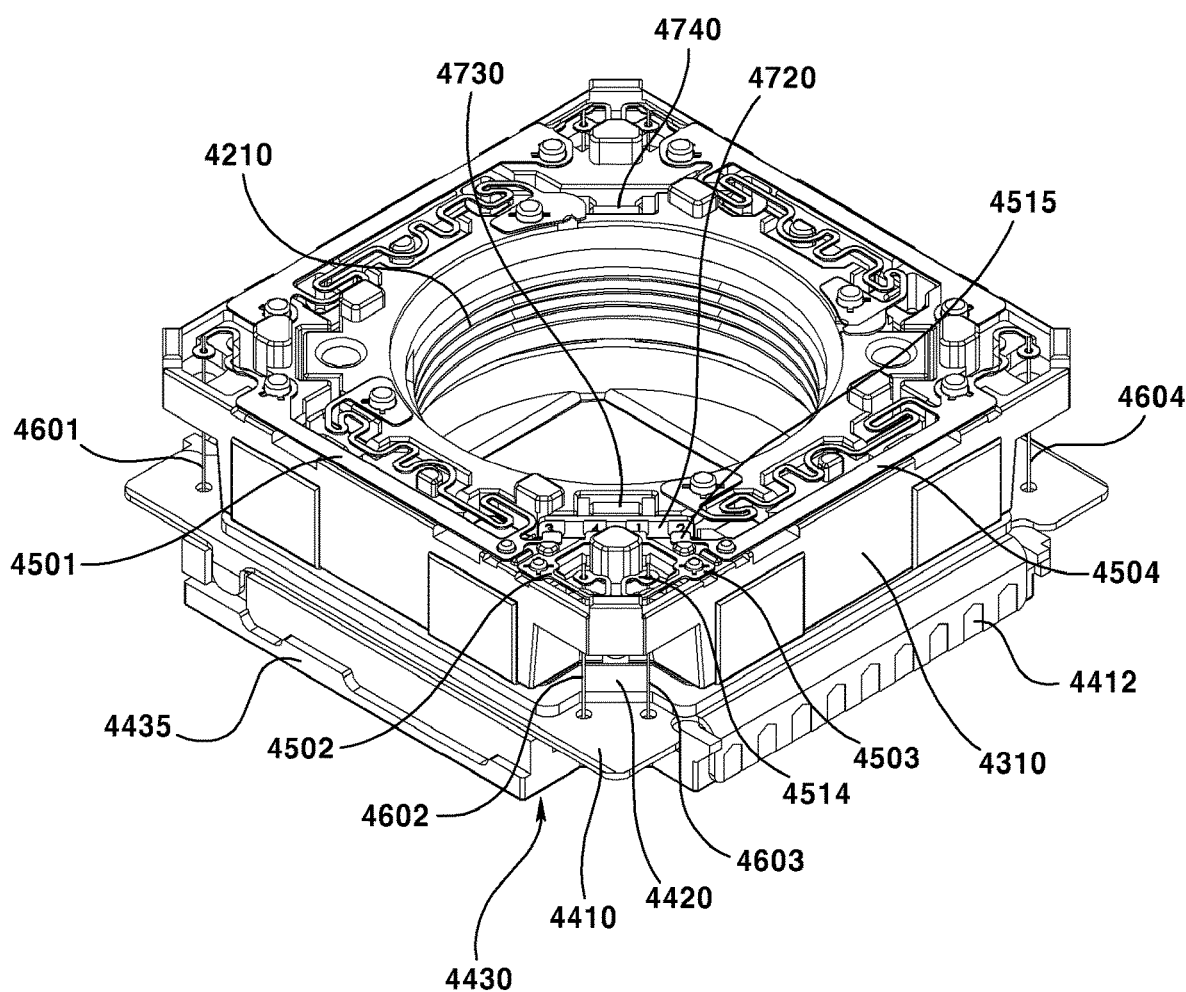
FIG. 28 is a perspective view illustrating a second lens driving device omitted of some elements according to a second exemplary embodiment.

FIG. 23 is an exploded perspective view illustrating a second lens driving device according to a second exemplary embodiment, FIG. 24 is an exploded perspective view illustrating a second AF mover and related configuration according to a second exemplary embodiment, FIG. 25 is an exploded perspective view illustrating a second OIS mover and related configuration according to a second exemplary embodiment, FIG. 26 is an exploded perspective view illustrating a second stator and related configuration according to a second exemplary embodiment, FIG. 27 is an exploded perspective view illustrating a second elastic member, a second support member and related configuration thereof according to a second exemplary embodiment, and FIG. 28 is a perspective view illustrating a second lens driving device omitted of some elements according to a second exemplary embodiment.

The second lens driving device (4000) may be spaced apart from the first lens driving device (3000). The second lens driving device (4000) may be arranged in parallel with the first lens driving device (3000). The second lens driving device (4000) may be arranged side by side with the first lens driving device (3000). The second lens driving device (4000) may be so disposed as to allow a surface facing the first lens driving device (3000) to be mutually in parallel. A fifth side surface (4301) of the second lens driving device (4000) may be overlapped with a first side surface (3301) of the first lens driving device (3000) to a direction perpendicular to a second optical axis. A second cover member (4100) of the second lens driving device (4000) may be spaced apart from a first cover member (3100) of the first lens driving device (3000) by 1 mm~5 mm. That is, a discrete distance (See L of FIG. 29) between the first and second cover members (3100, 4100) may be 1 mm~5 mm. Alternatively, a discrete distance (L) between the first and second cover members (3100, 4100) may be 1 mm~3 mm. Alternatively, a discrete distance (L) between the first and second cover members (3100, 4100) may be 1 mm.

The second lens driving device (4000) may comprise a second cover member (4100), a second AF mover (4200), a second OIS mover (4300), a second stator (4400), a second elastic member (4500), a second support member (4600), a second AF feedback sensor unit (4700) and a second OIS feedback sensor (4800). However, any one or more of the second cover member (4100), the second AF mover (4200), the second OIS mover (4300), the second stator (4400), the second elastic member (4500), the second support member (4600), the second AF feedback sensor unit (4700) and the second OIS feedback sensor (4800) may be omitted or changed from the second lens driving device (4000). In a modification, the second AF feedback sensor unit (4700) may be changed or omitted.

The second cover member (4100) may accommodate the second housing (4310) at an inside thereof. The second cover member (4100) may form an external shape of the second lens driving device (4000). The second cover member (4100) may take a bottom-opened cubic shape. However, the present invention is not limited thereto. The second cover member (4100) may be a non-magnetic substance. The second cover member (4100) may be formed with a metal material.

To be more specific, the second cover member (4100) may be formed with a metal plate. In this case, the second cover member (4100) may shield an EMI (Electro Magnetic Interference). Because of this characteristic of the second cover member (4100), the second cover member (4100) may be called an "EMI shield can". The second cover member (4100) can shield radio waves generated from outside of the second lens driving device (4000) from being introduced into the second cover member (4100). Furthermore, the second cover member (4100) may shield radio waves generated from inside of the second cover member (4100) from being discharged to outside of the second cover member (4100). However, the material of the second cover member (4100) is not limited thereto.

The second cover member (4100) may comprise an upper plate (4101) and a side plate (4102). The second cover member (4100) may comprise an upper plate (4101) and a side plate (4102) extended downwardly from an outside of the upper plate (4101). A lower end of the side plate (4102) of the second cover member (4100) may be mounted on a second base (4430). The lower end of the side plate (4102) of the second cover member (4100) may be coupled to a step (staircase, 4435) of the second base (4430). The second cover member (4100) may be mounted on the second base (4430) by being tightly coupled at an inner surface, in part or in whole, to a side surface of the second base (4430). An inner space formed by the second cover member (4100) and the second base (4430) may be disposed with a second AF mover (4200) and a second OIS mover (4300). Through this structure, the second cover member (4100) can protect inner elements from an outside shock and simultaneously inhibit an outside foreign object from being inwardly introduced. However, the present invention is not limited thereto, and a lower end of the side plate (4102) of the second cover member (4100) may be directly coupled to the second PCB (4001) disposed at a lower side of the second base (4430). Some portions of a plurality of side plates (4102) may face a first cover member (3100).

The second cover member (4100) may comprise an opening (4110). The opening (4110) may be formed on an upper plate (4101). The opening (4110) may expose the second lens module. The opening (4110) may be formed to correspond in shape to the second lens module. The size of the opening (4110) may be formed to be greater than a diameter of the second lens module in order to allow the second lens module to be assembled through the opening (4110). Meantime, a light having introduced through the opening (4110) may pass through the second lens module. At this time, the light having passed the second lens module may be obtained as an image by a second image sensor.

The second AF mover (4200) may be coupled to the second lens module. The second AF mover (4200) may accommodate the second lens module at an inside thereof. An inner periphery surface of the second AF mover (4200) may be coupled by an outer periphery surface of the second lens module. The second AF mover (4200) may integrally move along with the second lens module through an interaction with the second OIS mover (4300).

The second AF mover (4200) may be coupled to the second lens module which is one element of the second camera module, where the second lens module may be explained as an element of the lens driving device. The second AF mover (4200) may accommodate the second lens module at an inside thereof. An inner periphery surface of the second AF mover (4200) may be coupled by an outer periphery surface of the second lens module. The second AF mover (4200) may move through an interaction with the second OIS mover (4300) and/or the second stator (4400). At this time, the second AF mover (4200) may integrally move along with the second lens module. Meantime, the second AF mover (4200) may move for the AF function. However, the second AF mover (4200) is not limited to a member that moves for AF function only. The second AF mover (4200) may be also moved for OIS function. The second AF mover (4200) may comprise a second bobbin (4210) and a third coil (4220). However, any one or more of the second bobbin (4210) and the third coil (4220) may be omitted or changed from the second AF mover (4200).

The second bobbin (4210) may be disposed at an inside of a second housing (4310). The second bobbin (4210) may be disposed at a through hole (4311) of the second housing (4310). The second bobbin (4210) may move to an optical axis direction about the second housing (4310). The second bobbin (4210) may be so disposed at the through hole (4311) of the second housing (4310)

as to move along an optical axis. The second bobbin (4210) may be coupled with the second lens module. An inner periphery surface of the second bobbin (4210) may be coupled by an outer periphery surface of the second lens module. The second bobbin (4210) may be coupled by the third coil (4220). An outer periphery surface of the second bobbin (4210) may be coupled by the third coil (4220). A top surface of second bobbin (4210) may be coupled with the second upper elastic member (4510). A lower surface of the second bobbin (4210) may be coupled to the second lower elastic member (4520).

The second bobbin (4210) may comprise a through hole (4211), a driving part coupling part (4212), an upper coupling part (4213) and a lower coupling part (not shown). However, any one or more of the through hole (4211), the driving part coupling part (4212), the upper coupling part (4213) and the lower coupling part may be omitted or changed from the second bobbin (4210).

The through hole (4211) may be formed at an inside of the second bobbin (4210). The through hole (4211) may be formed with an upper/bottom opened shape. The through hole (4211) may be coupled by the second lens module. An inner periphery surface of the through hole (4211) may be formed with a screw thread with a shape corresponding to that formed on an outer periphery surface of the second lens module. That is, the through hole (4211) may be screw-connected to the second lens module. An adhesive may be interposed between the second lens module and the second bobbin (4210). At this time, the adhesive may be an epoxy hardened by any one or more of the UV (ultraviolet), heat or laser beam.

The driving part coupling part (4212) may be coupled by the third coil (4220). The driving part coupling part (4212) may be formed at an outer periphery surface of second bobbin (4210). The driving part coupling part (4212) may be formed by a groove formed by allowing a portion of an outer periphery surface of second bobbin (4210) to be inwardly recessed. At this time, at least a portion of the third coil (4220) may be accommodated into the driving part coupling part (4212). The driving part coupling part (4212) may be integrally formed with the outer periphery surface of second bobbin (4210). For example, the driving part coupling part (4212) may be continuously formed along the outer periphery surface of second bobbin (4210).

At this time, the driving part coupling part (4212) may be wound with the third coil (4220). In another example, the driving part coupling part (4212) may be formed in a plural number each spaced apart. At this time, the third coil (4220) may be formed in a plural number each being coupled to the driving part coupling part (4212). In still another example, the driving part coupling part (4212) may be formed with an upper-opened or a bottom-opened shape. At this time, the third coil (4220) may be coupled to the driving part coupling part (4212) by being inserted into the driving part coupling part (4212) through an opened area while being in a pre-wound state.

The upper coupling part (4213) may be coupled to the second upper elastic member (4510). The upper coupling part (4213) may be coupled to an inner periphery surface (4512) of the second upper elastic member (4510). The upper coupling part (4213) may be protrusively formed upwardly from a top surface of the second bobbin (4210). For example, the protruder of the upper coupling part (4213) may be coupled by being inserted into a groove or a hole of an inner periphery surface (4512) of the second upper elastic member (4510). At this time, the protruder of the upper coupling part (4213) may be fused while being inserted into a hole of the inner periphery surface (4512) to fix the second upper elastic member (4510) between the fused protruder and the second bobbin (4210).

The lower coupling part may be coupled to the second lower elastic member (4520). The lower coupling part may be coupled to an inner periphery surface (4522) of the second lower elastic member (4520). The lower coupling part may be protrusively formed downwardly from a lower surface of the second bobbin (4210). For example, the protruder of the lower coupling part may be coupled by being inserted into a groove or a hole of an inner periphery surface (4522) of the second lower elastic member (4520). At this time, the protruder of the lower coupling part may be fused while being inserted into a hole of the inner periphery surface (4522) to fix the second lower elastic member (4520) between the fused protruder and the second bobbin (4210).

The third coil (4220) may be disposed at the second bobbin (4210). The third coil (4220) may be disposed at an outer periphery surface of the second bobbin (4210). The third coil (4220) may face the second magnet (4320). In this case, when a current is supplied to the third coil (4220) to form a magnetic field about the third coil (4220), the third coil (4220) may move relative to the second magnet (4320) through an electromagnetic interaction between the third coil (4220) and the second magnet (4320). The third coil (4220) may electromagnetically interact with the second magnet (4320). The third coil (4220) may move the second bobbin (4210) to an optical axis direction relative to the second housing (4310) through an electromagnetic interaction with the second magnet (4320). At this time, the third coil (4220) may be called an "AF coil". For example, the third coil (4220) may be an integrally formed one coil. In another example, the third coil (4220) may comprise a plurality of coils each mutually spaced apart. The third coil (4220) may be formed with four (4) coils each mutually spaced apart. At this time, the four coils may be disposed at an outer periphery surface of the second bobbin (4210) to allow two adjacent coils to mutually form a 90°.

The third coil (4220) may comprise a pair of lead cables for power supply. The pair of lead cables on the third coil (4220) may be electrically connected to a fifth and sixth elastic units (4505, 4506) which are divisible elements of the second upper elastic member (4510). That is, the third coil (4220) may receive a power through the second upper elastic member (4510). To be more specific, the third coil (4220) may receive a power sequentially through the second PCB (4001), the second substrate (4410), the second support member (4600) and the second upper elastic member (4510). Alternatively, the third coil (4220) may receive a power through the second lower elastic member (4520).

The second OIS mover (4300) may accommodate, into an inside thereof, at least a portion of the second AF mover (4200). The second OIS mover (4300) may move the second AF mover (4200) or may move along with the second AF mover (4200). The second OIS mover (4300) may move through an interaction with the second stator (4400). The second OIS mover (4300) may move for the OIS function. The second OIS mover (4300) may move integrally along with the second AF mover (4200) when moved for OIS function.

The second OIS mover (4300) may comprise a second housing (4310) and a second magnet (4320). However, any one or more of the second housing (4310) and the second magnet (4320) may be omitted or changed from the second OIS mover (4300).

The second housing (4310) may be disposed at an outside of the second bobbin (4210). The second housing (4310) may accommodate, into an inside thereof, at least a portion of the second bobbin (4210). For example, the second housing (4310) may take a cubic shape. However, the second housing (4310) may comprise four (4) side surfaces and four (4) corner portions disposed among the four side surfaces. The second housing (4310) may be disposed with a second magnet (4320). For example, each of the four side surfaces of the second housing (4310) may be disposed with second magnet (4320). In another example, each of the four corner portions of the second housing (4310) may be disposed with a second magnet (4320). At least a portion of the outer periphery surface of the second housing (4310) may be formed with a shape corresponding to that of an inner periphery surface of the second cover member (4100). Particularly, the outer periphery surface of the second housing (4310) may be formed with a shape corresponding to an inner periphery surface of the side surface (4102) of the second cover member (4100). The second housing (4310) may be formed with an insulation material. The second housing (4310) may be formed with a material different from the second cover member (4100). The second housing (4310) may be formed with an injection in consideration of productivity. An outside lateral surface of the second housing (4310) may be spaced apart an inner side surface of the side plate (4102) of the second cover member (4100). The second housing (4310) may move at a discrete space between the second housing (4310) and the second cover member (4100) for OIS driving. A top surface of second housing (4310) may be coupled by the second upper elastic member (4510). A lower surface of the second housing (4310) may be coupled by the second lower elastic member (4520).

The second housing (4310) may comprise fifth to eighth side surfaces (4301, 4302, 4303, 4304). The second housing (4310) may comprise continuously-arranged fifth to eighth side surfaces (4301, 4302, 4303, 4304). The second housing (4310) may comprise a fifth side surface (4301) disposed with a fifth side surface magnet (4321), a sixth side surface (4302) disposed with a sixth side surface magnet (4322), a seventh side surface (4303) disposed with a seventh side surface magnet (4323), an eighth side surface (4304) disposed with an eighth side surface magnet (4324). The fifth side surface (4301) of the second housing (4310) at the second lens driving device (4000) may face the first side surface (3301) of the first housing (3310) at the first lens driving device (3000). The second housing (4310) may comprise a fifth side surface (4301), a seventh side surface (4303) disposed opposite to the fifth side surface (4301), and sixth and eighth side surfaces (4302, 4304) mutually oppositely disposed between the fifth and seventh side surfaces (4301, 4303).

The second housing (4310) may comprise fifth to eighth corner portions (4305, 4306, 4307, 4308). The second housing (4310) may comprise fifth to eighth corner portions (4305, 4306, 4307, 4308) disposed among the fifth to eighth side surfaces (4301, 4302, 4303, 4304). The fifth corner portion (4305) may be interposed between the fifth side surface (4301) and the sixth side surface (4302). The sixth corner portion (4306) may be interposed between the sixth side surface (4302) and the seventh side surface (4303). The seventh corner portion (4307) may be interposed between the seventh side surface (4303) and the eighth side surface (4304). The eighth corner portion (4308) may be interposed between the eighth side surface (4304) and the fifth side surface 4301).

The second housing (4310) may comprise a through hole (4311), a driving part coupling part (4312), an upper coupling part (4313), a lower coupling part (not shown) and a sensor coupling part (4315). However, any one or more of the through hole (4311), the driving part coupling part (4312), the upper coupling part (4313), the lower coupling part and the sensor coupling part (4315) may be omitted or changed from the second housing (4310).

The through hole (4311) may be formed at the second housing (4310). The through hole (4311) may be formed at an inside of the second housing (4310). The through hole (4311) may be so formed as to vertically penetrate the second housing (4310). The through hole (4311) may be disposed with the second bobbin (4210). The through hole (4311) may be movably disposed with the second bobbin (4210). At least a portion of the through hole (4311) may take a shape corresponding to that of the second bobbin (4210). An inner periphery surface of the second housing (4310) forming the through hole (4311) may be spaced apart from an outer periphery surface of the second bobbin (4210). However, an inner periphery surface of the second housing (4310) forming the through hole (4311) may be formed with a stopper inwardly disposed to restrict a mechanical movement of the second bobbin (4210) to an optical axis direction.

The driving part coupling part (4312) may be coupled by the second magnet (4320). The driving part coupling part (4312) may be formed at the second housing (4310). The driving part coupling part (4312) may be formed at an inner periphery surface of the second housing (4310). In this case, there is an advantage in the electromagnetic interaction of the second magnet (4320) disposed at the driving part coupling part (4312) with the third coil (4220) disposed at an inner side of the second magnet (4320). The driving part coupling part (4312) may take a bottom-opened shape. In this case, there is an advantage in the electromagnetic interaction of the second magnet (4320) disposed at the driving part coupling part (4312) with the fourth coil (4322) disposed at a lower side of the second magnet (4320). The driving part coupling part (4312) may be formed as a groove that is formed by allowing an inner periphery surface of the second housing (4310) to be outwardly recessed. At this time, the driving part coupling part (4312) may be formed in a plural number. Meantime, each of the plurality of driving part coupling parts (4312) may be accommodated by the second magnet (4320). For example, the driving part coupling part (4312) may be divided to four pieces. Each of the four driving part coupling parts (4312) may be disposed with the second magnet (4320). For example, the driving part coupling part (4312) may be formed at a side surface of the second housing (4310). In another example, the driving part coupling part (4312) may be formed at a corner portion of the second housing (4310).

The upper coupling part (4313) may be coupled with a second upper elastic member (4510). The upper coupling part (4313) may be coupled with an outer periphery surface (4511) of the second upper elastic member (4510). The upper coupling part (4313) may be protrusively formed from a top surface of the second housing (4310). For example, the protruder of the upper coupling part (4313) may be coupled by being inserted into a groove or a hole of an outer periphery surface (4511) of the second upper elastic member (4510). At this time, the protruder of the upper coupling part (4313) may be fused while being inserted into a hole of the outer periphery surface (4511) to fix the second upper elastic member (4510) between the fused protruder and a top surface of the second housing (4310).

The lower coupling part may be coupled to the second lower elastic member (4520). The lower coupling part may be coupled to an outer periphery surface (4521) of the second lower elastic member (4520). The lower coupling part may be protrusively formed downwardly from a lower surface of the second bobbin (4210). For example, the protruder of the lower coupling part may be coupled by being inserted into a groove or a hole of an outer periphery surface (4521) of the second lower elastic member (4520). At this time, the protruder of the lower coupling part may be fused while being inserted into a hole of the outer periphery surface (4521) to fix the second lower elastic member (4520) between the fused protruder and a lower surface of the second housing (4310).

The sensor coupling part (4315) may be disposed with at least a portion of the second AF feedback sensor unit (4700). The sensor coupling part (4315) may be disposed with the second AF feedback sensor (4710). The sensor coupling part (4315) may be disposed on the second housing (4310). The sensor coupling part (4315) may be formed with a groove formed by allowing a portion of a top surface of the second housing (4310) to be downwardly recessed. At this time, the sensor coupling part (4315) may be accommodated by at least a portion of the second AF feedback sensor (4710). Furthermore, at least a portion of the sensor coupling part (4315) may take a shape corresponding to that of the second AF feedback sensor (4710).

The second magnet (4320) may be disposed on the second housing (4310). The second magnet (4320) may be disposed at an outside of the third coil (4220). The second magnet (4320) may face the third coil (4220). The second magnet (4320) may electromagnetically interact with the third coil (4220). The second magnet (4320) may be disposed at a top surface of a fourth coil (4422). The second magnet (4320) may face the fourth coil (4422). The second magnet (4320) may electromagnetically interact with the fourth coil (4422). The second magnet (4320) may be co-used for AF function and for OIS function. However, the second magnet (4320) may comprise a plurality of magnets that are separately used for the AF function and the OIS function. For example, the second magnet (4320) may be disposed at a side surface of the second housing (4310). At this time, the second magnet (4320) may take a flat shape. In a modification, the second magnet (4320) may be disposed at a corner portion of the second housing (4310). At this time, the second magnet (4320) may be a corner magnet. The second magnet (4320) may take a cubic shape having a broader outer side surface than an inner side surface.

The second magnet (4320) may comprise fifth to eighth side surface magnets (4321, 4322, 4323, 4324). The second magnet (4320) may comprise fifth to eighth side surface magnets (4321, 4322, 4323, 4324), each mutually spaced apart from the other. The second magnet (4320) may comprise fifth to eighth side surface magnets (4321, 4322, 4323, 4324) each disposed at fifth to eighth side surfaces (4301, 4302, 4303, 4304) of the second housing (4310). The second magnet (4320) may comprise a fifth side surface magnet (4321) disposed at the fifth side surface (4301) of the second housing (4310). The second magnet (4320) may comprise a sixth side surface magnet (4322) disposed at a sixth side surface (4302) of the second housing (4310). The second magnet (4320) may comprise a seventh side surface magnet (4323) disposed at a seventh side surface (4303) of the second housing (4310). The second magnet (4320) may comprise an eighth side surface magnet (4324) disposed at an eighth side surface (4304) of the second housing (4310).

The fifth side surface magnet (4321) may be disposed at a fifth side surface (4301) of the second housing (4310). The fifth side surface magnet (4321) may be disposed closer to a fifth corner portion (4305) than an eighth corner portion (4308). The sixth side surface magnet (4322) may be disposed at a sixth side surface (4302) of the second housing (4310). The sixth side surface magnet (4322) may be disposed closer to the fifth corner portion (4305) than a sixth corner portion (4306). The seventh side surface magnet (4323) may be disposed at a seventh side surface (4303) of the second housing (4310). The seventh side surface magnet (4323) may be disposed closer to a seventh corner portion (4307) than the sixth corner portion (4306). The eighth side surface magnet (4324) may be disposed at an eighth side surface (4304) of the second housing (4310). The eighth side surface magnet (4324) may be disposed closer to a seventh corner portion (4307) than an eighth corner portion (4308).

The fifth to eighth side surface magnets (4321, 4322, 4323, 4324) may be mutually symmetrical about a second optical axis. The fifth side surface magnet (4321) may be symmetrical with the seventh side surface magnet (4323) about the second optical axis. The fifth side surface magnet (4321) may be disposed at a position symmetrical with the seventh side surface magnet (4323) about the second optical axis. The fifth side surface magnet (4321) may be formed with a size and a shape symmetrical with those of the seventh side surface magnet (4323) about the second optical axis. The sixth side surface magnet (4322) may be symmetrical with the eighth side surface magnet (4324) about the second optical axis. The sixth side surface magnet (4322) may be disposed at a position symmetrical with the eighth side surface magnet (4324) about the second optical axis. The sixth side surface magnet (4322) may be formed with a size and a shape symmetrical with those of the eighth side surface magnet (4324) about the second optical axis.

Each of the fifth to eighth side surface magnets (4321, 4322, 4323, 4324) may have a flat-plated shape. In this case, the fifth to eighth side surface magnets (4321, 4322, 4323, 4324) may be called "flat-plated magnets". The fifth to eighth side surface magnets (4321, 4322, 4323, 4324) may be so disposed as to allow each N pole to face an inside. Alternatively, the fifth to eighth side surface magnets (4321, 4322, 4323, 4324) may be so disposed as to allow each S pole to face inside.

The fifth to eighth side surface magnets (4321, 4322, 4323, 4324) may be symmetrical with first to fourth side surface magnets (4321, 4322, 4323, 4324) about a first virtual line which is an imaginary straight line. The first, virtual line may be disposed on a plane surface comprising first and second optical axes, and may be parallel with the first and second optical axes. Furthermore, the first virtual line may be spaced apart from the first and second optical axes at an equal distance.

The fifth side surface magnet (4321) may not be overlapped with the first side surface magnet (3321) to a direction perpendicular to the second optical axis. Alternatively, the fifth side surface magnet (4321) may be overlapped within a 30% area of an opposite surface with the first side surface magnet (3321) to a direction perpendicular to the second optical axis. Alternatively, the fifth side surface magnet (4321) may be overlapped within a 50% area of an opposite surface with the first side surface magnet (3321) to a direction perpendicular to the second optical axis.

The second magnet (4320) may be formed with a shape corresponding to that of the first magnet (3320). The second magnet (4320) may be formed with a width same as that of the first magnet (3320). The second magnet (4320) may have a same height as that of the first magnet (3320). The second magnet (4320) may have a same thickness as that of the first magnet (3320). A position disposed by the second magnet (4320) in the second lens driving device (4000) may correspond to that disposed by the first magnet (3320) in the first lens driving device (3000). The third coil (4220) may have eight side surfaces, and the second magnet (4320) may be so disposed as to face any one side surface of eight side surfaces at the third coil (4220). A length of the second magnet (4320) may be shorter than a length of an opposite surface of the third coil (4220). The third coil (4220) may have eight side surfaces, and the second sensing magnet (4730) may be so disposed as to allow facing any one side surface of the eight side surfaces in the third coil (4220). The third coil (4220) may have eight side surfaces, and a second compensation magnet (4740) may be so disposed as to allow facing any one side surface of the eight side surfaces in the third coil (4220).

The second stator (4400) may be disposed at a lower side of the second housing (4310). The second stator (4400) may be disposed at a lower side of the second OIS mover (4300). The second stator (4400) may face the second OIS mover (4300). The second stator (4400) may movably support the second OIS mover (4300). The second stator (4400) may move the second OIS mover (4300). At this time, the second AF mover (4200) may move along with the second OIS mover (4300).

The second stator (4400) may comprise a second substrate (4410), a second circuit member (4420) and a second base (4430). However, any one or more of the second substrate (4410), the second circuit member (4420) and the second base (4430) may be omitted or changed from the second stator (4400).

The second substrate (410) may supply a power to a fourth coil (4422). The second substrate (4410) may be coupled with the second circuit member (4420). The second substrate (4410) may be coupled with a second PCB (4001) disposed at a lower side of the second base (4430). The second substrate (4410) may be disposed at a lower surface of the second circuit member (4420). The second substrate (4410) may be disposed at a top surface of the second base (4430). The second substrate (4410) may be interposed between the second circuit member (4420) and the second base (4430). The second substrate (4410) may be coupled by a second support member (4600). The second substrate (4410) may be formed with a hole passed through by the second support member (4600). A lower surface of the second substrate (4410) and a lower end of the second support member (4600) may be coupled by soldering.

The second substrate (4410) may comprise a flexible PCB (FPCB, Flexible Printed Circuit Board). The second substrate (4410) may be partially bent. The second substrate (4410) may supply a current to the third coil (4220). The second substrate (4410) may supply a current to the third coil (4220) through the second support member (4600) and the second upper elastic member (4510). The second substrate (4410) may supply a current to a substrate (4720) of the second AF feedback sensor unit (4700) through the second support member (4600) and the second upper elastic member (4510). The current supplied to the substrate (4720) may be used for driving the second AF feedback sensor (4710).

The second substrate (4410) may comprise an opening (4411) and a terminal part (4412). However, any one or more of the opening (4411) and the terminal part (4412) may be omitted or changed from the second substrate (4410).

The opening (4411) may be formed on the second substrate (4410). The opening (4411) may be formed at a center of the second substrate (410). The opening (411) may be formed by allowing the second substrate (4410) to pass therethrough. The opening (4411) may pass a light having passed through the second lens module. The opening (4411) may be formed in a round shape. However, the shape of the opening (4411) is not limited thereto.

The terminal part (4412) may be formed on the second substrate (4410). The terminal part (4412) may be formed by a portion of the second substrate (4410) being downwardly bent. At least a portion of the terminal part (4412) may be exposed to an outside. The terminal part (4412) may be coupled to the second PCB (4001) disposed at a lower side of the second base (4430) by way of soldering. A lower end of the terminal part (4412) may directly contact the second. PCB (4001). The terminal part (4412) may be disposed at a terminal coupling part (4434) of the second base (4430).

The second circuit member (4420) may be disposed at the second base (4430). The second circuit member (4420) may be disposed at the second substrate (4410). The second circuit member (4420) may be disposed at a top surface of second substrate (4410). The second circuit member (4420) may be disposed at a lower side of the second magnet (4320). The second circuit member (4420) may be interposed between the second magnet (4320) and the second base (4430). The second circuit member (4420) may be coupled by the second support member (4600). The second circuit member (4420) may movably support the second OIS mover (4300).

The second circuit member (4420) may comprise a substrate part (4421) and a fourth coil (4422). However, any one or more of the substrate part (4421) and the fourth coil (4422) may be omitted or changed from the second circuit member (4420).

The substrate part (4421) may be a circuit substrate. The substrate part (4421) may be an FPCB. The substrate part (4421) may be integrally formed with the fourth coil (4422). The substrate part (4421) may be coupled by the second support member (4600). The substrate part (4421) may be formed with a hole through which the second support member (4600) can pass by. A lower surface of substrate part (4421) and a lower end of the second support member (4600) may be coupled by soldering. The substrate part (4421) may be formed with an opening. The substrate part (4421) may be formed with an opening which passes through the substrate part (4421). The opening of the substrate part (4421) may be so formed as to correspond to the opening (4411) of the second substrate (4410).

The fourth coil (4422) may face the second magnet (4320). In this case, when a current is supplied to the fourth coil (4422) to form a magnetic field about the fourth coil (4422), the second magnet (4320) may move to the fourth coil (4422) through an electromagnetic interaction between the fourth coil (4422) and the second magnet (4320). The fourth coil (4422) may electromagnetically interact with the second magnet (4320). The fourth coil (4422) may move the second housing (4310) and the second bobbin (4210) relative to the second base (4430) through the electromagnetic interaction with the second magnet (4320) to a direction perpendicular to an optical axis. The fourth coil (4422) may comprise at least one coil. The fourth coil (4422) may be an FP coil (Fine Pattern coil) integrally formed at the substrate part (4421). The fourth coil (4422) may comprise a plurality of coils each mutually spaced apart from the other coil. The fourth coil (4422) may comprise four coils each mutually spaced apart from the other coil. At this time, the four coils may be disposed at the substrate part (4421) to allow the adjacent two coils to mutually form a 90°. Meantime, each of the four coils may be separately controlled. The fourth coil (4422) may receive a power sequentially through the second PCB (4001), the second substrate (4410) and the substrate part (4421).

The second base (4430) may be disposed at a lower surface of second substrate (4410). A top surface of second base (4430) may be disposed with the second substrate (4410). The second base (4430) may be disposed with the second circuit member (4420). The second base (4430) may be coupled with the second cover member (4100). The second base (4430) may be disposed at a top surface of second PCB (4001). However, a separate holder member may be interposed between the second base (4430) and the second PCB (4001). The second base (4430) may perform the function of a sensor holder protecting the second image sensor mounted on the second PCB (4001).

The second base (4430) may comprise a through hole (4431), a foreign object collection part (4432), a sensor coupling part (4433), a terminal coupling part (4434) and a step (staircase) part (4435). However, any one or more of the through hole (4431), the foreign object collection part (4432), the sensor coupling part (4433), the terminal coupling part (4434) and the step part (4435) may be omitted or changed from the second base (4430).

The through hole (4431) may be disposed on the second base (4430). The through hole (4431) may be so formed as to vertically penetrate the second base (4430). The through hole (4431) may be disposed with an infrared filter. However, the infrared filter may be coupled to a separate holder member disposed at a lower surface of second base (4430). A light having passed the second lens module through the through hole (4431) may be incident on the image sensor. That is, the light having passed through the second lens module may be incident on the image sensor through the opening of the second circuit member (4420), an opening (4411) of second substrate (4410) and the through hole (4431) of the second base (4430). The through hole (4431) may be so formed as to have a round shape. However, the shape of the through hole (4431) is not limited thereto.

The foreign object collection part (4432) may collect foreign objects introduced into the second lens driving device (4000). The foreign object collection part (4432) may comprise a groove formed by allowing a top surface of the second base (4430) to be downwardly recessed, and an adhesive part disposed on the groove. The adhesive part may comprise an adhesive material. The foreign objects introduced into the second lens driving device (4000) may be adhered by the adhesive part.

The sensor coupling part (4433) may be disposed at the second OIS feedback sensor (4800). The sensor coupling part (4433) may accommodate at least a portion of the second OIS feedback sensor (4800). The sensor coupling part (4433) may be formed by a groove formed by allowing a top surface of the second base (4430) to be downwardly recessed. The sensor coupling part (4433) may be spaced apart from the foreign object collection part (4432). The sensor coupling part (4433) may be formed by a plurality of grooves. For example, the sensor coupling part (4433) may be formed with two grooves. At this time, each of the two grooves may be disposed with a second OIS feedback sensor (4800).

The terminal coupling part (4434) may be disposed with the terminal part (4412) of the second substrate (4410). The terminal coupling part (4434) may be formed with a groove by allowing a portion of one side surface of second base (4430) to be inwardly recessed. At this time, the terminal coupling part (4434) may be accommodated by at least a portion of the terminal part (4412) of the second substrate (4410). A width of the terminal coupling part (4434) may be so formed as to correspond to that of the terminal part (4412) of second substrate (4410). A length of the terminal coupling part (4434) may be so formed as to correspond to that of the terminal part (4412) of second substrate (4410).

The step part (4435) may be formed at a side surface of second base (4430). The step part (4435) may be so formed as to surround an outer periphery surface of the second base (4430). The step part (4435) may be formed by allowing a top surface of a side surface of the second base (4430) to be recessed. Alternatively, the step part (435) may be formed by allowing a lower surface of side surface of the second base (4430) to be protruded. The step part (4435) may be disposed with a lower end of the side plate (4102) of the second cover member (4100).

The second elastic member (4500) may be coupled to the second bobbin (4210) and to the second housing (4310). The second elastic member (4500) may elastically support the second bobbin (4210). The second elastic member (4500) may have elasticity on at least a portion thereof. The second elastic member (4500) may movably support the second bobbin (4210). The second elastic member (4500) may movably support the second bobbin (4210) relative to the second housing (4310) to an optical axis. That is, the second elastic member (4500) may support in such a manner that the second bobbin (4210) performs the AF driving. At this time, the second elastic member (4500) may be called an "AF elastic member".

The second elastic member (4500) may comprise a second upper elastic member (4510) and a second lower elastic member (4520). However, any one or more of the second upper elastic member (4510) and the second lower elastic member (4520) may be omitted or changed from the second elastic member (4500).

The second upper elastic member (4510) may be disposed at an upper side of the second bobbin (4210), and may be coupled to the second bobbin (4210) and to the second housing (4310). The second upper elastic member (4510) may be coupled to the second bobbin (4210) and to the second housing (4310). The second upper elastic member (4510) may be coupled to a top surface of second bobbin (4210) and to a top surface of the second housing (4310). The second upper elastic member (4510) may elastically support the second bobbin (4210). The second upper elastic member (4510) may have elasticity on at least a portion thereof. The second upper elastic member (4510) may movably support the second bobbin (4210). The second upper elastic member (4510) may movably support the second bobbin (4210) relative to the second housing (4310) to an optical axis direction. The second upper elastic member (4510) may be formed with a leaf spring.

The second upper elastic member (4510) may be formed with a plurality of divisive elements. The second upper elastic member (4510) may comprise six (6) elastic units (4501, 4502, 4503, 4504, 4505, 4506), each spaced apart from the other units. However, any one or more of six (6) elastic units (4501, 4502, 4503, 4504, 4505, 4506) may be omitted or changed from the second upper elastic member (4510).

The first to sixth elastic units (4501, 4502, 4503, 4504, 4505, 4506) may be mutually spaced apart, through which, the first to sixth elastic units (4501, 4502, 4503, 4504, 4505, 4506) may be used as a conductive lines inside the second lens driving device (4000). The first to sixth elastic units (4501, 4502, 4503, 4504, 4505, 4506) may be electrically connected to the second substrate (4410) through the second support member (4600). The first to fourth elastic units (4501, 4502, 4503, 4504) may be coupled to the substrate (4720) of the second AF feedback sensor unit (4700), through which the first to fourth elastic units (4501, 4502, 4503, 4504) may be electrically connected to the second AF feedback sensor (4710). At this time, the fifth and sixth elastic units (4505, 4506) may be electrically connected to the third coil (4220). That is, the first to sixth elastic units (4501, 4502, 4503, 4504, 4505, 4506) may be used for supplying a power to the second AF feedback sensor (4710) disposed at the second housing (4310) and to the third coil (4220) disposed at the second bobbin (4210).

The second upper elastic member (4510) may comprise an external part (4511), an internal part (4512), a connection part (4513), a coupling part (4514) and a terminal part (4515). However, any one or more of the external part (4511), the internal part (4512), the connection part (4513), the coupling part (4514) and the terminal part (4515) may be omitted or changed from the second upper elastic member (4510).

The external part (4511) may be coupled to the second housing (4310). The external part (4511) may be coupled to a top surface of the second housing (4310). The external part (4511) may be coupled to an upper coupling part (4313) of the second housing (4310). The external part (4511) may comprise a hole or a groove coupled to the upper coupling part (4313) of the second housing (4310).

The internal part (4512) may be coupled to the second bobbin (4210). The internal part (4512) may be coupled to a top surface of the second bobbin (4210). The internal part (4512) may be coupled to the upper coupling part (4213) of the second bobbin (4210). The internal part (4512) may comprise a hole or a groove coupled to the upper coupling part (4213) of the second bobbin (4210).

The connection part (4513) may connect the external part (4511) and the internal part (4512). The connection part (4513) may elastically connect the external part (4511) and the internal part (4512). The connection part (4513) may have elasticity. At this time, the connection part (4513) may be called an "elastic part". The connection part (4513) may be formed by being bent more than twice.

The coupling part (4514) may be coupled to a second support member (4600). The coupling part (4514) may be coupled to the second support member (4600) by way of soldering. For example, the coupling part (4514) may comprise a hole passed through by the second support member (4600). In another example, the coupling part (4514) may comprise a groove coupled by the second support member (4600). The coupling part (4514) may be extended from the external part (4511). The coupling part (4514) may be extended from the external part (4511) to an outside. The coupling part (4514) may comprise a bent part formed by being bent.

The terminal part (4515) may be extended from the external part (4511). The terminal part (4515) may be electrically connected to the substrate (4720) of the second AF feedback sensor unit (4700). The terminal part (4515) may be coupled to a terminal of the substrate (4720) of the second AF feedback sensor unit (4700) by way of soldering. The terminal part (4515) may comprise a total of four pieces.

The second lower elastic member (4520) may be disposed at a lower side of second bobbin (4210) and may be coupled to the second bobbin (4210) and the second housing (4310). The second lower elastic member (4520) may be coupled to the second bobbin (4210) and the second housing (4310). The second lower elastic member (4520) may be coupled to a lower surface of second bobbin (4210) and to a lower surface of second housing (4310). The second lower elastic member (4520) may elastically support the second bobbin (4210). The second lower elastic member (4520) may have elasticity on at least a portion thereof. The second lower elastic member (4520) may movably support the second bobbin (4210). The second lower elastic member (4520) may movably support the second bobbin (4210) relative to the second housing (4310) to an optical axis direction. The second lower elastic member (4520) may be formed with a leaf spring. For example, the second lower elastic member (4520) may be integrally formed.

The second lower elastic member (4520) may comprise an external part (4521), an internal part (4522) and a connection part (4523). However, any one or more of the external part (4521), the internal part (4522) and the connection part (4523) may be omitted or changed from the second lower elastic member (4520).

The external part (4521) may be coupled to the second housing (4310). The external part (4521) may be coupled to a lower surface of the second housing (4310). The external part (4521) may be coupled to a lower coupling part of the second housing (4310). The external part (4521) may comprise a hole or a groove coupled to the lower coupling part of the second housing (4310).

The internal part (4522) may be coupled to the second bobbin (4210). The internal part (4522) may be coupled to a top surface of the second bobbin (4210). The internal part (4522) may be coupled to a lower coupling part of the second bobbin (4210). The internal part (4522) may comprise a hole or a groove coupled to the lower coupling part of the second bobbin (4210).

The connection part (4523) may connect the external part (4521) and the internal part (4522). The connection part (4523) may elastically connect the external part (4521) and the internal part (4522). The connection part (4523) may have elasticity. At this time, the connection part (4523) may be called an "elastic part". The connection part (4523) may be formed by being bent more than twice.

The second support member (4600) may movably support the second housing (4310). The second support member (4600) may elastically support the second housing (4310). The second support member (4600) may have elasticity on at least a portion thereof. At this time, the second support member (4600) may be called an "elastic member". For example, the second support member (4600) may movably support the second housing (4310) relative to the second stator (4400) to a direction perpendicular to the optical axis. At this time, the second bobbin (4210) may integrally move with the second housing (4310). In another example, the second support member (4600) may tiltably support the second housing (4310) relative to the second stator (4400). That is, the second support member (4600) may support the second housing (4310) and the second bobbin (4210) in such a manner that the second housing (4310) and the second bobbin (4210) can perform the OIS driving. At this time, the second support member (4600) may be called an "OIS support member". For example, the second support member (4600) may be formed with a wire. In another example, the second support member (4600) may be formed with a leaf spring.

The second support member (4600) may be coupled to the second upper elastic member (4510) and the second stator (4400). A lower end of the second support member (4600) may be coupled to the second substrate (4410). The second support member (4600) may pass through the second substrate (4410). Through this structure, the lower end of the second support member (4600) may be coupled to a lower surface of the second substrate (4410) by way of soldering. An upper end of the second support member (4600) may be coupled to a coupling part (4514) of the second upper elastic member (4510). An upper end of the second support member (4600) may pass through the coupling part (4514) of the second upper elastic member (4510). Through this structure, an upper end of the second support member (4600) may be coupled to a top surface of the coupling part (4514) of the second upper elastic member (4510) by way of soldering. In a modification, the lower end of the second support member (4600) may be coupled to the substrate part (4421) of the second circuit member (4420). The lower end of the second support member (4600) may be coupled to the second base (4430). The upper end of the second support member (4600) may be coupled to the second housing (4310). However, the structure of the second support member (4600) is not limited thereto, and may comprise any structure capable of movably supporting the second OIS mover (4300) relative to the second stator (4400).

The second support member (4600) may be formed with a plurality of divisive elements. The second support member (4600) may be formed with six (6) support parts (4601, 4602, 4603, 4604, 4605, 4606) each mutually spaced apart. The second support member (4600) may comprise first to sixth support parts (4601, 4602, 4603, 4604, 4605, 4606) each mutually spaced apart. However, any one or more of the first to sixth support parts (4601, 4602, 4603, 4604, 4605, 4606) may be omitted or changed from the second support member (4600). Particularly, the second support member (4600) may be formed with first to sixth support parts (4601, 4602, 4603, 4604, 4605, 4606) in order to pair with first to sixth elastic units support (4501, 4502, 4503, 4504, 4505, 4506) of the second upper elastic member (4510). However, as a modification, the second support member (4600) may be formed with eight support parts in consideration of symmetry.

The first to sixth support parts (4601, 4602, 4603, 4604, 4605, 4606) may be mutually spaced apart, through which the first to sixth support parts (4601, 4602, 4603, 4604, 4605, 4606) may be used as conductive lines within the second lens driving device (4000). The first to sixth support parts (4601, 4602, 4603, 4604, 4605, 4606) may be couple to the second substrate (4410). The first to sixth support parts (4601, 4602, 4603, 4604, 4605, 4606) may be coupled to the second upper elastic member (4510). That is, the first to sixth support parts (4601, 4602, 4603, 4604, 4605, 4606) may electrically connect the second substrate (4410) and the second upper elastic member (4510). The first support part (4601) may be coupled to the first elastic unit (4501), the second support part (4602) may be coupled to the second elastic unit (4502), the third support part (4603) may be coupled to the third elastic unit (4503), the fourth support part (4604) may be coupled to the fourth elastic unit (4504), the fifth support part (4605) may be coupled to the fifth elastic unit (4505), and the sixth support part (4606) may be coupled to the sixth elastic unit (4506). Each of the first to sixth support parts (4601, 4602, 4603, 4604, 4605, 4606) may be a wire.

A damper (not shown) may be disposed on the second support member (4600). The damper may be disposed on the second support member (4600) and the second housing (4310). The damper may be disposed on the second elastic member (4500). The damper may be disposed on the second elastic member (4500) and/or the second support member (4600) to inhibit the resonance phenomenon generated from the second elastic member (4500) and/or the second support member (4600). A shock absorption part (not shown) may be provided to any one or more of the second elastic member (4500) and the second support member (4600). The shock absorption part may be formed by allowing a shape of a portion of the second elastic member (4500) and/or the second support member (4600) to be changed.

The second AF feedback sensor unit (4700) may be provided for AF feedback. The second AF feedback sensor unit (4700) may detect the movement of the second bobbin (4210) to an optical axis direction. The second AF feedback sensor unit (4700) may detect the movement the second bobbin (4210) to an optical axis direction for supply of the movement to the controller in real time.

The second AF feedback sensor unit (4700) may comprise a second AF feedback sensor (4710), a substrate (4720) and a second sensing magnet (4730). However, any one or more of the second AF feedback sensor (4710), the substrate (4720) and the second sensing magnet (4730) may be omitted or changed from the second AF feedback sensor unit (4700). Furthermore, the second AF feedback sensor unit (4700) may further comprise a second compensation magnet (4740). However, the second compensation magnet (4740) is an element having nothing to do with the position sensing of the second bobbin (4210), and therefore, may be explained as a separate element from the second AF feedback sensor unit (4700).

The second AF feedback sensor (4710) may be disposed on the second housing (4310). The second AF feedback sensor (4710) may be arranged on the second housing (4310). The second AF feedback sensor (4710) may be disposed at a corner portion of the second housing (4310). The second AF feedback sensor (4710) may be disposed on a corner portion most spaced apart from a first sensing magnet (3730) among a plurality of corner portions of the second housing (4310). The second AF feedback sensor (4710) may be disposed on a corner portion most spaced apart from a first AF feedback sensor (3710) among a plurality of corner portions of the second housing (4310). Through this structure, the second AF feedback sensor (4710) and the first AF feedback sensor (3710) may be maximally spaced apart within a limited space. The second AF feedback sensor (4710) may be disposed on a sixth corner portion (4306) of the second housing (4310). The second AF feedback sensor (4710) may be interposed between sixth and seventh side surfaces (4302, 4303). The second AF feedback sensor (4710) may be disposed on a virtual straight line connecting a sixth corner portion (4306) and an eighth corner portion (4308). That is, all the second AF feedback sensor (4710), the second sensing magnet (4730), and the second compensation magnet (4740) may be disposed on the virtual straight line connecting the sixth corner portion (4300) and the eighth corner portion (4308) of the second housing (4310).

The second AF feedback sensor (4710) may be disposed on a substrate (4720). The second. AF feedback sensor (4710) may be coupled to the substrate (4720). The second AF feedback sensor (4710) may be electrically connected to the substrate (4720). The second AF feedback sensor (4710) may be mounted on the substrate (4720). The second AF feedback sensor (4710) may be coupled to the substrate (4720) using the SMT (Surface Mounter Technology). The second AF feedback sensor (4710) may be mounted on a sensor mounting part of substrate (4720). The second AF feedback sensor (4710) may detect the second sensing magnet (4730). The second AF feedback sensor (4710) may comprise a Hall IC detecting a magnetic field of a magnet.

The second AF feedback sensor (4710) may comprise a Hall-integrated driver. The second AF feedback sensor (4710) may comprise a temperature detection function.

The second AF feedback sensor (4710) is fixed to the second housing (4310) and the second sensing magnet (4730) is fixed to the second bobbin (4210). When the second sensing magnet (4730) moves along with the second bobbin (4210), the magnetic flux density detected by the Hall IC inside the second AF feedback sensor (4710) may be changed in response to a relative position of the second AF feedback sensor (4710) and the second sensing magnet (4730). The second AF feedback sensor (4710) may detect a position of the second lens module using an output voltage of Hall IC in proportion to a magnetic flux density that changes in response to the relative position of the second AF feedback sensor (4710) and the second sensing magnet (4730).

The substrate (4720) may be disposed on the second housing (4310). The substrate (4720) may be coupled to the second AF feedback sensor (4710). The substrate (4720) may be electrically connected to the second AF feedback sensor (4710). The substrate (4720) may be coupled to the second upper elastic member (4510). The substrate (4720) may be electrically connected to first to fourth elastic units (4501, 4502, 4503, 4504) of the second upper elastic member (4510). The substrate (4720) may comprise four (4) terminals coupled to the first to fourth elastic units (4501, 4502, 4503, 4504) of second upper elastic member (4510). The substrate (4720) and the second upper elastic member (4510) may be coupled by way of soldering. A top surface of the substrate (4720) may be coupled to the first to fourth elastic units (4501, 4502, 4503, 4504) of the second upper elastic member (4510), and a lower surface of the substrate (4720) may be coupled to the second AF feedback sensor (4710).

The second sensing magnet (4730) may be disposed at a side surface of the second bobbin (4210) facing the sixth corner portion (4306) between the sixth and seventh side surfaces (4302, 4303) of the second housing (4310). The second sensing magnet (4730) may be disposed on the second bobbin (4210). The second sensing magnet (4730) may be arranged on the second bobbin (4210). The second sensing magnet (4730) may be detected by the second AF feedback sensor (4710). The second sensing magnet (4730) may be disposed at a corner of the second bobbin (4210). The second sensing magnet (4730) may be so disposed as to face the sixth corner portion (4306) of the second housing (4310). The second sensing magnet (4730) may be disposed on a virtual straight line connecting the sixth corner portion (4306) and the eighth corner portion (4308). The second sensing magnet (4730) may be symmetrical with the second compensation magnet (4740) about the second bobbin (4210). The second sensing magnet (4730) may have a magnetism corresponding to that of the second compensation magnet (4740). The second sensing magnet (4730) may be disposed at one side of the second bobbin (4210). The second sensing magnet (4730) may be overlapped with the third coil (4220) to a direction perpendicular to the second optical axis.

The second sensing magnet (4730) may be disposed at an inside of the third coil (4220). The third coil (4220) may comprise eight (8) side surfaces, and the second sensing magnet (4730) may be disposed at an inside of the third coil (4220) to allow facing any one side surface of the eight side surfaces of the third coil (4220). The second sensing magnet (4730) may be disposed at an outside of the third coil (4220). The second sensing magnet (4730) may be interposed between the third coil (4220) and the second AF feedback sensor (4710). In this case, a detection value detected by the second AF feedback sensor (4710) may be great because a distance between the second sensing magnet (4730) and the second AF feedback sensor (4710) come nearer over a case where the second sensing magnet (4730) is disposed at an inside of the third coil (4220). The second sensing magnet (4730) may be magnetized to four (4) poles and may be disposed in consideration of a relative position with the second AF feedback sensor (4710) to allow using only a section where a Hall output is positive. The second sensing magnet (4730) may be so disposed to allow an S pole to be formed at an upper inside, an N pole to be formed at an upper outside, an N pole to be formed at a lower inside and an S pole to be formed at a lower outside.

The second compensation magnet (4740) may be so disposed as to implement a magnetic balance with the second sensing magnet (4730). The second compensation magnet (4740) may be disposed on the second bobbin (4210). The second compensation magnet (4740) may be arranged on the second bobbin (4210). The second compensation magnet (4740) may be symmetrical with the second sensing magnet (4730) about the second optical axis. The second compensation magnet (4740) may be symmetrical with the second sensing magnet (4730) about the second bobbin (4210). The second compensation magnet (4740) may have a magnetism corresponding to that of the second sensing magnet (4730). The second compensation magnet (4740) may be disposed at the other side of the second bobbin (4210) corresponding to an opposite side of one side of the second bobbin (4210) disposed with the second sensing magnet (4730). The second compensation magnet (4740) may be disposed on a virtual straight line connecting the sixth corner portion (4306) and the eighth corner portion (4308). The second compensation magnet (4740) may be so disposed as to be symmetrical with the second sensing magnet (4730) about the second optical axis. Through this structure, an electromagnetic balance between the second sensing magnet (4730) and the second compensation magnet (4740) may be realized. As a result, an influence affecting on the electromagnetic interaction between the second sensing magnet (4730) and the third coil (4220) by the second sensing magnet (4730) may be minimized.

The second compensation magnet (4740) may be disposed at an inside of the third coil (4220). The third coil (4220) may comprise eight (8) side surfaces, and the second compensation magnet (4740) may be disposed at an inside of the third coil (4220) to allow facing any one side surface of the eight side surfaces of the third coil (4220). The second compensation magnet (4740) may be disposed at an outside of the third coil (4220).

The second OIS feedback sensor (4800) may be provided for the OIS feedback. The second OIS feedback sensor (4800) may detect the movement of second housing (4310). The second OIS feedback sensor (4800) may detect the movement or tilt to a direction perpendicular to an optical axis of the second housing (4310) and/or the second bobbin (4210). The second OIS feedback sensor (4800) may detect the second magnet (4320). The second OIS feedback sensor (4800) may detect the second magnet (4320) disposed on the second housing (4310). The second OIS feedback sensor (4800) may detect the position of the second housing (4310). The second OIS feedback sensor (4800) may detect the amount of movement to a direction perpendicular to an optical axis of the second housing (4310). At this time, the amount of movement to a direction perpendicular to an optical axis of second housing (4310) may correspond to that of the second bobbin (4210) and to that of the lens module coupled to the second bobbin (4210). The second OIS feedback sensor (4800) may be disposed on the second stator (4400). The second OIS feedback sensor (4800) may be disposed at a lower surface of the second substrate (4410). The second OIS feedback sensor (4800) may be electrically connected to the second substrate (4410). The second OIS feedback sensor (4800) may be disposed on the second base (4430). The second OIS feedback sensor (4800) may be accommodated into a sensor coupling part (4433) formed at a top surface of second base (4430). The second OIS feedback sensor (4800) may be a Hall sensor. The second OIS feedback sensor (4800) may be a Hall IC Mall integrated circuit). The second OIS feedback sensor (4800) may detect a magnetic force of the second magnet (4320). That is, when the second housing (4310) moves, the second OIS feedback sensor (4800) may detect the displacement volume of the second housing (4310) by detecting a change in the magnetic force that changes in response to the movement of the second magnet (4320). The second OIS feedback sensor (4800) may be provided in a plural number. The second OIS feedback sensor (4800) may comprise a first axis sensor (4810) and a second axis sensor (4820). At this time, the first axis sensor (4810) may detect the movement of the second housing (4310) to an x axis (z axis is optical axis) direction and the second axis sensor (4820) may detect the movement of second housing (4310) to a y axis direction.

Figure 29:
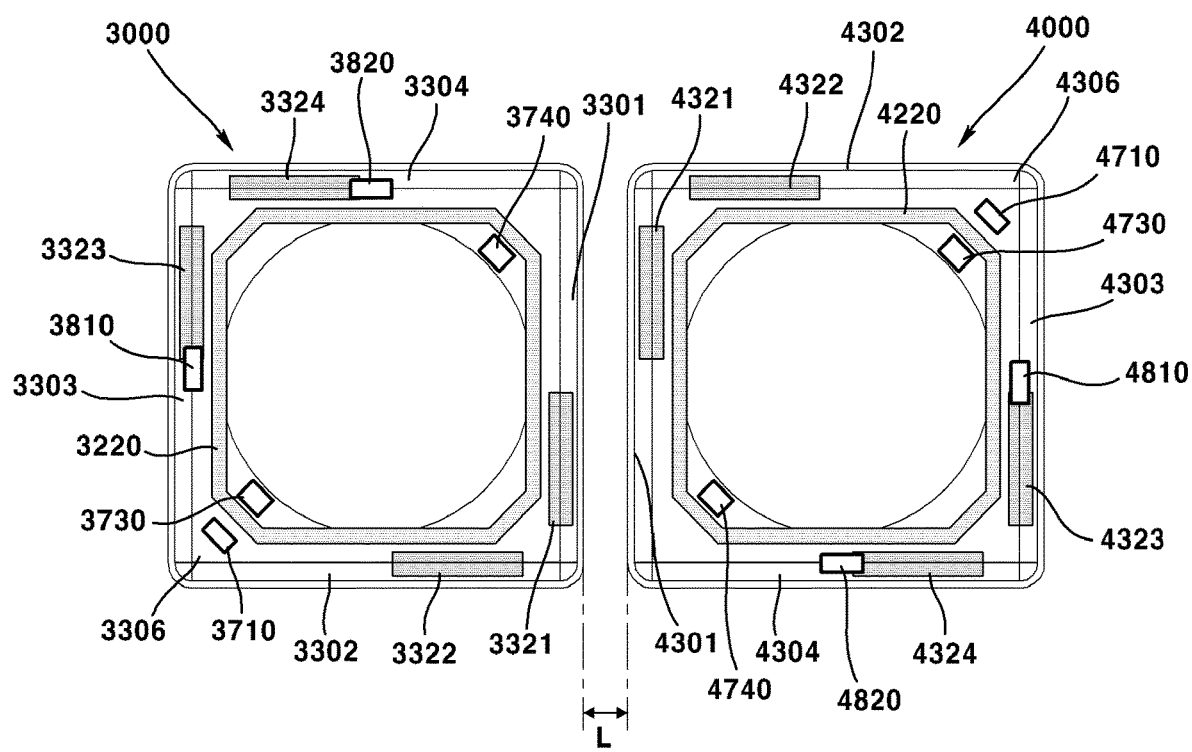
FIG. 29 is a perspective (conceptual) view of some elements of a dual camera module seen from a plane according to a second exemplary embodiment.

FIG. 29 is a perspective (conceptual) view of some elements of a dual camera module seen from a plane according to a second exemplary embodiment.

Referring to FIG. 29, it can be ascertained that the first lens driving device (3000) and the second lens driving device (4000) are spaced apart side by side. At this time, the first lens driving device (3000) and the second lens driving device (4000) may be spaced apart with a discrete distance (L) by 1 mm~5 mm. The first AF feedback sensor (3710) may be disposed at a second corner portion (3306) of the first housing (3310), and the second AF feedback sensor (4710) may be disposed at the sixth corner portion (4306) of the second housing (4310). That is, the first AF feedback sensor (3710) and the second AF feedback sensor (4710) may be maximally disposed. The first side surface magnet (3321) and the second side surface magnet (3322) may be leans to a first corner portion (3305) side, and the third side surface magnet (3323) and the fourth side surface magnet (3324) may be leaned to a third corner portion (3307) side. The fifth side surface magnet (4321) and the sixth side surface magnet (4322) may be leaned to a fifth corner portion (4305) side, and the seventh side surface magnet (4323) and the eighth side surface magnet (4324) may be leaned to a seventh corner portion (4307) side.

Particularly, in the second exemplary embodiment, the first to fourth side surface magnets (3321, 3322, 3323, 3324) may be symmetrical with the fifth to eighth side surface magnets (4321, 4322, 4323, 4324) about a first virtual line parallel with the first optical axis and the second axis and spaced apart as much as the same distance, and the first sensing magnet (3730) may be symmetrical with the second sensing magnet (4730), the first compensation magnet (3740) may be symmetrical with the second compensation magnet (4740), and the first AF feedback sensor (3710) may be symmetrical with the second AF feedback sensor (4710).

In the second exemplary embodiment, through this structure, an influence affected by the mutual magnetic force between the first lens driving device (3000) and the second lens driving device (4000) can be minimized.

Hereinafter, a configuration of a dual camera module according to a modification will be described with reference to the accompanying drawings.

Figure 30:
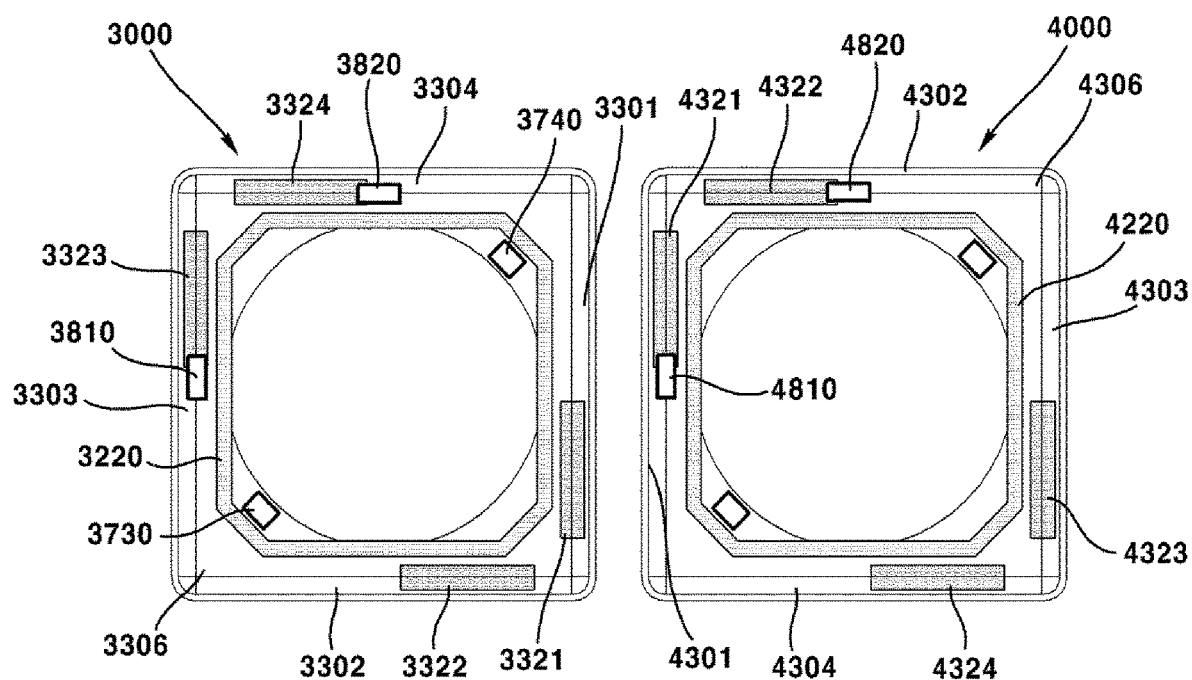
FIG. 30 is a perspective (conceptual) view of some elements of a dual camera module seen from a plane according to a modification.

FIG. 30 is a perspective (conceptual) view of some elements of a dual camera module seen from a plane according to a modification.

The dual camera module according to the modification is omitted with the first AF feedback sensor (3710) and the second AF feedback sensor (4710) compared with the dual camera module according to the exemplary embodiment. Thus, any explanation on other configurations than the first AF feedback sensor (3710) and the second AF feedback sensor (4710) in the configurations of the dual camera module according to the modification may be inferably applied from the dual camera module according to the present exemplary embodiment.

In the modification, even if the first AF feedback sensor (3710) is omitted, the first sensing magnet (3730) and the first compensation magnet (3740) may be disposed. At this time, the first sensing magnet (3730) may be a configuration for magnetic force balance instead of a use for feedback function. Thus, in the modification, the first sensing magnet (3730) may be called a "first balancing magnet". Furthermore, in the modification, the first compensation magnet (3740) may be called a "second balancing magnet". In the modification, even if the second AF feedback sensor (4710) is omitted, the second sensing magnet (4730) and the second compensation magnet (4740) may be disposed. At this time, the second sensing magnet (4730) may be a configuration for magnetic force balance instead of a use for feedback function. Thus, in the modification, the second sensing magnet (4730) may be called a "third balancing magnet". Furthermore, in the modification, the second compensation magnet (4740) may be called a "fourth balancing magnet".

In the modification, the first balancing magnet may be so disposed as to face a corner portion most spaced apart from the third balancing magnet among the plurality of corner portions of the first housing (3310). Furthermore, the third balancing magnet may be so disposed as to face a corner portion most spaced apart from the first balancing magnet among the plurality of corner portions of the second housing (4310). At this time, the first balancing magnet may be disposed at the first bobbin (3210), and the third balancing magnet may be disposed at the second bobbin (4210). In the modification, the first balancing magnet, the second balancing magnet, the third balancing magnet and the fourth balancing magnet can minimize the influence by the magnetic force interference between the first lens driving device (3000) and the second lens driving device (4000).

Third Exemplary Embodiment

Hereinafter, configuration of optical device according to a third exemplary embodiment will be described with reference to the accompanying drawing.

Figure 42:
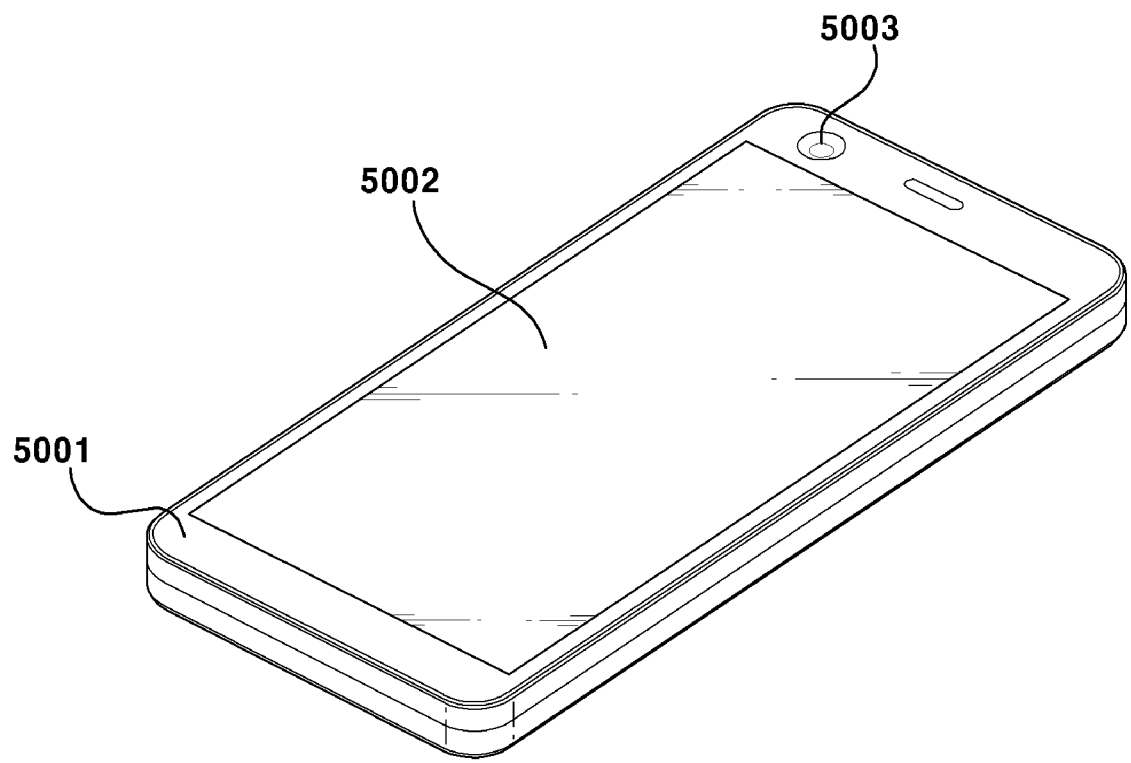
FIG. 42 is a perspective view of an optical device according to a third exemplary embodiment.

FIG. 42 is a perspective view of an optical device according to a third exemplary embodiment.

The optical device may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and may comprise any device capable of capturing an image or a photograph.

The optical device may comprise a main body (5001), a display part (5002) and a camera module (5003). However, any one or more of the main body (5001), the display part (5002) and the camera module (5003) may be omitted or changed from the optical device.

The main body (5001) may form an external shape of an optical device. The main body (5001) may comprise a cubic shape, for example. In another example, the main body (5001) may be at least partially rounded. The main body (5001) may accommodate the camera module (5003). One surface of a main body (5001) may be disposed with a display part (5002).

For example, one surface of main body (5001) may be arranged with the display part (5002) and the camera module (5003) and the other surface (a surface disposed on an opposite side of the one surface) of the main body (5001) may be additionally arranged with a camera module (5003).

The display part (5002) may be disposed on the main body (5001). The display part (5002) may be disposed at one surface of main body (5001). That is, the display part (5002) may be disposed on a same surface as that of the camera module (5003). Alternatively, the display part (5002) may be disposed on the other surface of main body (5001). The display part (5002) may be disposed on a surface disposed at an opposite surface of a surface disposed with the camera module (5003). The display part (5002) may output an image captured by the camera module (5003).

The camera module (5003) may be disposed on the main body (5001). The camera module (5003) may be disposed on one surface of main body (5001). At least a portion of the camera module (5003) may be accommodated into the main body (5001). The camera module (5003) may be provided in a plural number. The plurality of camera modules (5003) may be respectively disposed on one surface of the main body (5001) and the other surface of main body (5001). The camera module (5003) may capture an image of a subject.

Hereinafter, configuration of the camera module according to the third exemplary embodiment will be described with reference to the accompanying drawings.

Figure 31:
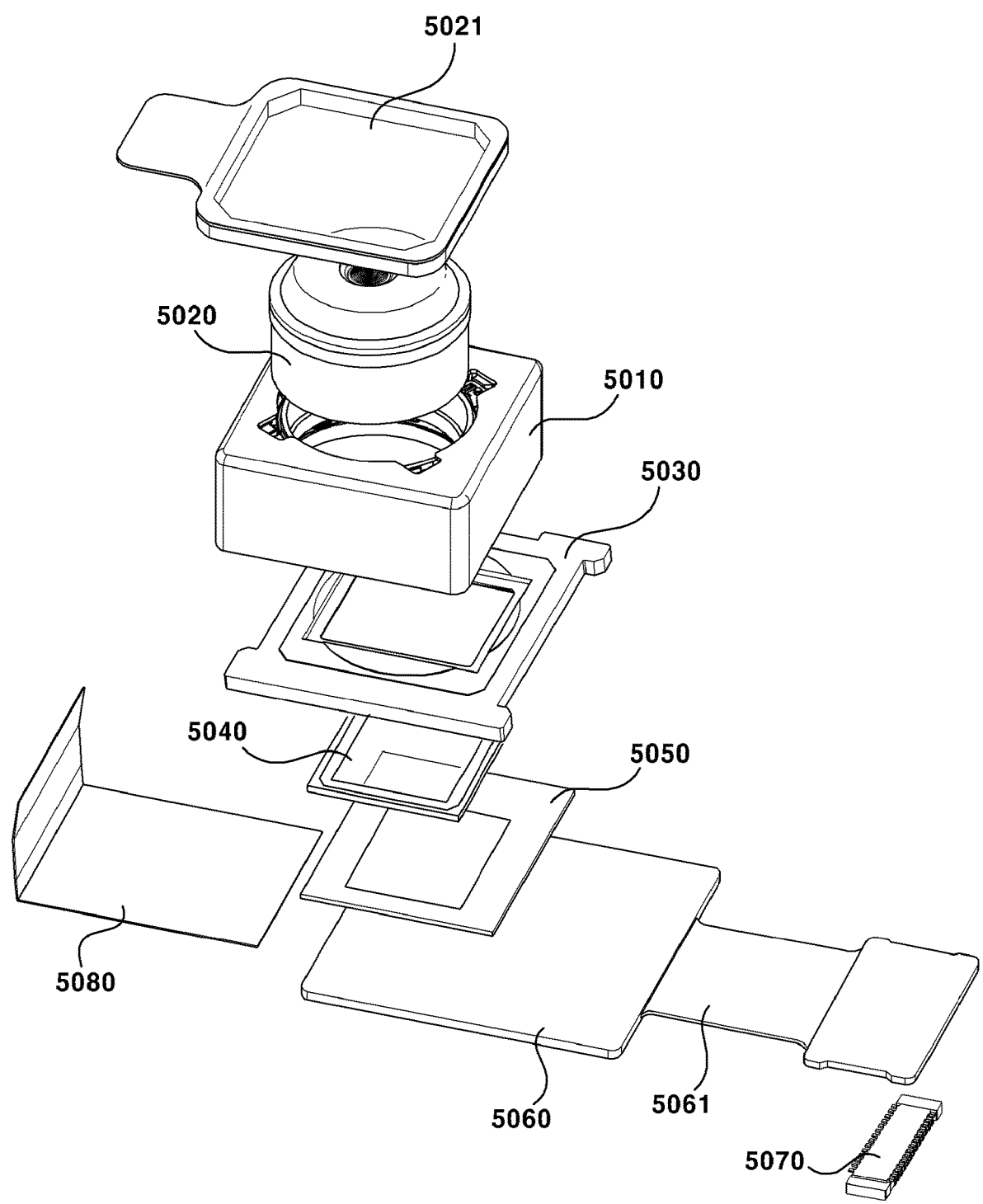
FIG. 31 is an exploded perspective view of a camera module according to a third exemplary embodiment.
Figure 32:
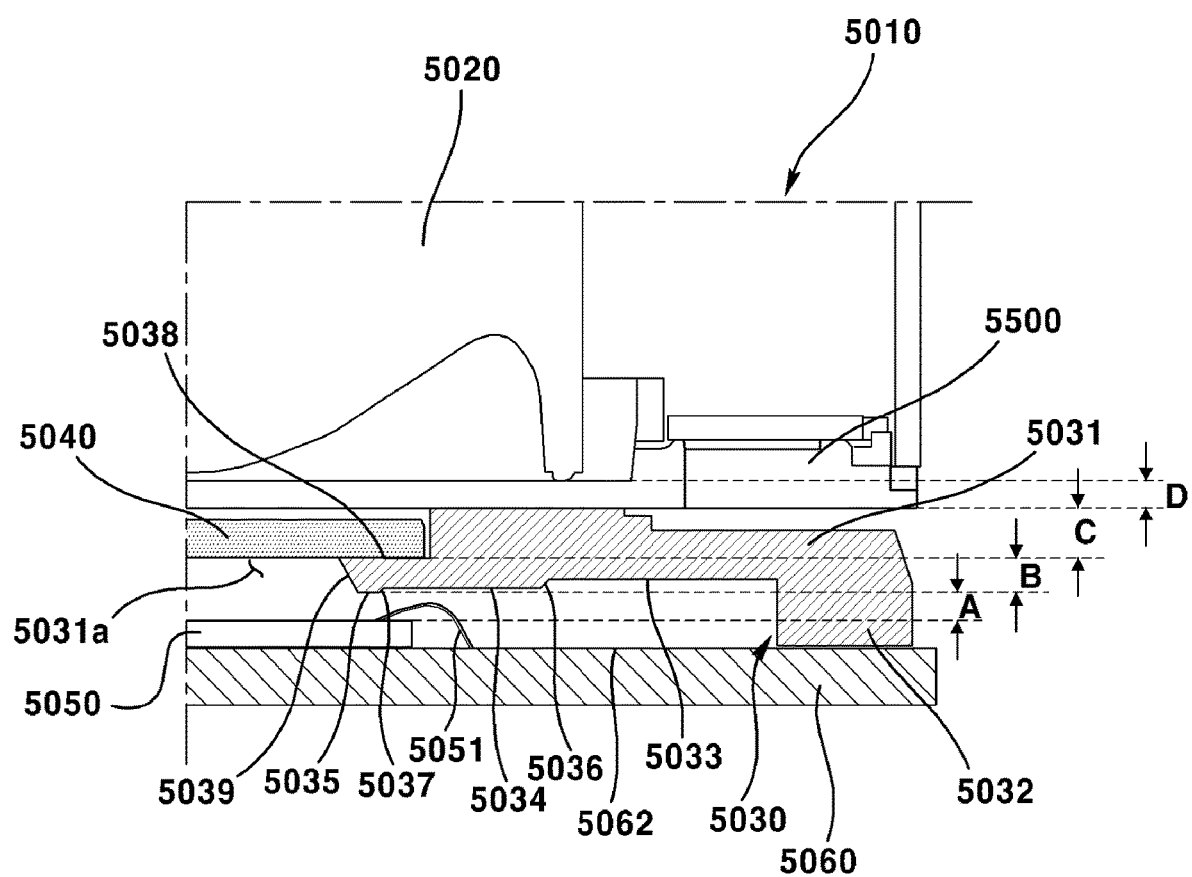
FIG. 32 is a cross-sectional view of some elements of a camera module according to a third exemplary embodiment.
Figure 33:
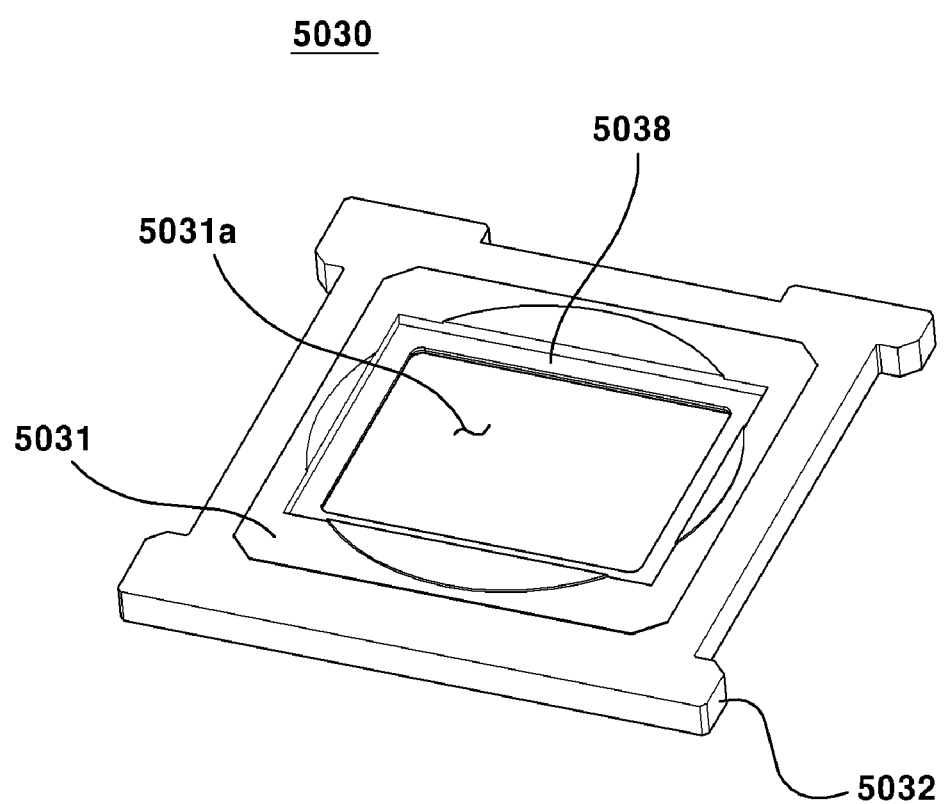
FIG. 33 is a perspective view of a sensor base according to a third exemplary embodiment.
Figure 34:
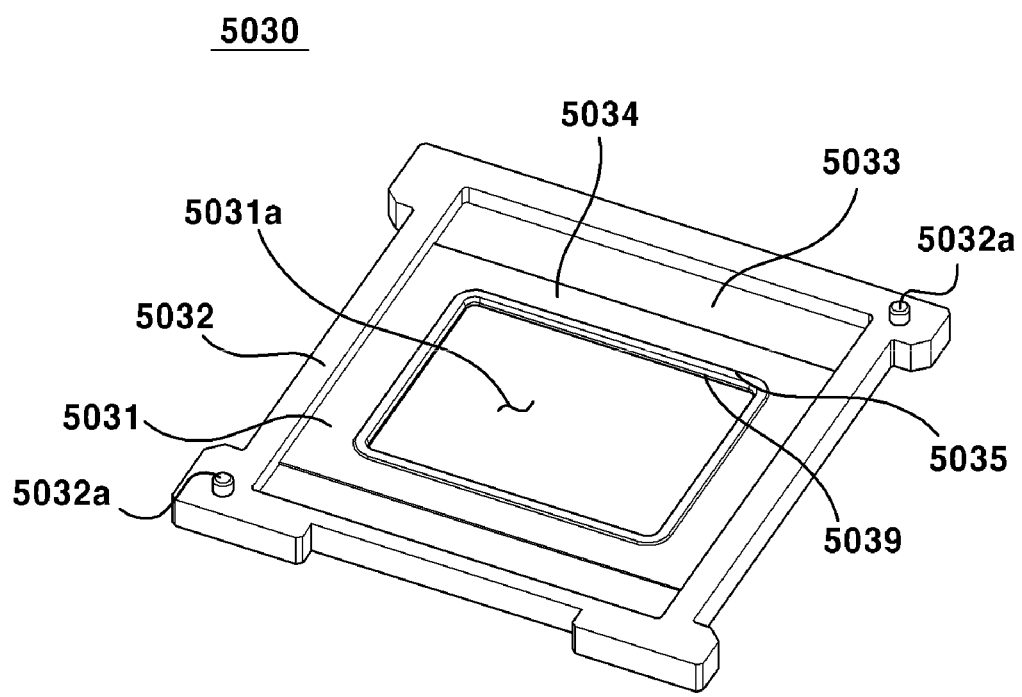
FIG. 34 is a bottom perspective view of a sensor base according to a third exemplary embodiment.
Figure 41:
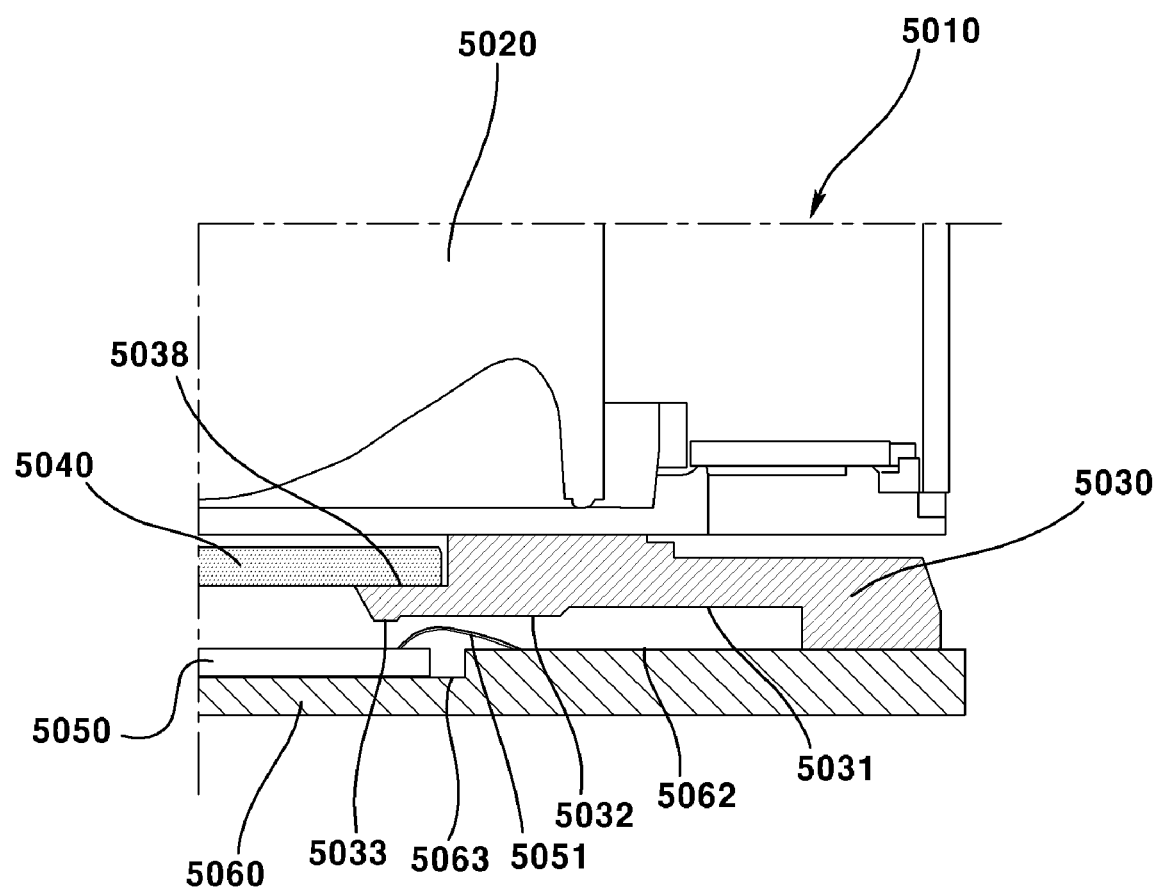
FIG. 41 is a cross-sectional view of some elements of a camera module according to a modification.

FIG. 31 is an exploded perspective view of a camera module according to a third exemplary embodiment, FIG. 32 is a cross-sectional view of some elements of a camera module according to a third exemplary embodiment, FIG. 33 is a perspective view of a sensor base according to a third exemplary embodiment, FIG. 34 is a bottom perspective view of a sensor base according to a third exemplary embodiment, and FIG. 41 is a cross-sectional view of some elements of a camera module according to a modification.

The camera module (5003) may comprise a lens driving device (5010), a lens module (5020), a sensor base (5030), a filter (5040), an image sensor (5050), a PCB (5060) and a controller (not shown). However, any one or more of the lens driving device (5010), the lens module (5020), the sensor base (5030), the filter (5040), the image sensor (5050), the PCB (5060) and the controller may be omitted or changed from the camera module (5003).

The lens driving device (5010) may be disposed at an upper side of the sensor base (5030). The lens driving device (5010) may be actively aligned on a top surface of sensor base (5030). For example, the lens driving device (5010) may be coupled to the sensor base (5030) using an epoxy hardened by ultraviolet and heat.

The lens module (5020) may comprise at least one lens. The lens module (5020) may comprise a lens and a lens barrel. The lens module (5020) may comprise a lens barrel and at least one lens accommodated into the lens barrel. However, one element of lens module (5020) is not limited to the lens module, and any holder structure capable of supporting one or more lenses will suffice for lens module.

The lens module (5020) may be coupled to an inside of the lens driving device (5010). The lens module (5020) may be coupled to a bobbin (5210) of the lens driving device (5010). The lens module (5020) may integrally move with the bobbin (5210). The lens module (5020) may be coupled to the bobbin (5210) using an adhesive (not shown). For example, the lens module (5020) may be screw-coupled to the bobbin (5210). Meantime, a light having passed the lens module (5020) may be irradiated on an image sensor (5050). A top surface of the lens module (5020) may be disposed with a lens protection tape (5021) for protecting the lens module (5020). The lens protection tape (5021) may be removed after the lens module (5020) is assembled to the lens driving device (5010).

The sensor base (5030) may be disposed at a top surface of a PCB (5060). The sensor base (5030) may be disposed at a lower side of the lens driving device (5010). That is, the sensor base (5030) may be interposed between the PCB (5060) and the lens driving device (5010). The sensor base (5030) may be formed with an insulation material. The sensor base (5030) may be accommodated with the image sensor (5050) at an inside thereof.

The sensor base (5030) may comprise a main body (5031) and a support part (5032). However, any one or more of the main body (5031) and a support part (5032) may be omitted or changed from the sensor base (5030). The sensor base (5030) may comprise a main body (5031) formed at a through hole (5031*a*) disposed at an upper side of the image sensor (5050). The sensor base (5030) may comprise a support part (5032) downwardly extended from an outside of the main body (5031) to be disposed at a top surface of a PCB (5060).

The main body (5031) may be disposed at an upper side of the image sensor (5050). The main body (5031) may be formed with a through hole (5031*a*). The main body (5031) may be formed at an outside with a support part (5032). The main body (5031) may be disposed at a top surface with a lens driving device (5010).

The support part (5032) may be downwardly extended from an outside of the main body (5031). The support part (5032) may be disposed at a top surface of the PCB (5060). The support part (5032) may support the main body (5031) relative to the PCB (5060). Through this structure, the main body (5031) may be spaced apart from a top surface (5062) of the PCB (5060) and the image sensor (5050).

A lower surface of support part (5032) may be formed with two protruders (5032*a*). A lower surface of sensor base (5030) may be formed with two protruders (5032*a*). The protruders (5032*a*) may be protruded from a lower surface of the support part (5032). The protruders may be so formed as to guide the coupling with the PCB (5060). That is, each of the protruders may be so formed in shape as to correspond to a hole or a groove formed on the PCB (5060) and may be accommodated into the hole or the groove.

The sensor base (5030) may comprise a first surface (5033), a second surface (5034), a third surface (5035), a first border surface (5036), a second border surface (5037), a reception surface (5038) and an inner periphery surface (5039). However, any one or more of the first surface (5033), the second surface (5034), the third surface (5035), the first border surface (5036), the second border surface (5037), the reception surface (5038) and the inner periphery surface (5039) may be omitted or changed from the sensor base (5030).

A lower surface of main body (5031) may comprise a first surface (5033) formed at an inside of the support part (5032). The lower surface of main body (5031) may comprise a second surface (5034) formed at an inside of the first surface (5033). The lower surface of main body (5031) may comprise a third surface (5035) formed at an inside of the second surface (5034). The lower surface of main body (5031) may comprise a first border surface (5036) formed between the first surface (5033) and the third surface (5034). The lower surface of main body (5031) may comprise a second border surface (5037) formed between the second surface (5034) and the third surface (5035).

The lower surface of main body (5031) may be sequentially formed from an outside to an inside with a first surface (5033), a first border surface (5036), a second surface (5034), a second border surface (5037) and a third surface (5035). At this time, the second surface (5034) may be disposed at a position lower than the first surface (5033). Furthermore, the third surface (5035) may be disposed at a position lower than the second surface (5034). Of course, the third surface (5035) may be disposed at a position lower than the first surface (5033). Conversely, the first surface (5033) may be disposed at a position higher than the second surface (5034). The second surface (5034) may be disposed at a position higher than the third surface (5035). The first surface (5033) may be disposed at a position higher than the third surface (5035).

The first surface (5033) may be most spaced apart from a top surface (5062) of the PCB (5060) on the lower surface of the main body (5031). A circuit element may be interposed between the first surface (5033) and a top surface (5062) of PCB (5060). That is, a circuit element may be accommodated into a discrete space formed by the first surface (5033) and the PCB (5060). The first surface (5033) may be formed at an outside of the second surface (5034). The first surface (5033) may be formed at an outside of the third surface (5035).

The second surface (5034) may be formed between the first surface (5033) and the third surface (5035). The second surface (5034) may form a staircase structure with the first surface (5033). The second surface (5034) may be overlapped with a wire (5051) to an optical axis direction. The second surface (5034) may be overlapped with an upper end of the wire (5051) to an optical axis direction. The wife (5051) may be accommodated into a space formed between the second surface (5034) and a top surface of the image sensor (5050). The wire (5051) may be accommodated into a space formed by the second surface (5034) and the top surface (5062) of PCB (5060). The second surface (5034) may be spaced apart from an upper end of the wire (5051). That is, the second surface (5034) may be inhibited from being contacted with the wire (5051). Through this structure, an arrangement space may be obtained for the wire (5051). That is, the wire (5051) may be inhibited from being interfered from the sensor base (5030). The second surface (5034) may be formed at an inside of the first surface (5033). The second surface (5034) may be formed at an outside of the third surface (5035).

The third surface (5035) may be disposed at a lowermost side of the lower surface of the main body (5031). The third surface (5035) may form a staircase structure with the second surface (5034). The third surface (5035) may be overlapped with the image sensor (5050) to an optical axis direction. The third surface (5035) may be formed at an inside of the first surface (5033). The third surface (5035) may be formed at an inside of the second surface (5034). The third surface (5035) may form an obtuse angle an inner periphery surface (5039) of the sensor base (5030). In the present exemplary embodiment, a height of a top surface of sensor base (5030) may be lowered by the third surface (5035) to enable to obtain an AA (Active Alignment) space between the sensor base (5030) and the lens driving device (5010). Furthermore, in the present embodiment, the third space (5035) may minimize a flair phenomenon in which a light reflected by the wire (5051) re-enters the lens module (5020).

The first border surface (5036) may be formed between the first surface (5033) and the second surface (5034). The first border surface (5036) may connect the first surface (5033) and the second surface (5034). The first border surface (5036) may comprise an inclination. The first border surface (5036) may be formed by an inclination. The first border surface (5036) may form an obtuse angle with the first surface (5033) and the second surface (5034). The first border surface (5036) may form a right angle with any one or more of the first surface (5033) and the second surface (5034).

The second border surface (5037) may be formed between the second surface (5034) and the third surface (5035). The second border surface (5037) may connect the second surface (5034) and the third surface (5035). The second border surface (5037) may comprise an inclination. The second border surface (5037) may be formed by an inclination. The second border surface (5037) may form an obtuse angle with the second surface (5034) and the third surface (5035). The second border surface connecting the third surface (5035) and the second surface (5034) may be overlapped with the image sensor (5050) to an optical axis direction. The second border surface (5037) may be overlapped with an area where the image sensor (5050) and the wire (5051) meet to an optical axis direction. The second border surface (5037) may form an obtuse angle respectively with the third surface (5035) and the second surface (5034). The second border surface (5037) may comprise an inclination forming an obtuse angle or a right angle respectively with the third surface (5035) and the second surface (5034).

The reception surface (5038) may be formed by allowing a portion of the top surface of sensor base to be recessed. The reception surface (5038) may be formed at a surrounding of a through hole (5031a). The reception surface (5038) may be disposed with a filter (5040). The reception surface (5038) may be formed with a shape corresponding to that of the filter (5040). The reception surface (5038) may form an acute angle with an inner periphery surface (5039) of the sensor base (5030).

The inner periphery surface (5039) may be formed between the reception surface (5038) and the third surface (5035). The inner periphery surface (5039) may connect the reception surface (5038) and the third surface (5035). The inner periphery surface (5039) may form a through hole (5031a). The inner periphery surface (5039) may form an obtuse angle with the third surface (5035). The inner periphery surface (5039) may form an acute angle with the reception surface (5038). The inner periphery surface (5039) of the sensor base (5030) forming the through hole (5031a) may form an obtuse angle with the third surface (5035) and may be formed as an inclination forming an acute angle with the reception surface (5038). The inner periphery surface (5039) of the sensor base (5030) forming the through hole (5031a) may be outwardly recessed toward the third surface (5035) from the reception surface (5038). Alternatively, the inner periphery surface (5039) may form a right angle with the reception surface (5038) and the third surface (5035).

In the third exemplary embodiment, a distance (See A of FIG. 32) between a top surface of image sensor (5050) and the third surface (5035) may be 0.14 mm~0.16 mm. A distance between the third surface (5035) and the second surface (5034) may be 0.02 mm~0.03 mm. A distance (See B of FIG. 32) between the third surface (5035) and the reception surface (5038) may be 0.19 mm~0.21 mm. Furthermore, a distance (See B of FIG. 32) between the third surface (5035) and the reception surface (5038) may be 0.20 mm. A distance (See C of FIG. 32) between the reception surface (5038) and a top surface of sensor base (5030) may be 0.23 mm~0.29 mm. A distance (See D of FIG. 32) between a top surface of sensor base (5030) and a lower end of the lens barrel may be 0.15 mm~0.20 mm. A distance between the third surface (5035) and the second surface (5034) may be 10% to 15% of a distance (B) between the third surface (5035) and the reception surface (5038). At this time, an FBL (Flange Back Length) may be equal to a distance where A, B, C and D of FIG. 32 are all aggregated.

In the third exemplary embodiment, a distance (B+C) between the third surface (5035) and a top surface of sensor base (5030) may be 0.42 mm~0.50 mm. Furthermore, a thickness of image sensor (5050) may be 0.30 mm~0.35 mm. Hence, the distance (B+C) between the third surface (5035) and the top surface of sensor base (5030) may 1.20~1.67 times the thickness (a distance from a lower surface 3 to a top surface) of the image sensor (5050). Furthermore, a distance from a lower end to a top surface of a wire (5051) may be 0.44~0.51. Thus, the distance from a lower end to a top surface of a wire (5051) may be 1.25~1.70 times the thickness of the image sensor (5050).

In the third exemplary embodiment, the flair phenomenon can be inhibited by providing an escape space of the wire (5051) through a double staircase structure extending from the first surface (5033), the second surface (5034) and the third surface (5035).

The filter (5040) may be disposed at a position corresponding to that of the through hole (5031*a*). The filter (5040) may be disposed on the reception surface (5038) formed by allowing a portion of a top surface of the sensor base (5030) to be recessed. The filter (5040) may inhibit a light of an infrared region from being incident on the image sensor (5050). The filter (5040) may be interposed between the lens module (5020) and the image sensor (5050). The filter (5040) may be disposed on the sensor base (5030). In another example, the filter (5040) may be disposed on a base (5500) of a lens driving device (5010). The filter (5040) may be formed with film material or glass material. The filter (5040) may be formed by allowing an infrared cut-off coating material to be coated on a plate-shaped optical filter such as an imaging plane protection cover glass or a cover glass. For example, the filter (5040) may be an infrared absorption filter absorbing an infrared ray. In another example, the filter (5040) may be an infrared reflection filter reflecting an infrared ray.

The image sensor (5050) may be disposed on the PCB (5060). The image sensor (5050) may be disposed at a top surface (5062) of PCB (5060). The image sensor (5050) may be electrically connected to the PCB (5060). For example, the image sensor (5050) may be coupled to the PCB (5060) using the SMT (Surface Mounting Technology). In another example, the image sensor (5050) may be coupled to the PCB (5060) by way of flip chip technology. The image sensor (5050) may be disposed with an optical axis being aligned with that of the lens module (5020). That is, an optical axis of the image sensor (5050) and an optical axis of the lens module (5020) may be aligned. Through this structure, the image sensor (5050) can obtain a light having passed the lens module (5020). The image sensor (5050) may convert a light irradiated on an effective image region of the image sensor (5050) to an electric signal. The image sensor (5050) may be any one of a CCD (charge coupled device), a MOS (metal oxide semi-conductor), a CPD and a CID. However, the type of image sensor (150) is not limited thereto, and any configuration capable of converting an incident light to an electric signal may suffice for the image sensor (5050).

The image sensor (5050) may be electrically conductive with the PCB (5060) using a wire (5051). A distance from a lower surface of the image sensor (5050) to a top surface of the image sensor (5050), i.e., a thickness, may be 0.30 mm~0.35 mm.

The wire (5051) may be connected to a top surface of the image sensor (5050) and to a top surface of the PCB (5060). An upper end of the wire (5051) may be overlapped with the second surface (5034) to an optical axis direction of the image sensor (5050), and may be disposed at an outside of the third surface (5035). The wire (5051) may be spaced apart from the sensor base (5030). In the present exemplary embodiment, the wire (5051) may be inhibited from being interfered by the sensor base (5030).

The lens driving device (5010) may be disposed on a top surface (5062) of the PCB (5060). The PCB (5060) may be disposed at a lower surface of the lens driving device (5010). The PCB (5060) may be coupled with the lens driving device (5010). The PCB (5060) may be disposed with the image sensor (5050). The PCB (5060) may be electrically connected to the image sensor (5050). The sensor base (5030) may be interposed between the PCB (5060) and the lens driving device (5010). At this time, the sensor base (5030) may accommodate, at an inside thereof, the image sensor (5050). In a modification, the lens driving device (5010) may be directly disposed on the PCB (5060). At this time, the lens driving device (5010) may accommodate, at an inside thereof, the image sensor (5050). Through this structure, a light having passed the lens module (5020) coupled to the lens driving device (5010) may be irradiated on the image sensor (5050) disposed on the PCB (5060). The PCB (5060) can supply a power (current) to the lens driving device (5010). Meantime, the PCB (5060) may be formed with a controller in order to control the lens driving device (5010). The PCB (5060) may comprise an FPCB (5061). That is, the PCB (5060) may comprise a rigid PCB disposed with the image sensor (5050), and an FPCB (Flexible PCB) connecting a connector (5070) and the rigid PCB. The connector (5070) may be used to electrically connect the camera module (5003) to an outside element. An insulation tape (5080) may be disposed in order to insulate a soldering part after soldering a terminal of a substrate (5730) and a terminal of the PCB (5730).

As shown in the modification illustrated in FIG. 41, The PCB (5060) may comprise a cavity surface (5063) formed by allowing a portion of a top surface (5062) to be partially recessed. That is, the PCB (5060) may be formed with the cavity PCB (Cavity Printed Circuit Board). At this time, the image sensor (5051) may be connected to a top surface (5062) of the image sensor (5050). Even in this case, a lower end of the sensor base (5030) may minimize the flair phenomenon by being formed in a double staircase structure.

The controller may be disposed on the PCB (5060). For example, the controller may be disposed at an inside of the lens driving device (5010). In another example, the controller may be also disposed at an outside of the lens driving device (5010). The controller may control a direction, intensity and amplitude of a current supplied to a coil (5220) of the lens driving device (5010). The controller may perform any one or more of the AF function and the OIS function of camera module (5003) by controlling the lens driving device (10). That is, the controller may move or tilt the lens module (5020) to an optical axis direction or to a direction perpendicular to the optical axis direction by controlling the lens driving device (5010). Furthermore, the controller may perform any one or more of the feedback control of AF function and the feedback control of the OIS function. To be more specific, the controller may perform the AF feedback control by controlling a current supplied to the coil (5220) and by receiving a position of the bobbin (5210) or the housing (5310) detected by a sensing unit (5700). The aforementioned feedback control by the controller is generated in real time to allow performing a more accurate AF focus function.

Hereinafter, configuration of lens driving device according to the third exemplary embodiment will be described with reference to the accompanying drawings.

Figure 35:
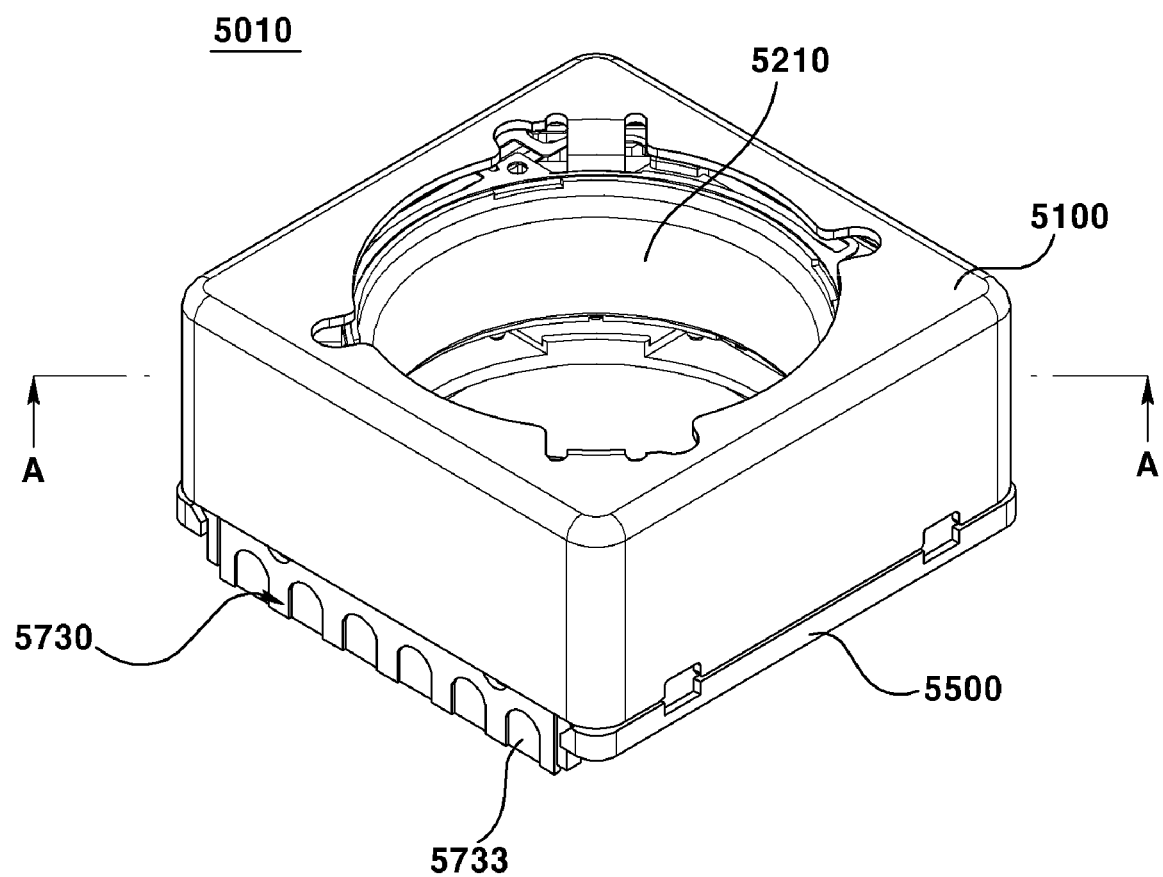
FIG. 35 is a perspective view of a lens driving device according to a third exemplary embodiment.
Figure 36:
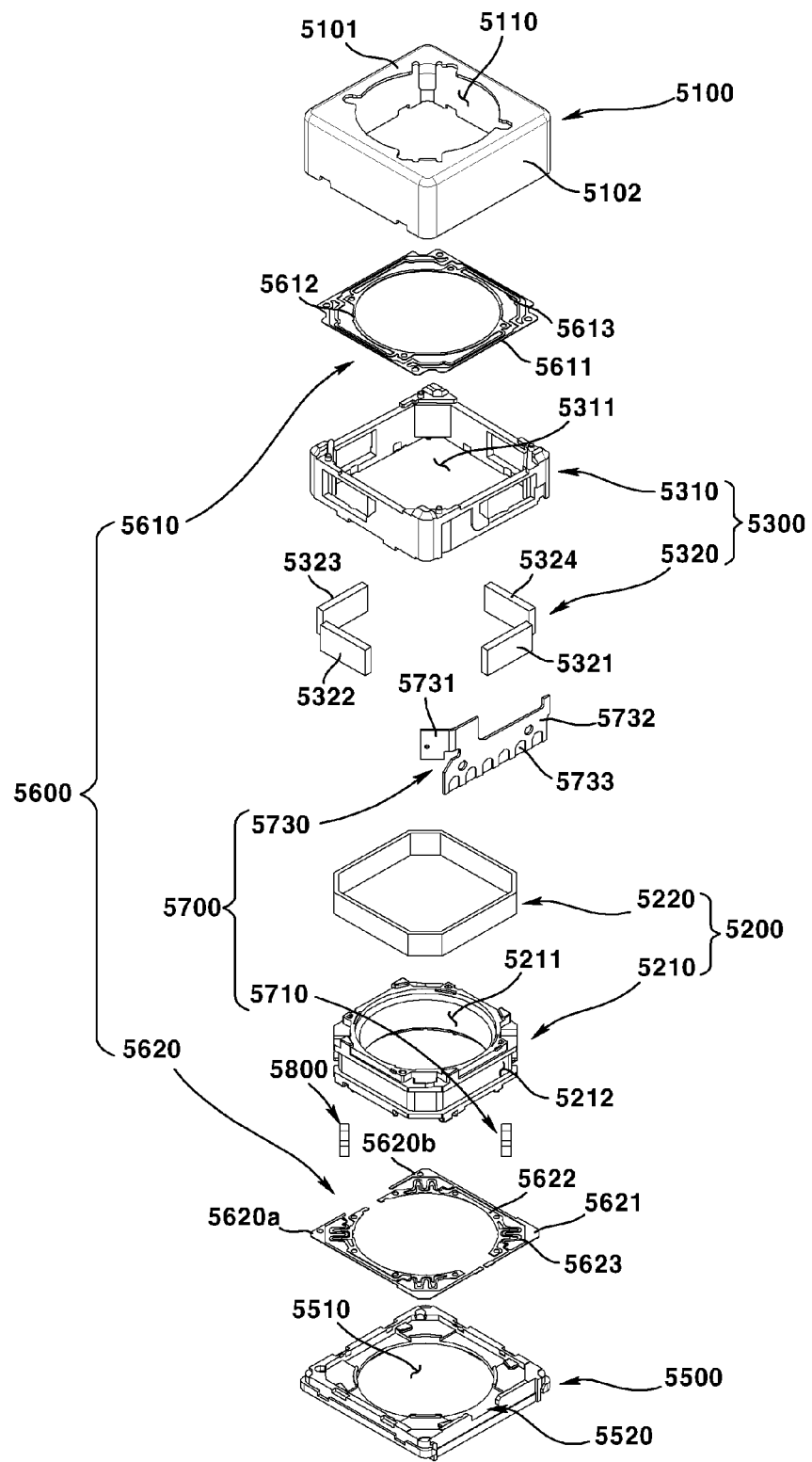
FIG. 36 is an exploded perspective view of a lens driving device according to a third exemplary embodiment.
Figure 37:
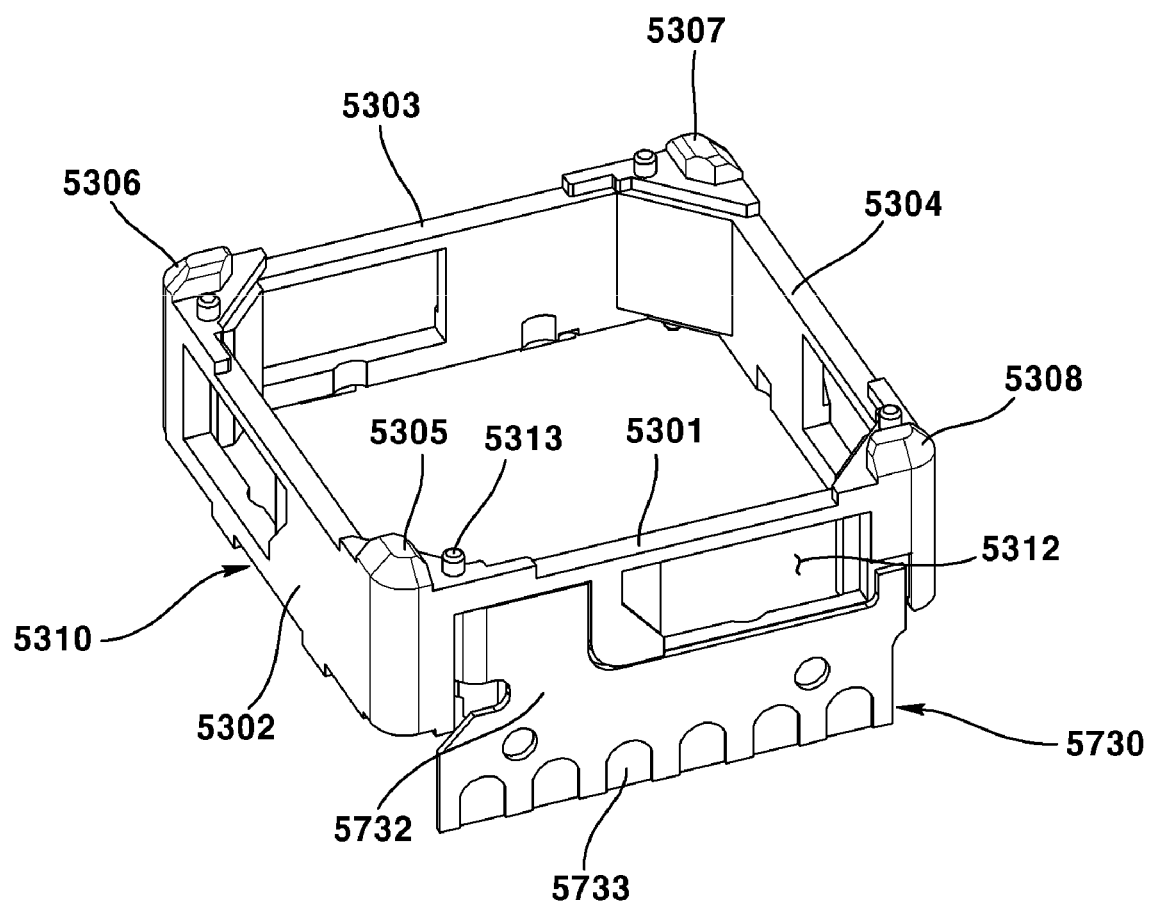
FIG. 37 is a perspective view of some elements of a lens driving device according to a third exemplary embodiment.
Figure 38:
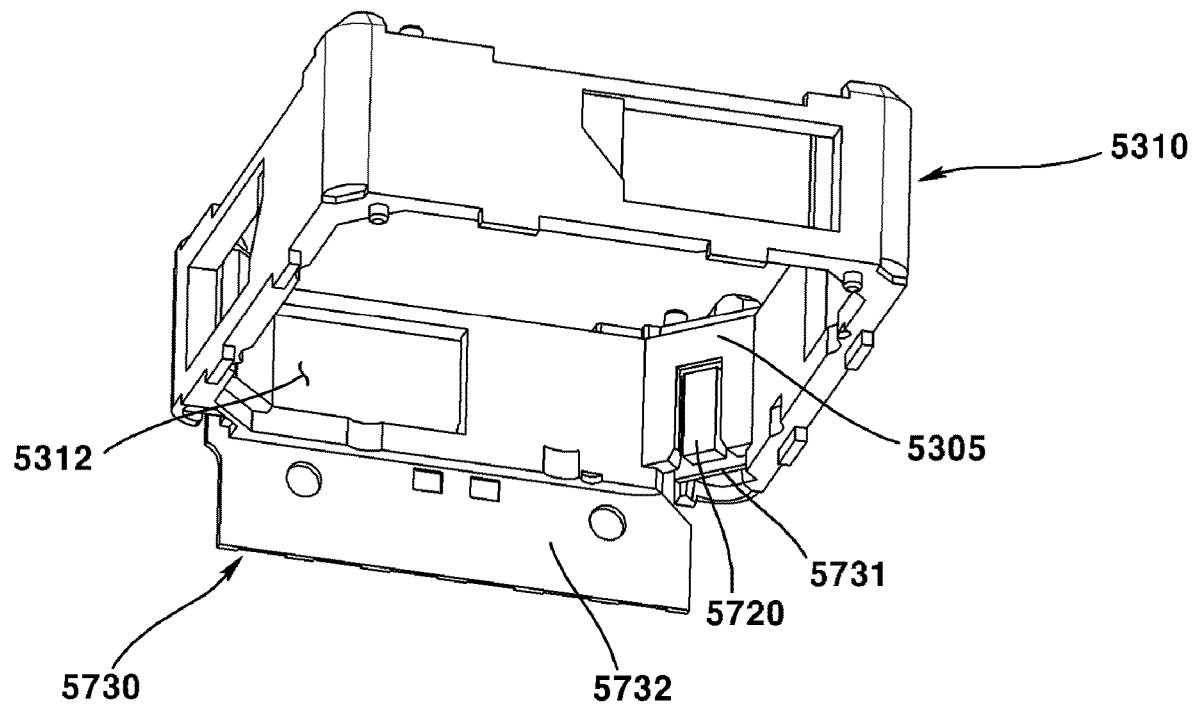
FIG. 38 is bottom perspective view of some elements of a lens driving device according to a third exemplary embodiment.
Figure 39:
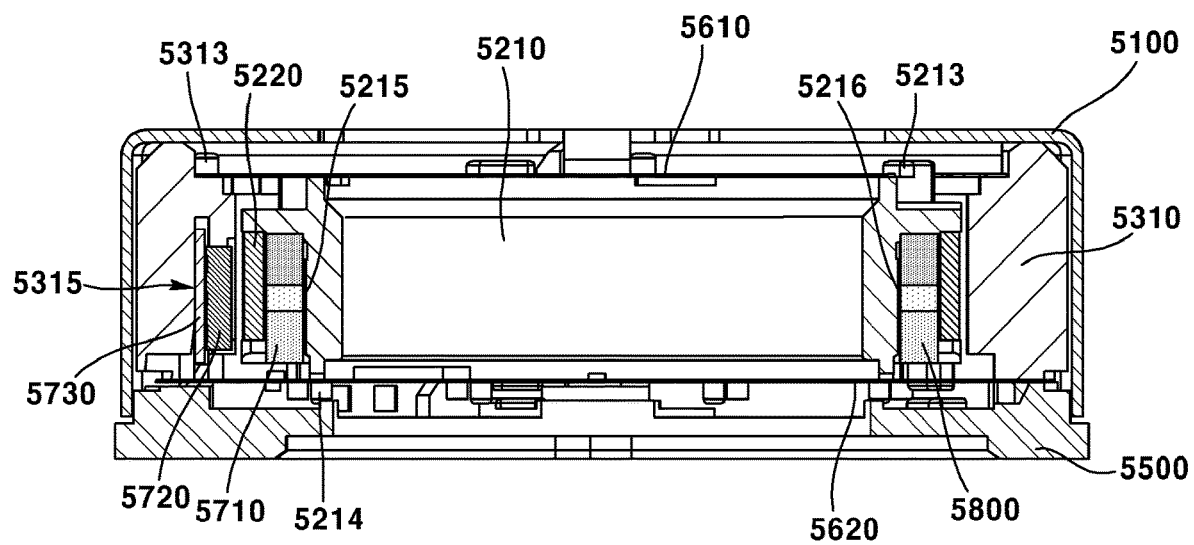
FIG. 39 is a cross-sectional view taken along line A-A of FIG. 35.
Figure 40:
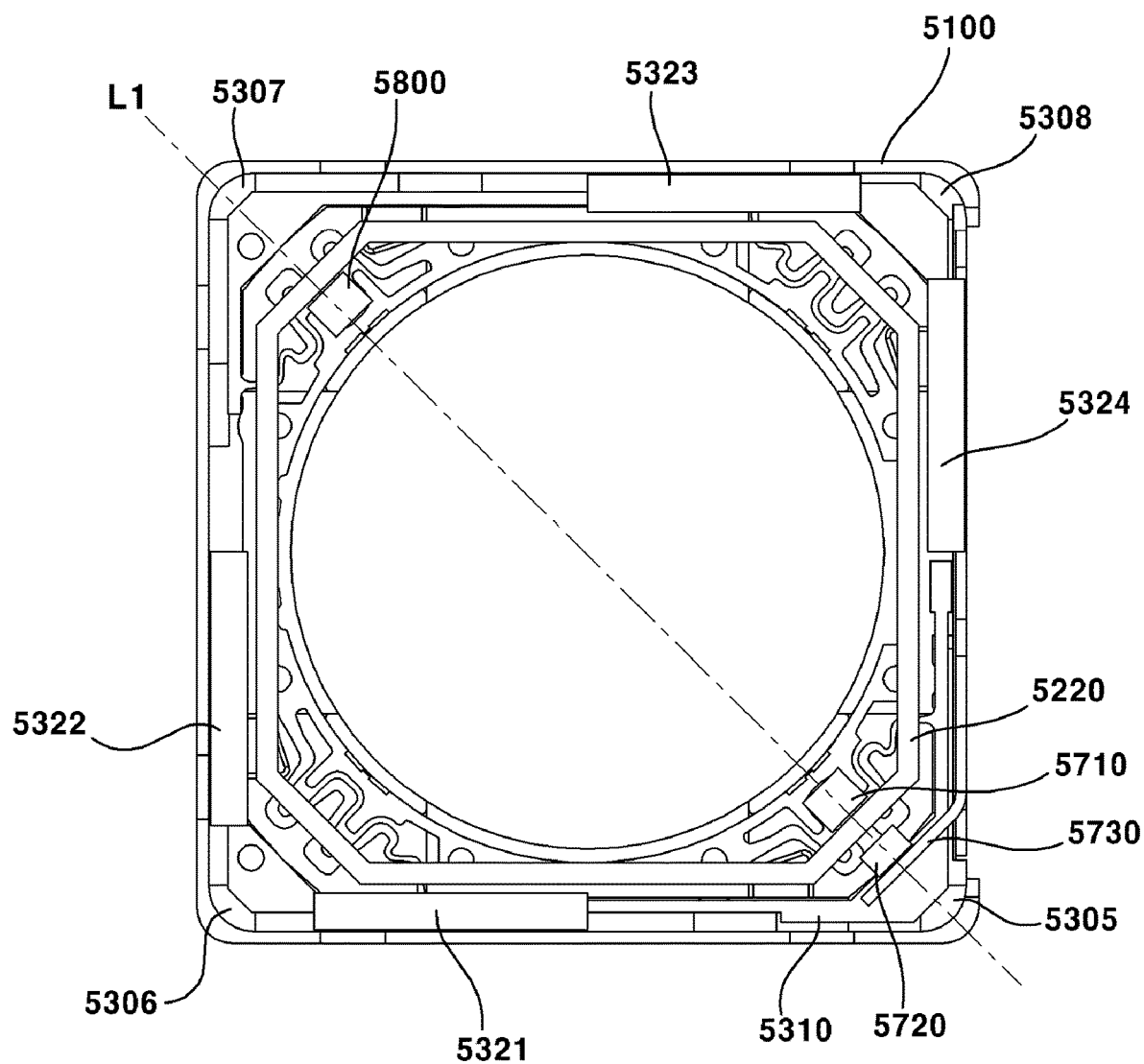
FIG. 40 is bottom view of some elements of a lens driving device according to a third exemplary embodiment.

FIG. 35 is a perspective view of a lens driving device according to a third exemplary embodiment, FIG. 36 is an exploded perspective view of a lens driving device according to a third exemplary embodiment, FIG. 37 is a perspective view of some elements of a lens driving device according to a third exemplary embodiment, FIG. 38 is bottom perspective view of some elements of a lens driving device according to a third exemplary embodiment, FIG. 39 is a cross-sectional view taken along line A-A of FIG. 35, and FIG. 40 is bottom view of some elements of a lens driving device according to a third exemplary embodiment.

The lens driving device (5010) may comprise a cover member (5100), a mover (5200), a stator (5300), a base (5500), an elastic member (5600) and a sensing unit (5700). However, any one or more of the cover member (5100), the mover (5200), the stator (5300), the base (5500), the elastic member (5600) and the sensing unit (5700) may be omitted or changed from the lens driving device (5010) according to the present exemplary embodiment. Particularly, the sensing unit (5700) may be omitted because the sensing unit (5700) is a configuration for AF feedback function.

The cover member (5100) may form an external shape of the lens driving device (5010). The cover member (5100) may take a bottom-opened cubic shape. However, the shape of the cover member (5100) is not limited thereto. The cover member (5100) may be made of non-magnetic substance. If the cover member (5100) is formed with a magnetic substance, a magnetic force of the cover member (5100) may be affected on any one or more of a magnet (5320), a sensing magnet (5710) and a compensation magnet (5800). The cover member (5100) may be formed with a metal material. To be more specific, the cover member (5100) may be formed with a metal plate. In this case, the cover member (5100) can shield an EMI (Electro Magnetic Interference). Due to the said characteristic of the cover member (5100), the cover member (5100) may be called an 'EMI shield can'. The cover member (5100) may be connected to a ground part of the PCB (5060), through which the cover member (5100) can be grounded. The cover member (5100) can inhibit the radio wave generated from outside of the lens driving device (5010) from being introduced inside the cover member (5100). Furthermore, the cover member (5100) can inhibit the radio wave generated from inside of the cover member (5100) from being discharged to outside of the cover member (5100).

The cover member (5100) may comprise an upper plate (5101) and a side plate (5102). The cover member (5100) may comprise an upper plate (5101) and a side plate (5102) downwardly extended from an outer periphery of the upper plate (5101). For example, the cover member (5100) may be coupled to a base (5500). A portion of the side plate (5102) of the cover member (5100) may be coupled to the base (5500). A lower end of the side plate (5102) of the cover member (5100) may be disposed at a staircase part (5435) of the base (5500). An inner periphery surface of the side plate (5102) of cover member (5100) may be directly contacted to an outer lateral surface of base (5500). The inner periphery surface of the side plate (5102) of cover member (5100) may be coupled to the base (5500) by an adhesive (not shown). In another example, the cover member (5100) may be directly coupled to a top surface of PCB (5060). An inner space formed by the cover member (5100) and the base (5500) may be disposed with a mover (5200), a stator (5300) and an elastic member (5600), through this structure, the cover member (5100) can inhibit protect inner elements from outside shocks and inhibit outside foreign objects from being introduced thereinto.

The cover member (5100) may comprise an opening (5110). The opening (5110) may be formed on an upper plate (5101) of cover member (5100). The opening (5110) may expose the lens module (5020) to an upper side. The opening (5110) may be formed to take a shape corresponding to that of the lens module (5020). The size of the opening (5110) may be formed to be greater than a diameter of the lens module (5020) to allow the lens module (5020) to be assembled through the opening (5110). A light having introduced through the opening (5110) may pass through the lens module (5020). At this time, the light having passed the lens module (5020) may be converted to an electric signal by an image sensor and may be obtained as an image.

The mover (5200) may be coupled to the lens module (5020), which is one of the elements of the camera module (5003) {however, the lens module (5020) may be also explained as an element of the lens driving module (5010)}. The mover (5200) may be accommodated at an inside of the lens module (5020). An inner periphery surface of the mover (5200) may be coupled by an outer periphery surface of the lens module (5020). The mover (5200) may be moved through an interaction with the stator (5300). At this time, the mover (5200) may be moved integrally with the lens module (5020). Meantime, the mover (5200) may move for the AF function. At this time, the mover (5200) may be called an 'AF mover'. However, the present description is not limited to a member that moves only for the AF function of the mover (5200). The mover (5200) may be also moved for the OIS function.

The mover (5200) may comprise a bobbin (5210) and a coil (5220). However, any one or more of the bobbin (5210) and a coil (5220) may be omitted or changed from the mover (5200).

The bobbin (5210) may be disposed at an inside of the housing (5310). The bobbin (5210) may be disposed on the through hole (5311) of the housing (5310). The bobbin (5210) may move to an optical axis direction about the housing (5310). The bobbin (5210) may be so disposed on the through hole (5311) of the housing (5310) as to move along an optical axis. The bobbin (5210) may be coupled to the lens module (5020). An inner periphery surface of the bobbin (5210) may be coupled by an outer periphery surface of the lens module (5020). The bobbin (5210) may be coupled by a coil (5220). An outer periphery surface of bobbin (5210) may be coupled by the coil (5220). A top surface of bobbin (5210) may be coupled with an upper elastic member (5610). A lower end of the bobbin (5210) may be coupled with a lower elastic member (5620).

The bobbin (5210) may comprise a through hole (5211), a coil coupling part (5212), an upper coupling part (5213)

and a lower coupling part (5214). However, any one or more of the through hole (5211), a coil coupling part (5212), an upper coupling part (5213) and a lower coupling part (5214) may be omitted or changed from the bobbin (5210).

The through hole (5211) may be formed at an inside of the bobbin (5210). The through hole (5211) may take an upper-bottom opened shape. The through hole (5211) may be coupled by the lens module (5020). An inner periphery surface of through hole (5211) may be formed with a screw thread corresponding to that formed on an outer periphery surface of the lens module (5020). That is, the through hole (5211) may be coupled by a screw thread of the lens module (5020). An adhesive may be interposed between the lens module and the bobbin (5210). At this time, the adhesive may be an epoxy hardened by UV, heat and laser.

The coil coupling part (5212) may be coupled by a coil (5220). The coil coupling part (5212) may be formed at an outer periphery surface of bobbin (5210). The coil coupling part (5212) may be formed by a groove formed by allowing a portion of the outer periphery surface of bobbin (5210) to be inwardly recessed. At this time, the coil coupling part (5212) may be accommodated by at least a portion of the coil (5220). The coil coupling part (5212) may be integrally formed with the outer periphery surface of bobbin (5210). For example, the coil coupling part (5212) may be continuously formed along the outer periphery surface of bobbin (5210). At this time, the coil coupling part (5212) may be wound with a coil (5220). In another example, the coil coupling part (5212) may be formed in a plural number, each being mutually spaced apart from the other. At this time, the coil (5220) may be also formed in a plural number to be respectively coupled to the coil coupling part (5212). Furthermore, in another example, the coil coupling part (5212) may be formed with an upper-bottom opened shape. At this time, the coil (5220) may be inserted and coupled to the coil coupling part (5212) through the opened portion while being in a pre-wound state.

The upper coupling part (5213) may be coupled to an upper elastic member (5610). The upper coupling part (213) may be coupled to an inner periphery surface (5612) of the upper elastic member (5610). The upper coupling part (5213) may be upwardly protruded from a top surface of bobbin (5210). For example, the protruder of the upper coupling part (5213) may be coupled by being inserted into a groove or a hole of an inner periphery surface (5612) of the upper elastic member (5610). At this time, the protruder of the upper coupling part (5213) may be fused while being inserted into the hole of the inner periphery surface (5612) to fix the upper elastic member (5610) between the fused protrude and the top surface of bobbin (5210).

The lower coupling part (5214) may be coupled to the lower elastic member (5620). The lower coupling part (5214) may be coupled to an inner periphery surface (5622) of the lower elastic member (5620). The lower coupling part (5214) may be downwardly protruded from a lower surface of bobbin (5210). For example, the protruder of the lower coupling part (5214) may be coupled by being inserted into a groove or a hole of the inner periphery surface (5622) of the lower elastic member (5620). At this time, the protruder of the lower coupling part (5214) may be fused while being inserted into the hole of the inner periphery surface (5622) to fix the lower elastic member (5620) between the fused protrude and the lower surface of bobbin (5210).

The bobbin (5210) may comprise a sensing magnet reception part (5215) accommodated by a sensing magnet (5710). The sensing magnet reception part (5215) may be formed at one side of bobbin (5210). The sensing magnet reception part (5215) may accommodate the sensing magnet (5710). The sensing magnet reception part (5215) may be formed by being inwardly recessed from the coil coupling part (5212).

The bobbin (5210) may comprise a compensation magnet reception part (5216) accommodated by a compensation magnet (5800). The compensation magnet reception part (5216) may be formed at the other side of bobbin (5210). The compensation magnet reception part (5216) may accommodate the compensation magnet (5800). The compensation magnet reception part (5216) may be formed by inwardly recessed from the coil coupling part (5212). The compensation magnet reception part (5216) may be so disposed as to be symmetrical with the sensing magnet reception part (5215) about a center of the bobbin (5210). In this case, when magnetism of the sensing magnet (5710) accommodated into the sensing magnet reception part (5215) and magnetism of the compensation magnet (5800) accommodated into the compensation magnet reception part (5216) are symmetrical, an electromagnetic balance between the sensing magnet (5710) and the compensation magnet (5800) may be realized, and as a result, an influence affected on an electromagnetic interaction between the coil (5220) and the magnet (5320) by the sensing magnet (5710) may be minimized.

The coil (5220) may be disposed on the bobbin (5210). The coil (5220) may be disposed at an outer periphery surface of bobbin (5210). The coil (5220) may be directly wound on the bobbin (5210). The coil (5220) may face the magnet (5320). In this case, when a current is supplied to the coil (5220) to form a magnetic field about the coil (5220), the coil (5220) may move relative to the magnet (5320) in response to the electromagnetic interaction between the coil (5220) and the magnet (5320). The coil (5220) may electromagnetically interact with the magnet (5320). The coil (5220) may move the bobbin (5210) relative to the housing (5310) through the electromagnetic interaction with the magnet (5320) to an optical axis. For example, the coil (5220) may be an integrally-formed one coil. In another example, the coil (5220) may comprise a plurality of coils, each coil being mutually spaced apart. The coil (5220) may comprise four coils, each being mutually spaced apart. At this time, the four coils may be disposed at an outer periphery surface of bobbin (5210) to allow two adjacent coils to mutually form a 90°.

The coil (5220) may comprise a pair of lead cables for power supply. At this time, the pair of lead cables on the coil (5220) may be electrically connected to a first lower elastic unit (5620a) and a second lower elastic unit (5620b), which are divisive elements of lower elastic member (5620). That is, the coil (5220) can receive the power through the lower elastic member (5620). To be more specific, the coil (5220) may receive the power sequentially through the PCB (5060), the substrate (5730) and the lower elastic member (5620). Alternatively, the coil (5220) may receive the power through the upper elastic member (5610).

The stator (5300) may be disposed at an outside of mover (5200). The stator (5300) may be supported by the base (5500) disposed thereunder. The stator (5300) may be disposed at an inner space of cover member (5100). The stator (5300) may move the mover (5200) through the electromagnetic interaction.

The stator (5300) may comprise a housing (5310) and a magnet (5320). However, any one or more of the housing (5310) and the magnet (5320) may be omitted or changed from the stator (5300). The stator (5300) may comprise a housing (5310) disposed at an outside of bobbin (5210). The stator (5300) may comprise a magnet (5320) facing the coil (5220) and fixed to the housing (5310).

The housing (5310) may be disposed at an outside of bobbin (5210). The housing (5310) may be disposed at an inside with the bobbin (5210). The housing (5310) may be disposed with a magnet (5320). The housing (5310) may be coupled to an elastic member (5600). A top surface of housing (5310) may be coupled with the upper elastic member (5610). The housing (5310) may be coupled at a lower surface to the lower elastic member (5620). The housing (5310) may be formed with a shape corresponding to an inner periphery surface of the cover member (5100). The housing (5310) may be formed with an insulation material. The housing may be formed with an injection in consideration of productivity. The housing (5310) may be fixed to a top surface of the base (5500). Alternatively, the housing (5310) may be omitted and the magnet (5320) may be directly fixed to the cover member (5100).

The housing (5310) may comprise first to fourth side parts (5301, 5302, 5303, 5304). The housing may comprise first to fourth corner portions (5305, 5306, 5307, 5308) formed among the first to fourth side parts (5301, 5302, 5303, 5304). The housing (5310) may comprise first to fourth corner portions (5305, 5306, 5307, 5308), each mutually being spaced apart.

The housing (5310) may comprise a first corner portion (5305) formed between the first and second side parts (5301, 5302). The housing (5310) may comprise a second corner portion (5306) formed between the second and third side parts (5302, 5303). The housing (5310) may comprise a third corner portion (5307) formed between the third and fourth side parts (5303, 5304). The housing (5310) may comprise a fourth corner portion (5308) formed between the fourth and first side parts (5304, 5301). At this time, a sensor (5720) may be disposed on the first corner portion (5305).

The housing (5310) may comprise a through hole (5311), a magnet coupling part (5312), an upper coupling part (5313), a lower coupling part and a sensing unit reception part (5315). However, any one or more of the through hole (5311), the magnet coupling part (5312), the upper coupling part (5313), the lower coupling part and the sensing unit reception part (5315) may be omitted or changed from the housing (5310).

The housing (5310) may be opened at an upper side and a bottom side to movably accommodate the bobbin (5210) to an optical axis direction. The through hole (5311) may be movably disposed with the bobbin (5210). The through hole (5311) may be formed with a shape corresponding to that of the bobbin (5210). An outer periphery surface of through hole (5311) may be spaced apart from an outer periphery surface of bobbin (5210).

The housing (5310) may comprise a magnet coupling part (5312) formed at a side surface with a shape corresponding to that of the magnet (5320) to accommodate the magnet (5320). The magnet coupling part (5312) may fix the magnet (5320) by accommodating the magnet (5320). The magnet coupling part (5312) may be so formed as to penetrate a side surface of housing (5310). Alternatively, the magnet coupling part (5312) may be formed at an inner periphery surface of the housing (5310) by being recessed thereinto.

The housing (5310) may comprise an upper coupling part (5313) coupled with the upper elastic member (5610). The upper coupling part (5313) may be coupled to an outer periphery surface (5610) of upper elastic member (5610). For example, a protruder of the upper coupling part (5313) may be coupled by being inserted into a groove or a hole of the outer periphery surface (5611). At this time, the protruder of the upper coupling part (5313) may fix the upper elastic member (5610) by being fused in a state of being inserted into the hole of the outer periphery surface (5611).

The housing (5310) may comprise a lower coupling part coupled with the lower elastic member (5620). The lower coupling part may be coupled to an external part (5621) of the lower elastic member (5620). For example, a protruder of the lower coupling part may be coupled by being inserted into a groove or a hole of the external part (5621). At this time, the protruder of the lower coupling part may fix the lower elastic member (5620) by being fused in a state of being inserted into a hole of the external part (5621). Alternatively, the external part (5621) of lower elastic member (5620) may be fixed by a method of being inserted between a lower surface of housing (5310) and a top surface of base (5500).

The housing (5310) may be formed with a sensing unit reception part (5315). The sensing unit reception part (5315) may be formed on the housing (5310). The sensing unit reception part (5315) may accommodate at least a portion of sensor (5720). The sensing unit reception part (5315) may accommodate at least a portion of the substrate (5730). The sensing unit reception part (5315) may be formed on a first side surface (5301) and a first corner portion (5305) of housing (5310). To be more specific, the sensing unit reception part (5315) may comprise a groove formed by allowing a side surface of housing (5310) to be inwardly recessed. Furthermore, the sensing unit reception part (5315) may comprise a groove formed by allowing a portion of the first corner portion (5305) to be recessed. Through this stricter, the sensor (5720) may be disposed on the first corner portion (5305) of housing (5310).

The magnet (5320) may be disposed on the housing (5310). The magnet (5320) may face the coil (5220). The magnet (5320) may be fixed to a magnet coupling part (5312) of housing (5310). The magnet (5320) may be adhered to the housing (5310) by an adhesive. The magnet (5320) may move the coil (5220) through an electromagnetic interaction with the coil (5220). The magnet (5320) may not be overlapped with a body part (5742) of substrate (5740) to a direction perpendicular to an optical axis.

The magnet (5320) may comprise a plurality of magnets. The magnet (5320) may comprise first to fourth magnets (5321, 5322, 5323, 5324). The magnet (5320) may comprise a first magnet (5321) disposed at a first side part (301), a second magnet (5322) disposed at a second side part (5302), a third magnet (5323) disposed at a third side part (5303) and a fourth magnet (5324) disposed at a fourth side part (5304).

The first to fourth magnets (5321, 5322, 5323, 5324) may be mutually spaced apart. The first to fourth magnets (5321, 5322, 5323, 5324) may be disposed on the housing (5310) to allow two adjacent magnets to mutually form 90°. The first magnet (5321) may be symmetrical with the third magnet (5323) about a center of housing (5310). The second magnet (5322) may be symmetrical with the fourth magnet (5324) about a center of housing (5310).

A center of first magnet (5321) may be disposed nearer to the fourth corner portion (5308) than the first corner portion (5305) of housing (5310). That is, the center of first magnet (5321) may be disposed to be leaned toward a fourth corner portion (5308) side. A center of the second magnet (5322) may be disposed nearer to the second corner portion (5306) than the first corner portion (5305) of housing (5310). That is, the center of second magnet (5322) may be disposed to be leaned toward a second corner portion (5306) side. A center of third magnet (5323) may be disposed to be nearer to the second corner portion (5306) than the third corner portion (5307) of housing (5310). That is, the center of third magnet (5323) may be disposed to be leaned toward a second corner portion (5306) side. A center of fourth magnet (5324) may be disposed nearer to the fourth corner portion (5308) than the third corner portion (5307) of housing (5310). That is, the center of fourth magnet (5324) may be leaned toward a fourth corner portion (5308) side. In this case, an electromagnetic interference between the first to fourth magnets (5321, 5322, 5333, 5334) and the sensing unit (5700) can be minimized. That is, in the present exemplary embodiment, an arrangement space of sensing unit (5700) can be secured through the shape and arrangement structure of the magnet (5320).

The base (5500) may be disposed at a lower side of bobbin (5210). The base (5500) may be disposed at a lower side of housing (5310). The base (5500) may support the stator (5300). A lower side of base (5500) may be disposed with the PCB (5060). The base (5500) may replace a sensor base (5030) protecting the image sensor (5050) mounted on the PCB (5060).

The base (5500) may comprise a through hole (5510), a terminal reception part (5520) and a foreign object collection part (not shown).

The base (5500) may comprise a through hole (5510) formed at a position corresponding to that of the through hole (5211) of bobbin (5210). The through hole (5510) of base (5500) may be coupled by a filter (5040). Alternatively, the filter (5040) may be coupled to the sensor base (5030) disposed at a lower surface of base (5500).

The base (5500) may comprise a terminal reception part (5520) in which at least a portion of the terminal part (5733) of the substrate (5730) is accommodated. The terminal reception part (5520) may accommodate at least a portion of the terminal part (5733) of substrate (5730). The terminal reception part (5520) may be formed by inwardly being recessed from an outer periphery surface of base (5500). The terminal part (5733) accommodated into the terminal reception part (5520) may be so disposed as to allow a terminal to be exposed to an outside.

The base (5500) may comprise a foreign object collection part collecting foreign objects introduced into the cover member (5100). The foreign object collection part may be disposed at a top surface of base (5500) to comprise an adhesive material and to collect foreign objects on an inner space formed by the cover member (5100) and the base (5500).

The elastic member (5600) may be coupled to the bobbin (5210) and the housing (5310). At least a portion of the elastic member (5600) may have elasticity. The elastic member (5600) may movably support the bobbin (5210) relative to the housing (5310). The elastic member (5600) may movably support the bobbin (5210) relative to the base (5500).

The elastic member (5600) may comprise an upper elastic member (5610) coupled to a top surface of housing (5310) and to a top surface of bobbin (5210), and a lower elastic member (5620) coupled to a lower surface of housing (5310) and to a lower surface of bobbin (5210).

The elastic member (5600) may comprise an upper elastic member (5610) coupled to a top surface of bobbin (5210) and to a top surface of housing (5310). The upper elastic member (5610) may be disposed at a top surface of bobbin (5210) and may be coupled to the bobbin (5210) and the housing (5310). The upper elastic member (5610) may be coupled to a top surface of bobbin (5210) and to a top surface of housing (5310). The upper elastic member (5610) may elastically support the bobbin (5210) relative to the housing (5310).

The upper elastic member (5610) may comprise an external part (5611), an internal part (5612) and a connection part (5613). The upper elastic member (5610) may comprise an external part (5611) coupled with the housing (5310), an internal part (5612) coupled to the bobbin (5210), and a connection part (5613) elastically connecting the external part (5611) and the internal part (5612).

The elastic member (5600) may comprise a lower elastic member (5620) coupled to a lower surface of bobbin (5210) and to a lower surface of housing (5310). The lower elastic member (5620) may be disposed at a lower side of bobbin (5210) and may be coupled to the bobbin (5210) and the housing (5310). The lower elastic member (5620) may be coupled to a lower surface of bobbin (5210) and a lower surface of housing (5310). The lower elastic member (5620) may elastically support the bobbin (5210) relative to the housing (5310). The external part (5621) of the lower elastic member (5620) may be fixed by being pressed between a lower surface of housing (5310) and a top surface of base (5500).

The lower elastic member (5620) may comprise an external part (5621), an internal part (5622) and a connection part (5623). The lower elastic member (5620) may comprise an external part (5621) coupled to the housing (5310), an internal part (5622) coupled to the bobbin (5210), and a connection part (5623) elastically connecting the external part (5621) and the internal part (5622).

The lower elastic member (5620) may be divisively formed with a pair to supply a power to the coil (5220). The lower elastic member (5620) may comprise a first lower elastic unit (5620a) elastically connecting a distal end of the coil (5220) and the substrate (5730). The lower elastic member (5620) may comprise a second lower elastic unit (5620b) spaced apart from the first lower elastic unit (5620a) to electrically connect the other distal end of the coil (5220) and the substrate (5730).

The sensing unit (5700) may provide position information of lens module (5020) by detecting the position information of the lens module (5020) for AF feedback function. The sensing unit (5700) may comprise a sensing magnet (5212), a sensor (5720) and a substrate (5730). However, any one or more of the sensing magnet (5212), the sensor (5720) and the substrate (5730) may be omitted or changed from the sensing unit (5700).

The sensing magnet (5710) may be disposed at one side of bobbin (5210). The compensation magnet (5800) may be disposed at the other side of bobbin (5210). The sensor (5720) may detect the sensing magnet (5710) by being disposed at the housing (5310).

The sensing magnet (5710) may be disposed at the bobbin (5210). The sensing magnet (5710) may be detected by the sensor (5720). The sensing magnet (5710) may be so disposed as to face the first corner portion (5305) of the housing (5310). The sensing magnet (5710) may be disposed on a first virtual straight line (L1 of FIG. 40) connecting the first corner portion (5305) and the third corner portion (5307). The sensing magnet (5710) may have a magnetism corresponding to that of the compensation magnet (5800). The sensing magnet (5710) may be disposed at one side of bobbin (5210). The sensing magnet (5710) may be overlapped with the coil (5220) to a direction perpendicular to an optical axis. The sensing magnet (5710) may be disposed at an inside of the coil (5220). The sensing magnet (5710) may be magnetized with four poles and may be disposed in consideration of relative position of the sensor (5720) in order to use only a section where a Hall output is outputted with a positive number.

The sensor (5720) may detect the sensing magnet (5710). The sensor (5720) may be disposed on an imaginary straight line of a first virtual straight line (L1) connecting the first corner portion (5305) and the third corner portion (5307). That is, the sensor (5720), the sensing magnet (5710) and the compensation magnet (5800) may be all disposed on the first virtual straight line (L1). The sensor (5720) may be mounted on the substrate (5730). The sensor (5720) may be mounted on an extension part (5731) of substrate (5730). The sensor (5720) may be formed with a Hall sensor (Hall IC) detecting the magnetic field of magnet.

The Hall sensor may be fixed on the housing (5310) and the sensing magnet (5710) may be fixed on the bobbin (5210). When the sensing magnet (5710) moves along with the bobbin (5210), a magnetic flux density detected by the Hall IC inside the Hall sensor may be changed in response to relative position of the Hall sensor and the sensing magnet (5710). The Hall sensor may detect the position of lens module (5020) using an output voltage of Hall sensor that is proportionate to a magnetic flux density that changes in response to a relative position between the Hall sensor and the sensing magnet (5710).

The substrate (5730) may be mounted with a sensor (5720). At least a portion of the substrate (5730) may be accommodated into the sensing unit reception part (5315) formed on the housing (5310). The substrate (5730) may be electrically connected to a distal end of the coil (5220) by the first lower elastic unit (5620a). The substrate (5730) may be electrically connected to the other distal end of the coil (5220) by the second lower elastic unit (5620b). That is, the substrate (5730) may supply a power to the coil (5220) through the lower elastic member (5620).

The substrate (5730) may comprise a body part (5732) contacting a side part of housing (5310). The substrate (5730) may comprise a terminal part (5733) downwardly extended from the body part (5732). The substrate (5730) may comprise an extension part (5731) bent from the body part (5732) to be inserted into the housing (5310) and mounted with the sensor (5720). The substrate (5730) may be an FPCB (Flexible Printed Circuit Board). However, the present invention is not limited thereto.

The substrate (5730) may be inserted to the sensing unit reception part (5315) of housing (5310) from a lower side. The substrate (5730) may be fixed by an adhesive (not shown) while being inserted into the sensing unit reception part (5315) of housing (5310). The substrate (5730) may be so arranged as to allow the body part (5732) to be disposed on an outside of housing (5310) and to allow the extension part (5731) to be disposed at an inside of housing (5310) while being inserted into the sensing unit reception part (5315) of housing (5310). Through this structure, the terminal part (5733) disposed at a lower side of body part (5732) may be easy to be coupled for electrical conduction with an outside element, and the sensor (5720) mounted at an inside surface of extension part (5731) can detect the sensing magnet (5710) disposed at an inside with a high output.

The extension part (5731) may be extended into an inside of the housing (5310) by being bent from the body part (5732). The extension part (5731) may be mounted with the sensor (5720). The body part (5732) may be contacted to an outside lateral surface of housing (5310). The body part (5732) may not be overlapped with the magnet (5320) to a direction perpendicular to an optical axis. The terminal part (5733) may be downwardly extended from the body part (5732). The terminal part (5733) may be exposed to an outside.

The lens driving device (5010) may comprise a compensation magnet (5800). The compensation magnet (5800) may have magnetism corresponding to that of the sensing magnet (5710). The compensation magnet (5800) may be disposed at the other side of bobbin (5210). The compensation magnet (5800) may be disposed on a first virtual line (L1) which is an imaginary straight line connecting the first corner portion (5305) and the third corner portion (5307). The compensation magnet (5800) may be symmetrical about a center between the sensing magnet (5710) and the bobbin (5210). Through this structure, an electromagnetic balance between the sensing magnet (5710) and the compensation magnet (5800) may be realized. As a result, the influence affected on an electromagnetic interaction between the coil (5220) and the magnet (5320) by the sensing magnet (5710) may be minimized.

Hereinafter, operation of camera module according to the third exemplary embodiment will be described.

To be more specific, an AF function of a camera module (5003) according to the third exemplary embodiment will be described. When a power is supplied to the coil (5220), the coil performs movement to the magnet (5320) by the electromagnetic interaction between the coil (5220) and the magnet (5320). At this time, the bobbin (5210) coupled by the coil (5220) integrally moves along with the coil (5220). That is, the bobbin coupled at an inside by the lens module (5020) may move relative to the housing (5310) to an optical axis direction. The said movement by the bobbin (5210) results in the lens module (5020) moving nearer to or distancing from the image sensor, whereby supply of power to the coil (5220) can perform the focus adjustment to a subject according to the present exemplary embodiment.

Meantime, in the camera module (5003) according to the third exemplary embodiment, an AF feedback is applied in order to realize a more accurate AF function. The sensor (5720) arranged on the housing (5310) detects the magnetic field of sensing magnet (5710) fixed to the bobbin (5210). When the bobbin moves a relative movement to the housing (5310), a distance between the sensor (5720) and the sensing magnet (5710) is changed to thereby change the amount of magnetic field detected by the sensor (5720). The sensor (5720) detects the movement of bobbin (5210) to the optical axis or the position of bobbin (5210) using the abovementioned method, and transmits the detection value to a controller. The controller determines whether to perform an additional movement to the bobbin (5210) through the received detection value. These types of processes are generated in real time, such that the AF function of the camera module (5003) according to the present invention can be more accurately performed through the AF feedback function.

So far, the third exemplary embodiment has been explained by an AF model capable of performing an AF function. However, in a modification, it may be possible that the housing (5310) and the base (5500) are spaced apart, and a side support member (wire or leaf spring) movably supports the housing (5310) relative to the base (5500), and the OIS coil part is made to face the magnet (5320) on a top surface of base (5500). That is, in the modification to the present exemplary embodiment, the OIS function can be also performed along with the AF function.

Fourth Exemplary Embodiment

Hereinafter, the 'lens driving device' may be interchangeably used with the 'VCM (Voice Coil Motor)'. Hereinafter, a recessed groove (33) may be interchangeably used with a 'dent structure' and a 'dent part'.

The 'Active Align Type Module' method is one where after the image sensor (6050), the PCB (6060) and the sensor base (6030) are assembled, an epoxy is coated on a top surface of sensor base (6030), and an assembly of lens driving device (6010) and the lens module (6020) is mounted on the sensor base (6030) through an Active Align(ment) Auto Focusing process.

The recent trend is to require a high performance lens, where a diameter of lens module (6020) tends to be enlarged. Meantime, the diameter of lens module (6020) is increased while the size of the relatively compact lens driving device (6010) is increased in a limited state, such that an adhesive area between the sensor base (6030) and the lens driving device (6010) is decreased. Particularly, obtainment of space at a soldering terminal part of the lens driving device (6010) is required and therefore, an actual adhesive area becomes less than 0.4 mm.

Due to narrow adhesive area in a comparative example, there may be generated a risk in the active align epoxy dispensing process (epoxy being introduced into filter (6040) due to excessive coating and reduced adhesiveness due to decreased coating). Furthermore, the lens driving device (6010) may be disengaged during drop test and tumble test.

The fourth exemplary embodiment relates to an active align process type module formed with a dent structure on an active align epoxy coated area on a top surface of sensor base.

In the fourth exemplary embodiment, an epoxy is coated on a top surface of sensor base (6030) after the image sensor (6050), the PCB (6010) and the sensor base (6030) are assembled. At this time, the active align epoxy must be coated on the dent structure. Thereafter, the lens driving device (6010) is mounted through the active alignment and module is completed.

The fourth exemplary embodiment is characterized by the fact that a top surface of sensor base (6030) is applied with a dent structure.

Application of dent structure on an active align epoxy coated surface enables to increase a contact area with the lens driving device (6010) due to introduction of epoxy onto the dent part to thereby increase the adhesive power of active align epoxy according to the fourth exemplary embodiment.

In this case, the disengagement of lens driving device (6010) can be inhibited due to increased adhesive power after drop test and tumble test. Furthermore, an additional epoxy sealing process applied to the lens driving device (6010) as a method to inhibit the lens driving device (6010) from being disengaged when the dent structure is not applied can be skipped. In addition, the phenomenon that an active align epoxy can be introduced into the filter (6040) due to excessive coating can be inhibited.

Hereinafter, configuration of optical device according to the fourth exemplary embodiment will be described with reference to the accompanying drawings.

Figure 56:
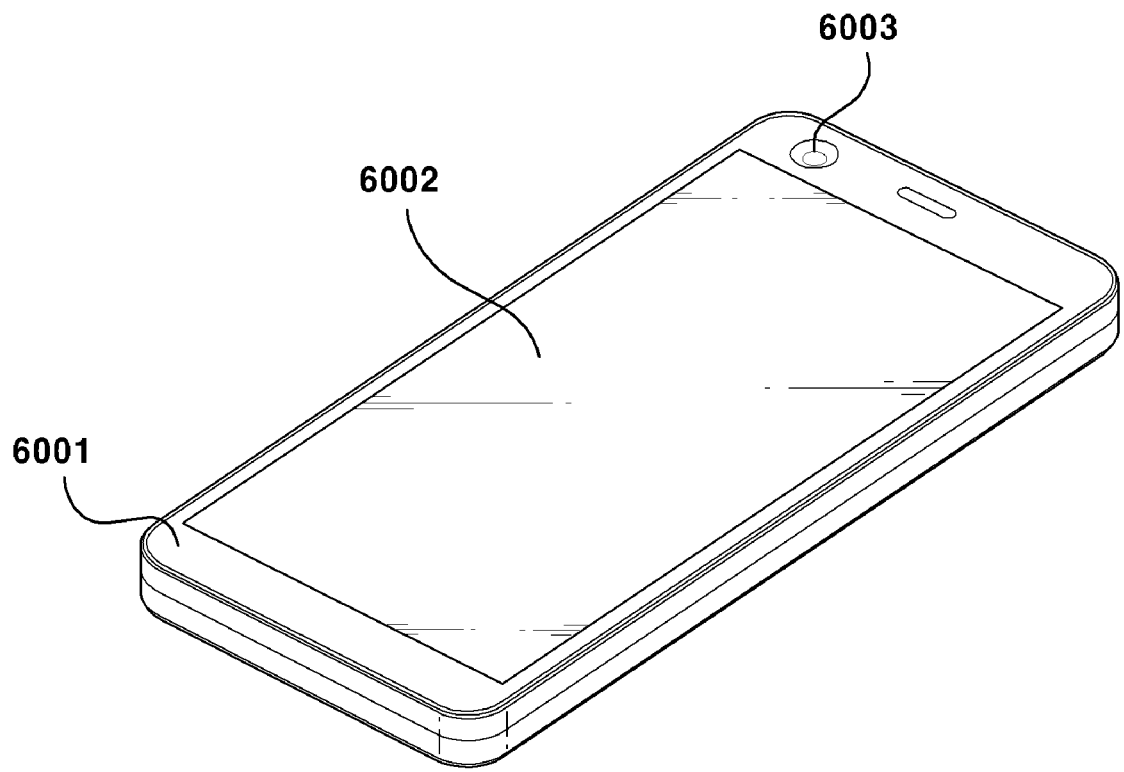
FIG. 56 is a perspective view of an optical device according to a fourth exemplary embodiment.

FIG. 56 is a perspective view of an optical device according to the present exemplary embodiment. The optical device may comprise a main body (6001), a display part (6002) and a camera module (6003). The optical device according to the fourth exemplary embodiment may be inferably applied with the optical device according to the third exemplary embodiment.

Hereinafter, configuration of camera module according to the fourth exemplary embodiment will be described with reference to the accompanying drawings.

Figure 43:
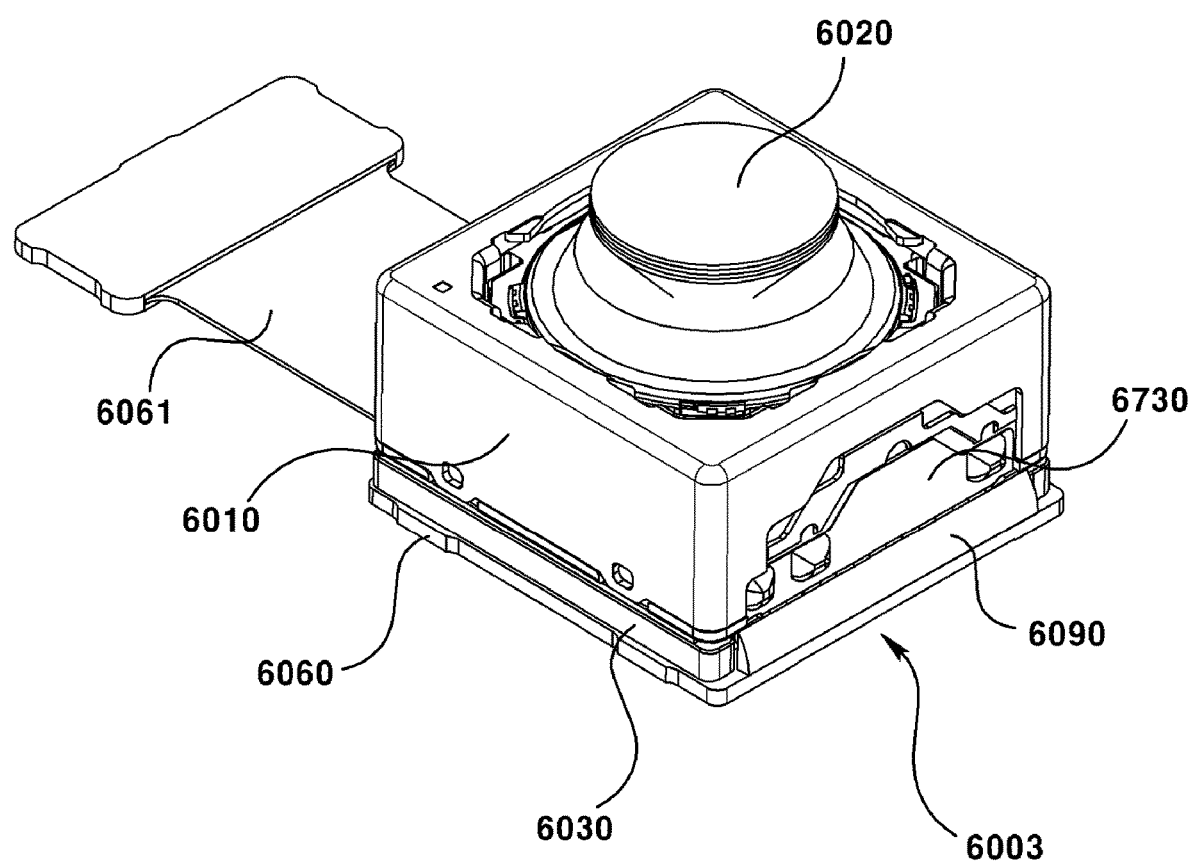
FIG. 43 is a perspective view of a camera module according to a fourth exemplary embodiment.
Figure 44:
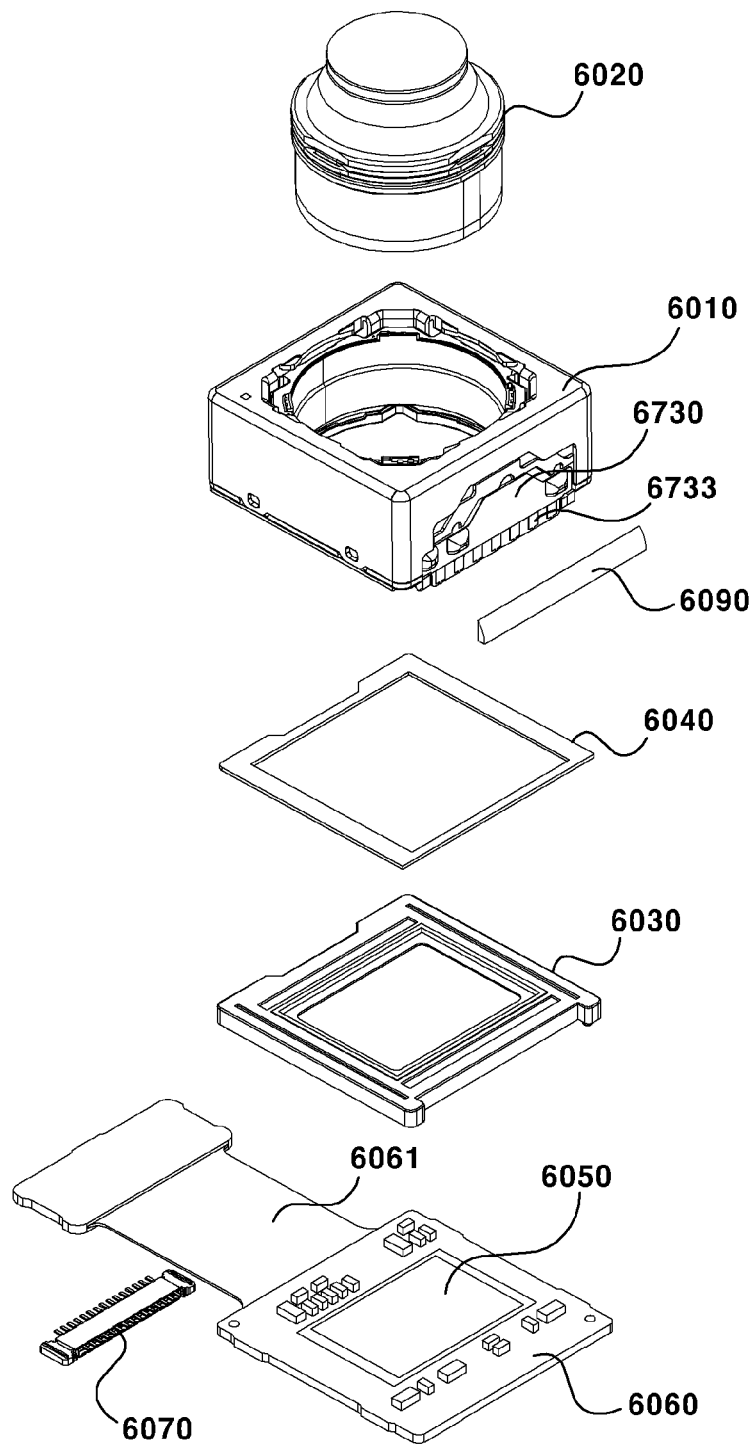
FIG. 44 is an exploded perspective view of a camera module according to a fourth exemplary embodiment.
Figure 45:
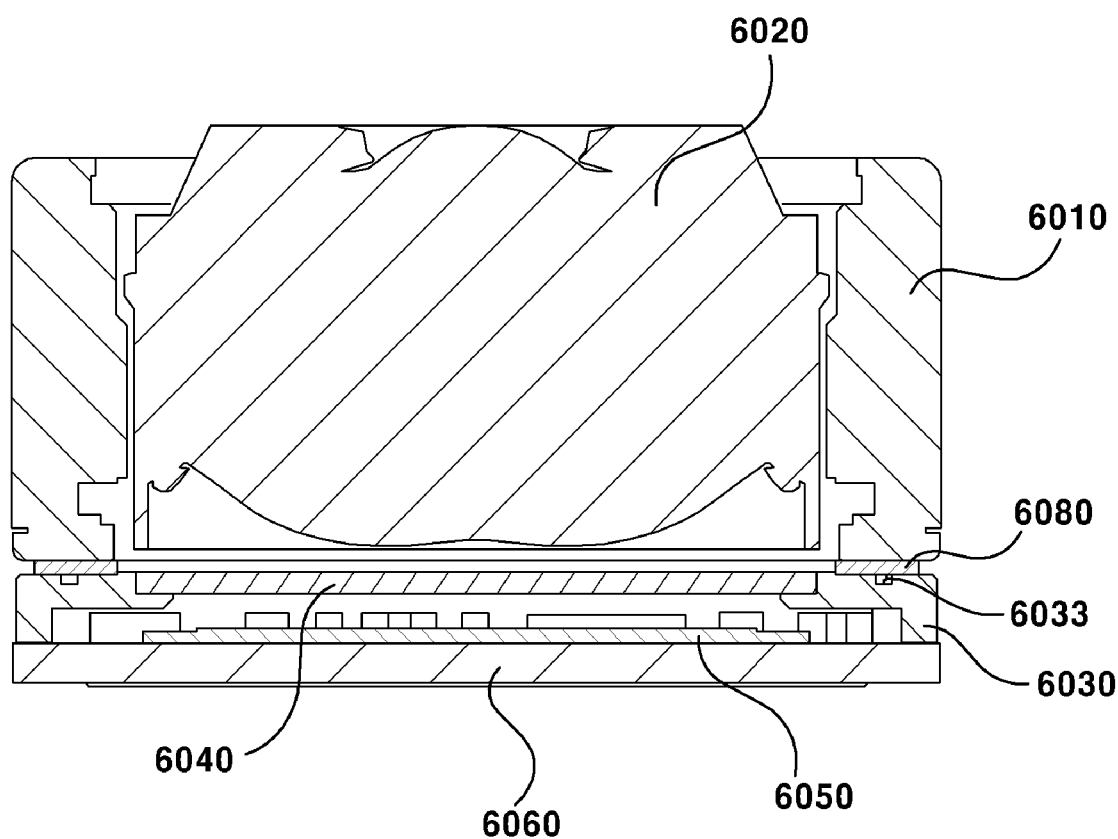
FIG. 45 is a cross-sectional view of a camera module according to a fourth exemplary embodiment.
Figure 46:
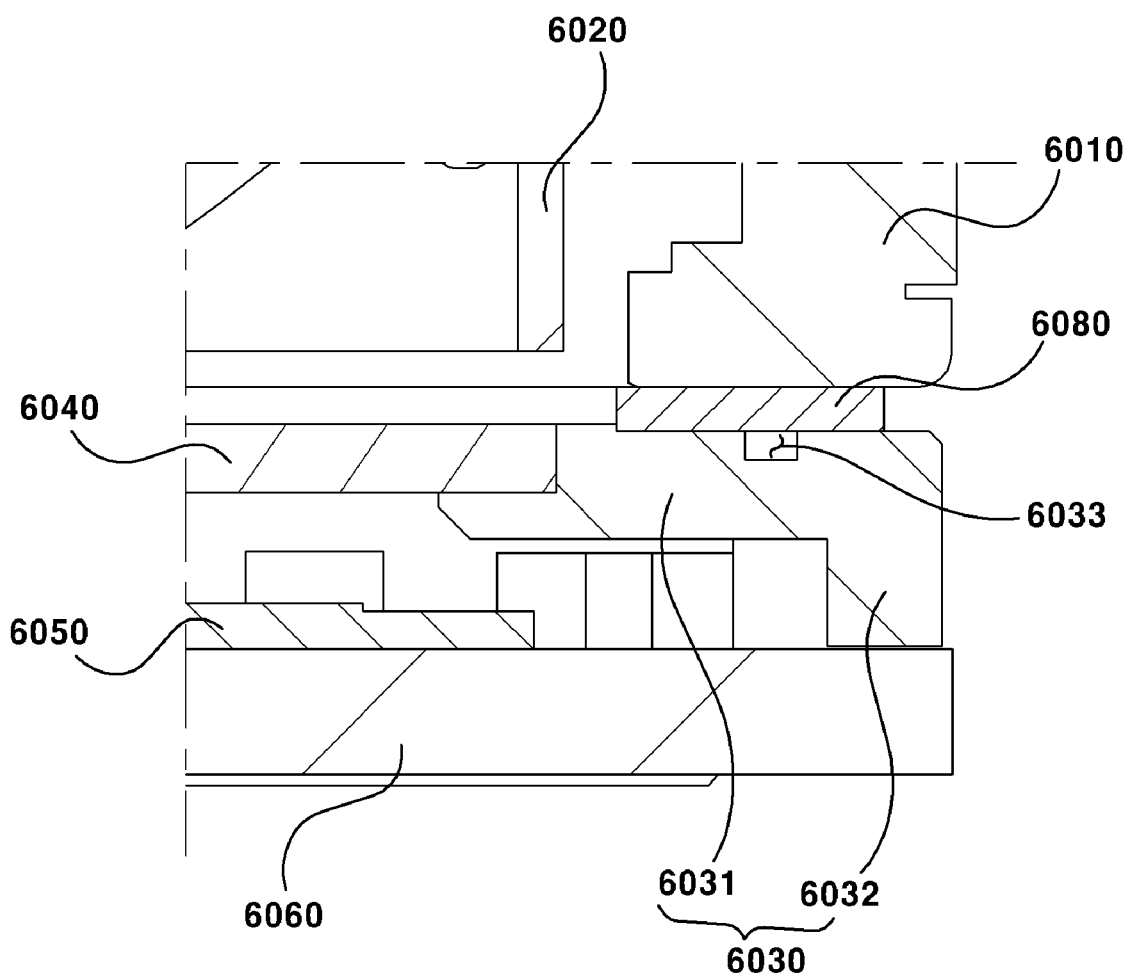
FIG. 46 is a partially expanded cross-sectional view of some elements in FIG. 45.
Figure 47:
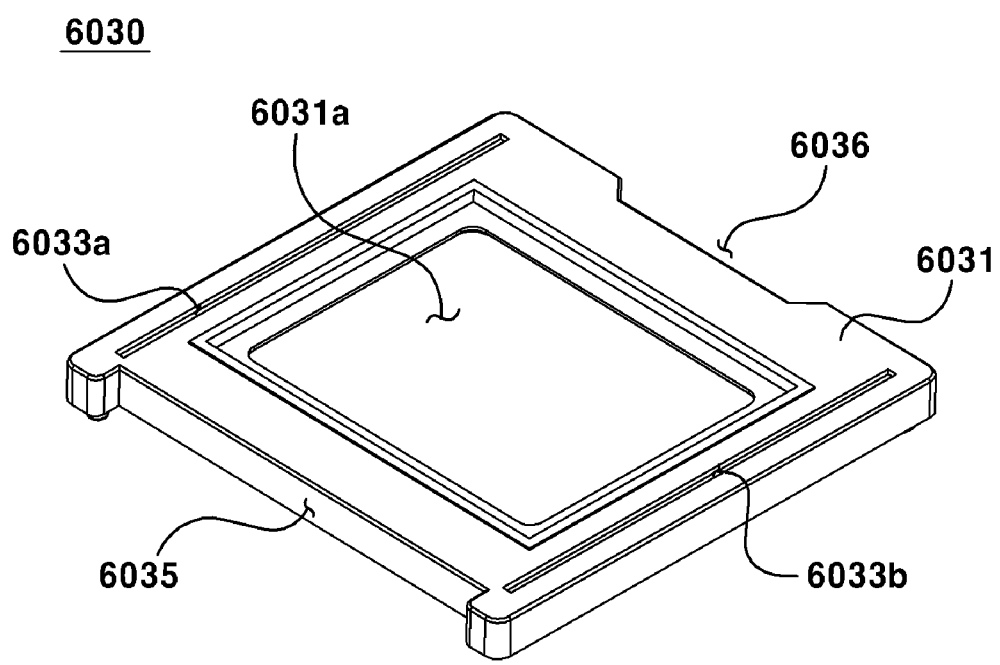
FIG. 47 is a perspective view of a sensor base of a camera module according to a fourth exemplary embodiment.
Figure 48:
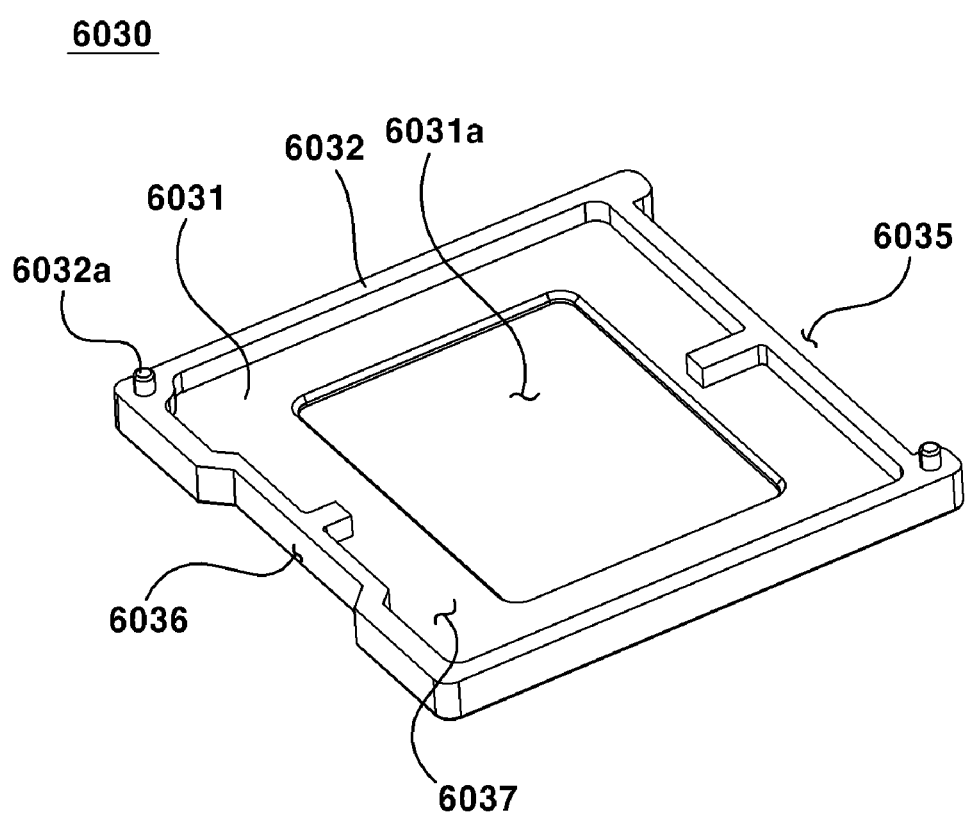
FIG. 48 is a bottom perspective view of a sensor base of a camera module according to a fourth exemplary embodiment.

FIG. 43 is a perspective view of a camera module according to a fourth exemplary embodiment, FIG. 44 is an exploded perspective view of a camera module according to a fourth exemplary embodiment, FIG. 45 is a cross-sectional view of a camera module according to a fourth exemplary embodiment, FIG. 46 is a partially expanded cross-sectional view of some elements in FIG. 45, FIG. 47 is a perspective view of a sensor base of a camera module according to a fourth exemplary embodiment, and FIG. 48 is a bottom perspective view of a sensor base of a camera module according to a fourth exemplary embodiment.

The camera module may comprise a lens driving device (6010), a lens module (6020), a sensor base (6030), a filter (6040), an image sensor (6050), a PCB (6060), a connector (6070), an adhesive (6080), a protection member (6090) and a controller (not shown). However, any one or more of the lens driving device (6010), the lens module (6020), the sensor base (6030), the filter (6040), the image sensor (6050), the PCB (6060), the connector (6070), the adhesive (6080), the protection member (6090) and the controller may be omitted or changed from the camera module.

The lens driving device (6010) may be coupled to the sensor base (6030). The lens driving device (6010) may be disposed on a top surface of sensor base (6030). The lens driving device (6010) may comprise a substrate (6730) disposed at a side surface of the lens driving device (6010). The lens driving device (6010) may be coupled to the lens module (6020). The lens driving device (6010) may move the coupled lens module (6020).

The lens module (6020) may comprise at least one lens. The lens module (6020) may comprise a lens and a lens barrel. The lens module (6020) may comprise a lens barrel, and at least one lens accommodated into the lens barrel. However, an element of lens module (6020) is not limited to the lens barrel, and may suffice for any holder structure capable of supporting one or more lenses. The lens module (6020) may be coupled to an inside of lens driving device (6010). The lens module (6020) may be coupled to a bobbin (6210) of the lens driving device (6010). The lens module (6020) may integrally move along with the bobbin (6210). The lens module (6020) may be coupled to the bobbin (6210) by an adhesive (not shown). For example, the lens module (6020) may be screw-connected to the bobbin (6210). Meantime, a light having passed the lens module (6020) may be irradiated on the image sensor (6050).

The sensor base (6030) may be disposed at a top surface of PCB (6060). The sensor base (6030) may be disposed at a lower surface of lens driving device (6010). The sensor base (6030) may be interposed between the PCB (6060) and the lens driving device (6010). The sensor base (6030) may accommodate, at an inside, the image sensor (6050). The sensor base (6030) may be formed with an injection material. The sensor base (6030) may be formed with an insulation material.

The sensor base (6030) may comprise a body part (6031) and a support part (6032). However, any one or more of the body part (6031) and the support part (6032) may be omitted or changed from the sensor base (6030). The sensor base (6030) may comprise a body part (6031) having a through hole (6031a) disposed at a top side of image sensor (6050). The sensor base (6030) may comprise a support part (6032) downwardly extended from an outside of body part (6031) to be disposed at a top surface of the PCB (6060).

The body part (6031) may be disposed at a top side of image sensor (6050). The body part (6031) may be formed with a through hole (6031a). The body part (6031) may be formed at an outside with a support part (6032). The body part (6031) may be disposed at a top surface with a lens driving device (6010).

The support part (6032) may be downwardly extended from an outside of body part (6031). The support part (6032) may be disposed at a top surface of PCB (6060). The support part (6032) may support the body part (6031) relative to the PCB (6060). Through this structure, the body part (6031) may be spaced apart from the top surface of PCB (6060) and the image sensor (6050).

A lower surface of support part (6032) may be formed with two protruders (6032*a*). A lower surface of sensor base (6030) may be formed with two protruders (6032*a*). The protruders (6032*a*) may be protruded from a lower surface of support part (6032). The protruders (6032*a*) may be formed in order to guide the coupling with the PCB (6060). That is, each of the protruders (6032*a*) may be accommodated into a groove or a hole of the PCB (6060) by being formed with a shape corresponding to that of the groove or the hole of the PCB (6060). Furthermore, a third recessed groove (6037) may be formed at a lower surface of sensor base (6030) by the support part (6032).

The sensor base (6030) may be formed by allowing a top surface to be recessed and may comprise a recessed groove (6033) accommodating a portion of an adhesive (6080). The recessed groove (6033) may be formed by allowing a top surface of sensor base (6030) to be recessed. The recessed groove (6033) may accommodate at least a portion of adhesive (6080). The adhesive (6080) may be coated along the recessed groove (6033). The recessed groove (6033) may be spaced apart from a filter reception part (6034). The recessed groove (6033) may be recessed from a top surface of sensor base (6030) at a depth by 0.05 mm. The recessed groove (6033) may be recessed from a top surface of sensor base (6030) at a depth by 0.03 mm~0.05 mm. The recessed groove (6033) may be formed with a 0.2 mm width. The recessed groove (6033) may be formed with a width of 0.2 mm~0.3 mm.

The recessed groove (6033) may comprise a first groove (6033*a*) and a second groove (6033*b*). The recessed groove (6033) may be formed between the filter reception part (6034) and an outer lateral surface of sensor base (6030), and may comprise a first groove (6033*a*) and a second groove (6033*b*), each mutually spaced apart.

The first groove (6033*a*) and the second groove (6033*b*) may be formed between the filter reception part (6034) and an outer lateral surface of sensor base (6030). The first groove (6033*a*) and the second groove (6033*b*) may be mutually spaced apart. The first groove (6033*a*) may be disposed in parallel with the second groove (6033*b*) at an opposite side of the second groove (6003*b*) about the filter reception part (6034). The first groove (6033*a*) and the second groove (6033*b*) may be mutually spaced apart from an outer lateral surface of sensor base (6030). Each of the first groove (6033*a*) and the second groove (6033*b*) may be straightly extended along an imaginary straight line. An extended length of the first groove (6033*a*) and the second groove (6033*b*) may be longer than a length of corresponding direction of the filter reception part (6034).

The first groove (6033*a*) may be formed between the filter reception part (6034) and the outer lateral surface of sensor base (6030). The first groove (6033*a*) may be spaced apart from the second groove (6033*b*). The first groove (6033*a*) may be spaced apart from the outer lateral surface of sensor base (6030). A distance between the first groove (6033*a*) and the outer lateral surface of sensor base (6030) may correspond to that between the first groove (6033*a*) and the filter reception part (6034). The first groove (6033*a*) may be straightly extended along an imaginary straight line. An extended length (see A of FIG. 49) of the first groove (6033*a*) may be longer than a length (see B of FIG. 49) of corresponding direction of filter reception part (6034).

The second groove (6033*b*) may be formed between the filter reception part (6034) and the outer lateral surface of sensor base (6030). The second groove (6033*b*) may be spaced apart from the first groove (6033*a*). The second groove (6033*b*) may be spaced apart from the outer lateral surface of sensor base (6030). A distance between the second groove (6033*b*) and the outer lateral surface of sensor base (6030) may correspond to that between the second groove (6033*b*) and the filter reception part (6034). The second groove (60336) may be straightly extended along an imaginary straight line. An extended length (see A of FIG. 49) of the second groove (6033*b*) may be longer than a length (see B of FIG. 49) of corresponding direction of filter reception part (6034).

In a modification, the groove (6033) may not be straight but may be extended in a zigzagged shape. Furthermore, the groove (6033) may be so extended as to have a curvature. The groove (6033) may be formed in a plural number, each spaced apart and arranged in a straight line. The groove (6033) may be arranged in a plural number, each parallel to a diagonal line direction relative to the top surface of sensor base (6030).

In another modification, the groove (6033) may be formed on a lower surface of the lens driving device (6010) instead of the top surface of sensor base (6030). Alternatively, the groove (6033) may be formed on both the top surface of sensor base (6030) and a lower surface of the lens driving device (6010). At this time, the groove (6003) of sensor base (6030) and the groove (6033) of lens driving device (6010) may be formed at a corresponding position and with a corresponding shape.

The sensor base (6030) may comprise a through hole (6031*a*) formed at a position corresponding to that of the image sensor (6050). The sensor base (6030) may comprise a filter reception part (6040) formed by allowing a portion on a top surface of sensor base (6030) corresponding to a surrounding of the through hole (6031*a*) to be recessed and arranged with a filter (6040).

The filter reception part (6034) may be formed by allowing a portion of a top surface of the sensor base (6030) to be recessed. The filter reception part (6034) may be formed at a surrounding of the through hole (6031*a*). The filter reception part (6034) may be accommodated by at least a portion of the filter (6040). The filter reception part (6034) may have a shape corresponding to that of filter (6040).

The sensor base (6030) may comprise a first recessed part (6035) and a second recessed part (6036). The first recessed part (6035) may be formed by allowing a side surface of sensor base (6030) to be recessed. The first recessed part (6035) may accommodate a terminal (6733) of substrate (6730) at the lens driving device (6010). That is, the first recessed part (6035) may be arranged with a terminal (6733) of substrate (6730) at the lens driving device (6010). The second recessed part (6036) may be formed by allowing a side surface of sensor base (6030) to be recessed. The second recessed part (6036) may be formed at an opposite side of first recessed part (6037). A width of second recessed part (6036) may be narrower than that of the first recessed part (6037). The second recessed part (6036) may comprise a recessed surface and an inclination slantly connecting the recessed surface and a side surface of the sensor base (6030).

The sensor base (6030) may comprise a third recessed part (6037). The third recessed part (6037) may be formed by allowing a portion of a lower surface of sensor base (6030) to be recessed. A space may be formed by the third recessed part (6037) between the body part (6031) of sensor base (6030) and the PCB (6060), and the space may be arranged with the image sensor (6050).

The filter (6040) may be disposed at a position corresponding to that of the through hole (6031a). The filter (6040) may be disposed on the filter reception part (6034) formed by allowing a portion of the top surface of the sensor base (6030) to be recessed. The filter (6040) may shield a light of an infrared region from being incident on the image sensor (6050). The filter (6040) may be interposed between the lens module (6020) and the image sensor (6050). The filter (6040) may be disposed on the sensor base (6030). In another example, the filter (6040) may be disposed at a base (6500) of lens driving device (6010). The filter (6040) may be formed with a film material or glass material. The filter (6040) may be formed by coating an infrared cut-off coating material on a flat optical filter such as protective cover glass and cover glass. For example, the filter (6040) may be an infrared cut-off filter or an infrared absorption filter. In another example, the filter (6040) may be an infrared reflection filter.

The image sensor (6050) may be disposed on the PCB (6060). The image sensor (6050) may be disposed on a top surface of PCB (6060). The image sensor (6050) may be electrically connected to the PCB (6060). For example, the image sensor (6050) may be coupled to the PCB (6060) using an SMT (Surface Mounting Technology). In another example, the image sensor (6050) may be coupled to the PCB (6060) by the flip chip technology. The image sensor (6050) may be so disposed as to be aligned with the lens module (6020) in terms of optical axis. That is, an optical axis of the image sensor (6050) and an optical axis of lens module (6020) may be aligned. Through this configuration, the image sensor (6050) can obtain a light having passed the lens module (6020). The image sensor (6050) may convert a light irradiated on an effective image region of the image sensor (6050) to an electric signal. The image sensor (6050) may be any one of a CCD (charge coupled device), an MOS (metal oxide semi-conductor), a CPD and a CID. However, the types of image sensor (6050) are not limited thereto, and the image sensor (6050) may comprise any configuration capable of converting an incident light to an electric signal. The image sensor (50) may be electrically conducted to the PCB (60) by a wire.

The PCB (6060) may be disposed at an upper surface with the sensor base (6030). The PCB (6060) may be disposed at a lower surface of sensor base (6030). The PCB (6060) may be coupled with the lens driving device (6010). The PCB (6060) may be disposed with an image sensor (6050). The PCB (6060) may be electrically connected with the image sensor (6050). The sensor base (6030) may be interposed between the PCB (6060) and the lens driving device (6010). At this time, the sensor base (6030) may accommodate, at an inside, the image sensor (6050). Through this structure, a light having passed the lens module (6020) coupled to the lens driving device (6010) may be irradiated on the image sensor (6050) disposed on the PCB (6020). The PCB (6060) may supply a power (current) to the lens driving device (6010). Meantime, the PCB (6060) may be disposed with a controller in order to control the lens driving device (6010). The PCB (6060) may comprise an FPCB (6061).

The PCB (6060) may comprise a rigid PCB (PCB Rigid) disposed with the image sensor (6050) and an FPCB (Flexible PCB) connecting a connector (6070) and the rigid PCB. The connector (6070) may be used in order to electrically connect the camera module (6003) to an outside element.

An adhesive (6080) may be interposed between the sensor base (6030) and the lens driving device (6010). The adhesive (6080) may be disposed at a lower surface of lens driving device (6010) and a top surface of sensor base (6030). The adhesive (6080) may be disposed at a recessed groove (6033) of sensor base (6030). The adhesive (6080) may be coated on the recessed groove (6033) of sensor base (6030). The adhesive (6080) may be an epoxy.

A protection member (6080) may be coated on the terminal (6733) of substrate (6730) and the PCB (6060). The protection member (6080) may inhibit the terminal (6733) of substrate (6730) from being exposed to an outside. The protection member (6080) may be an epoxy.

Hereinafter, the sensor base according to a modification will be described with reference to the accompanying drawings.

Figure 49:
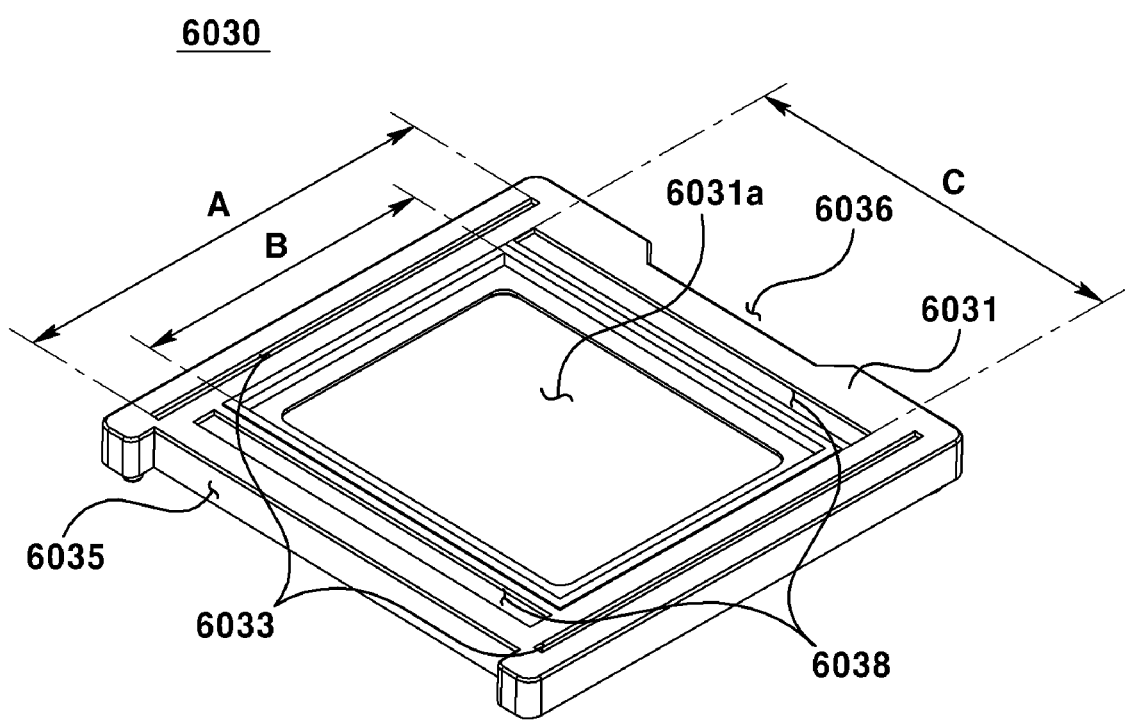
FIG. 49 is a perspective view of a sensor base of a camera module according to a modification of a fourth exemplary embodiment.

FIG. 49 is a perspective view of a sensor base on the camera module according to a modification of fourth exemplary embodiment of the present invention.

The sensor base (6030) in the modification may additionally comprise a groove (6038) in comparison with the present exemplary embodiment.

The groove (6038) may be formed by allowing a top surface of sensor base (6030) to be recessed. The groove (6038) may accommodate at least a portion of the adhesive (6080). The adhesive (6080) may be coated along the groove (6038). The groove (6038) may be spaced apart from the filter reception part (6034). The groove (6038) may be spaced apart from the recessed groove (6033). The groove (6038) and the recessed groove (6033) may be alternately disposed on a surrounding of filter reception part (6034). The groove (6038) may be extended with a width greater than that of the recessed groove (6033).

The groove (6038) may comprise a third groove and a fourth groove. The third groove and the fourth groove may be interposed between the filter reception part (6034) and an outer lateral surface of sensor base (6030). The third groove and the fourth groove may be mutually spaced apart. The third groove may be disposed in parallel with the fourth groove at an opposite side of the fourth groove about the filter reception part (6034). The third groove and the fourth groove may be spaced apart from the outer lateral surface of sensor base (6030). Each of the third groove and the fourth groove may be straightly extended along an imaginary straight line. A length (See C of FIG. 49) of the third and fourth grooves may correspond to a length (See C of FIG. 49) of corresponding direction of the filter reception part (6034).

Hereinafter, configuration of lens driving device according to another exemplary embodiment of fourth exemplary embodiment will be described with accompanying drawings. The lens driving device according to another exemplary embodiment of fourth exemplary embodiment may be applied with a camera module according to the present exemplary embodiment instead of a lens driving device of fourth exemplary embodiment (See FIGS. 43 and 44). The explanation of lens driving device according to another exemplary embodiment of fourth exemplary embodiment may be inferably applied from the explanation of lens driving device according to the fourth exemplary embodiment.

Figure 50:
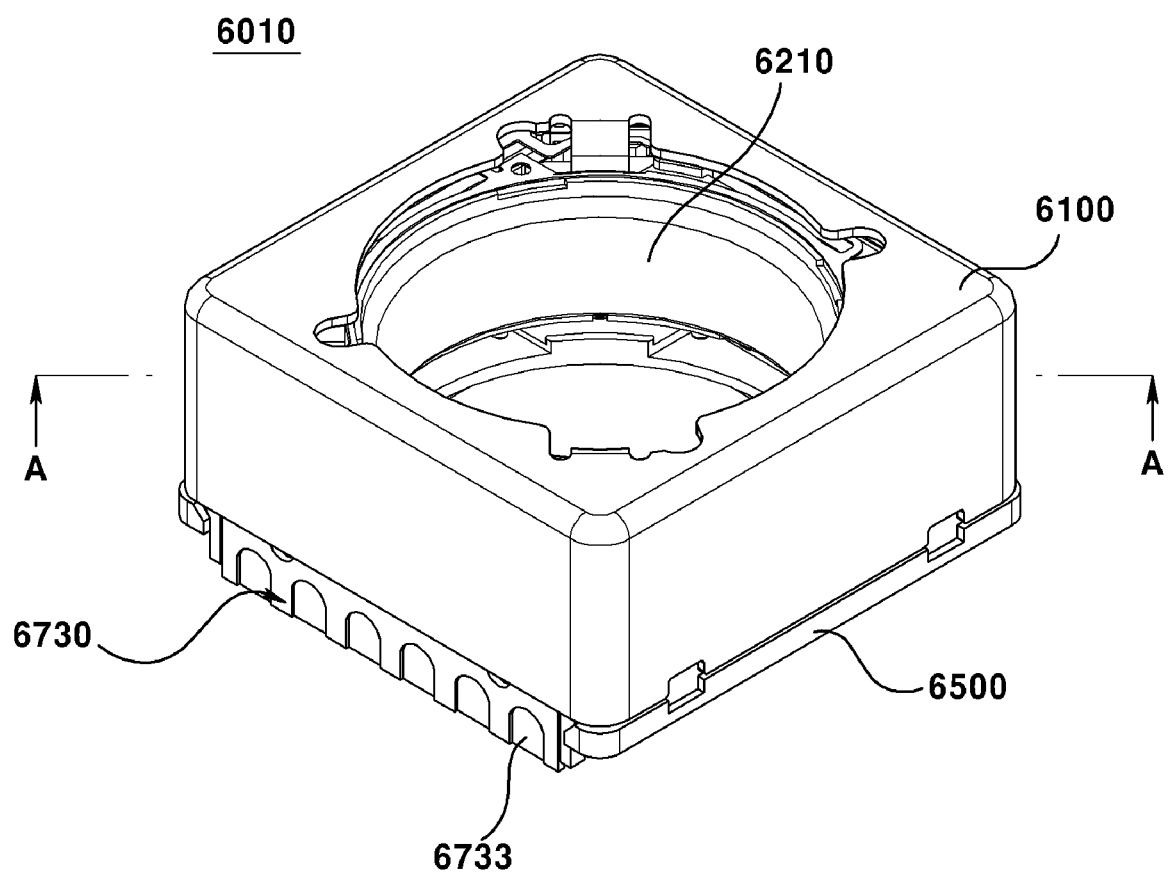
FIG. 50 is a perspective view of a lens driving device according to another exemplary embodiment based on a fourth exemplary embodiment.
Figure 51:
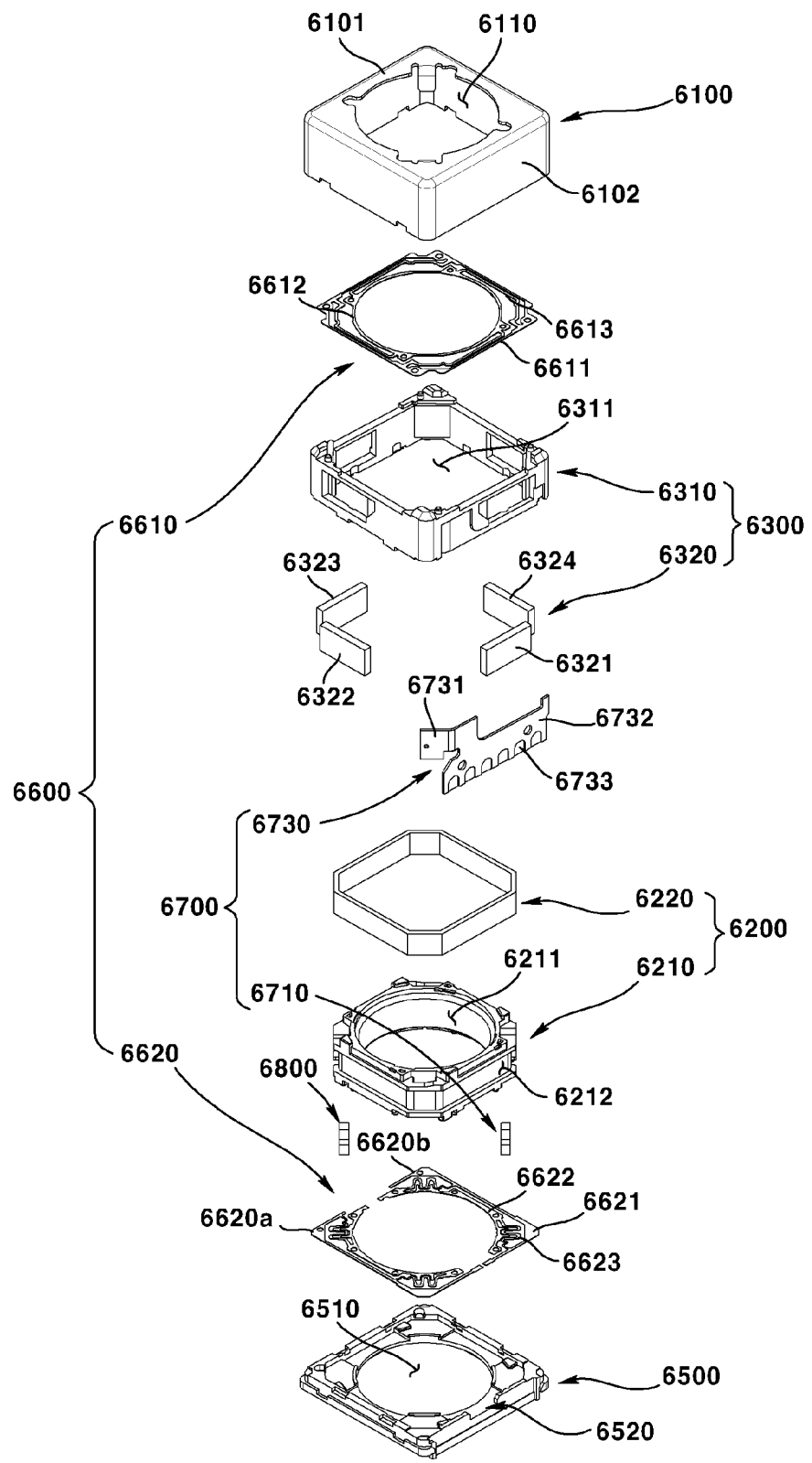
FIG. 51 is an exploded perspective view of a lens driving device according to another exemplary embodiment based on a fourth exemplary embodiment.
Figure 52:
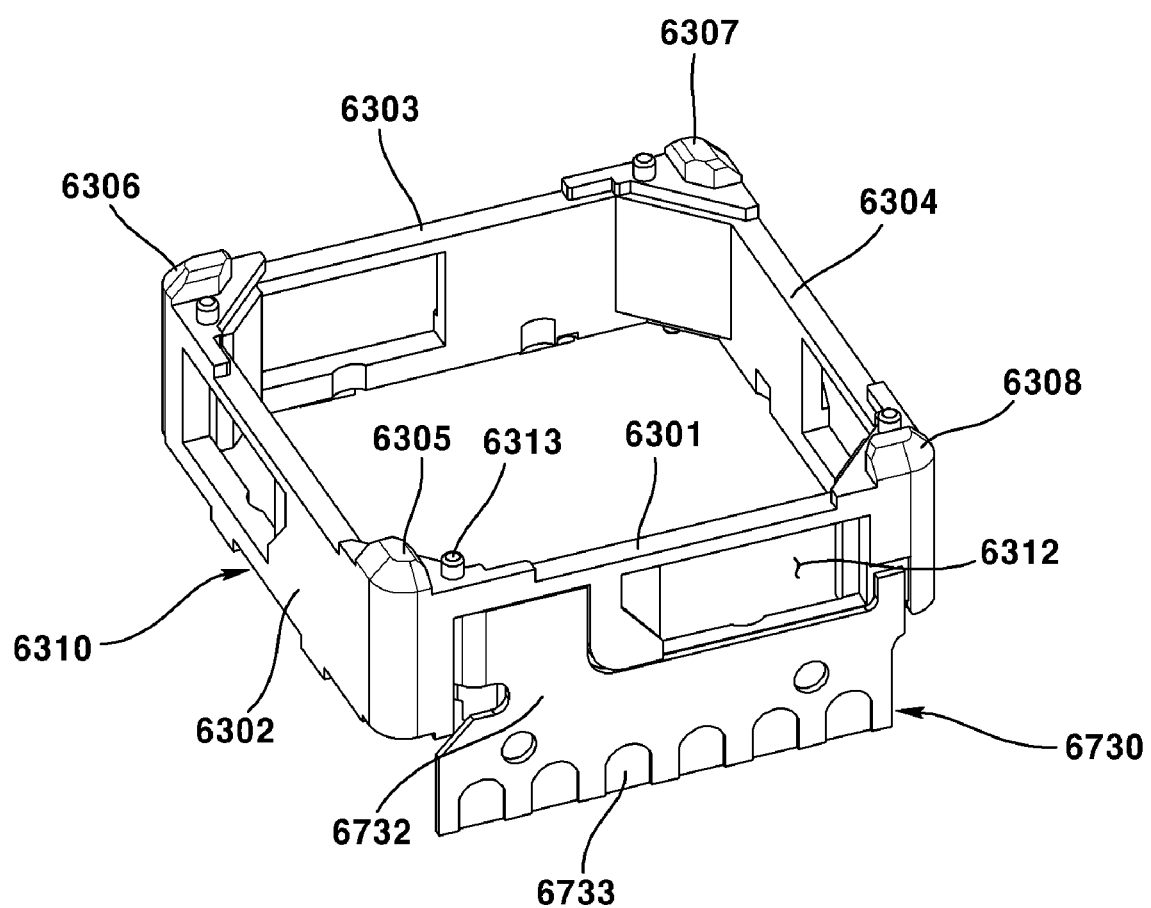
FIG. 52 is a perspective view of some elements of a lens driving device according to another exemplary embodiment based on a fourth exemplary embodiment.
Figure 53:
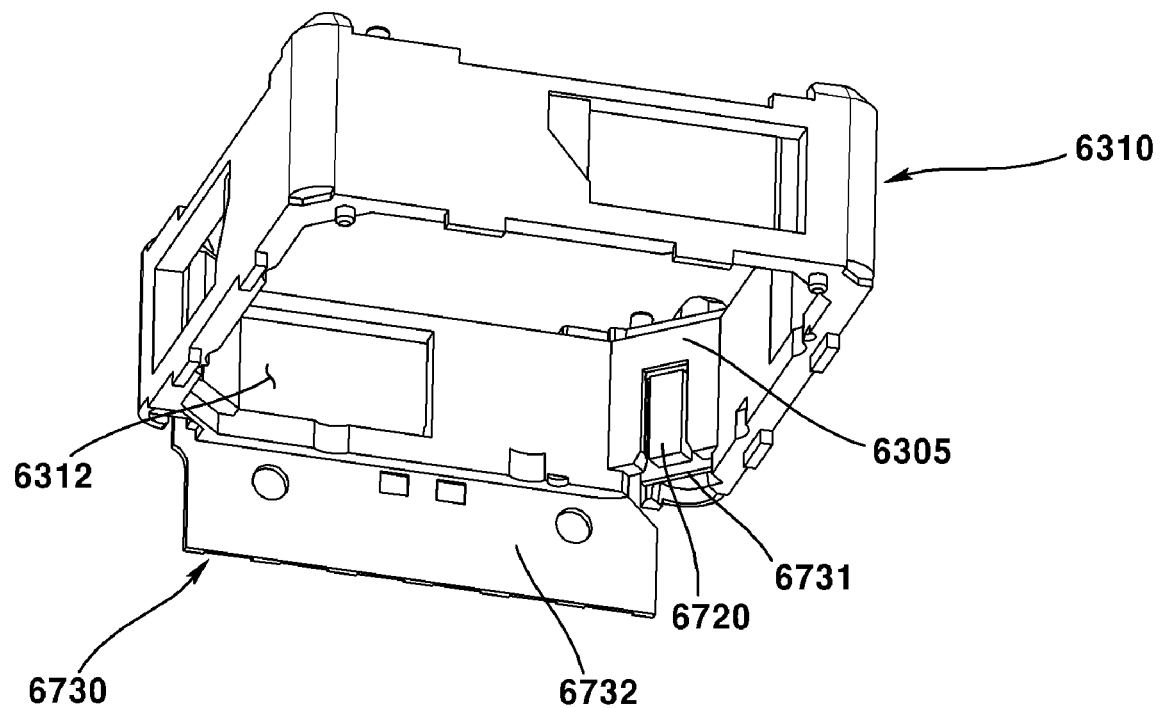
FIG. 53 is a bottom perspective view of some elements of a lens driving device according to another exemplary embodiment based on a fourth exemplary embodiment.
Figure 54:
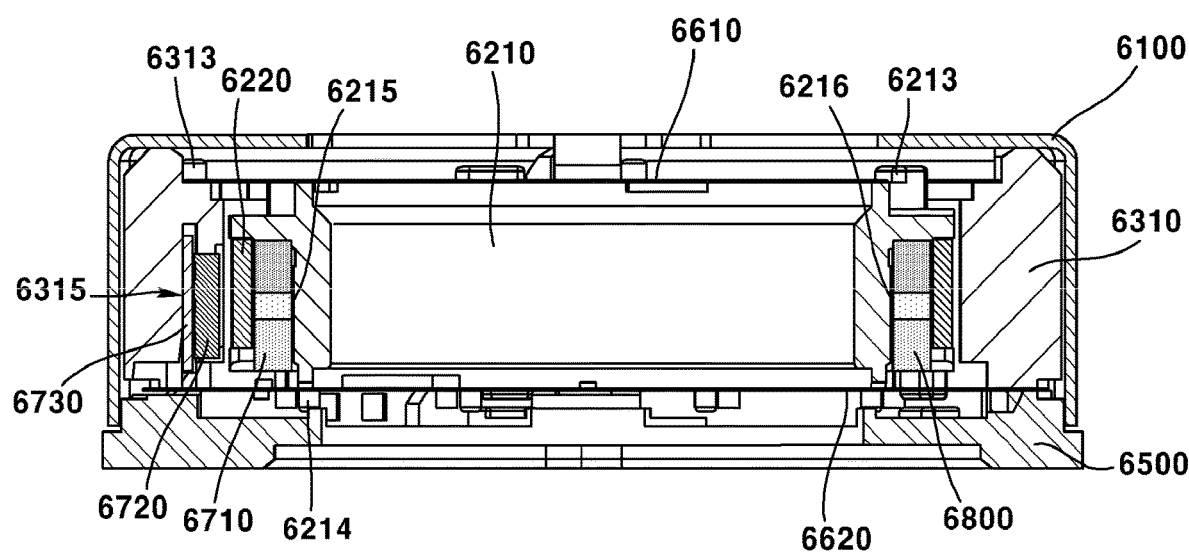
FIG. 54 is a cross-sectional view taken along line A-A of FIG. 50.
Figure 55:
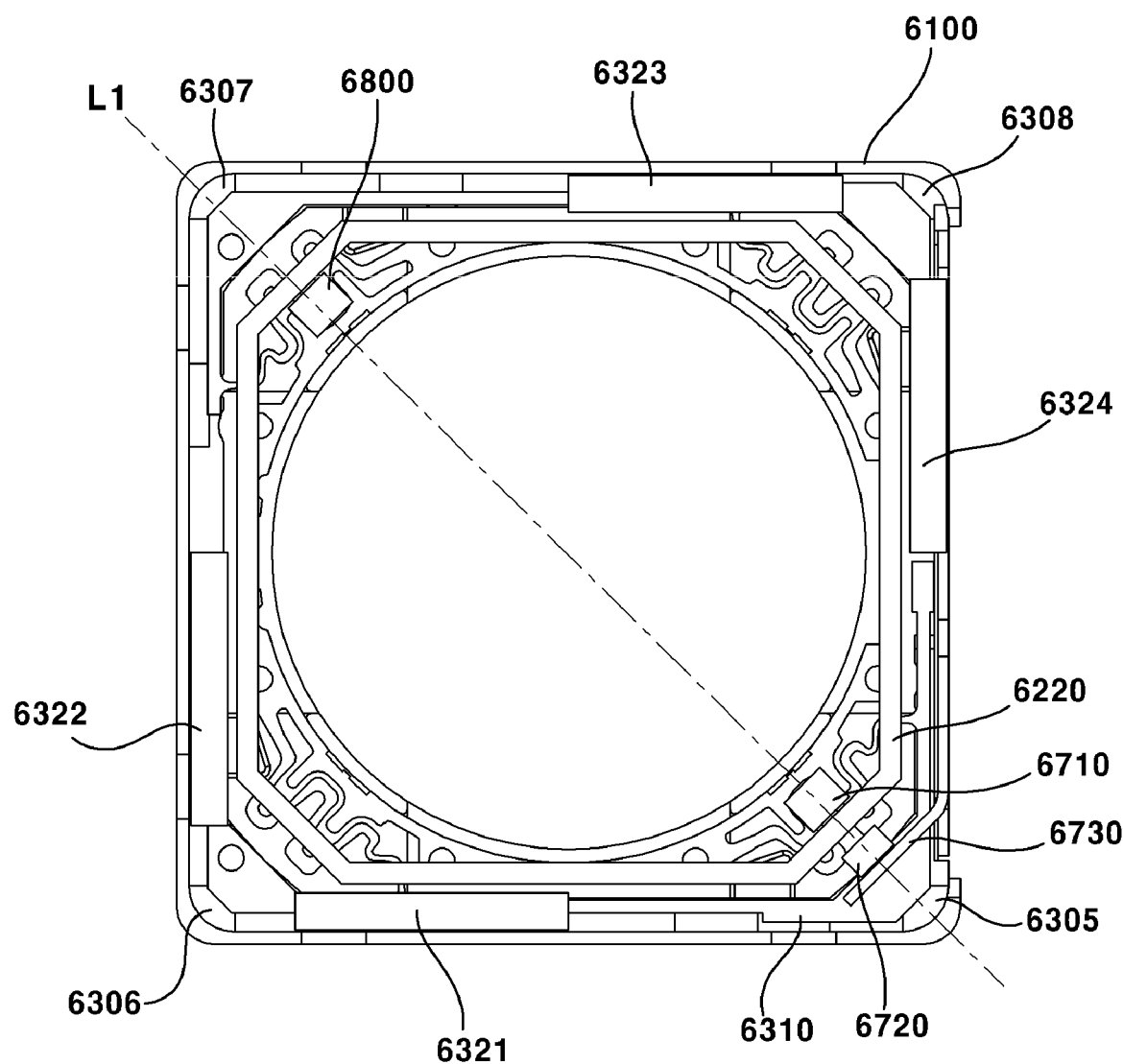
FIG. 55 is bottom view of some elements of a lens driving device according to another exemplary embodiment based on a fourth exemplary embodiment.

FIG. 50 is a perspective view of a lens driving device according to another exemplary embodiment based on a fourth exemplary embodiment, FIG. 51 is an exploded perspective view of a lens driving device according to another exemplary embodiment based on a fourth exemplary embodiment, FIG. 52 is a perspective view of some elements of a lens driving device according to another exemplary embodiment based on a fourth exemplary embodiment, FIG. 53 is a bottom perspective view of some elements of a lens driving device according to another exemplary embodiment based on a fourth exemplary embodiment, FIG. 54 is a cross-sectional view taken along line A-A of FIG. 50, and FIG. 55 is bottom view of some elements of a lens driving device according to another exemplary embodiment based on a fourth exemplary embodiment.

The lens driving device (6010) may comprise a cover member (6100), a mover (6200), a stator (6300), a base (6500), an elastic member (6600) and a sensing unit (6700). However, any one or more of the cover member (6100), a mover (6200), a stator (6300), a base (6500), an elastic member (6600) and a sensing unit (6700) may be omitted or changed from the lens driving device (6010). Particularly, the sensing unit (6700) may be omitted because the sensing unit (6700) is a configuration for AF feedback function.

The cover member (6100) may form an external shape of lens driving device (6010). The cover member (6100) may be of a bottom-opened cubic shape. The shape of cover member (6100) however is not limited thereto. The cover member (6100) may be of a non-magnetic substance. If the cover member (6100) is formed with a magnetic substance, a magnetic force of cover member (6100) may be affected to any one or more of the magnet (6320), the sensing magnet (6710) and the compensation magnet (6800). The cover member (6100) may be formed with a metal material. To be more specific, the cover member (6100) may be formed with metal plate. In this case, the cover member (6100) may shield an EMI (Electro Magnetic Interference). Because of this characteristic of cover member (6100), the cover member (6100) may be called an 'EMI shield can'. The cover member (6100) may be connected to a ground part of PCB (6060). Through this structure, the cover member (6100) may be grounded. The cover member (6100) may inhibit the radio wave generated from outside of lens driving device (6010) from entering into the cover member (6100). Furthermore, the cover member (6100) may inhibit the radio wave generated from inside of the cover member (6100) from being discharged to an outside of cover member (6100).

The cover member (6100) may comprise an upper plate (6101) and a side plate (6102). The cover member (6100) may comprise an upper plate (6101) and a side plate (6102) downwardly extended from an outer periphery of the upper plate (6101). For example, the cover member (6100) may be coupled to the base (6500). A portion of the side plate (6102) of the cover member (6100) may be coupled to the base (6500). A lower end of side plate (6102) of cover member (6100) may be disposed at a staircase part (6435) of base (6500). An inner periphery surface of side plate (6102) of cover member (6100) may directly contact an outer lateral surface of base (6500). An inner lateral surface of the side plate (6102) of cover member (6100) may be coupled to the base (6500) by an adhesive (not shown). In another example, the cover member (6100) may be directly coupled to a top surface of PCB (6060). An inner space formed by the cover member (6100) and the base (6500) may be disposed with a mover (6200), a stator (6300) an elastic member (6600). Through this structure, the cover member (6100) may protect inner elements from outside shock and simultaneously inhibit penetration of foreign objects from outside. The cover member (6100) may comprise an opening (6110).

The opening (6110) may be formed on the upper plate (6101) of cover member (6100). The opening (6110) may upwardly expose the lens module (6020). The opening (6110) may be formed with a shape corresponding to that of the lens module (6020). The size of opening (6110) may be formed to be greater than a diameter of the lens module (6020) to allow the lens module (6020) to be assembled through the opening (6110). A light having introduced through the opening (6110) may pass through the lens module (6020). At this time, the light having passed the lens module (6020) may be converted by the image sensor to an electric signal and obtained as an image.

The mover (6200) may be coupled to the lens module (6020) (However, the lens module (6020) may be explained as one of the elements of the lens driving device (6010)} which is one element of camera module (6003). The mover (6200) may be accommodated into an inside of the lens module (6020). An inner periphery surface of the mover (6200) may be coupled by an outer periphery surface of the lens module (6020). The mover (6200) may move through an interaction with the stator (6300). At this time, the mover (6200) may move integrally with the lens module (6020). Meantime, the mover (6200) may be moved for AF function. At this time, the mover (6200) may be called an 'AF mover'. However, the present description is not limited to a member moving the mover (6200) only for AF function. The mover (6200) may also move for OIS function.

The mover (6200) may comprise a bobbin (6210) and a coil (6220). However, any one or more of the bobbin (6210) and the coil (6220) may be omitted or changed from the mover (6200).

The bobbin (6210) may be disposed at an inside of the housing (6310). The bobbin (6210) may be disposed on a through hole (6311) of the housing (6310). The bobbin (6210) may move to an optical axis direction about the housing (6310). The bobbin (6210) may be so disposed on the through hole (6311) of the housing (6310) as to move along an optical axis. The bobbin (6210) may be coupled to the lens module (6020). An inner periphery surface of the bobbin (6210) may be coupled by an outer periphery surface of the lens module (6020). The bobbin (6210) may be coupled by a coil (6220). An outer periphery surface of bobbin (6210) may be coupled by the coil (6220). A top surface of bobbin (6210) may be coupled with an upper elastic member (6610). A lower end of the bobbin (6210) may be coupled with a lower elastic member (6620).

The bobbin (6210) may comprise a through hole (6211), a coil coupling part (6212), an upper coupling part (6213) and a lower coupling part (6214). However, any one or more of the through hole (6211), a coil coupling part (6212), an upper coupling part (6213) and a lower coupling part (6214) may be omitted or changed from the bobbin (6210).

The through hole (6211) may be formed at an inside of the bobbin (6210). The through hole (6211) may take an upper-bottom opened shape. The through hole (6211) may be coupled by the lens module (6020). An inner periphery surface of through hole (6211) may be formed with a screw thread corresponding to that formed on an outer periphery surface of the lens module (6020). That is, the through hole (6211) may be coupled by a screw thread of the lens module (6020). An adhesive may be interposed between the lens module and the bobbin (6210). At this time, the adhesive may be an epoxy hardened by UV, heat and laser.

The coil coupling part (6212) may be coupled by a coil (6220). The coil coupling part (6212) may be formed at an outer periphery surface of bobbin (6210). The coil coupling part (6212) may be formed by a groove formed by allowing a portion of the outer periphery surface of bobbin (6210) to be inwardly recessed. At this time, the coil coupling part (6212) may be accommodated by at least a portion of the coil (6220). The coil coupling part (6212) may be integrally formed with the outer periphery surface of bobbin (6210). For example, the coil coupling part (6212) may be continuously formed along the outer periphery surface of bobbin (6210). At this time, the coil coupling part (6212) may be wound with a coil (6220). In another example, the coil coupling part (6212) may be formed in a plural number, each being mutually spaced apart from the other. At this time, the coil (6220) may be also formed in a plural number to be respectively coupled to the coil coupling part (6212). Furthermore, in another example, the coil coupling part (6212) may be formed with an upper or bottom opened shape. At this time, the coil (6220) may be inserted and coupled to the coil coupling part (6212) through the opened portion while being in a pre-wound state.

The upper coupling part (6213) may be coupled to an upper elastic member (6610). The upper coupling part (6213) may be coupled to an inner periphery surface (6612) of the upper elastic member (6610). The upper coupling part (6213) may be upwardly protruded from a top surface of bobbin (6210). For example, the protruder of the upper coupling part (6213) may be coupled by being inserted into a groove or a hole of an inner periphery surface (6612) of the upper elastic member (6610). At this time, the protruder of the upper coupling part (6213) may be fused while being inserted into the hole of the inner periphery surface (6612) to fix the upper elastic member (6610) between the fused protruder and the top surface of bobbin (6210).

The lower coupling part (6214) may be coupled to the lower elastic member (6620). The lower coupling part (6214) may be coupled to an inner periphery surface (6622) of the lower elastic member (6620). The lower coupling part (6214) may be downwardly protruded from a lower surface of bobbin (6210). For example, the protruder of the lower coupling part (6214) may be coupled by being inserted into a groove or a hole of the inner periphery surface (6622) of the lower elastic member (6620). At this time, the protruder of the lower coupling part (6214) may be fused while being inserted into the hole of the inner periphery surface (6622) to fix the lower elastic member (6620) between the fused protruder and the lower surface of bobbin (6210).

The bobbin (6210) may comprise a sensing magnet reception part (6215) accommodated by a sensing magnet (6710). The sensing magnet reception part (6215) may be formed at one side of bobbin (6210). The sensing magnet reception part (6215) may accommodate the sensing magnet (6710). The sensing magnet reception part (6215) may be formed by being inwardly recessed from the coil coupling part (6212).

The bobbin (6210) may comprise a compensation magnet reception part (6216) accommodated by a compensation magnet (6800). The compensation magnet reception part (6216) may be formed at the other side of bobbin (6210). The compensation magnet reception part (6216) may accommodate the compensation magnet (6800). The compensation magnet reception part (6216) may be formed by inwardly recessed from the coil coupling part (6212). The compensation magnet reception part (6216) may be so disposed as to be symmetrical with the sensing magnet reception part (6215) about a center of the bobbin (6210). In this case, when magnetism of the sensing magnet (6710) accommodated into the sensing magnet reception part (6215) and magnetism of the compensation magnet (6800) accommodated into the compensation magnet reception part (5216) are symmetrical, an electromagnetic balance between the sensing magnet (6710) and the compensation magnet (6800) may be realized, and as a result, an influence affected on an electromagnetic interaction between the coil (6220) and the magnet (6320) by the sensing magnet (6710) may be minimized.

The coil (6220) may be disposed on the bobbin (6210). The coil (6220) may be disposed at an outer periphery surface of bobbin (6210). The coil (6220) may be directly wound on the bobbin (6210). The coil (6220) may face the magnet (6320). In this case, when a current is supplied to the coil (6220) to form a magnetic field about the coil (6220), the coil (6220) may move relative to the magnet (6320) in response to the electromagnetic interaction between the coil (6220) and the magnet (6320). The coil (6220) may electromagnetically interact with the magnet (6320). The coil (6220) may move the bobbin (6210) relative to the housing (6310) through the electromagnetic interaction with the magnet (6320) to an optical axis. For example, the coil (6220) may be an integrally-formed one coil. In another example, the coil (6220) may comprise a plurality of coils, each coil being mutually spaced apart. The coil (6220) may comprise four coils, each being mutually spaced apart. At this time, the four coils may be disposed at an outer periphery surface of bobbin (6210) to allow two adjacent coils to mutually form a 90°.

The coil (6220) may comprise a pair of lead cables for power supply. At this time, the pair of lead cables on the coil (6220) may be electrically connected to a first lower elastic unit (6620a) and a second lower elastic unit (6620b), which are divisive elements of the lower elastic member (6620). That is, the coil (6220) can receive the power through the lower elastic member (6620). To be more specific, the coil (6220) may receive the power sequentially through the PCB (6060), the substrate (6730) and the lower elastic member (6620). Alternatively, the coil (6220) may receive the power through the upper elastic member (6610).

The stator (6300) may be disposed at an outside of mover (6200). The stator (6300) may be supported by the base (6500) disposed thereunder. The stator (6300) may be disposed at an inner space of cover member (6100). The stator (6300) may move the mover (6200) through the electromagnetic interaction.

The stator (6300) may comprise a housing (6310) and a magnet (6320). However, any one or more of the housing (6310) and the magnet (6320) may be omitted or changed from the stator (6300). The stator (6300) may comprise a housing (6310) disposed at an outside of bobbin (6210). The stator (6300) may comprise a magnet (6320) facing the coil (6220) and fixed to the housing (6310).

The housing (6310) may be disposed at an outside of bobbin (6210). The housing (6310) may be disposed at an inside with the bobbin (6210). The housing (6310) may be disposed with a magnet (6320). The housing (6310) may be coupled to an elastic member (6600). A top surface of housing (6310) may be coupled with the upper elastic member (6610). The housing (6310) may be coupled at a lower surface to the lower elastic member (6620). The housing (6310) may be formed with a shape corresponding to an inner periphery surface of the cover member (6100). The housing (6310) may be formed with an insulation material. The housing (6310) may be formed with an injection in consideration of productivity. The housing (6310) may be fixed to a top surface of the base (6500). Alternatively, the housing (6310) may be omitted and the magnet (6320) may be directly fixed to the cover member (6100).

The housing (6310) may comprise first to fourth side parts (6301, 6302, 6303, 6304). The housing (6310) may comprise first to fourth corner portions (6305, 6306, 6307, 6308) formed among the first to fourth side parts (6301, 6302, 6303, 6304). The housing (6310) may comprise first to fourth corner portions (6305, 6306, 6307, 6308), each mutually being spaced apart.

The housing (6310) may comprise a first corner portion (6305) formed between the first and second side parts (6301, 6302). The housing (6310) may comprise a second corner portion (6306) formed between the second and third side parts (6302, 6303). The housing (6310) may comprise a third corner portion (6307) formed between the third and fourth side parts (6303, 6304). The housing (6310) may comprise a fourth corner portion (6308) formed between the fourth and first side parts (6304, 6301). At this time, a sensor (6720) may be disposed on the first corner portion (6305).

The housing (6310) may comprise a through hole (6311), a magnet coupling part (6312), an upper coupling part (6313), a lower coupling part and a sensing unit reception part (6315). However, any one or more of the through hole (6311), the magnet coupling part (6312), the upper coupling part (6313), the lower coupling part and the sensing unit reception part (6315) may be omitted or changed from the housing (6310).

The housing (6310) may be opened at an upper side and a bottom side to movably accommodate the bobbin (6210) to an optical axis direction. The through hole (6311) may be movably disposed with the bobbin (6210). The through hole (6311) may be formed with a shape corresponding to that of the bobbin (6210). An outer periphery surface of through hole (6311) may be spaced apart from an outer periphery surface of bobbin (6210).

The housing (6310) may comprise a magnet coupling part (6312) formed at a side surface with a shape corresponding to that of the magnet (6320) to accommodate the magnet (6320). The magnet coupling part (6312) may fix the magnet (6320) by accommodating the magnet (6320). The magnet coupling part (6312) may be so formed as to penetrate a side surface of housing (6310). Alternatively, the magnet coupling part (6312) may be formed at an inner periphery surface of the housing (6310) by being recessed thereinto.

The housing (6310) may comprise an upper coupling part (6313) coupled with the upper elastic member (6610). The upper coupling part (6313) may be coupled to an outer periphery surface (6611) of upper elastic member (6610). For example, a protruder of the upper coupling part (6313) may be coupled by being inserted into a groove or a hole of the outer periphery surface (6611). At this time, the protruder of the upper coupling part (6313) may fix the upper elastic member (6610) by being fused in a state of being inserted into the hole of the outer periphery surface (6611).

The housing (6310) may comprise a lower coupling part coupled with the lower elastic member (6620). The lower coupling part may be coupled to an external part (6621) of the lower elastic member (6620). For example, a protruder of the lower coupling part may be coupled by being inserted into a groove or a hole of the external part (6621). At this time, the protruder of the lower coupling part may fix the lower elastic member (6620) by being fused in a state of being inserted into a hole of the external part (6621). Alternatively, the external part (6621) of lower elastic member (6620) may be fixed by a method of being inserted between a lower surface of housing (6310) and a top surface of base (6500).

The housing (6310) may be formed with a sensing unit reception part (6315). The sensing unit reception part (6315) may be formed on the housing (6310). The sensing unit reception part (6315) may accommodate at least a portion of sensor (6720). The sensing unit reception part (6315) may accommodate at least a portion of the substrate (6730). The sensing unit reception part (6315) may be formed on a first side surface (6301) and a first corner portion (6305) of housing (6310). To be more specific, the sensing unit reception part (6315) may comprise a groove formed by allowing a side surface of housing (6310) to be inwardly recessed. Furthermore, the sensing unit reception part (6315) may comprise a groove formed by allowing a portion of the first corner portion (6305) to be recessed. Through this stricter, the sensor (6720) may be disposed on the first corner portion (6305) of housing (6310).

The magnet (5320) may be disposed on the housing (6310). The magnet (6320) may face the coil (6220). The magnet (6320) may be fixed to a magnet coupling part (6312) of housing (6310). The magnet (6320) may be adhered to the housing (6310) by an adhesive. The magnet (6320) may move the coil (6220) through an electromagnetic interaction with the coil (6220). The magnet (6320) may not be overlapped with a body part (6742) of substrate (6740) to a direction perpendicular to an optical axis.

The magnet (6320) may comprise a plurality of magnets. The magnet (6320) may comprise first to fourth magnets (6321, 6322, 6323, 6324). The magnet (6320) may comprise a first magnet (6321) disposed at a first side part (6301), a second magnet (6322) disposed at a second side part (6302), a third magnet (6323) disposed at a third side part (6303) and a fourth magnet (6324) disposed at a fourth side part (6304).

The first to fourth magnets (6321, 6322, 6323, 6324) may be mutually spaced apart. The first to fourth magnets (6321, 6322, 6323, 6324) may be disposed on the housing (6310) to allow two adjacent magnets to mutually form 90°. The first magnet (6321) may be symmetrical with the third magnet (6323) about a center of housing (6310). The second magnet (6322) may be symmetrical with the fourth magnet (6324) about a center of housing (6310).

A center of first magnet (6321) may be disposed nearer to the fourth corner portion (6308) than the first corner portion (6305) of housing (6310). That is, the center of first magnet (6321) may be disposed to be leaned toward a fourth corner portion (6308) side. A center of the second magnet (6322) may be disposed nearer to the second corner portion (6306) than the first corner portion (6305) of housing (6310). That is, the center of second magnet (6322) may be disposed to be leaned toward a second corner portion (6306) side. A center of third magnet (6323) may be disposed to be nearer to the second corner portion (6306) than the third corner portion (6307) of housing (6310). That is, the center of third magnet (6323) may be disposed to be leaned toward a second corner portion (6306) side. A center of fourth magnet (6324) may be disposed nearer to the fourth corner portion (6308) than the third corner portion (6307) of housing (6310). That is, the center of fourth magnet (6324) may be leaned toward a fourth corner portion (6308) side. In this case, an electromagnetic interference between the first to fourth magnets (6321, 6322, 6333, 6334) and the sensing unit (6700) can be minimized. That is, in the present exemplary embodiment, an arrangement space of sensing unit (6700) can be secured through the shape and arrangement structure of the magnet (6320).

The base (6500) may be disposed at a lower side of bobbin (6210). The base (6500) may be disposed at a lower side of housing (6310). The base (6500) may support the stator (6300). A lower side of base (6500) may be disposed with the PCB (6060). The base (6500) may replace a sensor base (6030) protecting the image sensor (6050) mounted on the PCB (6060).

The base (500) may comprise a through hole (6510), a terminal reception part (6520) and a foreign object collection part (not shown).

The base (6500) may comprise a through hole (6510) formed at a position corresponding to that of the through hole (6211) of bobbin (6210). The through hole (6510) of base (6500) may be coupled by a filter (6040). Alternatively, the filter (6040) may be coupled to the sensor base (6030) disposed at a lower surface of base (6500).

The base (6500) may comprise a terminal reception part (6520) in which at least a portion of the terminal part (6733) of the substrate (6730) is accommodated. The terminal reception part (6520) may accommodate at least a portion of the terminal part (6733) of substrate (6730). The terminal reception part (6520) may be formed by inwardly being recessed from an outer periphery surface of base (6500). The terminal part (6733) accommodated into the terminal reception part (6520) may be so disposed as to allow a terminal to be exposed to an outside.

The base (6500) may comprise a foreign object collection part collecting foreign objects introduced into the cover member (6100). The foreign object collection part may be disposed at a top surface of base (6500) to comprise an adhesive material and to collect foreign objects on an inner space formed by the cover member (6100) and the base (6500).

The elastic member (6600) may be coupled to the bobbin (6210) and the housing (6310). At least a portion of the elastic member (6600) may have elasticity. The elastic member (6600) may movably support the bobbin (6210) relative to the housing (6310). The elastic member (6600) may movably support the bobbin (6210) relative to the base (6500).

The elastic member (6600) may comprise an upper elastic member (6610) coupled to a top surface of housing (6310) and to a top surface of bobbin (6210), and a lower elastic member (6620) coupled to a lower surface of housing (6310) and to a lower surface of bobbin (6210).

The elastic member (6600) may comprise an upper elastic member (6610) coupled to a top surface of bobbin (6210) and to a top surface of housing (6310). The upper elastic member (6610) may be disposed at a top surface of bobbin (6210) and may be coupled to the bobbin (6210) and the housing (6310). The upper elastic member (6610) may be coupled to a top surface of bobbin (6210) and to a top surface of housing (6310). The upper elastic member (6610) may elastically support the bobbin (6210) relative to the housing (6310).

The upper elastic member (6610) may comprise an external part (6611), an internal part (6612) and a connection part (6613). The upper elastic member (6610) may comprise an external part (6611) coupled with the housing (6310), an internal part (6612) coupled to the bobbin (6210), and a connection part (6613) elastically connecting the external part (6611) and the internal part (6612).

The elastic member (6600) may comprise a lower elastic member (6620) coupled to a lower surface of bobbin (6210) and to a lower surface of housing (6310). The lower elastic member (6620) may be disposed at a lower side of bobbin (6210) and may be coupled to the bobbin (6210) and the housing (6310). The lower elastic member (6620) may be coupled to a lower surface of bobbin (6210) and a lower surface of housing (6310). The lower elastic member (6620) may elastically support the bobbin (6210) relative to the housing (6310). The external part (6621) of the lower elastic member (6620) may be fixed by being pressed between a lower surface of housing (6310) and a top surface of base (6500).

The lower elastic member (6620) may comprise an external part (6621), an internal part (6622) and a connection part (6623). The lower elastic member (6620) may comprise an external part (6621) coupled to the housing (6310), an internal part (6622) coupled to the bobbin (6210), and a connection part (6623) elastically connecting the external part (6621) and the internal part (6622).

The lower elastic member (6620) may be formed with a pair to supply a power to the coil (6220). The lower elastic member (6620) may comprise a first lower elastic unit (6620a) elastically connecting a distal end of the coil (6220) and the substrate (6730). The lower elastic member (6620) may comprise a second lower elastic unit (6620b) spaced apart from the first lower elastic unit (6620a) to electrically connect the other distal end of the coil (6220) and the substrate (6730).

The sensing unit (6700) may provide position information of lens module (6020) by detecting the position information of the lens module (6020) for AF feedback function. The sensing unit (6700) may comprise a sensing magnet (6212), a sensor (6720) and a substrate (6730). However, any one or more of the sensing magnet (6212), the sensor (6720) and the substrate (6730) may be omitted or changed from the sensing unit (6700).

The sensing magnet (6710) may be disposed at one side of bobbin (6210). The compensation magnet (6800) may be disposed at the other side of bobbin (6210). The sensor (6720) may detect the sensing magnet (6710) by being disposed at the housing (6310).

The sensing magnet (6710) may be disposed at the bobbin (6210). The sensing magnet (6710) may be detected by the sensor (6720). The sensing magnet (6710) may be so disposed as to face the first corner portion (6305) of the housing (6310). The sensing magnet (6710) may be disposed on a first virtual straight line (L1 of FIG. 10) connecting the first corner portion (6305) and the third corner portion (6307). The sensing magnet (6710) may have a magnetism corresponding to that of the compensation magnet (6800). The sensing magnet (6710) may be disposed at one side of bobbin (6210). The sensing magnet (6710) may be overlapped with the coil (6220) to a direction perpendicular to an optical axis. The sensing magnet (6710) may be disposed at an inside of the coil (6220). The sensing magnet (6710) may be magnetized with four poles and may be disposed in consideration of relative position of the sensor (6720) in order to use only a section where a Hall output is outputted with a positive number.

The sensor (6720) may detect the sensing magnet (6710). The sensor (6720) may be disposed on an imaginary straight line of a first virtual straight line (L1) connecting the first corner portion (6305) and the third corner portion (6307). That is, the sensor (6720), the sensing magnet (6710) and the compensation magnet (6800) may all be disposed on the first virtual straight line (L1). The sensor (6720) may be mounted on the substrate (6730). The sensor (6720) may be mounted on an extension part (6731) of substrate (6730). The sensor (6720) may be formed with a Hall sensor (Hall IC) detecting the magnetic field of magnet.

The Hall sensor may be fixed on the housing (6310) and the sensing magnet (6710) may be fixed on the bobbin (6210). When the sensing magnet (6710) moves along with the bobbin (6210), a magnetic flux density detected by the Hall IC inside the Hall sensor may be changed in response to relative position of the Hail sensor and the sensing magnet (6710). The Hall sensor may detect the position of lens module (6020) using an output voltage of Hall sensor that is proportionate to a magnetic flux density that changes in response to a relative position between the Hall sensor and the sensing magnet (6710).

The substrate (6730) may be mounted with a sensor (6720). At least a portion of the substrate (6730) may be accommodated into the sensing unit reception part (6315) formed on the housing (6310). The substrate (6730) may be electrically connected to a distal end of the coil (6220) by the first lower elastic unit (6620*a*). The substrate (6730) may be electrically connected to the other distal end of the coil (6220) by the second lower elastic unit (66206). That is, the substrate (6730) may supply a power to the coil (6220) through the lower elastic member (6620).

The substrate (6730) may comprise a body part (6732) contacted to a side part of housing (6310). The substrate (6730) may comprise a terminal part (6733) downwardly extended from the body part (6732). The substrate (6730) may comprise an extension part (6731) bent from the body part (6732) to be inserted into the housing (6310) and mounted with the sensor (6720). The substrate (6730) may be an FPCB (Flexible Printed Circuit Board). However, the present invention is not limited thereto.

The substrate (6730) may be inserted to the sensing unit reception part (6315) of housing (6310) from a lower side. The substrate (6730) may be fixed by an adhesive (not shown) while being inserted into the sensing unit reception part (6315) of housing (6310). The substrate (6730) may be so arranged as to allow the body part (6732) to be disposed on an outside of housing (6310) and to allow the extension part (6731) to be disposed at an inside of housing (6310) while being inserted into the sensing unit reception part (6315) of housing (6310). Through this structure, the terminal part (6733) disposed at a lower side of body part (6732) may be easy to be coupled for electrical conduction with an outside element, and the sensor (6720) mounted at an inside surface of extension part (6731) can detect the sensing magnet (6710) disposed at an inside with a high output.

The extension part (6731) may be extended into an inside of the housing (6310) by being bent from the body part (6732). The extension part (6731) may be mounted with the sensor (6720). The body part (6732) may be contacted to an outside lateral surface of housing (6310). The body part (6732) may not be overlapped with the magnet (6320) to a direction perpendicular to an optical axis. The terminal part (6733) may be downwardly extended from the body part (6732). The terminal part (6733) may be exposed to an outside.

The lens driving device (6010) may comprise a compensation magnet (6810). The compensation magnet (6800) may have magnetism corresponding to that of the sensing magnet (6710). The compensation magnet (6800) may be disposed at the other side of bobbin (6210). The compensation magnet (6800) may be disposed on a first virtual line (L1) which is an imaginary straight line connecting the first corner portion (6305) and the third corner portion (6307). The compensation magnet (6800) may be symmetrical about a center between the sensing magnet (6710) and the bobbin (6210). Through this structure, an electromagnetic balance between the sensing magnet (6710) and the compensation magnet (6800) may be realized. As a result, the influence affected on an electromagnetic interaction between the coil (6220) and the magnet (6320) by the sensing magnet (6710) may be minimized.

Hereinafter, operation of camera module according to the fourth exemplary embodiment will be described.

To be more specific, an AF function of a camera module (6003) according to the fourth exemplary embodiment will be described. When a power is supplied to the coil (6220), the coil (6220) performs movement to the magnet (6320) by the electromagnetic interaction between the coil (6220) and the magnet (6320). At this time, the bobbin (6210) coupled by the coil (6220) integrally moves along with the coil (6220). That is, the bobbin (6210) coupled at an inside by the lens module (6020) may move relative to the housing (6310) to an optical axis direction. The said movement by the bobbin (6210) results in the lens module (6020) moving nearer to or distancing from the image sensor (6050), whereby supply of power to the coil (6220) can perform the focus adjustment to a subject according to the present exemplary embodiment.

Meantime, in the camera module (6003) according to the fourth exemplary embodiment, an AF feedback is applied in order to realize a more accurate AF function. The sensor (6720) arranged on the housing (6310) detects the magnetic field of sensing magnet (6710) fixed to the bobbin (6210). When the bobbin (6210) moves a relative movement to the housing (6310), a distance between the sensor (6720) and the sensing magnet (6710) is changed to thereby change the amount of magnetic field detected by the sensor (6720). The sensor (6720) detects the movement of bobbin (6210) to the optical axis or the position of bobbin (6210) using the abovementioned method, and transmits the detection value to a controller. The controller determines whether to perform an additional movement to the bobbin (6210) through the received detection value. These types of processes are generated in real time, such that the AF function of the camera module (6003) according to the present invention can be more accurately performed through the AF feedback function.

So far, the fourth exemplary embodiment has been explained by an AF model capable of performing an AF function. However, in a modification of the fourth exemplary embodiment, it may be possible that the housing (6310) and the base (6500) may be spaced apart, and a side support member (wire or leaf spring) movably supports the housing (6310) relative to the base (6500), and the OIS coil part may be made to face the magnet (6320) on a top surface of base (6500). That is, in the modification to the present exemplary embodiment, the OIS function can be also performed along with the AF function.

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention. Furthermore, terms such as "includes", "including", "have", "having", "comprises" and/or "comprising" as used herein mean that the relevant elements are embedded, unless otherwise described, such that the mentioned elements are not excluded but may be further included.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The foregoing explanations are intended only to be illustrative of the technical ideas of the present invention, and therefore, it should be appreciated by the skilled in the art that various modifications and amendments to the above examples may be made without deviating from the scope of protection of the invention.

The exemplary embodiments disclosed by the present invention are not to limit the technical ideas of the present invention but to explain the present invention, and therefore, the technical ideas of present invention are not to be limited by the exemplary embodiments. The scope of protection of the present invention should be interpreted by the following claims and all technical ideas within the equivalent scope should be interpreted as being included in the scope of right of the present invention.

The invention claimed is:

1. A camera module comprising:
a printed circuit board;
an image sensor disposed on the printed circuit board;
a wire connecting an upper surface of the printed circuit board and an upper surface of the image sensor;
a sensor base disposed on the printed circuit board; and
a filter disposed on the sensor base,
wherein the sensor base comprises a main body disposed with the filter and a support part extending from the main body and disposed on the printed circuit board,
wherein the sensor base comprises a first groove formed on a lower surface of the main body, and a second groove further recessed from the first groove,
wherein the wire is overlapped with the first groove in an optical axis direction,
wherein the second groove comprises a first surface, and the first groove comprises a second surface, the second surface being disposed lower than the first surface,
wherein the main body comprises a third surface,
wherein the sensor base comprises a first border surface connecting the second surface and the third surface, the first border surface forms an obtuse angle with each of the second surface and the third surface, and the first border surface is overlapped in the optical axis direction with an area where the image sensor and the wire meet.

2. The camera module of claim 1, wherein the first surface faces the upper surface of the printed circuit board, and
wherein the second surface faces at least one of the upper surface of the printed circuit board and the upper surface of the image sensor.

3. The camera module of claim 2, wherein the third surface faces the upper surface of the image sensor, and
wherein the third surface is disposed lower than the second surface.

4. The camera module of claim 3, wherein, in the optical axis direction, a distance between the upper surface of the image sensor and the third surface is 0.14 to 0.16 mm, and
wherein, in the optical axis direction, a distance between the third surface and the second surface is 0.02 to 0.03 mm.

5. The camera module of claim 3, comprising a lens driving device disposed on a first area of an upper surface of the sensor base,
wherein the filter is disposed on a second area of the upper surface of the sensor base, and
wherein the second area of the sensor base is disposed lower than the first area of the sensor base.

6. The camera module of claim 5, wherein, in the optical axis direction, a distance between the third surface and the second area is 0.19 to 0.21 mm, and
wherein, in the optical axis direction, a distance between the first area and the second area is 0.23 to 0.29 mm.

7. The camera module of claim 5, comprising:
a lens barrel coupled to the lens driving device; and
a lens coupled to the lens barrel and disposed at a position corresponding to the image sensor.

8. The camera module of claim 7, wherein, in the optical axis direction, a distance between the first area and a lower end of lens barrel is 0.15 to 0.20 mm.

9. The camera module of claim 2, wherein the sensor base comprises a second border surface connecting the first surface and the second surface, and
wherein the second border surface forms an obtuse angle with each of the first surface and the second surface.

10. The camera module of claim 1, wherein at least a portion of the first groove is overlapped with the image sensor in the optical axis direction.

11. The camera module of claim 1, wherein at least a portion of the first groove is overlapped with the filter in the optical axis direction.

12. The camera module of claim 1, wherein the wire is not overlapped with the main body of the sensor base in a direction perpendicular to the optical axis direction.

13. The camera module of claim 1, comprising a circuit element disposed between the second groove of the sensor base and the upper surface of the printed circuit board.

14. The camera module of claim 1, wherein the printed circuit board comprises a groove recessed from the upper surface of the printed circuit board,
wherein the groove of the printed circuit board comprises a cavity surface, and
wherein the image sensor is disposed on the cavity surface so that the image sensor is overlapped with the printed circuit board in a direction perpendicular to the optical axis direction.

15. An optical device comprising:
a main structure;
a camera module of claim 1 disposed on the main structure to capture an image of a subject; and
a display part disposed on the main structure to output the image captured by the camera module.

16. A camera module comprising:
a printed circuit board;
an image sensor disposed on the printed circuit board;
a wire connecting an upper surface of the printed circuit board and an upper surface of the image sensor;
a sensor base disposed on the printed circuit board; and
a filter disposed on the sensor base,
wherein the sensor base comprises a main body disposed with the filter and a support part extending from the main body and disposed on the printed circuit board,
wherein a lower surface of the main body comprises a first surface, a second surface disposed in the first surface, and a third surface disposed in the second surface,
wherein the second surface is disposed lower than the first surface,
wherein the third surface is disposed lower than the second surface,
wherein the wire is overlapped with the second surface in an optical axis direction, and
wherein the sensor base comprises a first border surface connecting the second surface and the third surface, the first border surface forms an obtuse angle with each of the second surface and the third surface, and the first border surface is overlapped in the optical axis direction with an area where the image sensor and the wire meet.

17. The camera module of claim 16, wherein at least a portion of the second surface is overlapped with the image sensor in the optical axis direction.

18. The camera module of claim 16, wherein at least a portion of the second surface is overlapped with the filter in the optical axis direction.

19. A camera module comprising:
a printed circuit board;
an image sensor disposed on the printed circuit board;
a wire connecting an upper surface of the printed circuit board and an upper surface of the image sensor;
a sensor base disposed on the printed circuit board;
a filter disposed on the sensor base; and
a lens driving device disposed on a first area of an upper surface of the sensor base,
wherein the sensor base comprises a main body disposed with the filter and a support part extending from the main body and disposed on the printed circuit board,
wherein the sensor base comprises a first groove formed on a lower surface of the main body and a second groove further recessed from the first groove,
wherein the wire is overlapped with the first groove in an optical axis direction,
wherein the main body comprises a third surface facing the upper surface of the image sensor,
wherein the filter is disposed on a second area of the upper surface of the sensor base,
wherein, in the optical axis direction, a distance between the third surface and the second area is 0.19 to 0.21 mm, and
wherein, in the optical axis direction, a distance between the first area and the second area is 0.23 to 0.29 mm.

* * * * *